United States Patent
Breed et al.

(10) Patent No.: US 8,948,442 B2
(45) Date of Patent: Feb. 3, 2015

(54) OPTICAL MONITORING OF VEHICLE INTERIORS

(75) Inventors: David S Breed, Miami Beach, FL (US); Wendell C Johnson, Wllmington, CA (US); Wilbur E DuVall, Branson West, MO (US)

(73) Assignee: Intelligent Technologies International, Inc., Boonton, NJ (US)

( * ) Notice: Subject to any disclaimer, the term of this patent is extended or adjusted under 35 U.S.C. 154(b) by 1566 days.

(21) Appl. No.: 11/619,863

(22) Filed: Jan. 4, 2007

(65) Prior Publication Data

US 2007/0262574 A1 Nov. 15, 2007

Related U.S. Application Data

(63) Continuation-in-part of application No. 10/931,288, filed on Aug. 31, 2004, now Pat. No. 7,164,117, which is a continuation-in-part of application No. 09/639,303, filed on Aug. 16, 2000, now Pat. No.

(Continued)

(51) Int. Cl.
 *G06K 9/00* (2006.01)
 *B60R 1/00* (2006.01)
 (Continued)

(52) U.S. Cl.
 CPC .......... *B60R 1/00* (2013.01); *B60R 21/015* (2013.01); *G06K 9/00369* (2013.01); *G06K 9/00832* (2013.01); *B60R 2021/0027* (2013.01);
 (Continued)

(58) Field of Classification Search
 USPC .................. 382/291, 321, 156, 159, 165, 100
 See application file for complete search history.

(56) References Cited

U.S. PATENT DOCUMENTS

| 4,512,747 | A | * | 4/1985 | Hitchens et al. ............. 434/428 |
| 4,645,233 | A | | 2/1987 | Bruse et al. |

(Continued)

FOREIGN PATENT DOCUMENTS

| DE | 3802159 | 8/1989 |
| DE | 4023109 | 1/1992 |

(Continued)

OTHER PUBLICATIONS

David S. Breed et al., "Vehicle Occupant Position Sensing", SAE Technical Paper 940527, Feb. 28-Mar. 3, 1994, Detroit, MI, 7 pages.

(Continued)

*Primary Examiner* — Avinash J Yentrapati
(74) *Attorney, Agent, or Firm* — Brian Roffe

(57) ABSTRACT

Vehicle includes a structure defining an interior space for containing or designed to contain one or more objects, and an arrangement mounted on, joined or coupled to the structure for determining whether an object is present in the interior space, or the presence of multiple objects. One arrangement includes at least one optical imaging device arranged to receive images of the interior space defined by the structure, and a processor coupled to the optical imaging device(s) and arranged to determine whether one or more objects are present in the interior space and when one or more objects are determined to be present, to obtain information about the object or objects. The processor is preferably arranged to distinguish between different objects and/or different arrangements of objects. A related method for obtaining information about objects in interior spaces of vehicles is also disclosed.

23 Claims, 34 Drawing Sheets

Related U.S. Application Data 6,910,711, and a continuation-in-part of application No. 10/114,533, filed on Apr. 2, 2002, now Pat. No. 6,942,248, and a continuation-in-part of application No. 10/116,808, filed on Apr. 5, 2002, now Pat. No. 6,856,873, and a continuation-in-part of application No. 10/151,615, filed on May 20, 2002, now Pat. No. 6,820,897, and a continuation-in-part of application No. 10/227,780, filed on Aug. 26, 2002, now Pat. No. 6,950,022, which is a continuation-in-part of application No. 09/838,920, filed on Apr. 20, 2001, now Pat. No. 6,778,672, which is a continuation of application No. 10/365,129, filed on Feb. 12, 2003, now Pat. No. 7,134,687, and a continuation-in-part of application No. 10/457,238, filed on Jun. 9, 2003, now Pat. No. 6,919,803, which is a continuation-in-part of application No. 10/805,903, filed on Mar. 22, 2004, now Pat. No. 7,050,897, which is a continuation of application No. 10/174,709, filed on Jun. 19, 2002, now Pat. No. 6,735,506, which is a continuation-in-part of application No. 10/114,533, filed on Apr. 2, 2002, now Pat. No. 6,942,248, which is a continuation-in-part of application No. 10/940,881, filed on Sep. 13, 2004, now Pat. No. 7,663,502, which is a continuation-in-part of application No. 09/639,303, filed on Aug. 16, 2000, now Pat. No. 6,910,711, and a continuation-in-part of application No. 10/234,067, filed on Sep. 3, 2002, now Pat. No. 6,869,100.

(60) Provisional application No. 60/387,792, filed on Jun. 11, 2002.

(51) Int. Cl.
  B60R 21/015 (2006.01)
  B60R 21/00 (2006.01)

(52) U.S. Cl.
  CPC ............... *B60R2021/01541* (2013.01); *B60R 2300/8073* (2013.01)
  USPC ........................................ 382/100; 382/103

(56) References Cited

U.S. PATENT DOCUMENTS

| | | | |
|---|---|---|---|
| 4,651,157 A | 3/1987 | Gray et al. | |
| 4,706,072 A | 11/1987 | Ikeyama | |
| 4,750,197 A * | 6/1988 | Denekamp et al. | 455/404.2 |
| 4,768,088 A | 8/1988 | Ando | |
| 4,954,962 A * | 9/1990 | Evans et al. | 701/28 |
| 5,008,946 A | 4/1991 | Ando | |
| 5,071,160 A | 12/1991 | White et al. | |
| 5,074,583 A | 12/1991 | Fujita et al. | |
| 5,118,134 A | 6/1992 | Mattes et al. | |
| 5,161,820 A | 11/1992 | Vollmer | |
| 5,214,744 A * | 5/1993 | Schweizer et al. | 382/103 |
| 5,222,761 A | 6/1993 | Kaji et al. | |
| 5,232,243 A | 8/1993 | Blackburn et al. | |
| 5,247,584 A | 9/1993 | Krogmann | |
| 5,298,732 A | 3/1994 | Chen | |
| 5,330,226 A | 7/1994 | Gentry et al. | |
| 5,446,661 A | 8/1995 | Gioutsos et al. | |
| 5,454,591 A | 10/1995 | Mazur et al. | |
| 5,481,245 A | 1/1996 | Moldavsky | |
| 5,482,314 A | 1/1996 | Corrado et al. | |
| 5,490,069 A | 2/1996 | Gioutsos et al. | |
| 5,528,698 A | 6/1996 | Kamei et al. | |
| 5,585,625 A | 12/1996 | Spies | |
| 5,605,348 A | 2/1997 | Blackburn et al. | |
| 5,653,462 A | 8/1997 | Breed et al. | |
| 5,666,441 A * | 9/1997 | Rao et al. | 382/203 |
| 5,721,692 A * | 2/1998 | Nagaya et al. | 345/475 |
| 5,821,633 A | 10/1998 | Burke et al. | |
| 5,829,782 A | 11/1998 | Breed et al. | |
| 5,845,000 A | 12/1998 | Breed et al. | |
| 5,848,802 A | 12/1998 | Breed et al. | |
| 5,871,232 A | 2/1999 | White | |
| 5,901,978 A | 5/1999 | Breed et al. | |
| 5,969,755 A * | 10/1999 | Courtney | 348/143 |
| 6,005,485 A | 12/1999 | Kursawe et al. | |
| 6,018,728 A * | 1/2000 | Spence et al. | 706/20 |
| 6,029,105 A | 2/2000 | Schweizer | |
| 6,107,942 A * | 8/2000 | Yoo et al. | 340/932.2 |
| 6,148,291 A | 11/2000 | Radican | |
| 6,324,453 B1 | 11/2001 | Breed et al. | |
| 6,324,532 B1 * | 11/2001 | Spence et al. | 706/27 |
| 6,325,414 B2 | 12/2001 | Breed et al. | |
| 6,422,595 B1 | 7/2002 | Breed et al. | |
| 6,424,370 B1 * | 7/2002 | Courtney | 348/143 |
| 6,437,702 B1 * | 8/2002 | Ragland et al. | 340/686.1 |
| 6,611,755 B1 * | 8/2003 | Coffee et al. | 701/482 |
| 6,697,103 B1 * | 2/2004 | Fernandez et al. | 348/143 |
| 6,711,279 B1 * | 3/2004 | Hamza et al. | 382/103 |
| 6,712,387 B1 | 3/2004 | Breed et al. | |
| 6,731,805 B2 * | 5/2004 | Brodsky et al. | 382/199 |
| 6,735,630 B1 | 5/2004 | Gelvin et al. | |
| 6,741,977 B1 * | 5/2004 | Nagaya et al. | 1/1 |
| 6,826,607 B1 | 11/2004 | Gelvin et al. | |
| 6,832,251 B1 | 12/2004 | Gelvin et al. | |
| 6,859,831 B1 | 2/2005 | Gelvin et al. | |
| 6,869,100 B2 | 3/2005 | Breed et al. | |
| 6,895,103 B2 * | 5/2005 | Chen et al. | 382/117 |
| 6,895,338 B2 | 5/2005 | Hsiung et al. | |
| 6,901,163 B1 * | 5/2005 | Pearce et al. | 382/165 |
| 6,942,248 B2 | 9/2005 | Breed et al. | |
| 7,020,701 B1 | 3/2006 | Gelvin et al. | |
| 7,023,469 B1 * | 4/2006 | Olson | 348/152 |
| 7,200,246 B2 * | 4/2007 | Cofer et al. | 382/103 |
| 7,212,829 B1 | 5/2007 | Lau et al. | |
| 7,215,795 B2 * | 5/2007 | Ito et al. | 382/103 |
| 7,265,668 B1 | 9/2007 | Brosius | |
| 7,317,830 B1 * | 1/2008 | Gordon et al. | 382/173 |
| 7,411,495 B2 | 8/2008 | Auerbach et al. | |
| 7,499,581 B2 | 3/2009 | Tribble et al. | |
| 7,596,242 B2 | 9/2009 | Breed et al. | |
| 7,596,275 B1 | 9/2009 | Richardson et al. | |
| 7,839,432 B2 * | 11/2010 | Fernandez et al. | 348/143 |
| 7,940,955 B2 | 5/2011 | Zhang et al. | |
| 8,004,403 B2 | 8/2011 | McKethan | |
| 8,047,432 B2 | 11/2011 | Breed | |
| 8,054,203 B2 | 11/2011 | Breed et al. | |
| 8,115,620 B2 | 2/2012 | Breed | |
| 8,242,904 B2 | 8/2012 | Brosius | |
| 8,310,363 B2 | 11/2012 | Breed | |
| 8,354,927 B2 | 1/2013 | Breed | |
| 8,416,075 B2 | 4/2013 | McKethan | |
| 8,482,399 B2 | 7/2013 | Breed | |
| 2001/0010541 A1 * | 8/2001 | Fernandez et al. | 348/143 |
| 2001/0029613 A1 * | 10/2001 | Fernandez et al. | 725/105 |
| 2001/0030599 A1 * | 10/2001 | Zimmermann et al. | 340/426 |
| 2002/0057340 A1 * | 5/2002 | Fernandez et al. | 348/143 |
| 2002/0141637 A1 * | 10/2002 | Brodsky et al. | 382/165 |
| 2003/0133614 A1 * | 7/2003 | Robins et al. | 382/219 |
| 2004/0061777 A1 * | 4/2004 | Sadok | 348/83 |
| 2004/0066887 A1 * | 4/2004 | Garfinkle | 378/57 |
| 2004/0100379 A1 | 5/2004 | Boman et al. | |
| 2004/0125217 A1 * | 7/2004 | Jesson et al. | 348/231.3 |
| 2005/0046567 A1 | 3/2005 | Mortenson et al. | |
| 2005/0199782 A1 | 9/2005 | Calver et al. | |
| 2007/0262574 A1 * | 11/2007 | Breed et al. | 280/735 |
| 2008/0266580 A1 * | 10/2008 | Choi et al. | 358/1.2 |

FOREIGN PATENT DOCUMENTS

| | | | |
|---|---|---|---|
| DE | 4211556 A1 | 10/1993 | |
| GB | 2289332 | 11/1995 | |
| JP | 0342337 | 2/1991 | |
| JP | 3159838 | 7/1991 | |
| JP | 10300689 A * | 11/1998 | G01N 21/90 |
| JP | 2001272357 A * | 10/2001 | G01N 23/04 |

(56) References Cited

OTHER PUBLICATIONS

D. Theodore Zinke, "Small Car Front Seat Passenger Inflatable Restraint System", vol. II—Citation Air Bag Systems, Goleta, CA, Apr. 1981, 62 pages.
WPI Abstract Accession No. 93-321756/41 & DE 421156.
JAPIO Abstract No. 03591391 & JP 3254291.
Search Report for GB 9611810.4 dated Aug. 19, 1996.
Examination Report for GB 9611810.4 dated Nov. 25, 1999.
Cover page of GB 2363638 which corresponds to US 6324453.
Cover page of GB 2324864 which corresponds to US 5829782.
Cover page of GB 2301922 which corresponds to US 5845000.
Cover page of WO 94/22693 which corresponds to US 5653462.
Cover page of WO 2000/038949 which corresponds to US 6324453.
International Search Report for PCT/US1999/031184 (published as WO 2000/038949).
Examination Report for GB 0116062.1 dated Feb. 3, 2003.
International Preliminary Examination Report for PCT/US1999/31184.
Cover page of EP 0669227 which corresponds to 5585625.
Cover page of WO 95/27635 which corresponds to 5482314.
Cover page of WO 94/23974 which corresponds to 5446661 and 5490069.
Abstract of JP 4068500.
Abstract of JP 3254291.
Abstract of DE 4211556.
Examination Report for GB 9816593.9 dated Aug. 28, 1998.
Examination Report for GB 9816593.9 dated Oct. 29, 1998.
Final Report for GB 9816593.9 dated Nov. 25, 1998.
Response to Examination Report for GB 9816593.9 dated Sep. 24, 1998.
Response to Examination Report for GB 9816593.9 dated Nov. 17, 1998.
Examination Report for GB 9509090.8 dated Dec. 3, 1997.
Examination Report for GB 9509090.8 dated Jul. 3, 1998.
Examination Report for GB 9509090.8 dated Oct. 25, 1998.
Response to Examination Report for GB 9509090.8 dated Jun. 1, 1998.
Response to Examination Report for GB9509090.8 dated Sep. 24, 1998.
Response to Examination Report for GB 9509090.8 dated Oct. 29, 1998.
Final Report for GB 95090090.8 dated Nov. 25, 1998.
Examination Report for GB 95090090.8 dated Aug. 28, 1998.
Defendant's Preliminary Invalidity Contentions for U.S. Pat. No. 5,901,978 presented in *Automotive Technologies, Inc.* v. *American Honda Motor Co., Inc.*, et al. Civil Action No. 06-187-GMS, United States District Court, District of Delaware.
Defendant's Preliminary Invalidity Contentions for U.S. Pat. No. 6,325,414 presented in *Automotive Technologies, Inc.* v. *American Honda Motor Co., Inc.*, et al. Civil Action No. 06-187-GMS, United States District Court, District of Delaware.
Defendant's Preliminary Invalidity Contentions for U.S. Pat. No. 6,422,595 presented in *Automotive Technologies, Inc.* v. *American Honda Motor Co., Inc.*, et al. Civil Action No. 06-187-GMS, United States District Court, District of Delaware.
Defendant's Preliminary Invalidity Contentions for U.S. Pat. No. 6,712,387 presented in *Automotive Technologies, Inc.* v. *American Honda Motor Co.*, Inc., et al. Civil Action No. 06-187-GMS, United States District Court, District of Delaware.
Defendant's Preliminary Invalidity Contentions for U.S. Pat. No. 6,869,100 presented in *Automotive Technologies, Inc.* v. *American Honda Motor Co., Inc.*, et al. Civil Action No. 06-187-GMS, United States District Court, District of Delaware.
Defendant's Preliminary Invalidity Contentions for U.S. Pat. No. 6,942,248 presented in *Automotive Technologies, Inc.* v. *American Honda Motor Co., Inc.*, et al. Civil Action No. 06-187-GMS, United States District Court, District of Delaware.
Abstract of JP 3159838.
Abstract of DE 3802159.
International Search Report for International Application No. PCT/US94/03455 (published as WO 94/22693).

* cited by examiner

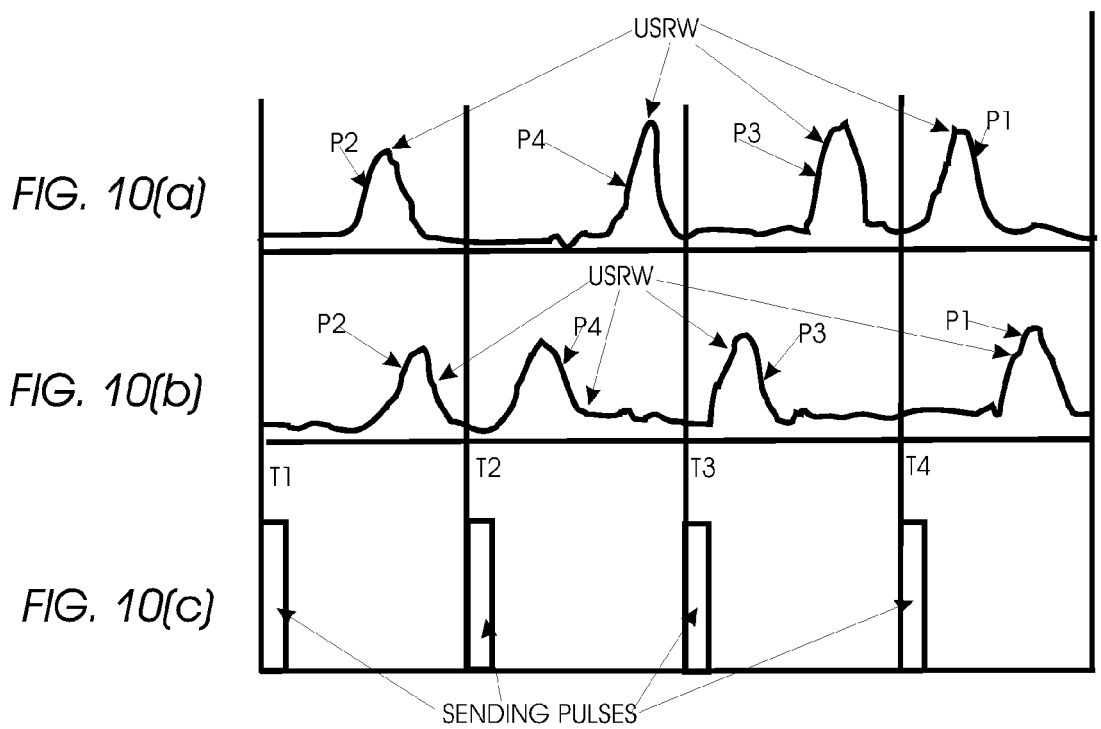
FIG. 10(a)
FIG. 10(b)
FIG. 10(c)
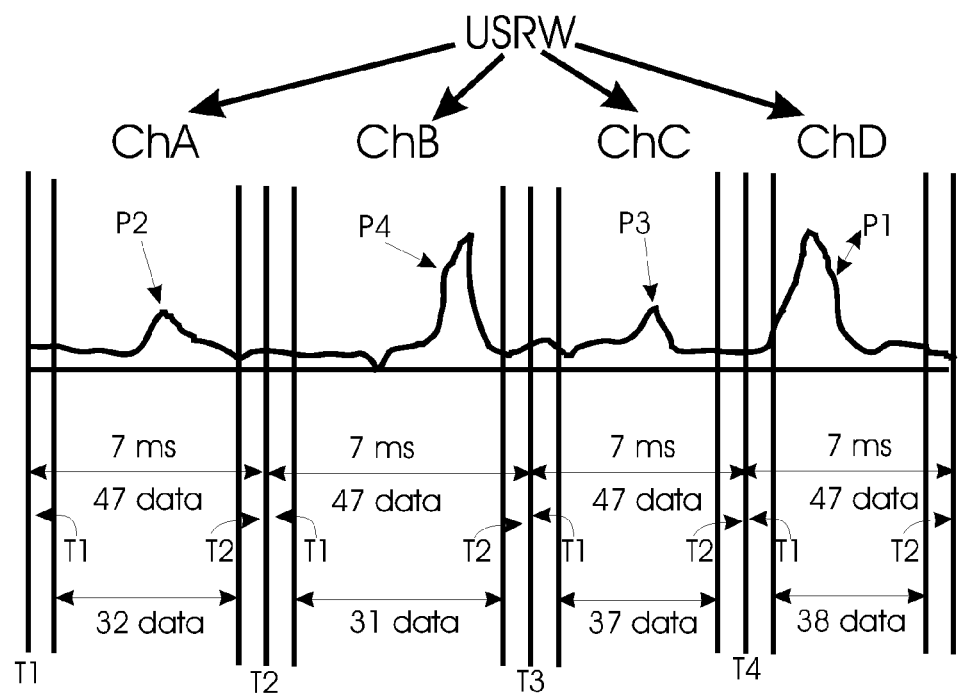
FIG. 11

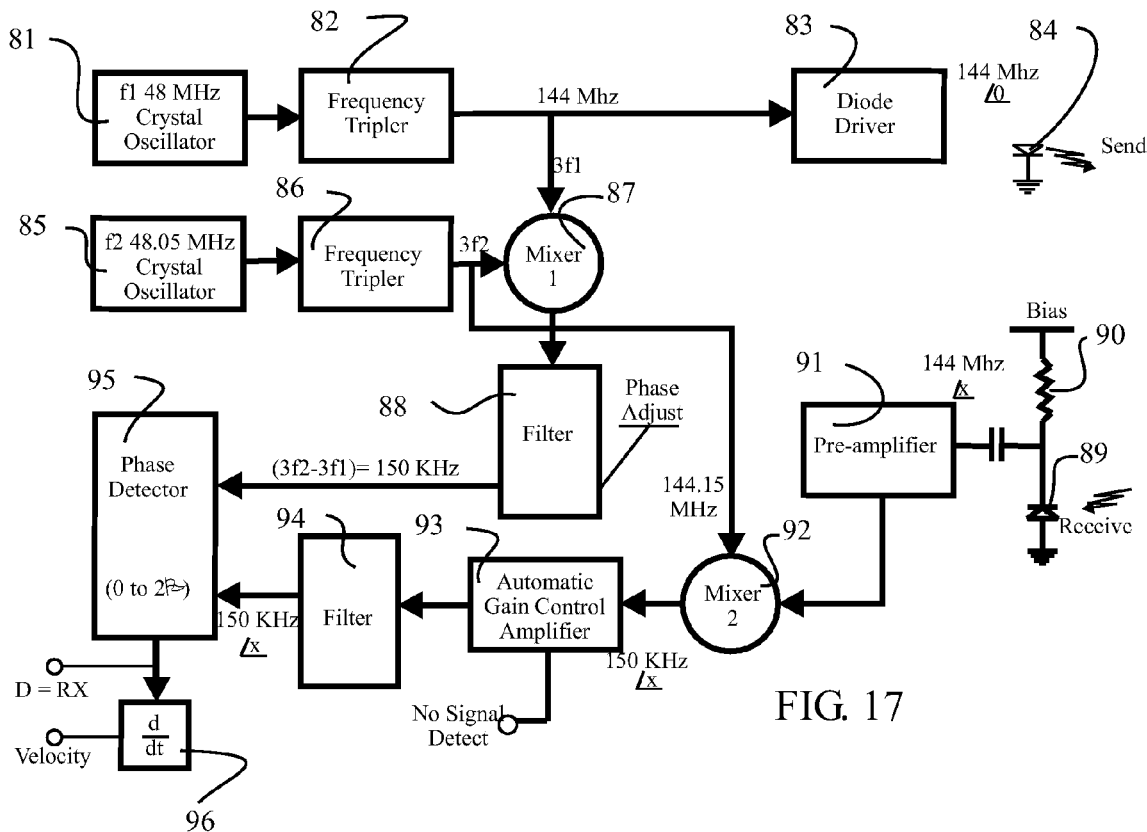
FIG. 17
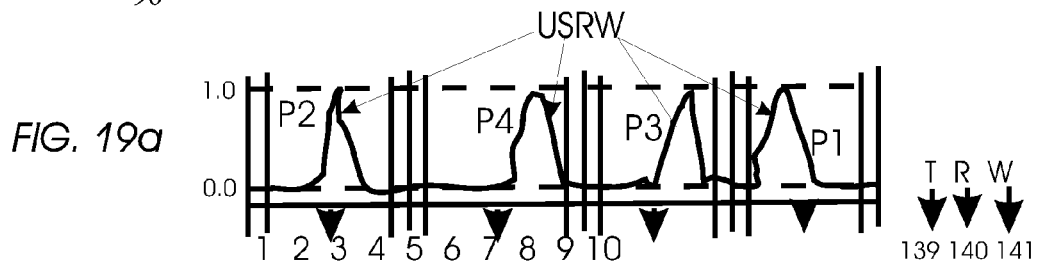
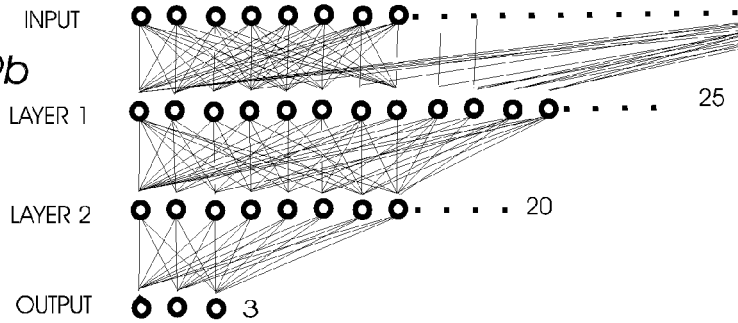
1 0 0   FFH or FFCS
0 1 0   RFCS or OOPH
0 0 1   VACANT

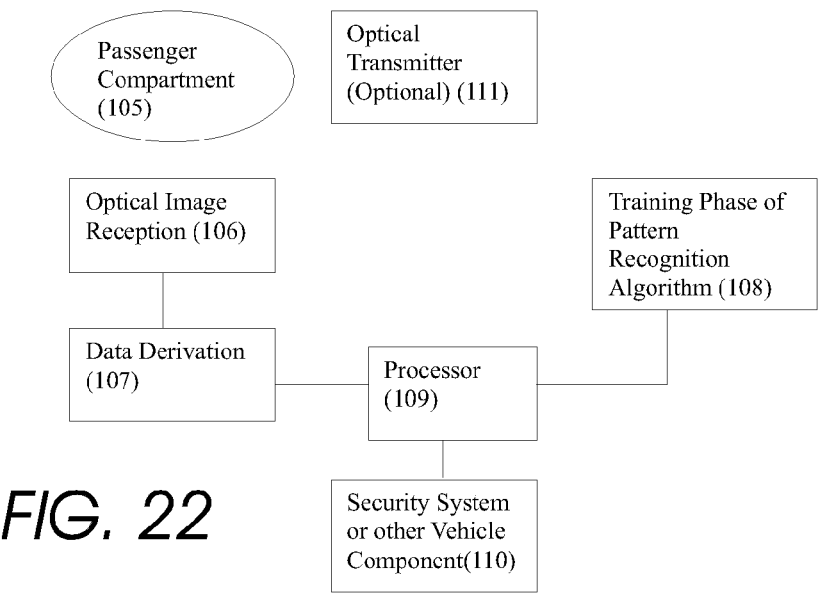
FIG. 22
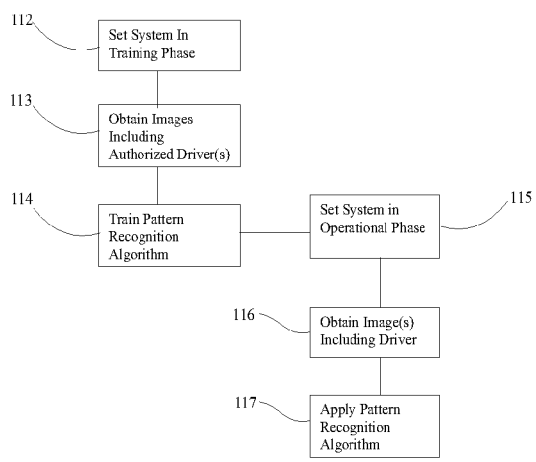
FIG. 23
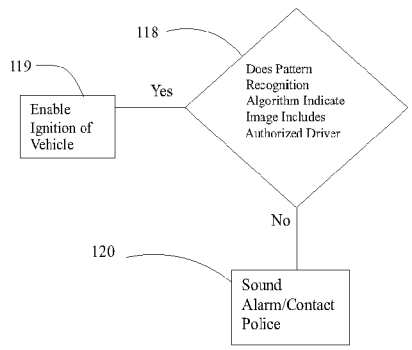
FIG. 24
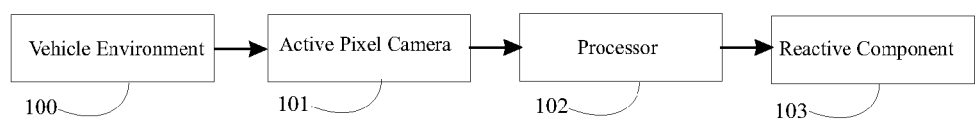

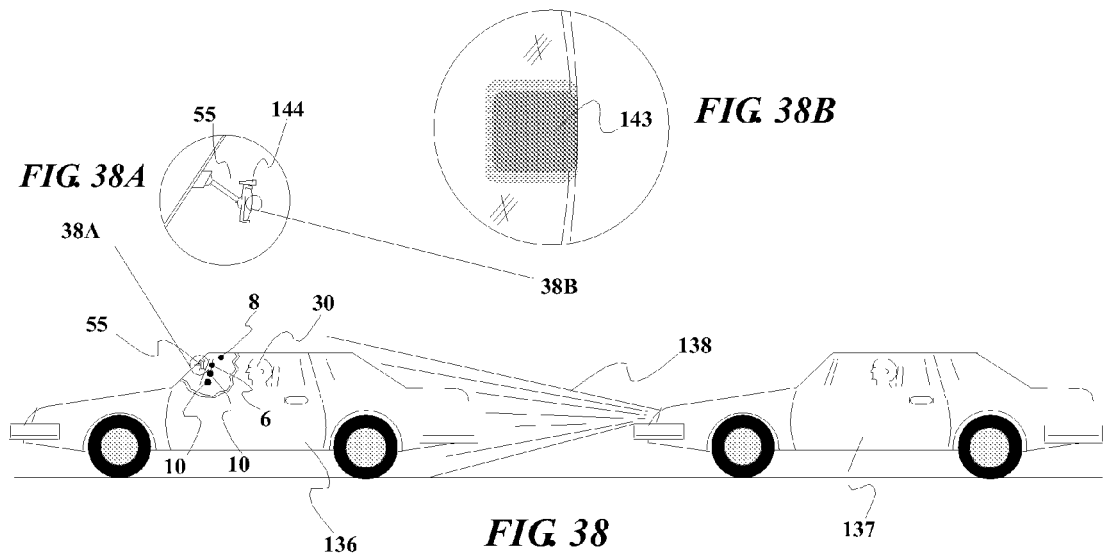
*FIG. 38A*
*FIG. 38B*
*FIG. 38*
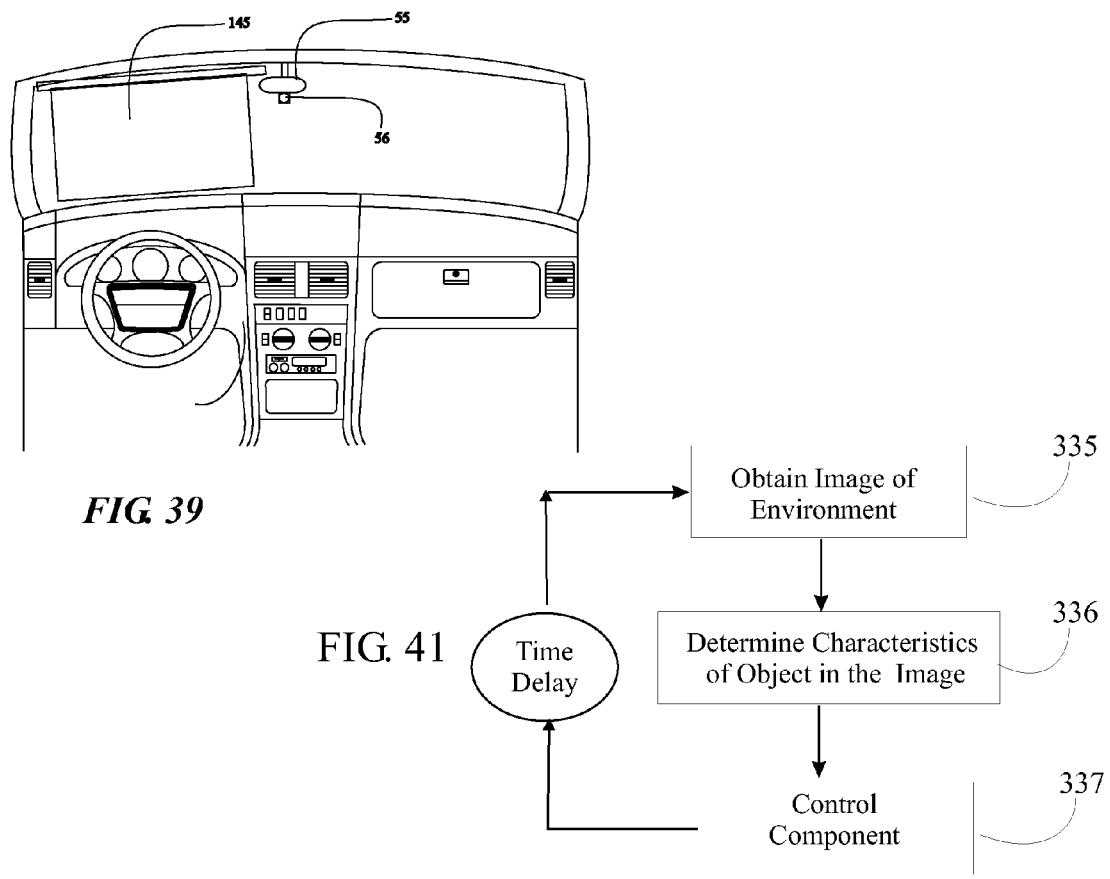
*FIG. 39*
FIG. 41
- Obtain Image of Environment — 335
- Determine Characteristics of Object in the Image — 336
- Control Component — 337
- Time Delay

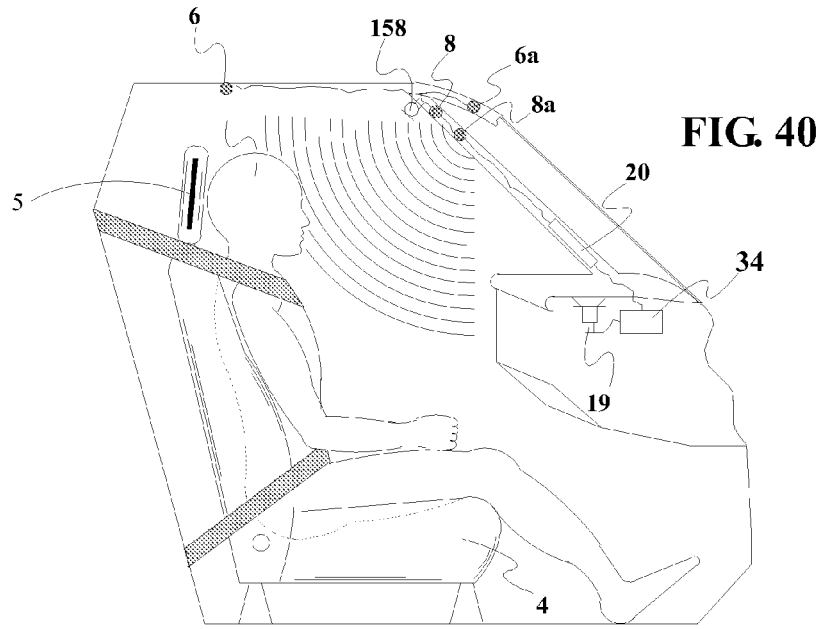
FIG. 40
FIG. 42
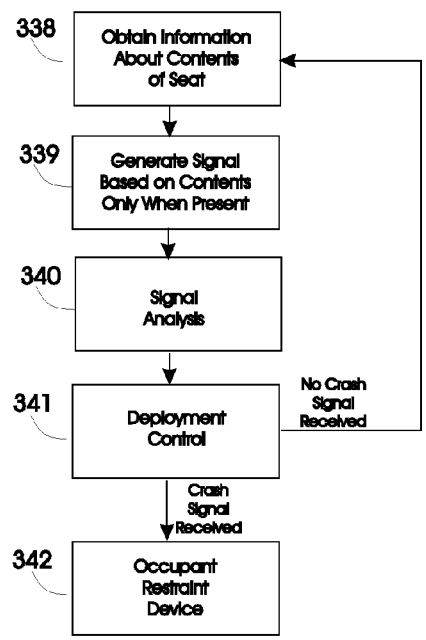
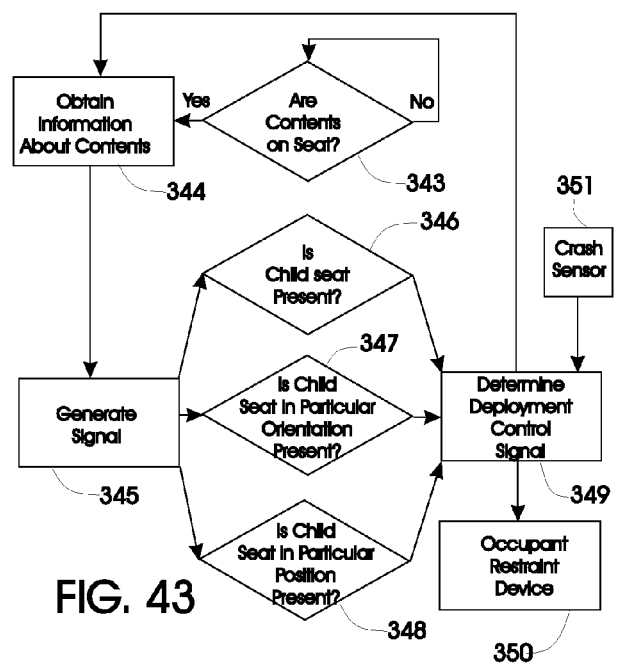
FIG. 43

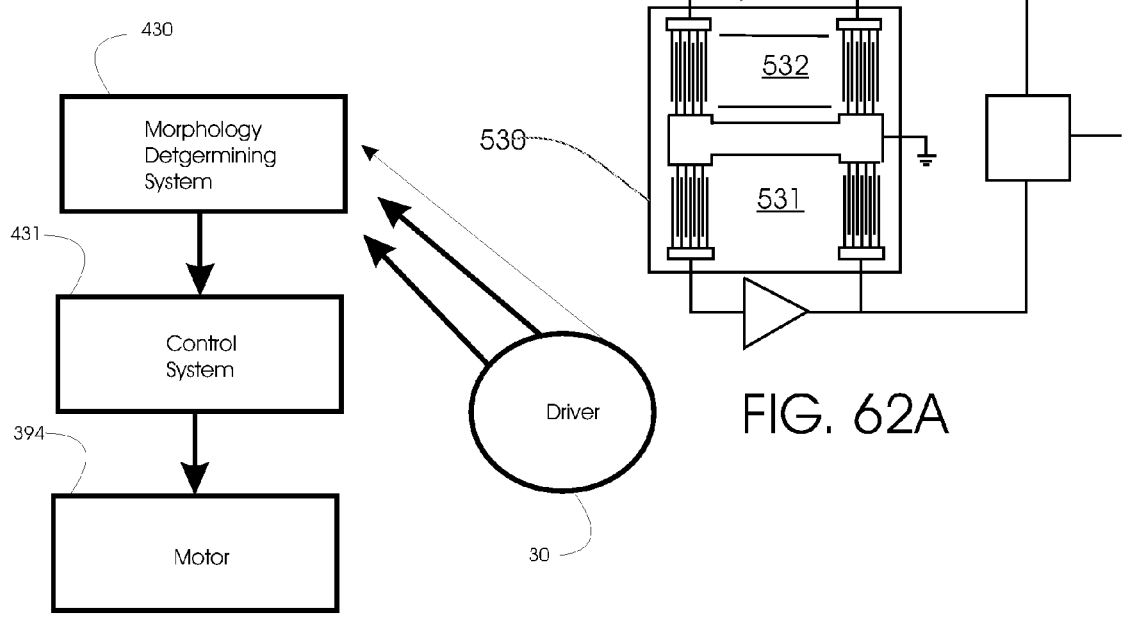
FIG. 51A
FIG. 62A
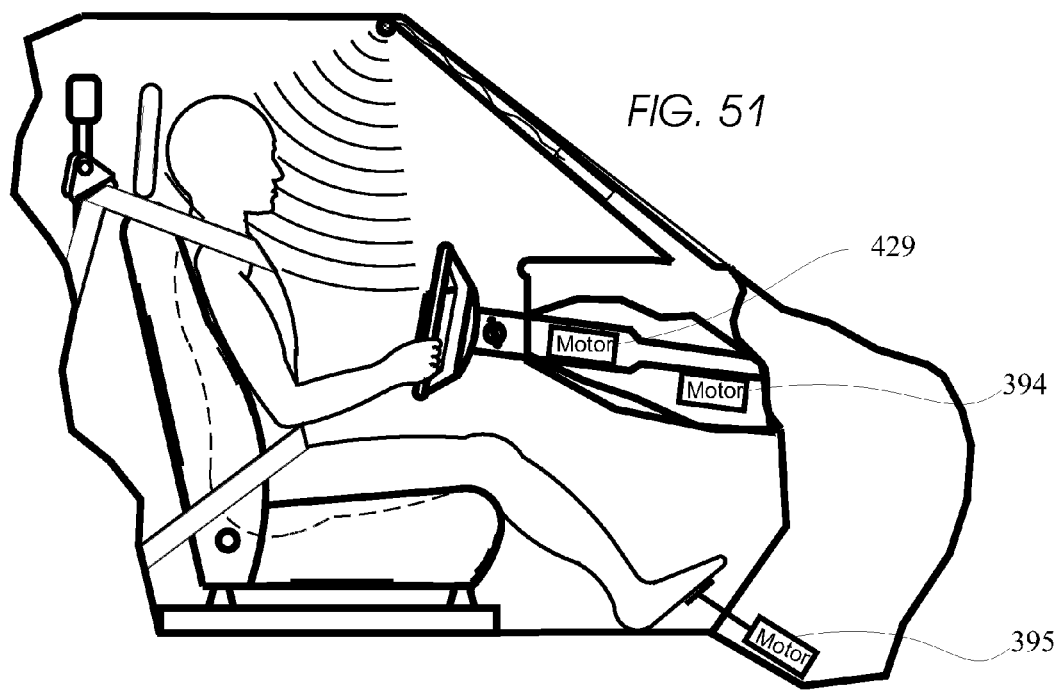
FIG. 51

Catigorization    Dynamic Position 1 0 0   FFH or FFCS
0 1 0   RFCS or OOPH
0 0 1   VACANT

OPTICAL MONITORING OF VEHICLE INTERIORS

CROSS REFERENCE TO RELATED APPLICATIONS

This application is:
1. a CIP of U.S. patent application Ser. No. 10/931,288 filed Aug. 31, 2004, now U.S. Pat. No. 7,164,117, which is:
  A. a CIP of U.S. patent application Ser. No. 09/639,303 filed Aug. 16, 2000, now U.S. Pat. No. 6,910,711;
  B. a CIP of U.S. patent application Ser. No. 10/114,533 filed Apr. 2, 2002, now U.S. Pat. No. 6,942,248;
  C. a CIP of U.S. patent application Ser. No. 10/116,808 filed Apr. 5, 2002, now U.S. Pat. No. 6,856,873, the history of which is set forth above;
  D. a CIP of U.S. patent application Ser. No. 10/151,615 filed May 20, 2002, now U.S. Pat. No. 6,820,897, the history of which is set forth above;
  E. a CIP of U.S. patent application Ser. No. 10/227,780 filed Aug. 26, 2002, now U.S. Pat. No. 6,950,022, which is a CIP of U.S. patent application Ser. No. 09/838,920 filed Apr. 20, 2001, now U.S. Pat. No. 6,778,672, the history of which is set forth above;
  F. a CIP of U.S. patent application Ser. No. 10/234,067 filed Sep. 3, 2002, now U.S. Pat. No. 6,869,100; and
2. a CIP of U.S. patent application Ser. No. 10/940,881 filed Sep. 13, 2004, now U.S. Pat. No. 7,663,502, which is:
  H. a CIP of U.S. patent application Ser. No. 10/457,238 filed Jun. 9, 2003, now U.S. Pat. No. 6,919,803, which claims priority under 35 U.S.C. §119(e) of U.S. provisional patent application Ser. No. 60/387,792 filed Jun. 11, 2002; and
  I. a CIP of U.S. patent application Ser. No. 10/805,903 filed Mar. 22, 2004, now U.S. Pat. No. 7,050,897, which is a CIP of U.S. patent application Ser. No. 10/174,709, filed Jun. 19, 2002, now U.S. Pat. No. 6,735,506, which is a CIP of U.S. patent application Ser. No. 10/114,533 filed Apr. 2, 2002, now U.S. Pat. No. 6,942,248; and
5. a CIP of U.S. patent application Ser. No. 10/940,881 filed Sep. 13, 2004 which is:
  A. a CIP of U.S. patent application Ser. No. 09/639,303 filed Aug. 16, 2000, now U.S. Pat. No. 6,910,711, the history of which is set forth above;
  B. a CIP of U.S. patent application Ser. No. 10/114,533 filed Apr. 2, 2002, now U.S. Pat. No. 6,942,248;
  C. a CIP of U.S. patent application Ser. No. 10/116,808 filed Apr. 5, 2002, now U.S. Pat. No. 6,856,873, the history of which is set forth above;
  D. a CIP of U.S. patent application Ser. No. 10/151,615 filed May 20, 2002, now U.S. Pat. No. 6,820,897, the history of which is set forth above;
  E. a CIP of U.S. patent application Ser. No. 10/227,780 filed Aug. 26, 2002, now U.S. Pat. No. 6,950,022, the history of which is set forth above;
  F. a CIP of U.S. patent application Ser. No. 10/234,067 filed Sep. 3, 2002, now U.S. Pat. No. 6,869,100, the history of which is set forth above; and
  G. a CIP of U.S. patent application Ser. No. 10/365,129 filed Feb. 12, 2003, now U.S. Pat. No. 7,134,687; and
  H. a CIP of U.S. patent application Ser. No. 10/457,238 filed Jun. 9, 2003, now U.S. Pat. No. 6,919,803, the history of which is set forth above; and
  I. a CIP of U.S. patent application Ser. No. 10/805,903 filed Mar. 22, 2004, now U.S. Pat. No. 7,050,897, the history of which is set forth above.

This application is related to U.S. patent application Ser. No. 08/474,782 filed Jun. 7, 1995, now U.S. Pat. No. 5,835,613, Ser. No. 09/084,641 filed May 26, 1998, now U.S. Pat. No. 5,901,978, Ser. No. 09/543,997 filed Apr. 6, 200, now U.S. Pat. No. 6,234,520, Ser. No. 09/562,994 filed May 1, 2000, now U.S. Pat. No. 6,254,127, Ser. No. 09/636,770 filed Aug. 1, 2000, now U.S. Pat. No. RE 37,736, Ser. No. 09/737,138 filed Dec. 14, 2000, now U.S. Pat. No. 6,325,414, Ser. No. 10/356,202 filed Jan. 31, 2002, now U.S. Pat. No. 6,793,242, Ser. No. 10/895,121 filed Jul. 21, 2004, Ser. No. 11/025,501 filed Jan. 3, 2005, Ser. No. 11/065,668 filed Feb. 24, 2005, Ser. No. 11/278,979 filed Apr. 7, 2006, Ser. No. 11/380,574 filed Apr. 27, 2006, Ser. No. 11/416,475 filed May 1, 2006, Ser. No. 11/420,297 filed May 25, 2006, Ser. No. 11/428,897 filed Jul. 6, 2006, Ser. No. 11/455,497 filed Jun. 19, 2006, Ser. No. 11/502,039 filed Aug. 10, 2006, Ser. No. 11/536,054 filed Sep. 28, 2006, Ser. No. 11/538,934 filed Oct. 5, 2006, Ser. No. 11/551,891 filed Oct. 23, 2006, Ser. No. 11/558,314 filed Nov. 9, 2006, Ser. No. 11/558,996 filed Nov. 13, 2006 on the grounds that they include common subject matter.

All of the above-referenced applications are incorporated by reference herein.

FIELD OF THE INVENTION

The present invention relates to arrangements and methods for monitoring interior spaces of vehicles and more particularly to obtaining information about objects in interior spaces of vehicles.

BACKGROUND OF THE INVENTION

A detailed discussion of background information is set forth in parent applications listed above and incorporated by reference herein. All of the patents, patent applications, technical papers and other references referenced below and in the parent applications are incorporated herein by reference in their entirety. Various patents, patent applications, patent publications and other published documents are discussed below as background of the invention. No admission is made that any or all of these references are prior art and indeed, it is contemplated that they may not be available as prior art when interpreting 35 U.S.C. §102 in consideration of the claims of the present application.

OBJECTS AND SUMMARY OF THE INVENTION

It is an object of the present invention to provide new and improved techniques for monitoring interior spaces in vehicles.

In order to achieve this object and others, a vehicle in accordance with the invention include a structure defining an interior space for containing or designed to contain one or more objects, and an arrangement mounted on, joined or coupled to the structure for determining whether an object is present in the interior space, or the presence of multiple objects. Various constructions of such an arrangement have been envisioned and one arrangement includes at least one optical imaging device arranged to receive images of the interior space defined by the structure, and a processor coupled to the optical imaging device(s) and arranged to determine whether one or more objects are present in the interior space and when one or more objects are determined to be present, to obtain information about the object or objects. The processor is preferably arranged to distinguish between different objects and/or different arrangements of objects.

In one embodiment, the processor generates a signal characteristic of the object based on the received images, and categorizes the signal to thereby identify the object. To this end, the processor might apply a pattern recognition technique to recognize and thus identify a class of the object by processing the signal into a categorization of the signal based on data relating to images received by the optical imaging device(s) stored within or available to the pattern recognition technique and associated with possible classes of objects. The processor can thus apply a pattern recognition algorithm generated from images of the interior space with different objects therein, and the absence of any objects, in order to obtain information about the object(s).

Only a single optical imaging device can be provided or a plurality of optical imaging devices can be provided, possibly spaced apart from one another. Optical imaging devices may be mounted throughout the structure including on or proximate to a roof of the structure.

A neural network can be embodied in the processor to determine whether an object is present after being trained in a training stage in which images received by the optical imaging device(s) in the absence of objects in the interior space and images received by the optical imaging device(s) with objects present in the interior space are collected and used to derive the neural network. Any known neural network derivation process can be similarly applied.

When the vehicle is an automobile, the interior space may be a passenger compartment and the processor arranged to determine the presence or absence of a human occupant in a front seat. Since most vehicles include multiple seating locations, the processor can determine the presence or absence of a human occupant in each seating location to thereby enable a determination of the number of human occupants in the vehicle.

An illumination device or a plurality of such devices may be mounted on the structure for illuminating at least a portion of the interior space with electromagnetic radiation, preferably that portion from which images are to be obtained. A structured light generator or a plurality of such generators may be provided to transmit structured light into the interior space. Structured light aids in the determination of information about the objects.

Information about the object(s) may be used for numerous purposes including controlling one or more reactive systems coupled to the processor and controlled thereby based on the determination as to whether an object is present in the interior space and the information about the object when present in the interior space. The information about the object determined by the processor when an object is present in the interior space may be a position of the object, a type of the object and/or a size of the object. The reactive system can be an occupant protection system, a vehicle guidance system, a vehicle communication system, a heating-air conditioning system, a music system, an alarm system, etc.

A method for monitoring an interior space of a vehicle in accordance with the invention includes mounting at least one optical imaging device to a structure defining the interior space, receiving images at the optical imaging device(s) during use of the vehicle, and when images are received, determining whether any objects are present in the interior space based on analysis of the images and when one or more objects are determined to be present, obtaining information about the object or objects based on analysis of the received images. Optionally, the method entails distinguishing between different objects or different arrangements of objects when one or more objects are determined to be present in the interior space of the vehicle.

Determining whether any objects are present and obtaining information about the object or objects when present may involve training a pattern recognition algorithm in a training stage to provide such output, and in the training stage, collecting images received by the optical imaging device(s) in the absence of objects in the interior space and with objects present in the interior space.

Additional variations of the method include those described above for the arrangement, for example, determining whether human occupants are present in a passenger compartment of the vehicle, illuminating at least a portion of the interior space with electromagnetic radiation and controlling a reactive system based on the determination as to whether any objects are present in the interior space and the information about the object or objects when present in the interior space.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims. In particular, the illustrations below are frequently limited to the monitoring of the front passenger seat for the purpose of describing the system. The invention applies as well to adapting the system to the other seating positions in the vehicle and particularly to the driver and rear passenger positions.

FIGS. 10(*a*), 10(*b*) and 10(*c*) are each a diagram showing the configuration of the reflected waves of an ultrasonic wave transmitted from each transmitter of the ultrasonic sensors toward the passenger seat, obtained within the time that the reflected wave arrives at a receiver, FIG. 10(*a*) showing an example of the reflected waves obtained when a passenger is in a normal seated-state, FIG. 10(*b*) showing an example of the reflected waves obtained when a passenger is in an abnormal seated-state (where the passenger is seated too close to the instrument panel), and FIG. 10(*c*) showing a transmit pulse.

FIG. 11 is a diagram of the data processing of the reflected waves from the ultrasonic or electromagnetic sensors.

FIG. 17 is a schematic illustrating the circuit of an occupant position-sensing device using a modulated infrared signal, beat frequency and phase detector system.

FIG. 19*a* is an explanatory diagram of a process for normalizing the reflected wave and shows normalized reflected waves.

FIG. 19*b* is a diagram similar to FIG. 19*a* showing a step of extracting data based on the normalized reflected waves and a step of weighting the extracted data by employing the data of the seat track position detecting sensor, the data of the reclining angle detecting sensor, and the data of the weight sensor.

FIG. 22 is a schematic illustration of a system for controlling operation of a vehicle or a component thereof based on recognition of an authorized individual.

FIG. 23 is a schematic illustration of a method for controlling operation of a vehicle based on recognition of an individual.

FIG. 24 is a schematic illustration of the environment monitoring in accordance with the invention.

FIG. 38 is a side view with parts cutaway and removed of a vehicle and a following vehicle showing the headlights of the following vehicle and the passenger compartment of the leading vehicle containing a driver and a preferred mounting location for driver eyes and following vehicle headlight detectors and the selective filtering of the light of the following vehicle's headlights through the use of electrochromic glass, SPD glass or equivalent, in the rear view mirror. FIG. 38B is an enlarged view of the section designated 38A in FIG. 38.

FIG. 39 illustrates the interior of a passenger compartment with a rear view mirror, a camera for viewing the eyes of the driver and a large generally transparent visor for glare filtering.

FIG. 40 is a side view with parts cutaway and removed of a vehicle showing the passenger compartment containing a front passenger and a preferred mounting location for an occupant head detector and a preferred mounting location of an adjustable microphone and speakers and including an antenna field sensor in the headrest for a rear of occupant's head locator for use with a headrest adjustment system to reduce whiplash injuries, in particular, in rear impact crashes.

FIG. 41 is a flow chart of the environment monitoring in accordance with the invention.

FIG. 42 is a schematic drawing of one embodiment of an occupant restraint device control system in accordance with the invention.

FIG. 43 is a flow chart of the operation of one embodiment of an occupant restraint device control method in accordance with the invention.

FIG. 51 is a view as in FIG. 49 showing a driver and driver seat with an automatically adjustable steering column and pedal system which is adjusted based on the morphology of the driver.

FIG. 51A is a schematic of a morphology adjustment system in accordance with the invention.

FIG. 62A is a detailed view of the SAW carbon dioxide sensor of FIG. 62.

DETAILED DESCRIPTION OF PREFERRED EMBODIMENTS

Whenever a patent or literature is referred to below it is to be assumed that all of that patent or literature is to be incorporated by reference in its entirety to the extent the disclosure of these reference is necessary. Also note that although many of the examples below relate to a particular vehicle, an automobile, the invention is not limited to any particular vehicle and is thus applicable to all relevant vehicles including shipping containers and truck trailers and to all compartments of a vehicle including, for example, the passenger compartment and the trunk of an automobile or truck.

Prior to describing the invention in detail, definitions of certain words or phrases used throughout this patent document will be defined: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

1. General Occupant Sensors

Figure 1:
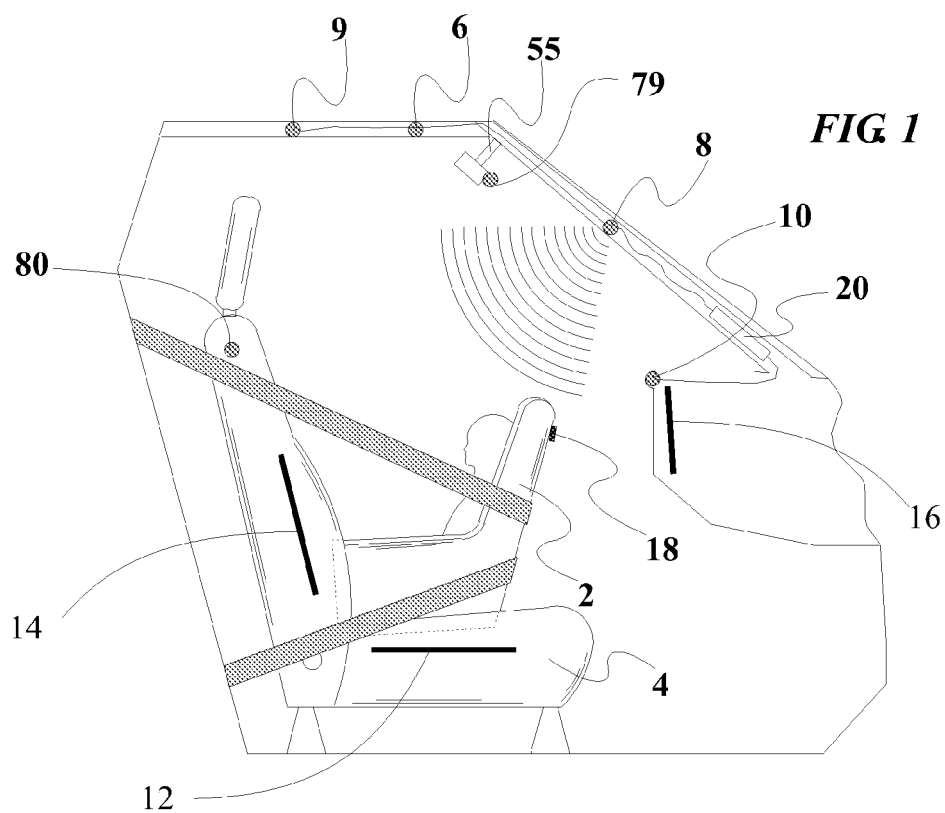
FIG. 1 is a side view with parts cutaway and removed of a vehicle showing the passenger compartment containing a rear facing child seat on the front passenger seat and a preferred mounting location for an occupant and rear facing child seat presence detector including an antenna field sensor and a resonator or reflector placed onto the forward most portion of the child seat.

Referring to the accompanying drawings, FIG. 1 is a side view, with parts cutaway and removed of a vehicle showing the passenger compartment, or passenger container, containing a rear facing child seat 2 on a front passenger seat 4 and a preferred mounting location for a first embodiment of a vehicle interior monitoring system in accordance with the invention. The interior monitoring system is capable of detecting the presence of an object, occupying objects such as a box, an occupant or a rear facing child seat 2, determining the type of object, determining the location of the object, and/or determining another property or characteristic of the object. A property of the object could be the orientation of a child seat, the velocity of an adult and the like. For example, the vehicle interior monitoring system can determine that an object is present on the seat, that the object is a child seat and that the child seat is rear-facing. The vehicle interior monitoring system could also determine that the object is an adult, that he is drunk and that he is out of position relative to the airbag.

In this embodiment, three transducers 6, 8 and 10 are used alone, or, alternately in combination with one or more antenna near field monitoring sensors or transducers, 12, 14 and 16, although any number of wave-transmitting transducers or radiation-receiving receivers may be used. Such transducers or receivers may be of the type that emit or receive a continuous signal, a time varying signal or a spatial varying signal such as in a scanning system and each may comprise only a transmitter which transmits energy, waves or radiation, only a receiver which receives energy, waves or radiation, both a transmitter and a receiver capable of transmitting and receiving energy, waves or radiation, an electric field sensor, a capacitive sensor, or a self-tuning antenna-based sensor, weight sensor, chemical sensor, motion sensor or vibration sensor, for example.

One particular type of radiation-receiving receiver for use in the invention receives electromagnetic waves and another receives ultrasonic waves.

In an ultrasonic embodiment, transducer 8 can be used as a transmitter and transducers 6 and 10 can be used as receivers. Other combinations can be used such as where all transducers are transceivers (transmitters and receivers). For example, transducer 8 can be constructed to transmit ultrasonic energy toward the front passenger seat, which is modified, in this case by the occupying item of the passenger seat, i.e., the rear facing child seat 2, and the modified waves are received by the transducers 6 and 10, for example. A more common arrangement is where transducers 6, 8 and 10 are all transceivers. Modification of the ultrasonic energy may constitute reflection of the ultrasonic energy as the ultrasonic energy is reflected back by the occupying item of the seat. The waves received by transducers 6 and 10 vary with time depending on the shape of the object occupying the passenger seat, in this case the rear facing child seat 2. Each different occupying item will reflect back waves having a different pattern. Also, the pattern of waves received by transducer 6 will differ from the pattern received by transducer 10 in view of its different mounting location. This difference generally permits the determination of location of the reflecting surface (i.e., the rear facing child seat 2) through triangulation. Through the use of two transducers 6, 10, a sort of stereographic image is received by the two transducers and recorded for analysis by processor 20, which is coupled to the transducers 6, 8, 10, e.g., by wires or wirelessly. This image will differ for each object that is placed on the vehicle seat and it will also change for each position of a particular object and for each position of the vehicle seat. Elements 6, 8, 10, although described as transducers, are representative of any type of component used in a wave-based analysis technique. Also, although the example of an automobile passenger compartment has been shown, the same principle can be used for monitoring the interior of any vehicle including in particular shipping containers and truck trailers.

Wave-type sensors as the transducers 6, 8, 10 as well as electric field sensors 12, 14, 16 are mentioned above. Electric field sensors and wave sensors are essentially the same from the point of view of sensing the presence of an occupant in a vehicle. In both cases, a time varying electric field is disturbed or modified by the presence of the occupant. At high frequencies in the visual, infrared and high frequency radio wave region, the sensor is based on its capability to sense a change of wave characteristics of the electromagnetic field, such as amplitude, phase or frequency. As the frequency drops, other characteristics of the field are measured. At still lower frequencies, the occupant's dielectric properties modify parameters of the reactive electric field in the occupied space between or near the plates of a capacitor. In this latter case, the sensor senses the change in charge distribution on the capacitor plates by measuring, for example, the current wave magnitude or phase in the electric circuit that drives the capacitor. These measured parameters are directly connected with parameters of the displacement current in the occupied space. In all cases, the presence of the occupant reflects, absorbs or modifies the waves or variations in the electric field in the space occupied by the occupant. Thus, for the purposes of at least one of the inventions disclosed herein, capacitance, electric field or electromagnetic wave sensors are equivalent and although they are all technically "field" sensors they will be considered as "wave" sensors herein. What follows is a discussion comparing the similarities and differences between two types of field or wave sensors, electromagnetic wave sensors and capacitive sensors as exemplified by Kithil in U.S. Pat. No. 5,702,634.

An electromagnetic field disturbed or emitted by a passenger in the case of an electromagnetic wave sensor, for example, and the electric field sensor of Kithil, for example, are in many ways similar and equivalent for the purposes of at least one of the inventions disclosed herein. The electromagnetic wave sensor is an actual electromagnetic wave sensor by definition because they sense parameters of an electromagnetic wave, which is a coupled pair of continuously changing electric and magnetic fields. The electric field here is not a static, potential one. It is essentially a dynamic, rotational electric field coupled with a changing magnetic one, that is, an electromagnetic wave. It cannot be produced by a steady distribution of electric charges. It is initially produced by moving electric charges in a transmitter, even if this transmitter is a passenger body for the case of a passive infrared sensor.

For ultrasonic systems, the "image" recorded from each ultrasonic transducer/receiver, is actually a time series of digitized data of the amplitude of the received signal versus time. Since there are two receivers, two time series are obtained which are processed by the processor 20. The processor 20 may include electronic circuitry and associated, embedded software. Processor 20 constitutes one form of generating means in accordance with the invention which generates information about the occupancy of the passenger compartment based on the waves received by the transducers 6, 8, 10.

When different objects are placed on the front passenger seat, the images from transducers 6, 8, 10 for example, are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the images of one type of object from the images of other types of objects, e.g., which differentiate the occupant images from the rear facing child seat images. The similarities of these images for various child seats are frequently not obvious to a person looking at plots of the time series and thus computer algorithms are developed to sort out the various patterns. For a more detailed discussion of pattern recognition, see U.S. RE 37260.

Determination of these rules is important to the pattern recognition techniques used in at least one of the inventions disclosed herein. In general, three approaches have been useful, artificial intelligence, fuzzy logic and artificial neural networks (including cellular and modular or combination neural networks and support vector machines—although additional types of pattern recognition techniques may also be used, such as sensor fusion). In some implementations of at least one of the inventions disclosed herein, such as the determination that there is an object in the path of a closing window as described below, the rules are sufficiently obvious that a trained researcher can sometimes look at the returned signals and devise a simple algorithm to make the required determinations. In others, such as the determination of the presence of a rear facing child seat or of an occupant, artificial neural networks can be used to determine the rules. One such set of neural network software for determining the pattern recognition rules is available from the International Scientific Research, Inc. of Panama City, Panama.

Electromagnetic energy based occupant sensors exist that use many portions of the electromagnetic spectrum. A system based on the ultraviolet, visible or infrared portions of the spectrum generally operate with a transmitter and a receiver of reflected radiation. The receiver may be a camera or a photo detector such as a pin or avalanche diode as described in above-referenced patents and patent applications. At other frequencies, the absorption of the electromagnetic energy is primarily used and at still other frequencies the capacitance or electric field influencing effects are used. Generally, the human body will reflect, scatter, absorb or transmit electromagnetic energy in various degrees depending on the frequency of the electromagnetic waves. All such occupant sensors are included herein.

When electromagnetic energy is used, it is to be appreciated that any portion of the electromagnetic signals that impinges upon, surrounds or involves a body portion of the occupant is at least partially absorbed by the body portion. Sometimes, this is due to the fact that the human body is composed primarily of water, and that electromagnetic energy of certain frequencies is readily absorbed by water. The amount of electromagnetic signal absorption is related to the frequency of the signal, and size or bulk of the body portion that the signal impinges upon. For example, a torso of a human body tends to absorb a greater percentage of electromagnetic energy than a hand of a human body.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, surface reflectivity, etc. depending on the frequency, so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

One or more of the transducers 6, 8, 10 can also be image-receiving devices, such as cameras, which take images of the interior of the passenger compartment. These images can be transmitted to a remote facility to monitor the passenger compartment or can be stored in a memory device for use in the event of an accident, i.e., to determine the status of the occupant(s) of the vehicle prior to the accident. In this manner, it can be ascertained whether the driver was falling asleep, talking on the phone, etc.

A memory device for storing images of the passenger compartment, and also for receiving and storing any other information, parameters and variables relating to the vehicle or occupancy of the vehicle, may be in the form a standardized "black box" (instead of or in addition to a memory part in a processor 20). The IEEE Standards Association is currently beginning to develop an international standard for motor vehicle event data recorders. The information stored in the black box and/or memory unit in the processor 20, can include the images of the interior of the passenger compartment as well as the number of occupants and the health state of the occupant(s). The black box would preferably be tamper-proof and crash-proof and enable retrieval of the information after a crash.

Transducer 8 can also be a source of electromagnetic radiation, such as an LED, and transducers 6 and 10 can be CMOS, CCD imagers or other devices sensitive to electromagnetic radiation or fields. This "image" or return signal will differ for each object that is placed on the vehicle seat, or elsewhere in the vehicle, and it will also change for each position of a particular object and for each position of the vehicle seat or other movable objects within the vehicle. Elements 6, 8, 10, although described as transducers, are representative of any type of component used in a wave-based or electric field analysis technique, including, e.g., a transmitter, receiver, antenna or a capacitor plate.

Transducers 12, 14 and 16 can be antennas placed in the seat and instrument panel, or other convenient location within the vehicle, such that the presence of an object, particularly a water-containing object such as a human, disturbs the near field of the antenna. This disturbance can be detected by various means such as with Micrel parts MICREF102 and MICREF104, which have a built-in antenna auto-tune circuit. Note, these parts cannot be used as is and it is necessary to redesign the chips to allow the auto-tune information to be retrieved from the chip.

Other types of transducers can be used along with the transducers 6, 8, 10 or separately and all are contemplated by at least one of the inventions disclosed herein. Such transducers include other wave devices such as radar or electronic field sensing systems such as described in U.S. Pat. No. 5,366,241, U.S. Pat. No. 5,602,734, U.S. Pat. No. 5,691,693, U.S. Pat. No. 5,802,479, U.S. Pat. No. 5,844,486, U.S. Pat. No. 6,014,602, U.S. Pat. No. 6,275,146, and U.S. Pat. No. 5,948,031. Another technology, for example, uses the fact that the content of the near field of an antenna affects the resonant tuning of the antenna. Examples of such a device are shown as antennas 12, 14 and 16 in FIG. 1. By going to lower frequencies, the near field range is increased and also at such lower frequencies, a ferrite-type antenna could be used to minimize the size of the antenna. Other antennas that may be applicable for a particular implementation include dipole, microstrip, patch, Yagi etc. The frequency transmitted by the antenna can be swept and the (VSWR) voltage and current in the antenna feed circuit can be measured. Classification by frequency domain is then possible. That is, if the circuit is tuned by the antenna, the frequency can be measured to determine the object in the field.

Figure 2:
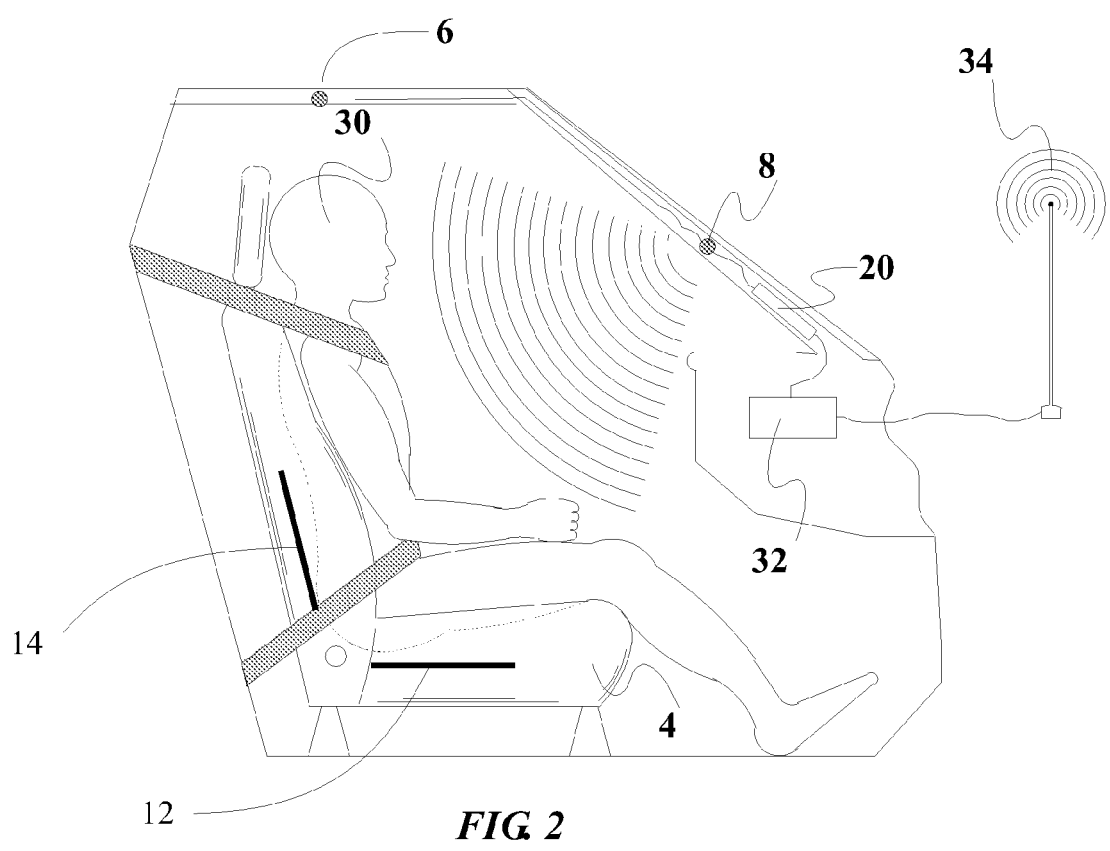
FIG. 2 is a side view with parts cutaway and removed showing schematically the interface between the vehicle interior monitoring system of at least one of the inventions disclosed herein and the vehicle cellular or other telematics communication system including an antenna field sensor.

An alternate system is shown in FIG. 2, which is a side view showing schematically the interface between the vehicle interior monitoring system of at least one of the inventions disclosed herein and the vehicle cellular or other communication system 32, such as a satellite based system such as that supplied by Skybitz, having an associated antenna 34. In this view, an adult occupant 30 is shown sitting on the front passenger seat 4 and two transducers 6 and 8 are used to determine the presence (or absence) of the occupant on that seat 4. One of the transducers 8 in this case acts as both a transmitter and receiver while the other transducer 6 acts only as a receiver. Alternately, transducer 6 could serve as both a transmitter and receiver or the transmitting function could be alternated between the two devices. Also, in many cases, more than two transmitters and receivers are used and in still other cases, other types of sensors, such as weight, chemical, radiation, vibration, acoustic, seatbelt tension sensor or switch, heartbeat, self tuning antennas (12, 14), motion and seat and seatback position sensors, are also used alone or in combination with the transducers 6 and 8. As is also the case in FIG. 1, the transducers 6 and 8 are attached to the vehicle embedded in the A-pillar and headliner trim, where their presence is disguised, and are connected to processor 20 that may also be hidden in the trim as shown or elsewhere. Other mounting locations can also be used and, in most cases, preferred as disclosed in U.S. RE 37260.

The transducers 6 and 8 in conjunction with the pattern recognition hardware and software described below enable the determination of the presence of an occupant within a short time after the vehicle is started. The software is implemented in processor 20 and is packaged on a printed circuit board or flex circuit along with the transducers 6 and 8. Similar systems can be located to monitor the remaining seats in the vehicle, also determine the presence of occupants at the other seating locations and this result is stored in the computer memory, which is part of each monitoring system processor 20. Processor 20 thus enables a count of the number of occupants in the vehicle to be obtained by addition of the determined presence of occupants by the transducers associated with each seating location, and in fact, can be designed to perform such an addition. The principles illustrated for automobile vehicles are applicable by those skilled in the art to other vehicles such as shipping containers or truck trailers and to other compartments of an automotive vehicle such as the vehicle trunk.

For a general object, transducers 6, 8, 9, 10 can also be used to determine the type of object, determine the location of the object, and/or determine another property or characteristic of the object. A property of the object could be the orientation of a child seat, the velocity of an adult and the like. For example, the transducers 6, 8, 9, 10 can be designed to enable a determination that an object is present on the seat, that the object is a child seat and that the child seat is rear-facing.

The transducers 6 and 8 are attached to the vehicle buried in the trim such as the A-pillar trim, where their presence can be disguised, and are connected to processor 20 that may also be hidden in the trim as shown (this being a non-limiting position for the processor 20). The A-pillar is the roof support pillar that is closest to the front of the vehicle and which, in addition to supporting the roof, also supports the front windshield and the front door. Other mounting locations can also be used. For example, transducers 6, 8 can be mounted inside the seat (along with or in place of transducers 12 and 14), in the ceiling of the vehicle, in the B-pillar, in the C-pillar and in the doors. Indeed, the vehicle interior monitoring system in accordance with the invention may comprise a plurality of monitoring units, each arranged to monitor a particular seating location. In this case, for the rear seating locations, transducers might be mounted in the B-pillar or C-pillar or in the rear of the front seat or in the rear side doors. Possible mounting locations for transducers, transmitters, receivers and other occupant sensing devices are disclosed in above-referenced patents and patent applications and all of these mounting locations are contemplated for use with the transducers described herein.

The cellular phone or other communications system 32 outputs to an antenna 34. The transducers 6, 8, 12 and 14 in conjunction with the pattern recognition hardware and software, which is implemented in processor 20 and is packaged on a printed circuit board or flex circuit along with the transducers 6 and 8, determine the presence of an occupant within a few seconds after the vehicle is started, or within a few seconds after the door is closed. Similar systems located to monitor the remaining seats in the vehicle, also determine the presence of occupants at the other seating locations and this result is stored in the computer memory which is part of each monitoring system processor 20.

Periodically and in particular in the event of an accident, the electronic system associated with the cellular phone system 32 interrogates the various interior monitoring system memories and arrives at a count of the number of occupants in the vehicle, and optionally, even makes a determination as to whether each occupant was wearing a seatbelt and if he or she is moving after the accident. The phone or other communications system then automatically dials the EMS operator (such as 911 or through a telematics service such as OnStar®) and the information obtained from the interior monitoring systems is forwarded so that a determination can be made as to the number of ambulances and other equipment to send to the accident site, for example. Such vehicles will also have a system, such as the global positioning system, which permits the vehicle to determine its exact location and to forward this information to the EMS operator. Other systems can be implemented in conjunction with the communication with the emergency services operator. For example, a microphone and speaker can be activated to permit the operator to attempt to communicate with the vehicle occupant(s) and thereby learn directly of the status and seriousness of the condition of the occupant(s) after the accident.

Thus, in basic embodiments of the invention, wave or other energy-receiving transducers are arranged in the vehicle at appropriate locations, trained if necessary depending on the particular embodiment, and function to determine whether a life form is present in the vehicle and if so, how many life forms are present and where they are located etc. To this end, transducers can be arranged to be operative at only a single seating location or at multiple seating locations with a provision being made to eliminate a repetitive count of occupants. A determination can also be made using the transducers as to whether the life forms are humans, or more specifically, adults, child in child seats, etc. As noted herein, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as the position of his or her extremities and head and chest (specifically). The degree of detail is limited by several factors, including, for example, the number and position of transducers and training of the pattern recognition algorithm(s).

In addition to the use of transducers to determine the presence and location of occupants in a vehicle, other sensors could also be used. For example, a heartbeat sensor which determines the number and presence of heartbeat signals can also be arranged in the vehicle, which would thus also determine the number of occupants as the number of occupants would be equal to the number of heartbeat signals detected. Conventional heartbeat sensors can be adapted to differentiate between a heartbeat of an adult, a heartbeat of a child and a heartbeat of an animal. As its name implies, a heartbeat sensor detects a heartbeat, and the magnitude and/or frequency thereof, of a human occupant of the seat, if such a human occupant is present. The output of the heartbeat sensor is input to the processor of the interior monitoring system. One heartbeat sensor for use in the invention may be of the types as disclosed in McEwan (U.S. Pat. No. 5,573,012 and U.S. Pat. No. 5,766,208). The heartbeat sensor can be positioned at any convenient position relative to the seats where occupancy is being monitored. A preferred location is within the vehicle seatback.

An alternative way to determine the number of occupants is to monitor the weight being applied to the seats, i.e., each seating location, by arranging weight sensors at each seating location which might also be able to provide a weight distribution of an object on the seat. Analysis of the weight and/or weight distribution by a predetermined method can provide an indication of occupancy by a human, an adult or child, or an inanimate object.

Another type of sensor which is not believed to have been used in an interior monitoring system previously is a micropower impulse radar (MIR) sensor which determines motion of an occupant and thus can determine his or her heartbeat (as evidenced by motion of the chest). Such an MIR sensor can be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan (U.S. Pat. No. 5,361,070), as well as many other patents by the same inventor.

Motion sensing is accomplished by monitoring a particular range from the sensor as disclosed in that patent. MIR is one form of radar which has applicability to occupant sensing and can be mounted at various locations in the vehicle. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency ultrasound is also possible. Additionally, multiple MIR sensors can be used when high speed tracking of the motion of an occupant during a crash is required since they can be individually pulsed without interfering with each through time division multiplexing.

An alternative way to determine motion of the occupant(s) is to monitor weight distribution of the occupant whereby changes in weight distribution after an accident would be highly suggestive of movement of the occupant. A system for determining weight distribution of the occupants could be integrated or otherwise arranged in the seats such as the front seat 4 of the vehicle and several patents and publications describe such systems.

More generally, any sensor which determines the presence and health state of an occupant can also be integrated into the vehicle interior monitoring system in accordance with the invention. For example, a sensitive motion sensor can determine whether an occupant is breathing and a chemical sensor can determine the amount of carbon dioxide, or the concentration of carbon dioxide, in the air in the passenger compartment of the vehicle which can be correlated to the health state of the occupant(s). The motion sensor and chemical sensor can be designed to have a fixed operational field situated where the occupant's mouth is most likely to be located. In this manner, detection of carbon dioxide in the fixed operational field could be used as an indication of the presence of a human occupant in order to enable the determination of the number of occupants in the vehicle. In the alternative, the motion sensor and chemical sensor can be adjustable and adapted to adjust their operational field in conjunction with a determination by an occupant position and location sensor which would determine the location of specific parts of the occupant's body, e.g., his or her chest or mouth. Furthermore, an occupant position and location sensor can be used to determine the location of the occupant's eyes and determine whether the occupant is conscious, i.e., whether his or her eyes are open or closed or moving.

The use of chemical sensors can also be used to detect whether there is blood present in the vehicle, for example, after an accident. Additionally, microphones can detect whether there is noise in the vehicle caused by groaning, yelling, etc., and transmit any such noise through the cellular or other communication connection to a remote listening facility (such as operated by OnStar®).

Figure 3:
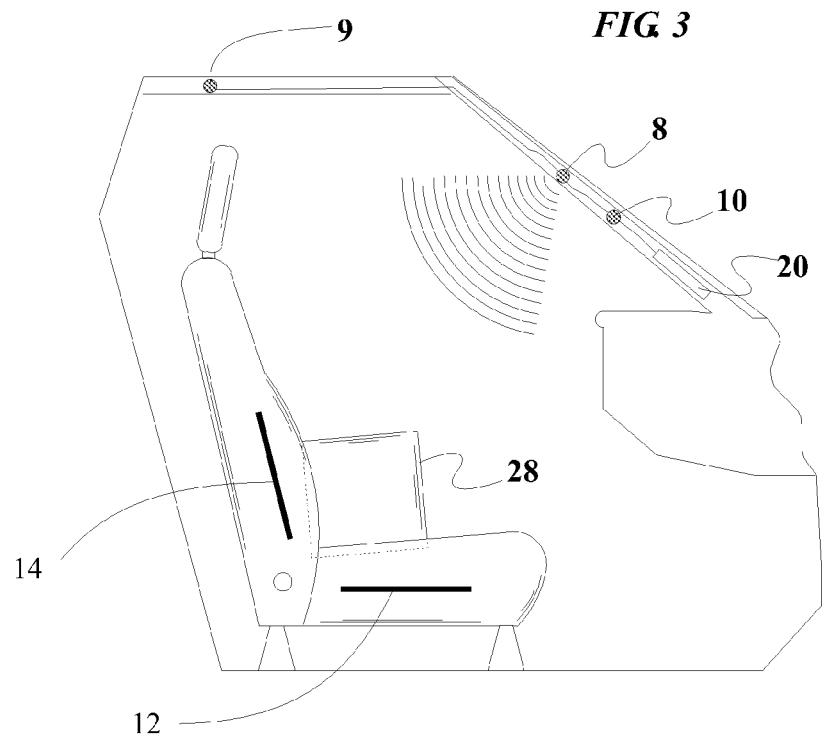
FIG. 3 is a side view with parts cutaway and removed of a vehicle showing the passenger compartment containing a box on the front passenger seat and a preferred mounting location for an occupant and rear facing child seat presence detector and including an antenna field sensor.

In FIG. 3, a view of the system of FIG. 1 is illustrated with a box 28 shown on the front passenger seat in place of a rear facing child seat. The vehicle interior monitoring system is trained to recognize that this box 28 is neither a rear facing child seat nor an occupant and therefore it is treated as an empty seat and the deployment of the airbag or other occupant restraint device is suppressed. For other vehicles, it may be that just the presence of a box or its motion or chemical or radiation effluents that are desired to be monitored. The auto-tune antenna-based system 12, 14 is particularly adept at making this distinction particularly if the box 28 does not contain substantial amounts of water. Although a simple implementation of the auto-tune antenna system is illustrated, it is of course possible to use multiple antennas located in the seat 4 and elsewhere in the passenger compartment and these antenna systems can either operate at one or a multiple of different frequencies to discriminate type, location and/or relative size of the object being investigated. This training can be accomplished using a neural network or modular neural network with the commercially available software. The system assesses the probability that the box 28 is a person, however, and if there is even the remotest chance that it is a person, the airbag deployment is not suppressed. The system is thus typically biased toward enabling airbag deployment.

When different levels of airbag inflation are possible, and there are different levels of injury associated with an out of position occupant being subjected to varying levels of airbag deployment, it is sometimes possible to permit a depowered or low level airbag deployment in cases of uncertainty. If, for example, the neural network has a problem distinguishing whether a box or a forward facing child seat is present on the vehicle seat, the decision can be made to deploy the airbag in a depowered or low level deployment state. Other situations where such a decision could be made would be when there is confusion as to whether a forward facing human is in position or out-of-position.

Neural networks systems frequently have problems in accurately discriminating the exact location of an occupant especially when different-sized occupants are considered. This results in a gray zone around the border of the keep out zone where the system provides a weak fire or weak no fire decision. For those cases, deployment of the airbag in a depowered state can resolve the situation since an occupant in a gray zone around the keep out zone boundary would be unlikely to be injured by such a depowered deployment while significant airbag protection is still being supplied.

Electromagnetic or ultrasonic energy can be transmitted in three modes in determining the position of an occupant, for example. In most of the cases disclosed above, it is assumed that the energy will be transmitted in a broad diverging beam which interacts with a substantial portion of the occupant or other object to be monitored. This method can have the disadvantage that it will reflect first off the nearest object and, especially if that object is close to the transmitter, it may mask the true position of the occupant or object. It can also reflect off many parts of the object where the reflections can be separated in time and processed as in an ultrasonic occupant sensing system. This can also be partially overcome through the use of the second mode which uses a narrow beam. In this case, several narrow beams are used. These beams are aimed in different directions toward the occupant from a position sufficiently away from the occupant or object such that interference is unlikely.

A single receptor could be used provided the beams are either cycled on at different times or are of different frequencies. Another approach is to use a single beam emanating from a location which has an unimpeded view of the occupant or object such as the windshield header in the case of an automobile or near the roof at one end of a trailer or shipping container, for example. If two spaced apart CCD array receivers are used, the angle of the reflected beam can be determined and the location of the occupant can be calculated. The third mode is to use a single beam in a manner so that it scans back and forth and/or up and down, or in some other pattern, across the occupant, object or the space in general. In this manner, an image of the occupant or object can be obtained using a single receptor and pattern recognition software can be used to locate the head or chest of the occupant or size of the object, for example. The beam approach is most applicable to electromagnetic energy but high frequency ultrasound can also be formed into a narrow beam.

A similar effect to modifying the wave transmission mode can also be obtained by varying the characteristics of the receptors. Through appropriate lenses or reflectors, receptors can be made to be most sensitive to radiation emitted from a particular direction. In this manner, a single broad beam transmitter can be used coupled with an array of focused receivers, or a scanning receiver, to obtain a rough image of the occupant or occupying object.

Figure 5:
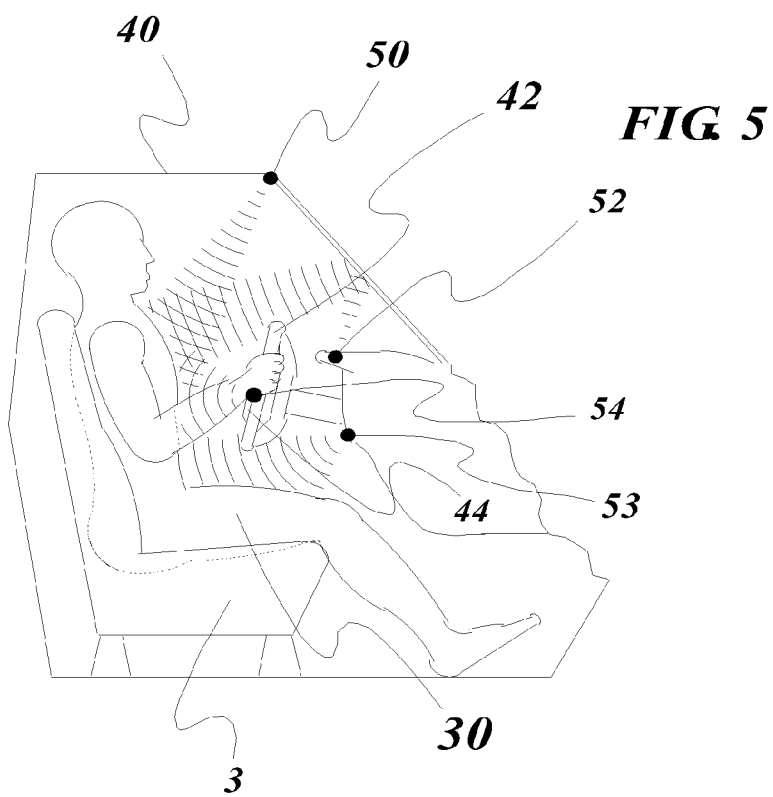
FIG. 5 is a side view, with certain portions removed or cut away, of a portion of the passenger compartment of a vehicle showing several preferred mounting locations of occupant position sensors for sensing the position of the vehicle driver.

Each of these methods of transmission or reception could be used, for example, at any of the preferred mounting locations shown in FIG. 5.

Figure 7:
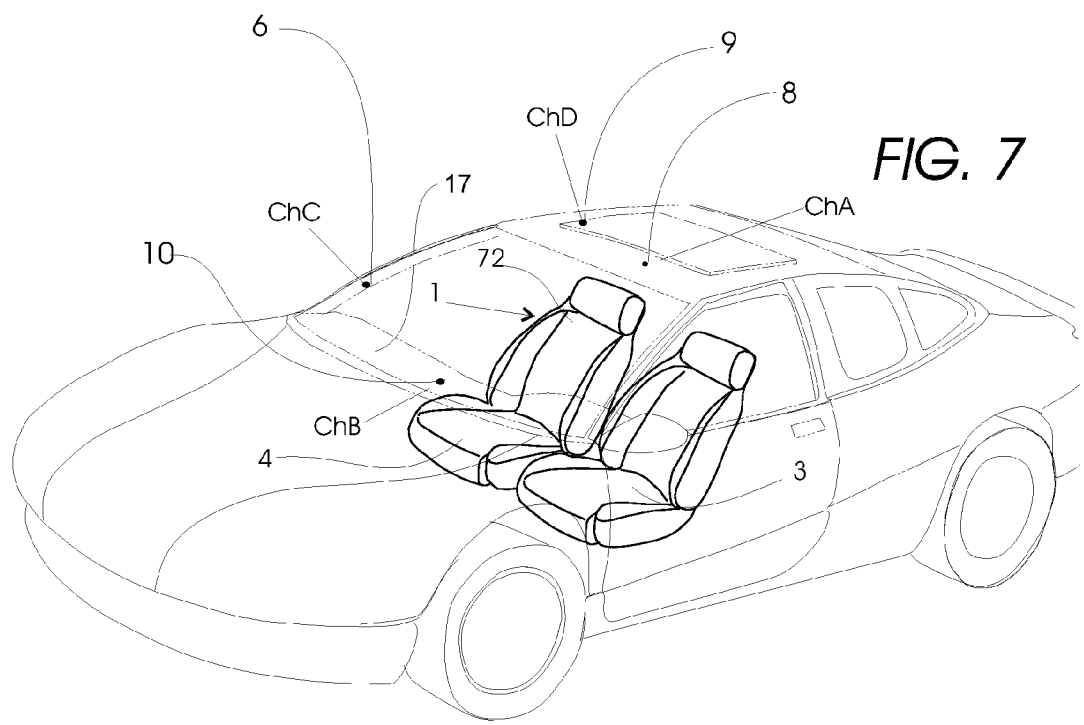
FIG. 7 is a perspective view of a vehicle showing the position of the ultrasonic or electromagnetic sensors relative to the driver and front passenger seats.

As shown in FIG. 7, there are provided four sets of wave-receiving sensor systems 6, 8, 9, 10 mounted within the passenger compartment of an automotive vehicle. Each set of sensor systems 6, 8, 9, 10 comprises a transmitter and a receiver (or just a receiver in some cases), which may be integrated into a single unit or individual components separated from one another. In this embodiment, the sensor system 6 is mounted on the A-Pillar of the vehicle. The sensor system 9 is mounted on the upper portion of the B-Pillar. The sensor system 8 is mounted on the roof ceiling portion or the headliner. The sensor system 10 is mounted near the middle of an instrument panel 17 in front of the driver's seat 3.

The sensor systems 6, 8, 9, 10 are preferably ultrasonic or electromagnetic, although sensor systems 6, 8, 9, 10 can be any other type of sensors which will detect the presence of an occupant from a distance including capacitive or electric field sensors. Also, if the sensor systems 6, 8, 9, 10 are passive infrared sensors, for example, then they may only comprise a wave-receiver. Recent advances in Quantum Well Infrared Photodetectors by NASA show great promise for this application. See "Many Applications Possible For Largest Quantum Infrared Detector", Goddard Space Center News Release Feb. 27, 2002.

The Quantum Well Infrared Photodetector is a new detector which promises to be a low-cost alternative to conventional infrared detector technology for a wide range of scientific and commercial applications, and particularly for sensing inside and outside of a vehicle. The main problem that needs to be solved is that it operates at 76 degrees Kelvin (−323 degrees F.). Chips are being developed capable of cooling other chips economically. It remains to be seen if these low temperatures can be economically achieved.

A section of the passenger compartment of an automobile is shown generally as 40 in FIGS. 8A-8D. A driver 30 of the vehicle sits on a seat 3 behind a steering wheel 42, which contains an airbag assembly 44. Airbag assembly 44 may be integrated into the steering wheel assembly or coupled to the steering wheel 42. Five transmitter and/or receiver assemblies 49, 50, 51, 52 and 54 are positioned at various places in the passenger compartment to determine the location of various parts of the driver, e.g., the head, chest and torso, relative to the airbag and to otherwise monitor the interior of the passenger compartment. Monitoring of the interior of the passenger compartment can entail detecting the presence or absence of the driver and passengers, differentiating between animate and inanimate objects, detecting the presence of occupied or unoccupied child seats, rear-facing or forward-facing, and identifying and ascertaining the identity of the occupying items in the passenger compartment. A similar system can be used for monitoring the interior of a truck, shipping container or other containers.

A processor such as control circuitry 20 is connected to the transmitter/receiver assemblies 49, 50, 51, 52, 54 and controls the transmission from the transmitters, if a transmission component is present in the assemblies, and captures the return signals from the receivers, if a receiver component is present in the assemblies. Control circuitry 20 usually contains analog to digital converters (ADCs) or a frame grabber or equivalent, a microprocessor containing sufficient memory and appropriate software including, for example, pattern recognition algorithms, and other appropriate drivers, signal conditioners, signal generators, etc. Usually, in any given implementation, only three or four of the transmitter/receiver assemblies would be used depending on their mounting locations as described below. In some special cases, such as for a simple classification system, only a single or sometimes only two transmitter/receiver assemblies are used.

A portion of the connection between the transmitter/receiver assemblies 49, 50, 51, 52, 54 and the control circuitry 20, is shown as wires. These connections can be wires, either individual wires leading from the control circuitry 20 to each of the transmitter/receiver assemblies 49, 50, 51, 52, 54 or one or more wire buses or in some cases, wireless data transmission can be used.

The location of the control circuitry 20 in the dashboard of the vehicle is for illustration purposes only and does not limit the location of the control circuitry 20. Rather, the control circuitry 20 may be located anywhere convenient or desired in the vehicle.

It is contemplated that a system and method in accordance with the invention can include a single transmitter and multiple receivers, each at a different location. Thus, each receiver would not be associated with a transmitter forming transmitter/receiver assemblies. Rather, for example, with reference to FIG. 8A, only element 51 could constitute a transmitter/receiver assembly and elements 49, 50, 52 and 54 could be receivers only.

On the other hand, it is conceivable that in some implementations, a system and method in accordance with the invention include a single receiver and multiple transmitters. Thus, each transmitter would not be associated with a receiver forming transmitter/receiver assemblies. Rather, for example, with reference to FIG. 8A, only element 51 would constitute a transmitter/receiver assembly and elements 49, 50, 52, 54 would be transmitters only.

One ultrasonic transmitter/receiver as used herein is similar to that used on modern auto-focus cameras such as manufactured by the Polaroid Corporation. Other camera auto-focusing systems use different technologies, which are also applicable here, to achieve the same distance to object determination. One camera system manufactured by Fuji of Japan, for example, uses a stereoscopic system which could also be used to determine the position of a vehicle occupant providing there is sufficient light available. In the case of insufficient light, a source of infrared light can be added to illuminate the driver. In a related implementation, a source of infrared light is reflected off of the windshield and illuminates the vehicle occupant. An infrared receiver 56 is located attached to the rear view mirror assembly 55, as shown in FIG. 8E. Alternately, the infrared can be sent by the device 50 and received by a receiver elsewhere. Since any of the devices shown in these figures could be either transmitters or receivers or both, for simplicity, only the transmitted and not the reflected wave fronts are frequently illustrated.

When using the surface of the windshield as a reflector of infrared radiation (for transmitter/receiver assembly and element 52), care must be taken to assure that the desired reflectivity at the frequency of interest is achieved. Mirror materials, such as metals and other special materials manufactured by Eastman Kodak, have a reflectivity for infrared frequencies that is substantially higher than at visible frequencies. They are thus candidates for coatings to be placed on the windshield surfaces for this purpose.

Figure 12A:
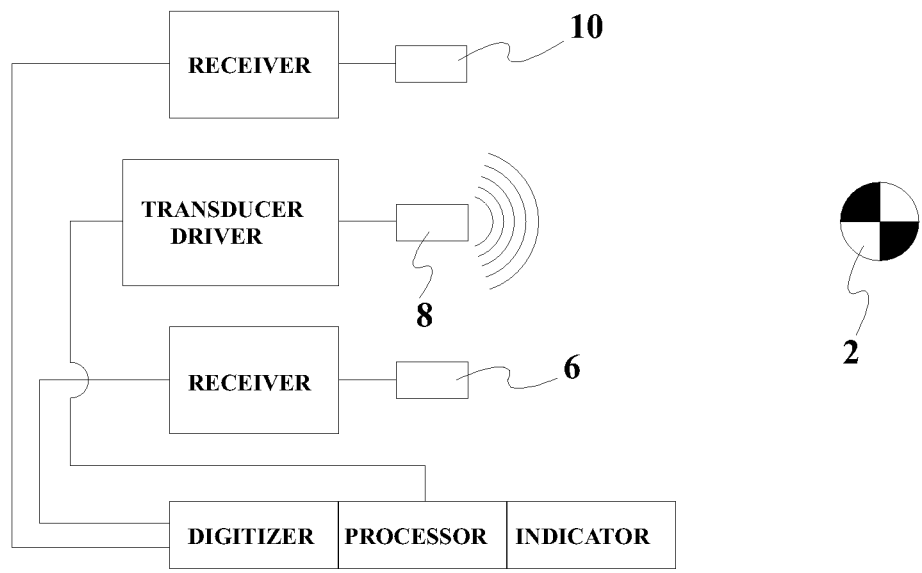
FIG. 12A is a functional block diagram of the ultrasonic imaging system illustrated in FIG. 1 using a microprocessor, DSP or field programmable gate array (FGPA). 12B is a functional block diagram of the ultrasonic imaging system illustrated in FIG. 1 using an application specific integrated circuit (ASIC).
Figure 12B:
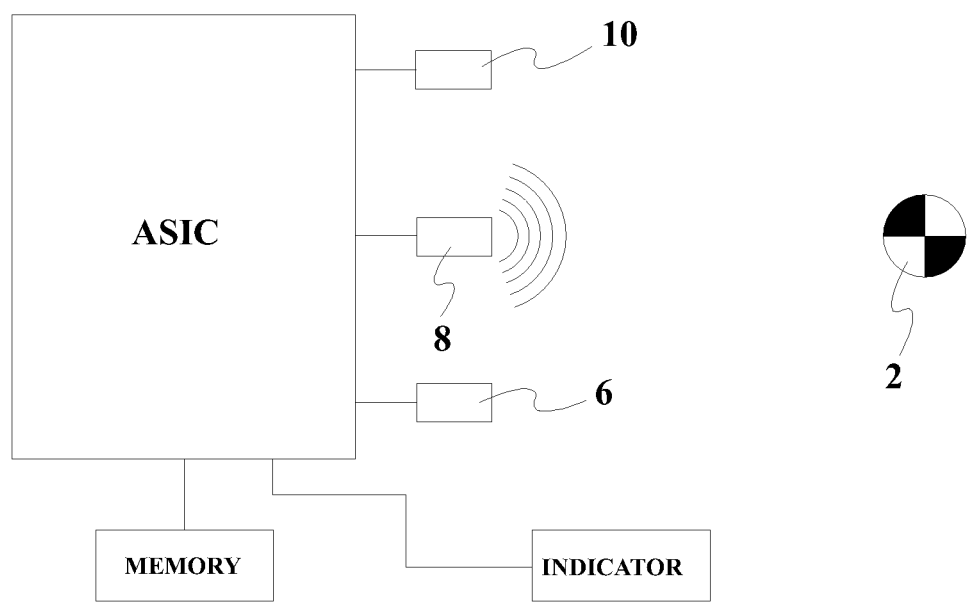

There are two preferred methods of implementing the vehicle interior monitoring system of at least one of the inventions disclosed herein, a microprocessor system and an application specific integrated circuit system (ASIC). Both of these systems are represented schematically as 20 herein. In some systems, both a microprocessor and an ASIC are used. In other systems, most if not all of the circuitry is combined onto a single chip (system on a chip). The particular implementation depends on the quantity to be made and economic considerations. A block diagram illustrating the microprocessor system is shown in FIG. 12A which shows the implementation of the system of FIG. 1. An alternate implementation of the FIG. 1 system using an ASIC is shown in FIG. 12B. In both cases, the target, which may be a rear facing child seat, is shown schematically as 2 and the three transducers as 6, 8, and 10. In the embodiment of FIG. 12A, there is a digitizer coupled to the receivers 6, 10 and the processor, and an indicator coupled to the processor. In the embodiment of FIG. 12B, there is a memory unit associated with the ASIC and also an indicator coupled to the ASIC.

The position of the occupant may be determined in various ways including by receiving and analyzing waves from a space in a passenger compartment of the vehicle occupied by the occupant, transmitting waves to impact the occupant, receiving waves after impact with the occupant and measuring time between transmission and reception of the waves, obtaining two or three-dimensional images of a passenger compartment of the vehicle occupied by the occupant and analyzing the images with an optional focusing of the images prior to analysis, or by moving a beam of radiation through a passenger compartment of the vehicle occupied by the occupant. The waves may be ultrasonic, radar, electromagnetic, passive infrared, and the like, and capacitive in nature. In the latter case, a capacitance or capacitive sensor may be provided. An electric field sensor could also be used.

Deployment of the airbag can be disabled when the determined position is too close to the airbag.

The rate at which the airbag is inflated and/or the time in which the airbag is inflated may be determined based on the determined position of the occupant.

Another method for controlling deployment of an airbag comprises determining the position of an occupant to be protected by deployment of the airbag and adjusting a threshold used in a sensor algorithm which enables or suppresses deployment of the airbag based on the determined position of the occupant. The probability that a crash requiring deployment of the airbag is occurring may be assessed and analyzed relative to the threshold whereby deployment of the airbag is enabled only when the assessed probability is greater than the threshold. The position of the occupant can be determined in any of the ways mentioned above.

One system for controlling deployment of an airbag comprises a crash sensor for providing information on a crash involving the vehicle, a position determining arrangement for determining the position of an occupant to be protected by deployment of the airbag and a circuit coupled to the airbag, the crash sensor and the position determining arrangement and arranged to issue a deployment signal to the airbag to cause deployment of the airbag. The circuit is arranged to consider a deployment threshold which varies based on the determined position of the occupant. Further, the circuit is arranged to assess the probability that a crash requiring deployment of the airbag is occurring and analyze the assessed probability relative to the threshold whereby deployment of the airbag is enabled only when the assessed probability is greater than the threshold.

In another implementation, the sensor algorithm may determine the rate that gas is generated to affect the rate that the airbag is inflated. In all of these cases the position of the occupant is used to affect the deployment of the airbag either as to whether or not it should be deployed at all, the time of deployment or as to the rate of inflation.

1.1 Ultrasonics 1.1.1 General

The maximum acoustic frequency that is practical to use for acoustic imaging in the systems is about 40 to 160 kilohertz (kHz). The wavelength of a 50 kHz acoustic wave is about 0.6 cm which is too coarse to determine the fine features of a person's face, for example. It is well understood by those skilled in the art that features which are much smaller than the wavelength of the irradiating radiation cannot be distinguished. Similarly, the wavelength of common radar systems varies from about 0.9 cm (for 33 GHz K band) to 133 cm (for 225 MHz P band) which are also too coarse for person-identification systems.

Referring now to FIGS. 5 and 13-17, a section of the passenger compartment of an automobile is shown generally as 40 in FIG. 5. A driver of a vehicle 30 sits on a seat 3 behind a steering wheel 42 which contains an airbag assembly 44. Four transmitter and/or receiver assemblies 50, 52, 53 and 54 are positioned at various places in or around the passenger compartment to determine the location of the head, chest and torso of the driver 30 relative to the airbag assembly 44. Usually, in any given implementation, only one or two of the transmitters and receivers would be used depending on their mounting locations as described below.

FIG. 5 illustrates several of the possible locations of such devices. For example, transmitter and receiver 50 emits ultrasonic acoustical waves which bounce off the chest of the driver 30 and return. Periodically, a burst of ultrasonic waves at about 50 kilohertz is emitted by the transmitter/receiver and then the echo, or reflected signal, is detected by the same or different device. An associated electronic circuit measures the time between the transmission and the reception of the ultrasonic waves and determines the distance from the transmitter/receiver to the driver 30 based on the velocity of sound. This information can then be sent to a microprocessor that can be located in the crash sensor and diagnostic circuitry which determines if the driver 30 is close enough to the airbag assembly 44 that a deployment might, by itself, cause injury to the driver 30. In such a case, the circuit disables the airbag system and thereby prevents its deployment. In an alternate case, the sensor algorithm assesses the probability that a crash requiring an airbag is in process and waits until that probability exceeds an amount that is dependent on the position of the driver 30. Thus, for example, the sensor might decide to deploy the airbag based on a need probability assessment of 50%, if the decision must be made immediately for a driver 30 approaching the airbag, but might wait until the probability rises to 95% for a more distant driver. Although a driver system has been illustrated, the passenger system would be similar.

Alternate mountings for the transmitter/receiver include various locations on the instrument panel on either side of the steering column such as 53 in FIG. 5. Also, although some of the devices herein illustrated assume that for the ultrasonic system, the same device is used for both transmitting and receiving waves, there are advantages in separating these functions, at least for standard transducer systems. Since there is a time lag required for the system to stabilize after transmitting a pulse before it can receive a pulse, close measurements are enhanced, for example, by using separate transmitters and receivers. In addition, if the ultrasonic transmitter and receiver are separated, the transmitter can transmit continuously, provided the transmitted signal is modulated such that the received signal can be compared with the transmitted signal to determine the time it takes for the waves to reach and reflect off of the occupant.

Many methods exist for this modulation including varying the frequency or amplitude of the waves or pulse modulation or coding. In all cases, the logic circuit which controls the sensor and receiver must be able to determine when the signal which was most recently received was transmitted. In this manner, even though the time that it takes for the signal to travel from the transmitter to the receiver, via reflection off of the occupant or other object to be monitored, may be several milliseconds, information as to the position of the occupant is received continuously which permits an accurate, although delayed, determination of the occupant's velocity from successive position measurements. Other modulation methods that may be applied to electromagnetic radiations include TDMA, CDMA, noise or pseudo-noise, spatial, etc.

Conventional ultrasonic distance measuring devices must wait for the signal to travel to the occupant or other monitored object and return before a new signal is sent. This greatly limits the frequency at which position data can be obtained to the formula where the frequency is equal to the velocity of sound divided by two times the distance to the occupant. For example, if the velocity of sound is taken at about 1000 feet per second, occupant position data for an occupant or object located one foot from the transmitter can only be obtained every 2 milliseconds which corresponds to a frequency of about 500 Hz. At a three-foot displacement and allowing for some processing time, the frequency is closer to about 100 Hz.

This slow frequency that data can be collected seriously degrades the accuracy of the velocity calculation. The reflection of ultrasonic waves from the clothes of an occupant or the existence of thermal gradients, for example, can cause noise or scatter in the position measurement and lead to significant inaccuracies in a given measurement. When many measurements are taken more rapidly, as in the technique described here, these inaccuracies can be averaged and a significant improvement in the accuracy of the velocity calculation results.

The determination of the velocity of the occupant need not be derived from successive distance measurements. A potentially more accurate method is to make use of the Doppler Effect where the frequency of the reflected waves differs from the transmitted waves by an amount which is proportional to the occupant's velocity. In one embodiment, a single ultrasonic transmitter and a separate receiver are used to measure the position of the occupant, by the travel time of a known signal, and the velocity, by the frequency shift of that signal. Although the Doppler Effect has been used to determine whether an occupant has fallen asleep, it has not previously been used in conjunction with a position measuring device to determine whether an occupant is likely to become out of position, i.e., an extrapolated position in the future based on the occupant's current position and velocity as determined from successive position measurements, and thus in danger of being injured by a deploying airbag, or that a monitored object is moving. This combination is particularly advantageous since both measurements can be accurately and efficiently determined using a single transmitter and receiver pair resulting in a low cost system.

One problem with Doppler measurements is the slight change in frequency that occurs during normal occupant velocities. This requires that sophisticated electronic techniques and a low Q receiver should be utilized to increase the frequency and thereby render it easier to measure the velocity using the phase shift. For many implementations, therefore, the velocity of the occupant is determined by calculating the difference between successive position measurements.

The following discussion will apply to the case where ultrasonic sensors are used although a similar discussion can be presented relative to the use of electromagnetic sensors such as active infrared sensors, taking into account the differences in the technologies. Also, the following discussion will relate to an embodiment wherein the seat is the front passenger seat, although a similar discussion can apply to other vehicles and monitoring situations.

Figure 9:
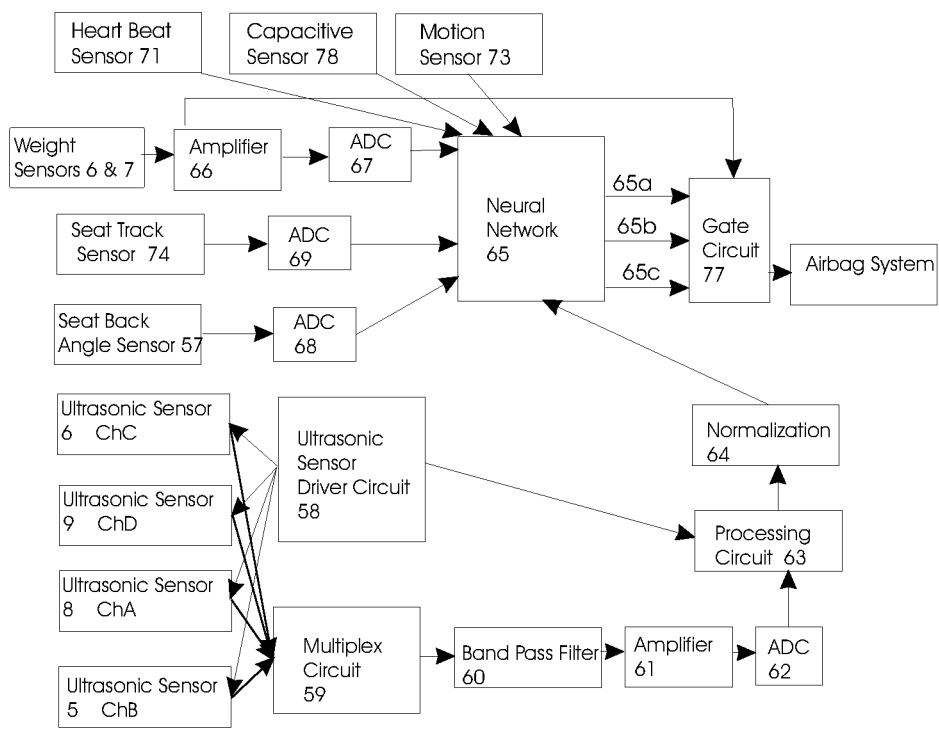
FIG. 9 is a circuit diagram of the seated-state detecting unit of the present invention.

The ultrasonic or electromagnetic sensor systems, 6, 8, 9 and 10 in FIG. 7 can be controlled or driven, one at a time or simultaneously, by an appropriate driver circuit such as ultrasonic or electromagnetic sensor driver circuit 58 shown in FIG. 9. The transmitters of the ultrasonic or electromagnetic sensor systems 6, 8, 9 and 10 transmit respective ultrasonic or electromagnetic waves toward the seat 4 and transmit pulses (see FIG. 10(c)) in sequence at times t1, t2, t3 and t4 (t4>t3>t2>t1) or simultaneously (t1=t2=t3=t4). The reflected waves of the ultrasonic or electromagnetic waves are received by the receivers ChA-ChD of the ultrasonic or electromagnetic sensors 6, 8, 9 and 10. The receiver ChA is associated with the ultrasonic or electromagnetic sensor system 8, the receiver ChB is associated with the ultrasonic or electromagnetic sensor system 5, the receiver ChC is associated with the ultrasonic or electromagnetic sensor system 6, and the receiver ChD is associated with the ultrasonic or electromagnetic sensor system 9.

FIGS. 10(a) and 10(b) show examples of the reflected ultrasonic waves USRW that are received by receivers ChA-ChD. FIG. 10(a) shows an example of the reflected wave USRW that is obtained when an adult sits in a normally seated space on the passenger seat 4, while FIG. 10(b) shows an example of the reflected wave USRW that are obtained when an adult sits in a slouching state (one of the abnormal seated-states) in the passenger seat 4.

Figure 6:
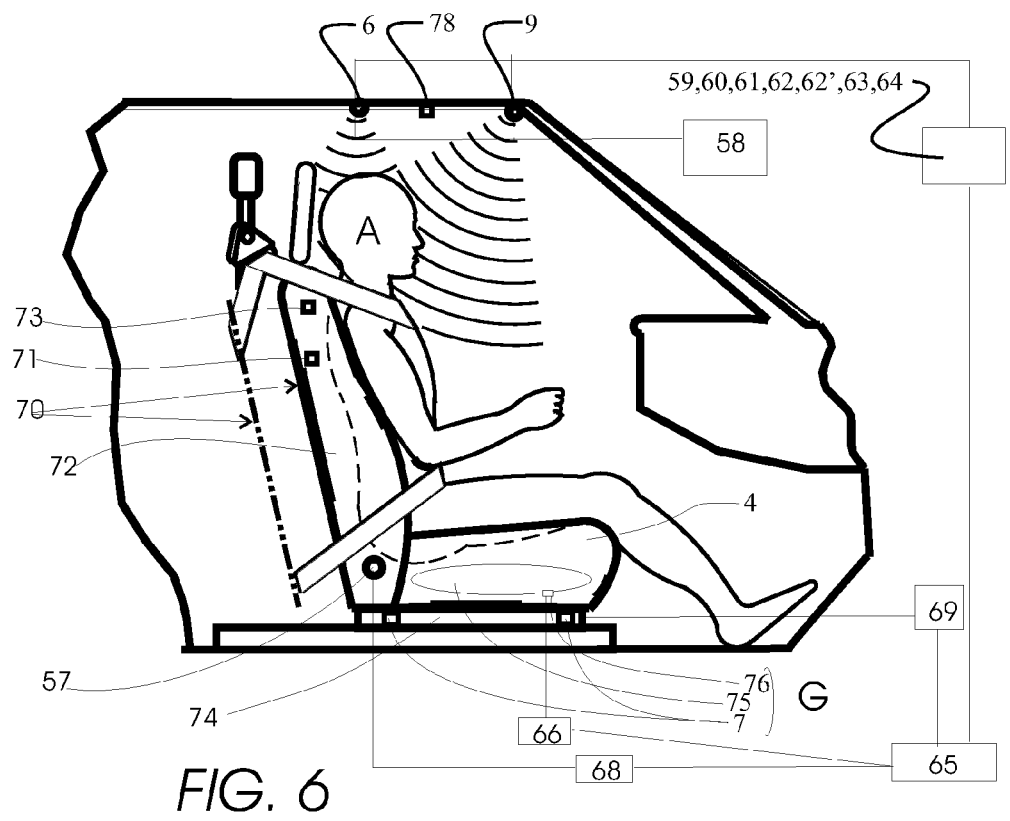
FIG. 6 shows a seated-state detecting unit in accordance with the present invention and the connections between ultrasonic or electromagnetic sensors, a weight sensor, a reclining angle detecting sensor, a seat track position detecting sensor, a heartbeat sensor, a motion sensor, a neural network, and an airbag system installed within a vehicle compartment.

In the case of a normally seated passenger, as shown in FIGS. 6 and 7, the location of the ultrasonic sensor system 6 is closest to the passenger A. Therefore, the reflected wave pulse P1 is received earliest after transmission by the receiver ChD as shown in FIG. 10(a), and the width of the reflected wave pulse P1 is larger. Next, the distance from the ultrasonic sensor 8 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 10(a). More specifically, since it is believed that the distance from the ultrasonic sensor system 6 to the passenger A is slightly shorter than the distance from the ultrasonic sensor system 10 to the passenger A, the reflected wave pulse P3 is received slightly earlier by the receiver ChC than the reflected wave pulse P4 is received by the receiver ChB.

In the case where the passenger A is sitting in a slouching state in the passenger seat 4, the distance between the ultrasonic sensor system 6 and the passenger A is shortest. Therefore, the time from transmission at time t3 to reception is shortest, and the reflected wave pulse P3 is received by the receiver ChC, as shown in FIG. 10(b). Next, the distances between the ultrasonic sensor system 10 and the passenger A becomes shorter, so the reflected wave pulse P4 is received earlier by the receiver ChB than the remaining reflected wave pulses P2 and P1. When the distance from the ultrasonic sensor system 8 to the passenger A is compared with that from the ultrasonic sensor system 9 to the passenger A, the distance from the ultrasonic sensor system 8 to the passenger A becomes shorter, so the reflected wave pulse P2 is received by the receiver ChA first and the reflected wave pulse P1 is thus received last by the receiver ChD.

The configurations of the reflected wave pulses P1-P4, the times that the reflected wave pulses P1-P4 are received, the sizes of the reflected wave pulses P1-P4 are varied depending upon the configuration and position of an object such as a passenger situated on the front passenger seat 4. FIGS. 10(a) and (b) merely show examples for the purpose of description and therefore the present invention is not limited to these examples.

The outputs of the receivers ChA-ChD, as shown in FIG. 9, are input to a band pass filter 60 through a multiplex circuit 59 which is switched in synchronization with a timing signal from the ultrasonic sensor drive circuit 58. The band pass filter 60 removes a low frequency wave component from the output signal based on each of the reflected wave USRW and also removes some of the noise. The output signal based on each of the reflected wave USRW is passed through the band pass filter 60, then is amplified by an amplifier 61. The amplifier 61 also removes the high frequency carrier wave component in each of the reflected waves USRW and generates an envelope wave signal. This envelope wave signal is input to an analog/digital converter (ADC) 62 and digitized as measured data. The measured data is input to a processing circuit 63, which is controlled by the timing signal which is in turn output from the ultrasonic sensor drive circuit 58.

The processing circuit 63 collects measured data at intervals of 7 ms (or at another time interval with the time interval also being referred to as a time window or time period), and 47 data points are generated for each of the ultrasonic sensor systems 6, 8, 9 and 10. For each of these reflected waves USRW, the initial reflected wave portion T1 and the last reflected wave portion T2 are cut off or removed in each time window. The reason for this will be described when the training procedure of a neural network is described later, and the description is omitted for now. With this, 32, 31, 37 and 38 data points will be sampled by the ultrasonic sensor systems 6, 8, 9 and 10, respectively. The reason why the number of data points differs for each of the ultrasonic sensor systems 6, 8, 9 and 10 is that the distance from the passenger seat 4 to the ultrasonic sensor systems 6, 8, 9 and 10 differ from one another.

Each of the measured data is input to a normalization circuit 64 and normalized. The normalized measured data is input to the neural network 65 as wave data.

A comprehensive occupant sensing system will now be discussed which involves a variety of different sensors, again this is for illustration purposes only and a similar description can be constructed for other vehicles including shipping container and truck trailer monitoring. Many of these sensors will be discussed in more detail under the appropriate sections below. FIG. 6 shows a passenger seat 70 to which an adjustment apparatus including a seated-state detecting unit according to the present invention may be applied. The seat 70 includes a horizontally situated bottom seat portion 4 and a vertically oriented back portion 72. The seat portion 4 is provided with one or more pressure or weight sensors 7, 76 that determine the weight of the object occupying the seat or the pressure applied by the object to the seat. The coupled portion between the seated portion 4 and the back portion 72 is provided with a reclining angle detecting sensor 57, which detects the tilted angle of the back portion 72 relative to the seat portion 4. The seat portion 4 is provided with a seat track position-detecting sensor 74. The seat track position detecting sensor 74 detects the quantity of movement of the seat portion 4 which is moved from a back reference position, indicated by the dotted chain line. Optionally embedded within the back portion 72 are a heartbeat sensor 71 and a motion sensor 73. Attached to the headliner is a capacitance sensor 78. The seat 70 may be the driver seat, the front passenger seat or any other seat in a motor vehicle as well as other seats in transportation vehicles or seats in non-transportation applications.

Pressure or weight measuring means such as the sensors 7 and 76 are associated with the seat, e.g., mounted into or below the seat portion 4 or on the seat structure, for measuring the pressure or weight applied onto the seat. The pressure or weight may be zero if no occupying item is present and the sensors are calibrated to only measure incremental weight or pressure. Sensors 7 and 76 may represent a plurality of different sensors which measure the pressure or weight applied onto the seat at different portions thereof or for redundancy purposes, e.g., such as by means of an airbag or fluid filled bladder 75 in the seat portion 4. Airbag or bladder 75 may contain a single or a plurality of chambers, each of which may be associated with a sensor (transducer) 76 for measuring the pressure in the chamber. Such sensors may be in the form of strain, force or pressure sensors which measure the force or pressure on the seat portion 4 or seat back 72, a part of the seat portion 4 or seat back 72, displacement measuring sensors which measure the displacement of the seat surface or the entire seat 70 such as through the use of strain gages mounted on the seat structural members, such as 7, or other appropriate locations, or systems which convert displacement into a pressure wherein one or more pressure sensors can be used as a measure of weight and/or weight distribution. Sensors 7, 76 may be of the types disclosed in U.S. Pat. No. 6,242,701 and below herein. Although pressure or weight here is disclosed and illustrated with regard to measuring the pressure applied by or weight of an object occupying a seat in an automobile or truck, the same principles can be used to measure the pressure applied by and weight of objects occupying other vehicles including truck trailers and shipping containers. For example, a series of fluid filled bladders under a segmented floor could be used to measure the weight and weight distribution in a truck trailer.

Many practical problems have arisen during the development stages of bladder and strain gage based weight systems. Some of these problems relate to bladder sensors and in particular to gas-filled bladder sensors and are effectively dealt with in U.S. Pat. No. 5,918,696, U.S. Pat. No. 5,927,427, U.S. Pat. No. 5,957,491, U.S. Pat. No. 5,979,585, U.S. Pat. No. 5,984,349, U.S. Pat. No. 6,021,863, U.S. Pat. No. 6,056,079, U.S. Pat. No. 6,076,853, U.S. Pat. No. 6,260,879 and U.S. Pat. No. 6,286,861. Other problems relate to seatbelt usage and to unanticipated stresses and strains that occur in seat mounting structures and will be discussed below.

As illustrated in FIG. 9, the output of the pressure or weight sensor(s) 7 and 76 is amplified by an amplifier 66 coupled to the pressure or weight sensor(s) 7,76 and the amplified output is input to the analog/digital converter 67.

A heartbeat sensor 71 is arranged to detect a heartbeat, and the magnitude thereof, of a human occupant of the seat, if such a human occupant is present. The output of the heartbeat sensor 71 is input to the neural network 65. The heartbeat sensor 71 may be of the type as disclosed in McEwan (U.S. Pat. No. 5,573,012 and U.S. Pat. No. 5,766,208). The heartbeat sensor 71 can be positioned at any convenient position relative to the seat 4 where occupancy is being monitored. A preferred location is within the vehicle seatback. The heartbeat of a stowaway in a cargo container or truck trailer can similarly be measured be a sensor on the vehicle floor or other appropriate location that measures vibrations.

The reclining angle detecting sensor 57 and the seat track position-detecting sensor 74, which each may comprise a variable resistor, can be connected to constant-current circuits, respectively. A constant-current is supplied from the constant-current circuit to the reclining angle detecting sensor 57, and the reclining angle detecting sensor 57 converts a change in the resistance value on the tilt of the back portion 72 to a specific voltage. This output voltage is input to an analog/digital converter 68 as angle data, i.e., representative of the angle between the back portion 72 and the seat portion 4. Similarly, a constant current can be supplied from the constant-current circuit to the seat track position-detecting sensor 74 and the seat track position detecting sensor 74 converts a change in the resistance value based on the track position of the seat portion 4 to a specific voltage. This output voltage is input to an analog/digital converter 69 as seat track data. Thus, the outputs of the reclining angle-detecting sensor 57 and the seat track position-detecting sensor 74 are input to the analog/digital converters 68 and 69, respectively. Each digital data value from the ADCs 68, 69 is input to the neural network 65. Although the digitized data of the pressure or weight sensor(s) 7, 76 is input to the neural network 65, the output of the amplifier 66 is also input to a comparison circuit. The comparison circuit, which is incorporated in the gate circuit algorithm, determines whether or not the weight of an object on the passenger seat 70 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit. A more detailed description of this and similar systems can be found in above-referenced patents and patent applications assigned to the current assignee and in the description below. The system described above is one example of many systems that can be designed using the teachings of at least one of the inventions disclosed herein for detecting the occupancy state of the seat of a vehicle.

Figure 18:
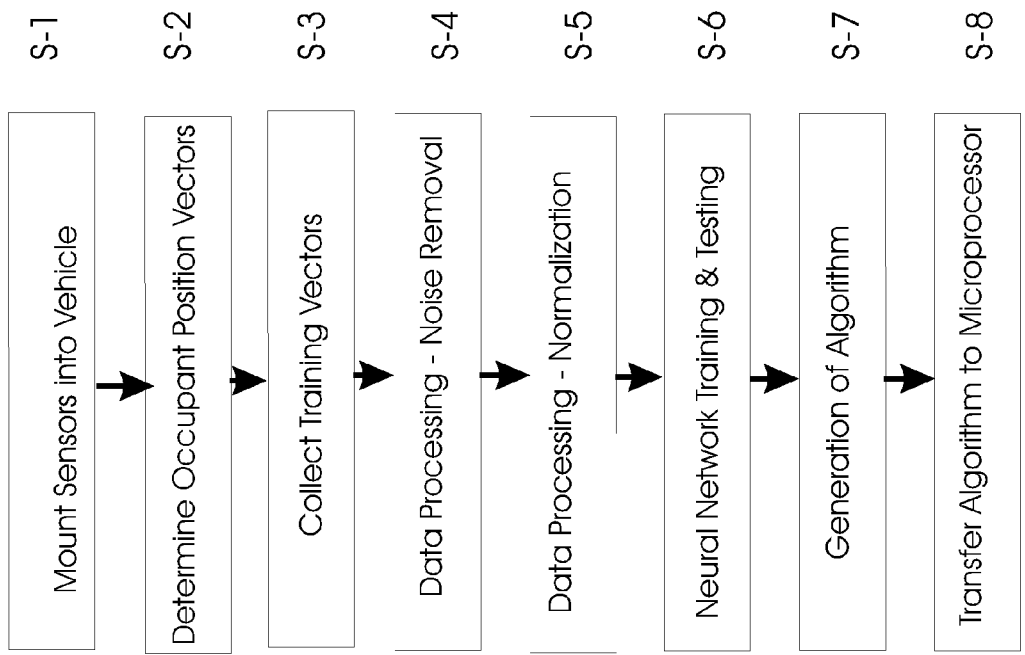
FIG. 18 a flowchart showing the training steps of a neural network.
Figure 16:
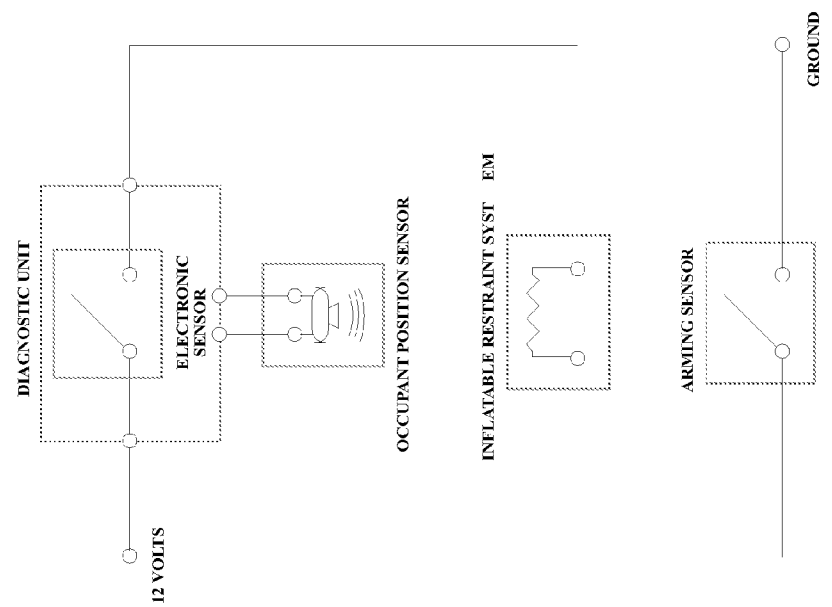
FIG. 16 is a circuit schematic illustrating the use of the occupant position sensor in conjunction with the remainder of the inflatable restraint system.

As diagrammed in FIG. 18, the first step is to mount the four sets of ultrasonic sensor systems 11-14, the weight sensors 7,76, the reclining angle detecting sensor 57, and the seat track position detecting sensor 74, for example, into a vehicle (step S1). For other vehicle monitoring tasks different sets of sensors could be used. Next, in order to provide data for the neural network 65 to learn the patterns of seated states, data is recorded for patterns of all possible seated or occupancy states and a list is maintained recording the seated or occupancy states for which data was acquired. The data from the sensors/transducers 6, 8, 9, 10, 57, 71, 73, 74, 76 and 78 for a particular occupancy of the passenger seat, for example, is called a vector (step S2). It should be pointed out that the use of the reclining angle detecting sensor 57, seat track position detecting sensor 74, heartbeat sensor 71, capacitive sensor 78 and motion sensor 73 is not essential to the detecting apparatus and method in accordance with the invention. However, each of these sensors, in combination with any one or more of the other sensors enhances the evaluation of the seated-state of the seat or the occupancy of the vehicle.

Next, based on the training data from the reflected waves of the ultrasonic sensor systems 6, 8, 9, 10 and the other sensors 7, 71, 73, 76, 78 the vector data is collected (step S3). Next, the reflected waves P1-P4 are modified by removing the initial reflected waves from each time window with a short reflection time from an object (range gating) (period T1 in FIG. 11) and the last portion of the reflected waves from each time window with a long reflection time from an object (period P2 in FIG. 11) (step S4). It is believed that the reflected waves with a short reflection time from an object is due to cross-talk, that is, waves from the transmitters which leak into each of their associated receivers ChA-ChD. It is also believed that the reflected waves with a long reflection time are reflected waves from an object far away from the passenger seat or from multipath reflections. If these two reflected wave portions are used as data, they will add noise to the training process. Therefore, these reflected wave portions are eliminated from the data.

Recent advances in ultrasonic transducer design have now permitted the use of a single transducer acting as both a sender (transmitter) and receiver. These same advances have substantially reduced the ringing of the transducer after the excitation pulse has been caused to die out to where targets as close as about 2 inches from the transducer can be sensed. Thus, the magnitude of the T1 time period has been substantially reduced.

As shown in FIG. 19a, the measured data is normalized by making the peaks of the reflected wave pulses P1-P4 equal (step S5). This eliminates the effects of different reflectivities of different objects and people depending on the characteristics of their surfaces such as their clothing. Data from the weight sensor, seat track position sensor and seat reclining angle sensor is also frequently normalized based typically on fixed normalization parameters. When other sensors are used for other types of monitoring, similar techniques are used.

The data from the ultrasonic transducers are now also preferably fed through a logarithmic compression circuit that substantially reduces the magnitude of reflected signals from high reflectivity targets compared to those of low reflectivity. Additionally, a time gain circuit is used to compensate for the difference in sonic strength received by the transducer based on the distance of the reflecting object from the transducer.

Figure 20:
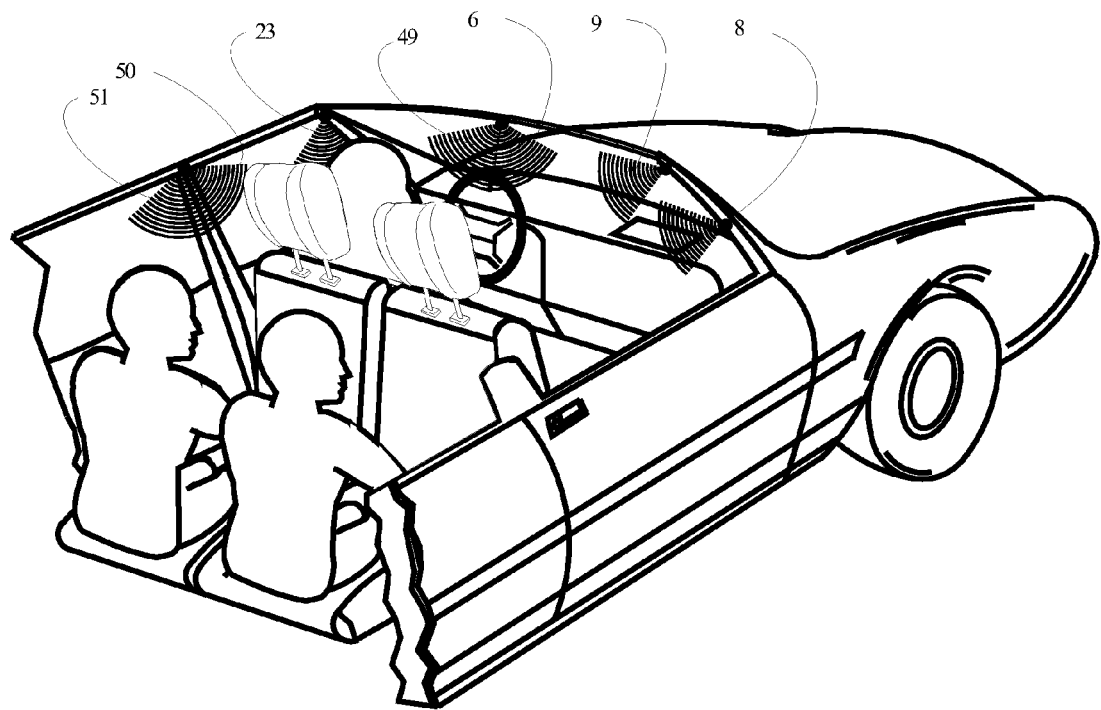
FIG. 20 is a perspective view of the interior of the passenger compartment of an automobile, with parts cut away and removed, showing a variety of transmitters that can be used in a phased array system.

As various parts of the vehicle interior identification and monitoring system described in the above reference patents and patent applications are implemented, a variety of transmitting and receiving transducers will be present in the vehicle passenger compartment. If several of these transducers are ultrasonic transmitters and receivers, they can be operated in a phased array manner, as described elsewhere for the headrest, to permit precise distance measurements and mapping of the components of the passenger compartment. This is illustrated in FIG. 20 which is a perspective view of the interior of the passenger compartment showing a variety of transmitters and receivers, 6, 8, 9, 23, 49-51 which can be used in a sort of phased array system. In addition, information can be transmitted between the transducers using coded signals in an ultrasonic network through the vehicle compartment airspace. If one of these sensors is an optical CCD or CMOS array, the location of the driver's eyes can be accurately determined and the results sent to the seat ultrasonically. Obviously, many other possibilities exist for automobile and other vehicle monitoring situations.

To use ultrasonic transducers in a phase array mode generally requires that the transducers have a low Q. Certain new micromachined capacitive transducers appear to be suitable for such an application. The range of such transducers is at present limited, however.

The speed of sound varies with temperature, humidity, and pressure. This can be compensated for by using the fact that the geometry between the transducers is known and the speed of sound can therefore be measured. Thus, on vehicle startup and as often as desired thereafter, the speed of sound can be measured by one transducer, such as transducer 18 in FIG. 21, sending a signal which is directly received by another transducer 5. Since the distance separating them is known, the speed of sound can be calculated and the system automatically adjusted to remove the variation due to variations in the speed of sound. Therefore, the system operates with same accuracy regardless of the temperature, humidity or atmospheric pressure. It may even be possible to use this technique to also automatically compensate for any effects due to wind velocity through an open window. An additional benefit of this system is that it can be used to determine the vehicle interior temperature for use by other control systems within the vehicle since the variation in the velocity of sound is a strong function of temperature and a weak function of pressure and humidity.

The problem with the speed of sound measurement described above is that some object in the vehicle may block the path from one transducer to the other. This of course could be checked and a correction would not be made if the signal from one transducer does not reach the other transducer. The problem, however, is that the path might not be completely blocked but only slightly blocked. This would cause the ultrasonic path length to increase, which would give a false indication of a temperature change. This can be solved by using more than one transducer. All of the transducers can broadcast signals to all of the other transducers. The problem here, of course, is which transducer pair should be believed if they all give different answers. The answer is the one that gives the shortest distance or the greatest calculated speed of sound. By this method, there are a total of 6 separate paths for four ultrasonic transducers.

An alternative method of determining the temperature is to use the transducer circuit to measure some parameter of the transducer that changes with temperature. For example, the natural frequency of ultrasonic transducers changes in a known manner with temperature and therefore by measuring the natural frequency of the transducer, the temperature can be determined. Since this method does not require communication between transducers, it would also work in situations where each transducer has a different resonant frequency.

The process, by which all of the distances are carefully measured from each transducer to the other transducers, and the algorithm developed to determine the speed of sound, is a novel part of the teachings of the instant invention for use with ultrasonic transducers. Prior to this, the speed of sound calculation was based on a single transmission from one transducer to a known second transducer. This resulted in an inaccurate system design and degraded the accuracy of systems in the field.

If the electronic control module that is part of the system is located in generally the same environment as the transducers, another method of determining the temperature is available. This method utilizes a device and whose temperature sensitivity is known and which is located in the same box as the electronic circuit. In fact, in many cases, an existing component on the printed circuit board can be monitored to give an indication of the temperature. For example, the diodes in a log comparison circuit have characteristics that their resistance changes in a known manner with temperature. It can be expected that the electronic module will generally be at a higher temperature than the surrounding environment, however, the temperature difference is a known and predictable amount. Thus, a reasonably good estimation of the temperature in the passenger compartment, or other container compartment, can also be obtained in this manner. Thermisters or other temperature transducers can be used.

The placement of ultrasonic transducers for the example of ultrasonic occupant position sensor system of at least one of the inventions disclosed herein include the following novel disclosures: (1) the application of two sensors to single-axis monitoring of target volumes; (2) the method of locating two sensors spanning a target volume to sense object positions, that is, transducers are mounted along the sensing axis beyond the objects to be sensed; (3) the method of orientation of the sensor axis for optimal target discrimination parallel to the axis of separation of distinguishing target features; and (4) the method of defining the head and shoulders and supporting surfaces as defining humans for rear facing child seat detection and forward facing human detection.

A similar set of observations is available for the use of electromagnetic, capacitive, electric field or other sensors and for other vehicle monitoring situations. Such rules however must take into account that some of such sensors typically are more accurate in measuring lateral and vertical dimensions relative to the sensor than distances perpendicular to the sensor. This is particularly the case for CMOS and CCD-based transducers.

Considerable work is ongoing to improve the resolution of the ultrasonic transducers. To take advantage of higher resolution transducers, data points should be obtained that are closer together in time. This means that after the envelope has been extracted from the returned signal, the sampling rate should be increased from approximately 1000 samples per second to perhaps 2000 samples per second or even higher. By doubling or tripling the amount of data required to be analyzed, the system which is mounted on the vehicle will require greater computational power. This results in a more expensive electronic system. Not all of the data is of equal importance, however. The position of the occupant in the normal seating position does not need to be known with great accuracy whereas, as that occupant is moving toward the keep out zone boundary during pre-crash braking, the spatial accuracy requirements become more important. Fortunately, the neural network algorithm generating system has the capability of indicating to the system designer the relative value of each data point used by the neural network. Thus, as many as, for example, 500 data points per vector may be collected and fed to the neural network during the training stage and, after careful pruning, the final number of data points to be used by the vehicle mounted system may be reduced to 150, for example. This technique of using the neural network algorithm-generating program to prune the input data is an important teaching of the present invention.

By this method, the advantages of higher resolution transducers can be optimally used without increasing the cost of the electronic vehicle-mounted circuits. Also, once the neural network has determined the spacing of the data points, this can be fine-tuned, for example, by acquiring more data points at the edge of the keep out zone as compared to positions well into the safe zone. The initial technique is done by collecting the full 500 data points, for example, while in the system installed in the vehicle the data digitization spacing can be determined by hardware or software so that only the required data is acquired.

1.1.2 Thermal Gradients

Techniques for compensating for thermal gradients which affect ultrasonic waves and electromagnetic waves are set forth in U.S. patent application Ser. No. 10/940,881 and are incorporated by reference herein.

1.2 Optics

Figure 4:
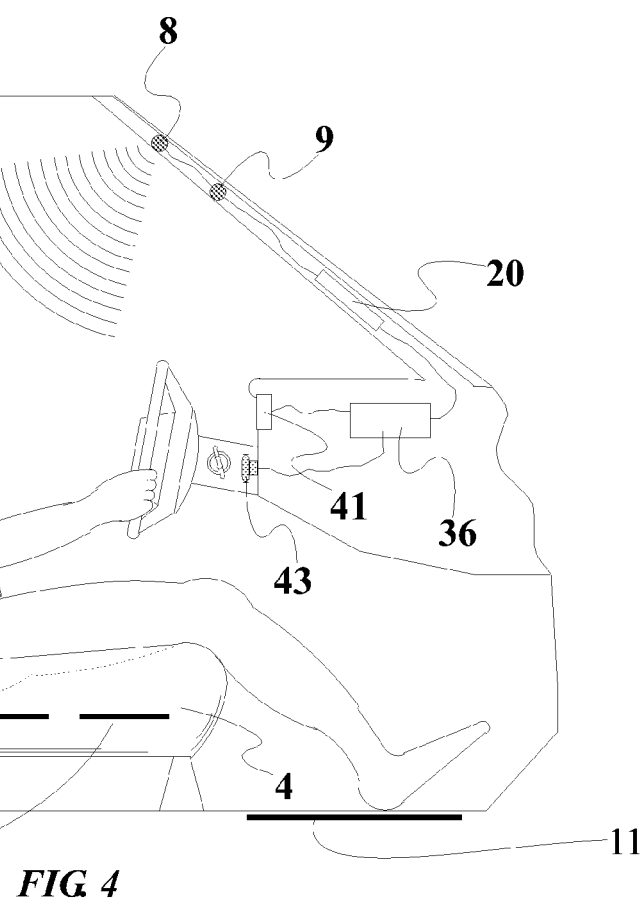
FIG. 4 is a side view with parts cutaway and removed of a vehicle showing the passenger compartment containing a driver and a preferred mounting location for an occupant identification system and including an antenna field sensor and an inattentiveness response button.

In FIG. 4, the ultrasonic transducers of the previous designs are replaced by laser transducers 8 and 9 which are connected to a microprocessor 20. In all other manners, the system operates the same. The design of the electronic circuits for this laser system is described in U.S. Pat. No. 5,653,462 and in particular FIG. 8 thereof and the corresponding description. In this case, a pattern recognition system such as a neural network system is employed and uses the demodulated signals from the laser transducers 8 and 9.

A more complicated and sophisticated system is shown conceptually in FIG. 5 where transmitter/receiver assembly 52 is illustrated. In this case, as described briefly above, an infrared transmitter and a pair of optical receivers are used to capture the reflection of the passenger. When this system is used to monitor the driver as shown in FIG. 5, with appropriate circuitry and a microprocessor, the behavior of the driver can be monitored. Using this system, not only can the position and velocity of the driver be determined and used in conjunction with an airbag system, but it is also possible to determine whether the driver is falling asleep or exhibiting other potentially dangerous behavior by comparing portions of his/her image over time. In this case, the speed of the vehicle can be reduced or the vehicle even stopped if this action is considered appropriate. This implementation has the highest probability of an unimpeded view of the driver since he/she must have a clear view through the windshield in order to operate the motor vehicle.

The output of microprocessor 20 of the monitoring system is shown connected schematically to a general interface 36 which can be the vehicle ignition enabling system; the entertainment system; the seat, mirror, suspension or other adjustment systems; telematics or any other appropriate vehicle system.

Figure 8A:
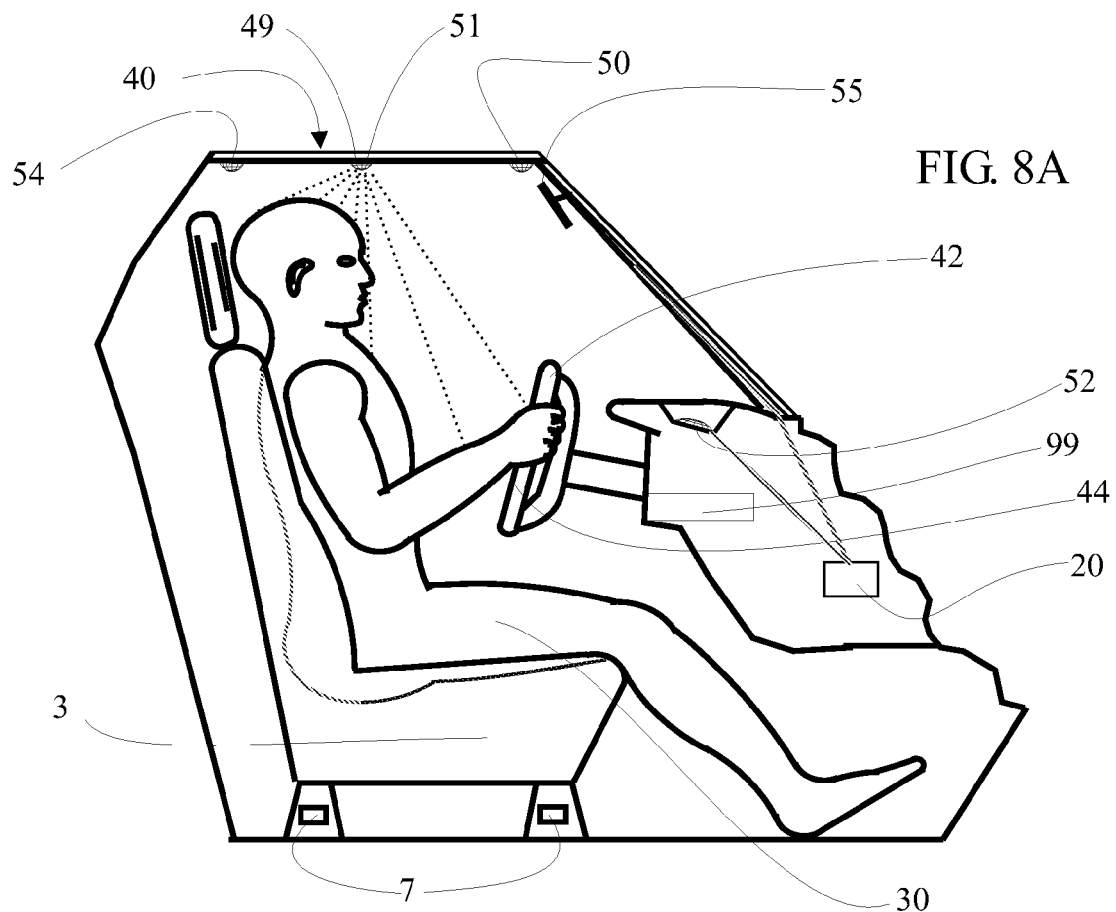
FIG. 8A is a side planar view, with certain portions removed or cut away, of a portion of the passenger compartment of a vehicle showing several preferred mounting locations of interior vehicle monitoring sensors shown particularly for sensing the vehicle driver illustrating the wave pattern from a CCD or CMOS optical position sensor mounted along the side of the driver or centered above his or her head.

FIG. 8A illustrates a typical wave pattern of transmitted infrared waves from transmitter/receiver assembly 49, which is mounted on the side of the vehicle passenger compartment above the front, driver's side door. Transmitter/receiver assembly 51, shown overlaid onto transmitter/receiver 49, is actually mounted in the center headliner of the passenger compartment (and thus between the driver's seat and the front passenger seat), near the dome light, and is aimed toward the driver. Typically, there will be a symmetrical installation for the passenger side of the vehicle. That is, a transmitter/receiver assembly would be arranged above the front, passenger side door and another transmitter/receiver assembly would be arranged in the center headliner, near the dome light, and aimed toward the front, passenger side door. Additional transducers can be mounted in similar places for monitoring both rear seat positions, another can be used for monitoring the trunk or any other interior volumes. As with the ultrasonic installations, most of the examples below are for automobile applications since these are generally the most complicated. Nevertheless, at least one of the inventions disclosed herein is not limited to automobile vehicles and similar but generally simpler designs apply to other vehicles such as shipping containers, railroad cars and truck trailers.

In a preferred embodiment, each transmitter/receiver assembly 49, 51 comprises an optical transducer, which may be a camera and an LED, that will frequently be used in conjunction with other optical transmitter/receiver assemblies such as shown at 50, 52 and 54, which act in a similar manner. In some cases, especially when a low cost system is used primarily to categorize the seat occupancy, a single or dual camera installation is used. In many cases, the source of illumination is not co-located with the camera. For example, in one preferred implementation, two cameras such as 49 and 51 are used with a single illumination source located at 49.

These optical transmitter/receiver assemblies frequently comprise an optical transmitter, which may be an infrared LED (or possibly a near infrared (NIR) LED), a laser with a diverging lens or a scanning laser assembly, and a receiver such as a CCD or CMOS array and particularly an active pixel CMOS camera or array or a HDRL or HDRC camera or array as discussed below. The transducer assemblies map the location of the occupant(s), objects and features thereof, in a two or three-dimensional image as now described.

Optical transducers using CCD arrays are now becoming price competitive and, as mentioned above, will soon be the technology of choice for interior vehicle monitoring. A single CCD array of 160 by 160 pixels, for example, coupled with the appropriate trained pattern recognition software, can be used to form an image of the head of an occupant and accurately locate the head, eyes, ears etc. for some of the purposes of at least one of the inventions disclosed herein.

The location or position of the occupant can be determined in various ways as noted and listed above and below as well. Generally, any type of occupant sensor can be used. Some particular occupant sensors which can be used in the systems and methods in accordance with the invention. Specifically, a camera or other device for obtaining images of a passenger compartment of the vehicle occupied by the occupant and analyzing the images can be mounted at the locations of the transmitter and/or receiver assemblies 49, 50, 51, and 54 in FIG. 8C. The camera or other device may be constructed to obtain three-dimensional images and/or focus the images on one or more optical arrays such as CCDs. Further, a mechanism for moving a beam of radiation through a passenger compartment of the vehicle occupied by the occupant, i.e., a scanning system, can be used. When using ultrasonic or electromagnetic waves, the time of flight between the transmission and reception of the waves can be used to determine the position of the occupant. The occupant sensor can also be arranged to receive infrared radiation from a space in a passenger compartment of the vehicle occupied by the occupant. It can also comprise an electric field sensor operative in a seat occupied by the occupant or a capacitance sensor operative in a seat occupied by the occupant. The implementation of such sensors in the invention will be readily appreciated by one skilled in the art in view of the disclosure herein of general occupant sensors for sensing the position of the occupant using waves, energy or radiation.

Looking now at FIG. 22, a schematic illustration of a system for controlling operation of a vehicle based on recognition of an authorized individual in accordance with the invention is shown. One or more images of the passenger compartment 105 are received at 106 and data derived therefrom at 107. Multiple image receivers may be provided at different locations. The data derivation may entail any one or more of numerous types of image processing techniques such as those described in U.S. Pat. No. 6,397,136 including those designed to improve the clarity of the image. A pattern recognition algorithm, e.g., a neural network, is trained in a training phase 108 to recognize authorized individuals. The training phase can be conducted upon purchase of the vehicle by the dealer or by the owner after performing certain procedures provided to the owner, e.g., entry of a security code or key. In the case of the operator of a truck or when such an operator takes possession of a trailer or cargo container, the identity of the operator can be sent by telematics to a central station for recording and perhaps further processing, In the training phase for a theft prevention system, the authorized driver(s) would sit themselves in the driver or passenger seat and optical images would be taken and processed to obtain the pattern recognition algorithm. A processor 109 is embodied with the pattern recognition algorithm thus trained to identify whether a person is the authorized individual by analysis of subsequently obtained data derived from optical images. The pattern recognition algorithm in processor 109 outputs an indication of whether the person in the image is an authorized individual for which the system is trained to identify. A security system 10 enables operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

Optionally, an optical transmitting unit 111 is provided to transmit electromagnetic energy into the passenger compartment, or other volume in the case of other vehicles, such that electromagnetic energy transmitted by the optical transmitting unit is reflected by the person and received by the optical image reception device 106.

As noted above, several different types of optical reception devices can be used including a CCD array, a CMOS array, focal plane array (FPA), Quantum Well Infrared Photodetector (QWIP), any type of two-dimensional image receiver, any type of three-dimensional image receiver, an active pixel camera and an HDRC camera.

The processor 109 can be trained to determine the position of the individuals included in the images obtained by the optical image reception device, as well as the distance between the optical image reception devices and the individuals.

Instead of a security system, another component in the vehicle can be affected or controlled based on the recognition of a particular individual. For example, the rear view mirror, seat, seat belt anchorage point, headrest, pedals, steering wheel, entertainment system, ride quality, air-conditioning/ventilation system can be adjusted.

FIG. 24 shows the components of the manner in which an environment of the vehicle, designated 100, is monitored. The environment may either be an interior environment (car, trailer, truck, shipping container, railroad car), the entire passenger compartment or only a part thereof, or an exterior environment. An active pixel camera 101 obtains images of the environment and provides the images or a representation thereof, or data derived therefrom, to a processor 102. The processor 102 determines at least one characteristic of an object in the environment based on the images obtained by the active pixel camera 101, e.g., the presence of an object in the environment, the type of object in the environment, the position of an object in the environment, the motion of an object in the environment and the velocity of an object in the environment. The environment can be any vehicle environment. Several active pixel cameras can be provided, each focusing on a different area of the environment, although some overlap is desired. Instead of an active pixel camera or array, a single light-receiving pixel can be used in some cases.

Systems based on ultrasonics and neural networks have been very successful in analyzing the seated-state of both the passenger and driver seats of automobiles. Such systems are now going into production for preventing airbag deployment when a rear facing child seat or and out-of-position occupant is present. The ultrasonic systems, however, suffer from certain natural limitations that prevent system accuracy from getting better than about 99 percent. These limitations relate to the fact that the wavelength of ultrasound is typically between 3 mm and 8 mm. As a result, unexpected results occur which are due partially to the interference of reflections from different surfaces. Additionally, commercially available ultrasonic transducers are tuned devices that require several cycles before they transmit significant energy and similarly require several cycles before they effectively receive the reflected signals. This requirement has the effect of smearing the resolution of the ultrasound to the point that, for example, using a conventional 40 kHz transducer, the resolution of the system is approximately three inches.

In contrast, the wavelength of near infrared is less than one micron and no significant interferences occur. Similarly, the system is not tuned and therefore is theoretically sensitive to a very few cycles. As a result, resolution of the optical system is determined by the pixel spacing in the CCD or CMOS arrays. For this application, typical arrays have been chosen to be 100 pixels by 100 pixels and therefore the space being imaged can be broken up into pieces that are significantly less than 1 cm in size. If greater resolution is required arrays having larger numbers of pixels are readily available. Another advantage of optical systems is that special lenses can be used to magnify those areas where the information is most critical and operate at reduced resolution where this is not the case. For example, the area closest to the at-risk zone in front of the airbag can be magnified.

To summarize, although ultrasonic neural network systems are operating with high accuracy, they do not totally eliminate the problem of deaths and injuries caused by airbag deployments. Optical systems, on the other hand, at little or no increase in cost, have the capability of virtually 100 percent accuracy. Additional problems of ultrasonic systems arise from the slow speed of sound and diffraction caused by variations is air density. The slow sound speed limits the rate at which data can be collected and thus eliminates the possibility of tracking the motion of an occupant during a high speed crash.

In an embodiment wherein electromagnetic energy is used, it is to be appreciated that any portion of the electromagnetic signals that impinges upon a body portion of the occupant is at least partially absorbed by the body portion. Sometimes, this is due to the fact that the human body is composed primarily of water, and that electromagnetic energy at certain frequencies can be readily absorbed by water. The amount of electromagnetic signal absorption is related to the frequency of the signal, and size or bulk of the body portion that the signal impinges upon. For example, a torso of a human body tends to absorb a greater percentage of electromagnetic energy as compared to a hand of a human body for some frequencies.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, etc., so that different signals will be received relating to the degree or extent of absorption by the occupying item on a seat or elsewhere in the vehicle. The receiver will produce a signal representative of the returned waves or energy signals which will thus constitute an absorption signal as it corresponds to the absorption of electromagnetic energy by the occupying item in the seat.

Another optical infrared transmitter and receiver assembly is shown generally at 52 in FIG. 5 and is mounted onto the instrument panel facing the windshield. Although not shown in this view, reference 52 consists of three devices, one transmitter and two receivers, one on each side of the transmitter. In this case, the windshield is used to reflect the illumination light, and also the light reflected back by the driver, in a manner similar to the "heads-up" display which is now being offered on several automobile models. The "heads-up" display, of course, is currently used only to display information to the driver and is not used to reflect light from the driver to a receiver. In this case, the distance to the driver is determined stereoscopically through the use of the two receivers. In its most elementary sense, this system can be used to measure the distance between the driver and the airbag module. In more sophisticated applications, the position of the driver, and particularly of the driver's head, can be monitored over time and any behavior, such as a drooping head, indicative of the driver falling asleep or of being incapacitated by drugs, alcohol or illness can be detected and appropriate action taken. Other forms of radiation including visual light, radar, terahertz and microwaves as well as high frequency ultrasound could also be used by those skilled in the art.

A passive infrared system could be used to determine the position of an occupant relative to an airbag or even to detect the presence of a human or other life form in a vehicle. Passive infrared measures the infrared radiation emitted by the occupant and compares it to the background. As such, unless it is coupled with an imager and a pattern recognition system, it can best be used to determine that an occupant is moving toward the airbag since the amount of infrared radiation would then be increasing. Therefore, it could be used to estimate the velocity of the occupant but not his/her position relative to the airbag, since the absolute amount of such radiation will depend on the occupant's size, temperature and clothes as well as on his position. When passive infrared is used in conjunction with another distance measuring system, such as the ultrasonic system described above, the combination would be capable of determining both the position and velocity of the occupant relative to the airbag. Such a combination would be economical since only the simplest circuits would be required. In one implementation, for example, a group of waves from an ultrasonic transmitter could be sent to an occupant and the reflected group received by a receiver. The distance to the occupant would be proportional to the time between the transmitted and received groups of waves and the velocity determined from the passive infrared system. This system could be used in any of the locations illustrated in FIG. 5 as well as others not illustrated including truck trailers and cargo containers.

Recent advances in Quantum Well Infrared Photodetectors (QWIP) are particularly applicable here due to the range of frequencies that they can be designed to sense (3-18 microns) which encompasses the radiation naturally emitted by the human body. Currently, QWIPs need to be cooled and thus are not quite ready for vehicle applications. There are, however, longer wave IR detectors based of focal plane arrays (FPA) that are available in low resolution now. As the advantages of SWIR, MWIR and LWIR become more evident, devices that image in this part of the electromagnetic spectrum will become more available.

Passive infrared could also be used effectively in conjunction with a pattern recognition system. In this case, the passive infrared radiation emitted from an occupant can be focused onto a QWIP or FPA or even a CCD array, in some cases, and analyzed with appropriate pattern recognition circuitry, or software, to determine the position of the occupant.

Such a system could be mounted at any of the preferred mounting locations shown in FIG. 5 as well as others not illustrated.

Lastly, it is possible to use a modulated scanning beam of radiation and a single pixel receiver, PIN or avalanche diode, in the inventions described above. Any form of energy or radiation used above may also be in the infrared or radar spectrums and may be polarized and filters may be used in the receiver to block out sunlight etc. These filters may be notch filters and may be made integral with the lens as one or more coatings on the lens surface as is well known in the art. Note, in many applications, this may not be necessary as window glass blocks all IR except the near IR.

For some cases, such as a laser transceiver that may contain a CMOS array, CCD, PIN or avalanche diode or other light sensitive devices, a scanner is also required that can be either solid state as in the case of some radar systems based on a phased array, an acoustical optical system as is used by some laser systems, or a mirror or MEMS based reflecting scanner, or other appropriate technology.

Figure 25:
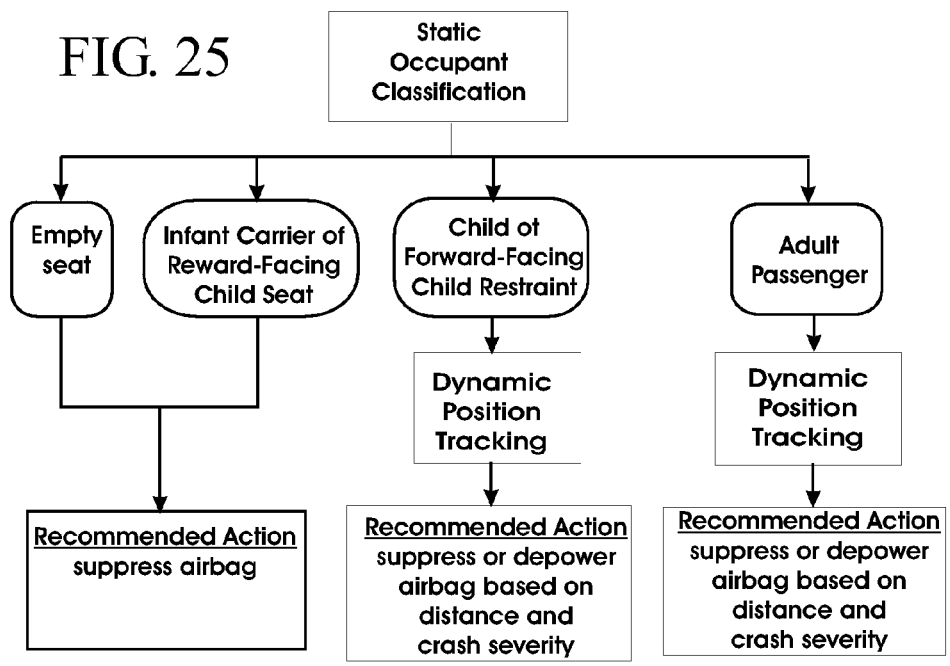
FIG. 25 is a diagram showing an example of an occupant sensing strategy for a single camera optical system.

An optical classification system using a single or dual camera design will now be discussed, although more than two cameras can also be used in the system described below. The occupant sensing system should perform occupant classification as well as position tracking since both are critical information for making decision of airbag deployment in an auto accident. For other purposes such as container or truck trailer monitoring generally only classification is required. FIG. 25 shows a preferred occupant sensing strategy. Occupant classification may be done statically since the type of occupant does not change frequently. Position tracking, however, has to be done dynamically so that the occupant can be tracked reliably during pre-crash braking situations. Position tracking should provide continuous position information so that the speed and the acceleration of the occupant can be estimated and a prediction can be made even before the next actual measurement takes place.

Figure 26:
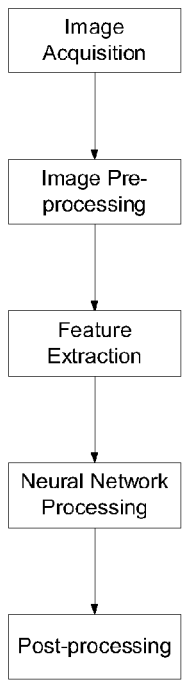
FIG. 26 is a processing block diagram of the example of FIG. 25.

The current assignee has demonstrated that occupant classification and dynamic position tracking can be done with a stand-alone optical system that uses a single camera. The same image information is processed in a similar fashion for both classification and dynamic position tracking. As shown in FIG. 26, the whole process can involve five steps: image acquisition, image preprocessing, feature extraction, neural network processing, and post-processing. These steps will now be discussed.

Step-1 image acquisition is to obtain the image from the imaging hardware. The imaging hardware main components may include one or more of the following image acquisition devices, a digital CMOS camera, a high-power near-infrared LED, and the LED control circuit. A plurality of such image acquisition devices can be used. This step also includes image brightness detection and LED control for illumination. Note that the image brightness detection and LED control do not have to be performed for every frame. For example, during a specific interval, the ECU can turn the LED ON and OFF and compare the resulting images. If the image with LED ON is significantly brighter, then it is identified as nighttime condition and the LED will remain ON; otherwise, it is identified as daytime condition and the LED can remain OFF.

Step-2 image preprocessing performs such activities as removing random noise and enhancing contrast. Under daylight condition, the image contains unwanted contents because the background is illuminated by sunlight. For example, the movement of the driver, other passengers in the backseat, and the scenes outside the passenger window can interfere if they are visible in the image. Usually, these unwanted contents cannot be completely eliminated by adjusting the camera position, but they can be removed by image preprocessing. This process is much less complicated for some vehicle monitoring cases such as trailer and cargo containers where sunlight is rarely a problem.

Step-3 feature extraction compresses the data from, for example, the 76,800 image pixels in the prototype camera to only a few hundred floating-point numbers, which may be based of edge detection algorithms, while retaining most of the important information. In this step, the amount of the data is significantly reduced so that it becomes possible to process the data using neural networks in Step-4.

There are many methods to extract information from an image for the purposes herein. One preferred method is to extract information as to the location of the edges of an object and then to input this information into a pattern recognition algorithm. As will be discussed below, the location and use of the edges of an occupying item as features in an imager is an important contribution of the inventions disclosed herein for occupant or other object sensing and tracking in a vehicle.

Step-4, to increase the system learning capability and performance stability, modular or combination neural networks can be used with each module handling a different subtask (for example, to handle either daytime or nighttime condition, or to classify a specific occupant group).

Step-5 post-processing removes random noise in the neural network outputs via filtering. Besides filtering, additional knowledge can be used to remove some of the undesired changes in the neural network output. For example, it is impossible to change from an adult passenger to a child restraint without going through an empty-seat state or key-off. After post-processing, the final decision of classification is output to the airbag control module, or other system, and it is up to the automakers or vehicle owners or managers to decide how to utilize the information. A set of display LED's on the instrument panel provides the same information to the vehicle occupant(s).

If multiple images are acquired substantially simultaneously, each by a different image acquisition device, then each image can be processed in the manner above. A comparison of the classification of the occupant obtained from the processing of the image obtained by each image acquisition device can be performed to ascertain any variations. If there are no variations, then the classification of the occupant is likely to be very accurate. However, in the presence of variations, then the images can be discarded and new images acquired until variations are eliminated.

A majority approach might also be used. For example, if three or more images are acquired by three different cameras, or other imagers, then if two provide the same classification, this classification will be considered the correct classification. Alternately, all of the data from all of the images can be analyzed and together in one combined neural network or combination neural network.

Referring again to FIG. 25, after the occupant is classified from the acquired image or images, i.e., as an empty seat (classification 1), an infant carrier or an occupied rearward-facing child seat (classification 2), a child or occupied forward-facing child seat (classification 3) or an adult passenger (classification 4), additional classification may be performed for the purpose of determining a recommendation for control of a vehicular component such as an occupant restraint device.

For classifications 1 and 2, the recommendation is always to suppress deployment of the occupant restraint device. For classifications 3 and 4, dynamic position tracking is performed. This involves the training of neural networks or other pattern recognition techniques, one for each classification, so that once the occupant is classified, the particular neural network can be trained to analyze the dynamic position of that occupant will be used. That is, the data from acquired images will be input to the neural network to determine a recommendation for control of the occupant restraint device and also into the neural network for dynamic position tracking of an adult passenger when the occupant is classified as an adult passenger. The recommendation may be either a suppression of deployment, a depowered deployment or a full power deployment.

To additionally summarize, the system described can be a single or multiple camera or other imager system where the cameras are typically mounted on the roof or headliner of the vehicle either on the roof rails or center or other appropriate location. The source of illumination is typically one or more infrared LEDs and if infrared, the images are typically monochromic, although color can effectively be used when natural illumination is available. Images can be obtained at least as fast as 100 frames per second; however, slower rates are frequently adequate. A pattern recognition algorithmic system can be used to classify the occupancy of a seat into a variety of classes such as: (1) an empty seat; (2) an infant seat which can be further classified as rear or forward facing; (3) a child which can be further classified as in or out-of-position and (4) an adult which can also be further classified as in or out-of-position. Such a system can be used to suppress the deployment of an occupant restraint. If the occupant is further tracked so that his or her position relative to the airbag, for example, is known more accurately, then the airbag deployment can be tailored to the position of the occupant. Such tracking can be accomplished since the location of the head of the occupant is either known from the analysis or can be inferred due to the position of other body parts.

As will be discussed below, data and images from the occupant sensing system, which can include an assessment of the type and magnitude of injuries, along with location information if available, can be sent to an appropriate off-vehicle location such as an emergency medical system (EMS) receiver either directly by cell phone, for example, via a telematics system such as OnStar®, or over the internet if available in order to aid the service in providing medical assistance and to access the urgency of the situation. The system can additionally be used to identify that there are occupants in the vehicle that has been parked, for example, and to start the vehicle engine and heater if the temperature drops below a safe threshold or to open a window or operate the air conditioning in the event that the temperature raises to a temperature above a safe threshold. In both cases, a message can be sent to the EMS or other services by any appropriate method such as those listed above. A message can also be sent to the owner's beeper or PDA.

The system can also be used alone or to augment the vehicle security system to alert the owner or other person or remote site that the vehicle security has been breeched so as to prevent danger to a returning owner or to prevent a theft or other criminal act. As discussed elsewhere herein, one method of alerting the owner or another interested person is through a satellite communication with a service such a as Skybitz or equivalent. The advantage here is that the power required to operate the system can be supplied by a long life battery and thus the system can be independent of the vehicle power system.

As discussed above and below, other occupant sensing systems can also be provided that monitor the breathing or other motion of the driver, for example, including the driver's heartbeat, eye blink rate, gestures, direction or gaze and provide appropriate responses including the control of a vehicle component including any such components listed herein. If the driver is falling asleep, for example, a warning can be issued and eventually the vehicle directed off the road if necessary.

The combination of a camera system with a microphone and speaker allows for a wide variety of options for the control of vehicle components. A sophisticated algorithm can interpret a gesture, for example, that may be in response to a question from the computer system. The driver may indicate by a gesture that he or she wants the temperature to change and the system can then interpret a "thumbs up" gesture for higher temperature and a "thumbs down" gesture for a lower temperature. When it is correct, the driver can signal by gesture that it is fine. A very large number of component control options exist that can be entirely executed by the combination of voice, speakers and a camera that can see gestures. When the system does not understand, it can ask to have the gesture repeated, for example, or it can ask for a confirmation. Note, the presence of an occupant in a seat can even be confirmed by a word spoken by the occupant, for example, which can use a technology known as voice print if it is desired to identify the particular occupant.

It is also to be noted that the system can be trained to recognize essentially any object or object location that a human can recognize and even some that a human cannot recognize since the system can have the benefit of special illumination as discussed above. If desired, a particular situation such as the presence of a passenger's feet on the instrument panel, hand on a window frame, head against the side window, or even lying down with his or her head in the lap of the driver, for example, can be recognized and appropriate adjustments to a component performed.

Note, it has been assumed that the camera would be permanently mounted in the vehicle in the above discussion. This need not be the case and especially for some after-market products, the camera function can be supplied by a cell phone or other device and a holder appropriately (and removably) mounted in the vehicle.

Again the discussion above related primarily to sensing the interior of and automotive vehicle for the purposes of controlling a vehicle component such as a restraint system. When the vehicle is a shipping container then different classifications can be used depending on the objective. If it is to determine whether there is a life form moving within the container, a stowaway, for example, then that can be one classification. Another may be the size of a cargo box or whether it is moving. Still another may be whether there is an unauthorized entry in progress or that the door has been opened. Others include the presence of a particular chemical vapor, radiation, excessive temperature, excessive humidity, excessive shock, excessive vibration etc.

1.3 Ultrasonics and Optics

In some cases, a combination of an optical system such as a camera and an ultrasonic system can be used. In this case, the optical system can be used to acquire an image providing information as to the vertical and lateral dimensions of the scene and the ultrasound can be used to provide longitudinal information, for example.

A more accurate acoustic system for determining the distance to a particular object, or a part thereof, in the passenger compartment is exemplified by transducers 24 in FIG. 8E. In this case, three ultrasonic transmitter/receivers 24 are shown spaced apart mounted onto the A-pillar of the vehicle. Due to the wavelength, it is difficult to get a narrow beam using ultrasonics without either using high frequencies that have limited range or a large transducer. A commonly available 40 kHz transducer, for example, is about 1 cm. in diameter and emits a sonic wave that spreads at about a sixty-degree angle. To reduce this angle requires making the transducer larger in diameter. An alternate solution is to use several transducers and to phase the transmissions from the transducers so that they arrive at the intended part of the target in phase. Reflections from the selected part of the target are then reinforced whereas reflections from adjacent parts encounter interference with the result that the distance to the brightest portion within the vicinity of interest can be determined. A low-Q transducer may be necessary for this application.

By varying the phase of transmission from the three transducers 24, the location of a reflection source on a curved line can be determined. In order to locate the reflection source in space, at least one additional transmitter/receiver is required which is not co-linear with the others. The waves shown in FIG. 8E coming from the three transducers 24 are actually only the portions of the waves which arrive at the desired point in space together in phase. The effective direction of these wave streams can be varied by changing the transmission phase between the three transmitters 24.

A determination of the approximate location of a point of interest on the occupant can be accomplished by a CCD or CMOS array and appropriate analysis and the phasing of the ultrasonic transmitters is determined so that the distance to the desired point can be determined.

Although the combination of ultrasonics and optics has been described, it will now be obvious to others skilled in the art that other sensor types can be combined with either optical or ultrasonic transducers including weight sensors of all types as discussed below, as well as electric field, chemical, temperature, humidity, radiation, vibration, acceleration, velocity, position, proximity, capacitance, angular rate, heartbeat, radar, other electromagnetic, and other sensors.

1.3 SAW and Other Wireless Sensors in General 1.3.1 Antenna Considerations

Antennas are a very important aspect to SAW and RFID wireless devices such as can be used in tire monitors, seat monitors, weight sensors, child seat monitors, fluid level sensors and similar devices or sensors which monitor, detect, measure, determine or derive physical properties or characteristics of a component in or on the vehicle or of an area of the vehicle, as disclosed in the current assignee's granted patents and pending patent applications. In many cases, the location of a SAW or RFID device needs to be determined such as when such a device is used to locate the position of a movable item in or on a vehicle such as a seat. In other cases, the particular device from a plurality of similar devices, such as a tire pressure and/or temperature monitor that is reporting, needs to be identified. Thus, a combination of antennas can be used and the time or arrival, angle of arrival or similar method used to identify the reporting device.

Additionally, since the signal level from a SAW or RFID device is frequently low, various techniques can be used to improve the signal to noise ratio as described below. Finally, at the frequencies frequently used such as 433 MHz, the antennas can become large and methods are needed to reduce their size. These and other antenna considerations that can be used to improve the operation of SAW, RFID and similar wireless devices are described in the '881 application, e.g., with reference to FIGS. 189A-190.

1.4 Other Transducers

In FIG. 4, the ultrasonic transducers of the previous designs can be replaced by laser or other electromagnetic wave transducers or transceivers 8 and 9, which are connected to a microprocessor 20. As discussed above, these are only illustrative mounting locations and any of the locations described herein are suitable for particular technologies. Also, such electromagnetic transceivers are meant to include the entire electromagnetic spectrum including from X-rays to low frequencies where sensors such as capacitive or electric field sensors including so called "displacement current sensors" as discussed elsewhere herein, and the auto-tune antenna sensor also discussed herein operate.

Figure 27:
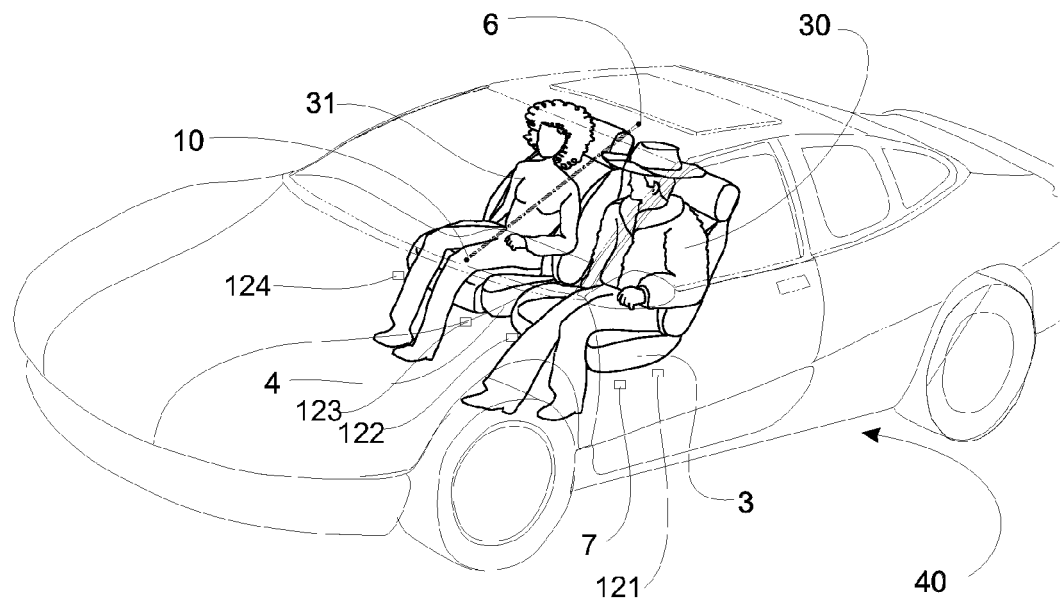
FIG. 27 is a perspective view of a vehicle containing two adult occupants on the front seat with the vehicle shown in phantom illustrating one preferred location of the transducers placed according to the methods taught in at least one of the inventions disclosed herein.

A block diagram of an antenna-based near field object detector is illustrated in FIG. 27 of the '881 application.

Note that the auto-tuned antenna sensor is preferably placed in the vehicle seat, headrest, floor, dashboard, headliner, or airbag module cover for an automotive vehicle. Seat mounted examples are shown at 12, 13, 14 and 15 in FIG. 4 and a floor mounted example at 11. In most other manners, the system operates the same. The geometry of the antenna system would differ depending on the vehicle to which it is applied and the intended purpose. Such a system, for example, can be designed to detect the entry of a person into a container or trailer through the door.

1.5 Circuits

There are several preferred methods of implementing the vehicle interior monitoring systems of at least one of the inventions disclosed herein including a microprocessor, an application specific integrated circuit system (ASIC), a system on a chip and/or an FPGA or DSP. These systems are represented schematically as 20 herein. In some systems, both a microprocessor and an ASIC are used. In other systems, most if not all of the circuitry is combined onto a single chip (system on a chip). The particular implementation depends on the quantity to be made and economic considerations. It also depends on time-to-market considerations where FPGA is frequently the technology of choice.

The design of the electronic circuits for a laser system is described in U.S. Pat. No. 5,653,462 and in particular FIG. 8 thereof and the corresponding description.

2. Adaptation

The process of adapting a system of occupant or object sensing transducers to a vehicle is described in U.S. patent application Ser. No. 10/940,881 and is incorporated by reference herein.

Figure 6A:
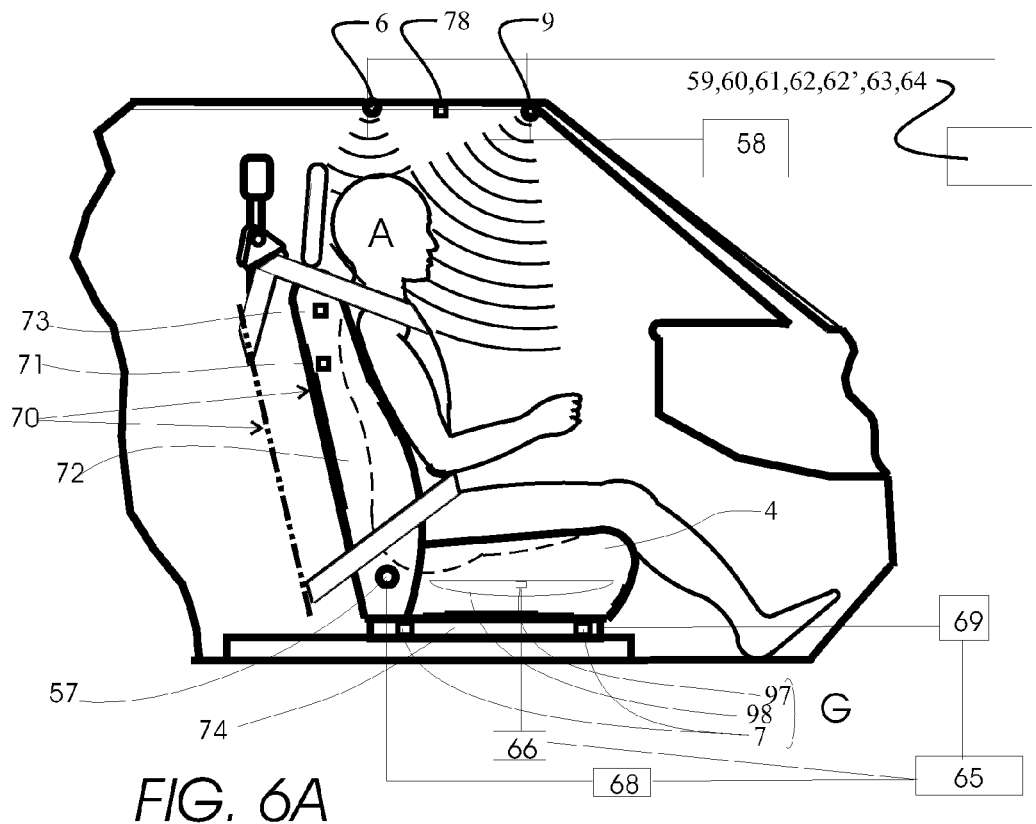
FIG. 6A is an illustration as in FIG. 6 with the replacement of a strain gage weight sensor within a cavity within the seat cushion for the bladder weight sensor of FIG. 6.

Referring again to FIG. 6, and to FIG. 6A which differs from FIG. 6 only in the use of a strain gage weight sensor mounted within the seat cushion, motion sensor 73 can be a discrete sensor that detects relative motion in the passenger compartment of the vehicle. Such sensors are frequently based on ultrasonics and can measure a change in the ultrasonic pattern that occurs over a short time period. Alternately, the subtracting of one position vector from a previous position vector to achieve a differential position vector can detect motion. For the purposes herein, a motion sensor will be used to mean either a particular device that is designed to detect motion for the creation of a special vector based on vector differences or a neural network trained to determine motion based on successive vectors.

An ultrasonic, optical or other sensor or transducer system 9 can be mounted on the upper portion of the front pillar, i.e., the A-Pillar, of the vehicle and a similar sensor system 6 can be mounted on the upper portion of the intermediate pillar, i.e., the B-Pillar. Each sensor system 6, 9 may comprise a transducer. The outputs of the sensor systems 6 and 9 can be input to a band pass filter 60 through a multiplex circuit 59 which can be switched in synchronization with a timing signal from the ultrasonic sensor drive circuit 58, for example, and then can be amplified by an amplifier 61. The band pass filter 60 removes a low frequency wave component from the output signal and also removes some of the noise. The envelope wave signal can be input to an analog/digital converter (ADC) 62 and digitized as measured data. The measured data can be input to a processing circuit 63, which can be controlled by the timing signal which can be in turn output from the sensor drive circuit 58. The above description applies primarily to systems based on ultrasonics and will differ somewhat for optical, electric field and other systems and for different vehicle types.

Each of the measured data can be input to a normalization circuit 64 and normalized. The normalized measured data can be input to the combination neural network (circuit) 65, for example, as wave data.

The output of the pressure or weight sensor(s) 7, 76 or 97 (see FIG. 6A) can be amplified by an amplifier 66 coupled to the pressure or weight sensor(s) 7, 76 and 97 and the amplified output can be input to an analog/digital converter and then directed to the neural network 65, for example, of the processor means. Amplifier 66 can be useful in some embodiments but it may be dispensed with by constructing the sensors 7, 76, 97 to provide a sufficiently strong output signal, and even possibly a digital signal. One manner to do this would be to construct the sensor systems with appropriate electronics.

The neural network 65 can be directly connected to the ADCs 68 and 69, the ADC associated with amplifier 66 and the normalization circuit 64. As such, information from each of the sensors in the system (a stream of data) can be passed directly to the neural network 65 for processing thereby. The streams of data from the sensors are usually not combined prior to the neural network 65 and the neural network 65 can be designed to accept the separate streams of data (e.g., at least a part of the data at each input node) and process them to provide an output indicative of the current occupancy state of the seat or of the vehicle. The neural network 65 thus includes or incorporates a plurality of algorithms derived by training in the manners discussed herein. Once the current occupancy state of the seat or vehicle is determined, it is possible to control vehicular components or systems, such as the airbag system or telematics system, in consideration of the current occupancy state of the seat or vehicle.

What follows now is a discussion of the methodology of adapting a monitoring system to an automotive vehicle for the purpose primarily of controlling a component such as a restraint system. This is one of the most complicated implementations of vehicle monitoring systems and serves as a good illustration of the methodology. Generally simpler systems are used for cargo container, truck trailer and other vehicle monitoring cases.

A section of the passenger compartment of an automobile is shown generally as 40 in FIG. 27. A driver 30 of a vehicle sits on a seat 3 behind a steering wheel, not shown, and an adult passenger 31 sits on seat 4 on the passenger side. Two transmitter and/or receiver assemblies 6 and 10, also referred to herein as transducers, are positioned in the passenger compartment 40, one transducer 6 is arranged on the headliner adjacent or in proximity to the dome light and the other transducer 10 is arranged on the center of the top of the dashboard or instrument panel of the vehicle. The methodology leading to the placement of these transducers is important to at least one of the inventions disclosed herein as explained below. In this situation, the system developed in accordance with at least one of the inventions disclosed herein will reliably detect that an occupant is sitting on seat 3, 4 and deployment of the airbag is enabled in the event that the vehicle experiences a crash. Transducers 6, 10 are placed with their separation axis parallel to the separation axis of the head, shoulder and rear facing child seat volumes of occupants of an automotive passenger seat and in view of this specific positioning, are capable of distinguishing the different configurations. In addition to the transducers 6, 10, pressure-measuring or weight-measuring sensors 7, 121, 122, 123 and 124 are also present. These pressure or weight sensors may be of a variety of technologies including, as illustrated here, strain-measuring transducers attached to the vehicle seat support structure as described in U.S. Pat. No. 6,081,757. Other pressure or weight systems can be utilized including systems that measure the deflection of, or pressure on, the seat cushion. The pressure or weight sensors described here are meant to be illustrative of the general class of pressure or weight sensors and not an exhaustive list of methods of measuring occupant weight or pressure applied by the occupant to the seat.

Figure 21:
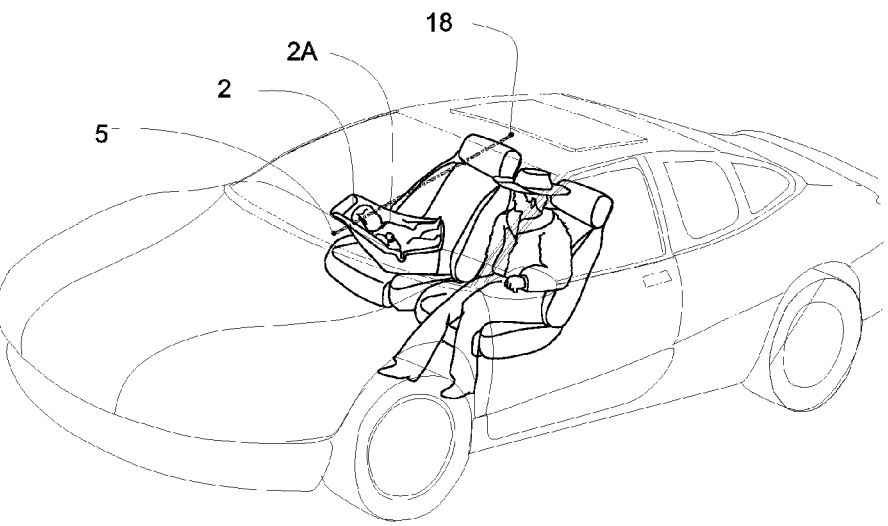
FIG. 21 is a perspective view of a vehicle containing an adult occupant and an occupied infant seat on the front seat with the vehicle shown in phantom illustrating one preferred location of the transducers placed according to the methods taught in at least one of the inventions disclosed herein.
Figure 28:
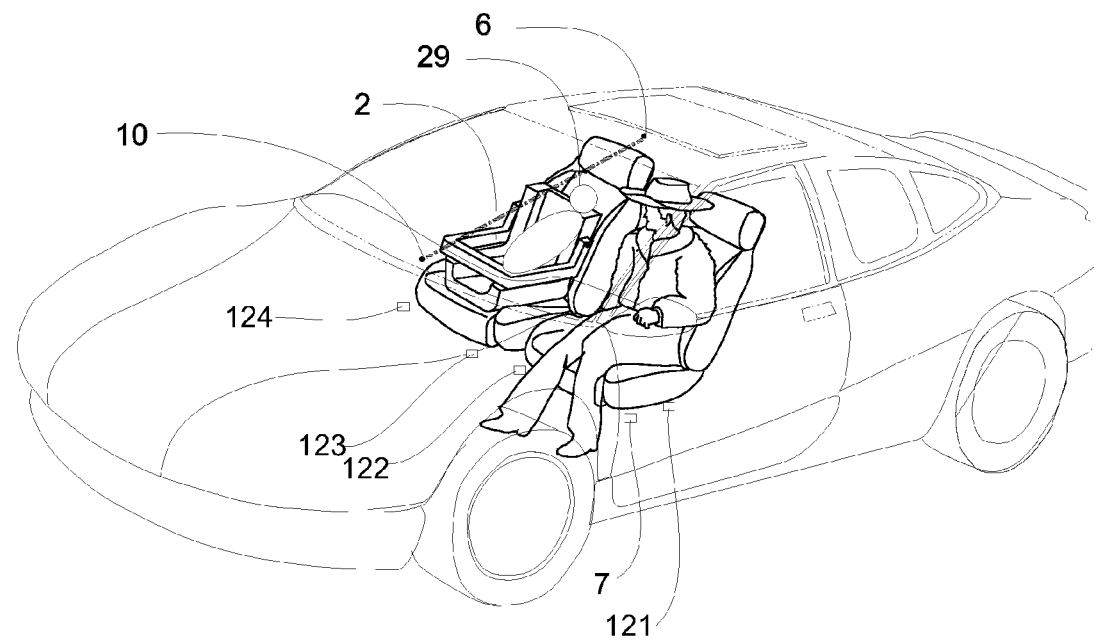
FIG. 28 is a view as in FIG. 27 with the passenger occupant replaced by a child in a forward facing child seat.
Figure 29:
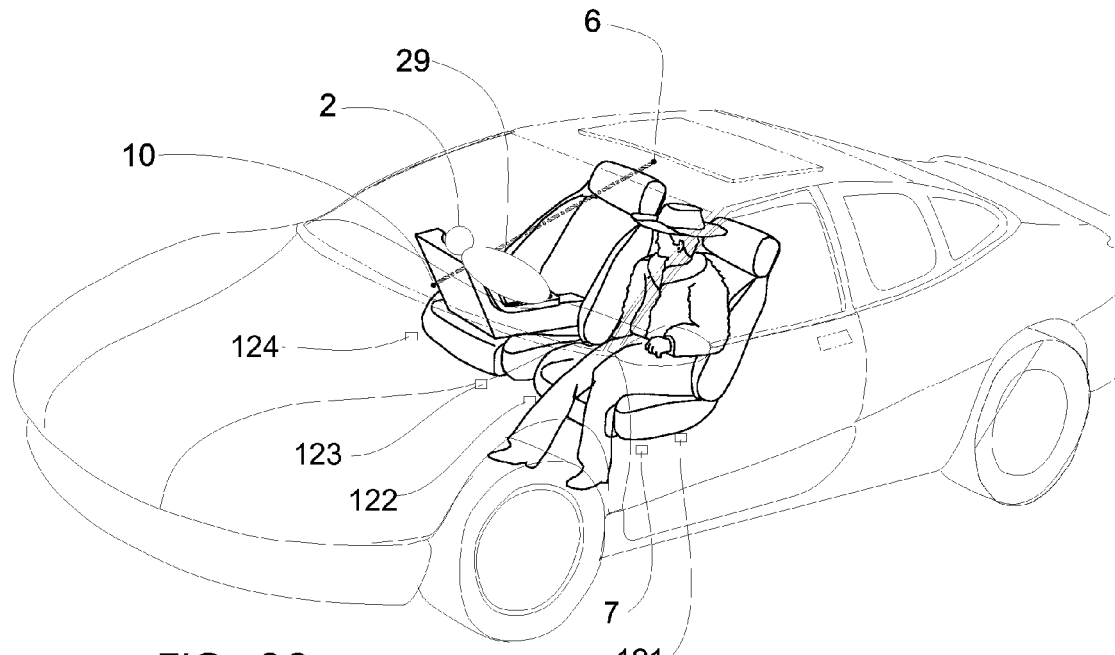
FIG. 29 is a view as in FIG. 27 with the passenger occupant replaced by a child in a rearward facing child seat.

In FIG. 28, a child seat 2 in the forward facing direction containing a child 29 replaces the adult passenger 31 as shown in FIG. 27. In this case, it is usually required that the airbag not be disabled, or enabled in the depowered mode, in the event of an accident. However, in the event that the same child seat 2 is placed in the rearward facing position as shown in FIG. 29, then the airbag is usually required to be disabled since deployment of the airbag in a crash can seriously injure or even kill the child 29. Furthermore, as illustrated in FIG. 21, if an infant 29 in an infant carrier 2 is positioned in the rear facing position of the passenger seat, the airbag should be disabled for the reasons discussed above. Instead of disabling deployment of the airbag, the deployment could be controlled to provide protection for the infant 29, e.g., to reduce the force of the deployment of the airbag. It should be noted that the disabling or enabling of the passenger airbag relative to the item on the passenger seat may be tailored to the specific application. For example, in some embodiments, with certain forward facing child seats, it may in fact be desirable to disable the airbag and in other cases, to deploy a depowered airbag.

The selection of when to disable, depower or enable the airbag, as a function of the item in the passenger seat and its location, is made during the programming or training stage of the sensor system and, in most cases, the criteria set forth above will be applicable, i.e., enabling airbag deployment for a forward facing child seat and an adult in a proper seating position and disabling airbag deployment for a rearward facing child seat and infant and for any occupant who is out-of-position and in close proximity to the airbag module. The sensor system developed in accordance with the invention may however be programmed according to other criteria.

Several systems using other technologies have been devised to discriminate between the four cases illustrated above but none have shown a satisfactory accuracy or reliability of discrimination. Some of these systems appear to work as long as the child seat is properly placed on the seat and belted in. So called "tag systems", for example, whereby a device is placed on the child seat which is electromagnetically sensed by sensors placed within the seat can fail but can add information to the overall system. One system has a resonator is built into the child seat and a low power signal from the car prompts a return signal from the resonator sensing the presence of the seat and automatically turning off the passenger's front airbag. One version of this technology uses a Radio Frequency Identification (RFID) tag. Another sensor uses a normally closed magnetic proximity switch to detect the presence of a child seat. A metal plate installed on the child seat is detected and the sensor deactivates the airbag. These sensors work by detecting the presence of a child (or infant) seat and deactivating the airbag on the front passenger's side. When used alone, they function well as long as the child seat is restrained by a seatbelt, but when this is not the case, they have a high failure rate. Since the seatbelt usage of the population of the United States is now somewhat above 70%, it is quite likely that a significant percentage of child seats will not be properly belted onto the seat and thus children will be subjected to injury and death in the event of an accident.

One novel tag system that has applicability if placed on all child seats uses an RFID tag or multiple such tags that are interrogated by a general purpose interrogator. One such tag system uses SAW (Surface Acoustic Wave) tags that can be interrogated by the same interrogator that is used to monitor tire pressure and temperature when such a system is present.

This methodology will now be described as it relates primarily to wave-type sensors such as those based on optics, ultrasonics or radar. A similar methodology applies to other transducer types, such as electric field sensors, and which will now be obvious to those skilled in the art after a review of the methodology described below.

Figure 30:
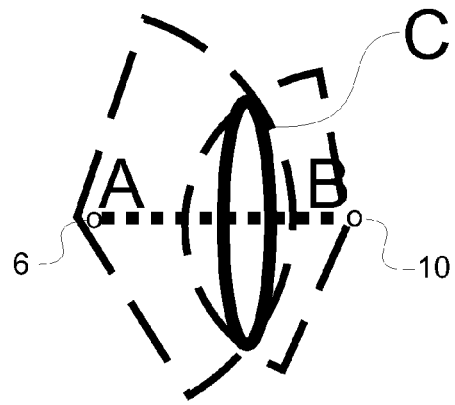
FIG. 30 is a diagram illustrating the interaction of two ultrasonic sensors and how this interaction is used to locate a circle is space.

To understand this methodology, consider two transmitters and receivers 6 and 10 (transducers) which are connected by an axis AB in FIG. 30. Each transmitter radiates a signal which is primarily confined to a cone angle, called the field angle, with its origin at the transmitter. For simplicity, assume that the transmitter and receiver are embodied in the same device, although in some cases a separate device will be used for each function. When a transducer sends out a burst of waves, for example, to thereby irradiate the passenger compartment with radiation, and then receives a reflection or modified radiation from some object in the passenger compartment, the distance of the object from the transducer can be determined by the time delay between the transmission of the waves and the reception of the reflected or modified waves, by the phase angle or by a correlation process.

When looking at a single transducer, it may not be possible to determine the direction to the object which is reflecting or modifying the signal but it may be possible to know how far that object is from the transducer. That is, a single transducer may enable a distance measurement but not a directional measurement. In other words, the object may be at a point on the surface of a three-dimensional spherical segment having its origin at the transducer and a radius equal to the distance. This will generally be the case for an ultrasonic transducer or other broad beam single pixel device. Consider two transducers, such as 6 and 10 in FIG. 30, and both transducers 6, 10 receive a reflection from the same object, which is facilitated by proper placement of the transducers, the timing of the reflections depends on the distance from the object to each respective transducer. If it is assumed for the purposes of this analysis that the two transducers act independently, that is, they only listen to the reflections of waves which they themselves transmitted (which may be achieved by transmitting waves at different frequencies or at different times or through a coding scheme—FDMA, TDMA, CDMA etc.), then each transducer enables the determination of the distance to the reflecting object but not its direction. Assuming the transducer radiates in all directions within the field cone angle, each transducer enables the determination that the object is located on a spherical surface A', B' a respective known distance from the transducer, that is, each transducer enables the determination that the object is a specific distance from that transducer which may or may not be the same distance between the other transducer and the same object. Since now there are two transducers, and the distance of the reflecting object has been determined relative to each of the transducers, the actual location of the object resides on a circle which is the intersection of the two spherical surfaces A', and B'. This circle is labeled C in FIG. 30. At each point along circle C, the distance to the transducer 6 is the same and the distance to the transducer 10 is the same. This, of course, is strictly true only for ideal one-dimensional objects.

For many cases, the mere knowledge that the object lies on a particular circle is sufficient since it is possible to locate the circle such that the only time that an object lies on a particular circle that its location is known. That is, the circle which passes through the area of interest otherwise passes through a volume where no objects can occur. Thus, the mere calculation of the circle in this specific location, which indicates the presence of the object along that circle, provides valuable information concerning the object in the passenger compartment which may be used to control or affect another system in the vehicle such as the airbag system. This of course is based on the assumption that the reflections to the two transducers are in fact from the same object. Care must be taken in locating the transducers such that other objects do not cause reflections that could confuse the system.

Figure 31:
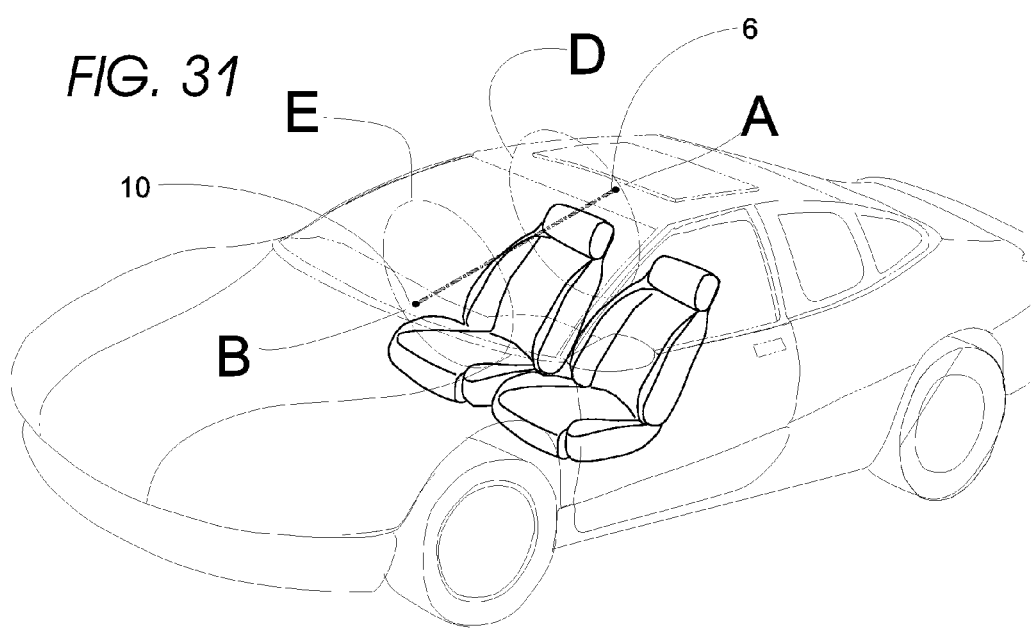
FIG. 31 is a view as in FIG. 27 with the occupants removed illustrating the location of two circles in space and how they intersect the volumes characteristic of a rear facing child seat and a larger occupant.

FIG. 31, for example, illustrates two circles D and E of interest which represent the volume which is usually occupied when the seat is occupied by a person not in a child seat or by a forward facing child seat and the volume normally occupied by a rear facing child seat, respectively. Thus, if the virtual circle generated by the system, (i.e., by appropriate processor means which receives the distance determination from each transducer and creates the circle from the intersection of the spherical surfaces which represent the distance from the transducers to the object) is at a location which is only occupied by an adult passenger, the airbag would not be disabled since its deployment in a crash is desired. On the other hand, if a virtual circle is at a location occupied only by a rear facing child seat, the airbag would be disabled.

The above discussion of course is simplistic in that it does not take into account the volume occupied by the object or the fact that reflections from more than one object surface will be involved. In reality, transducer B is likely to pick up the rear of the occupant's head and transducer A, the front. This makes the situation more difficult for an engineer looking at the data to analyze. It has been found that pattern recognition technologies are able to extract the information from these situations and through a proper application of these technologies, an algorithm can be developed, and when installed as part of the system for a particular vehicle, the system accurately and reliably differentiates between a forward facing and rear facing child seat, for example, or an in-position or out-of-position forward facing human being.

From the above discussion, a method of transducer location is disclosed which provides unique information to differentiate between (i) a forward facing child seat or a forward properly positioned occupant where airbag deployment is desired and (ii) a rearward facing child seat and an out-of-position occupant where airbag deployment is not desired. In actuality, the algorithm used to implement this theory does not directly calculate the surface of spheres or the circles of interaction of spheres. Instead, a pattern recognition system is used to differentiate airbag-deployment desired cases from those where the airbag should not be deployed. For the pattern recognition system to accurately perform its function, however, the patterns presented to the system must have the requisite information. That is, for example, a pattern of reflected waves from an occupying item in a passenger compartment to various transducers must be uniquely different for cases where airbag deployment is desired from cases where airbag deployment is not desired. The theory described herein teaches how to locate transducers within the vehicle passenger compartment so that the patterns of reflected waves, for example, will be easily distinguishable for cases where airbag deployment is desired from those where airbag deployment is not desired. In the case presented thus far, it has been shown that in some implementations, the use of only two transducers can result in the desired pattern differentiation when the vehicle geometry is such that two transducers can be placed such that the virtual circles D (airbag enabled) and E (airbag disabled) fall outside of the transducer field cones except where they are in the critical regions where positive identification of the condition occurs. Thus, the aiming and field angles of the transducers are important factors to determine in adapting a system to a particular vehicle, especially for ultrasonic and radar sensors, for example.

Figures 32, 33:
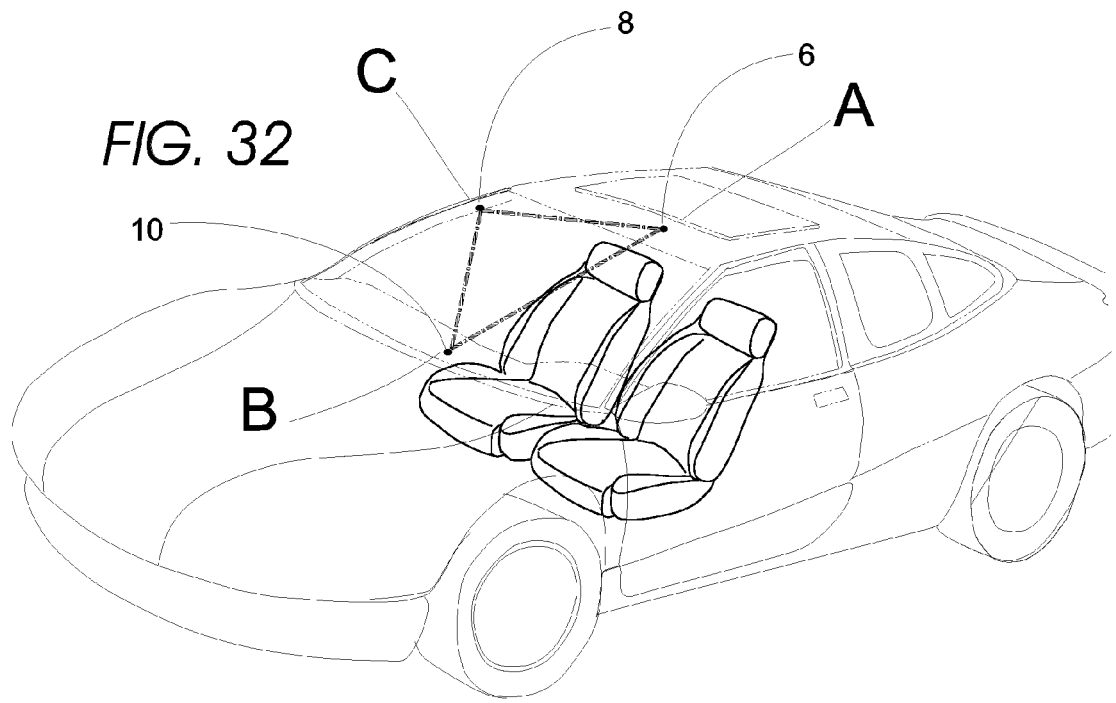
FIG. 32 illustrates a preferred mounting location of a three-transducer system.
FIG. 33 illustrates a preferred mounting location of a four-transducer system.

The use of only two transducers in a system for automobile occupant sensing for airbag suppression may not be acceptable since one or both of the transducers can be rendered inoperable by being blocked, for example, by a newspaper. Thus, it is usually desirable to add a third transducer 8 as shown in FIG. 32, which now provides a third set of spherical surfaces relative to the third transducer. Transducer 8 is positioned on the passenger side of the A-pillar (which is a preferred placement if the system is designed to operate on the passenger side of the vehicle). Three spherical surfaces now intersect in only two points and in fact, usually at one point if the aiming angles and field angles are properly chosen. Once again, this discussion is only strictly true for a point object. For a real object, the reflections will come from different surfaces of the object, which usually are at similar distances from the object. Thus, the addition of a third transducer substantially improves system reliability. Finally, with the addition of a fourth transducer 9 as shown in FIG. 33, even greater accuracy and reliability is attained. Transducer 9 can be positioned on the ceiling of the vehicle close to the passenger side door. In FIG. 33, lines connecting the transducers C and D and the transducers A and B are substantially parallel permitting an accurate determination of asymmetry and thereby object rotation. Thus, for example, if the infant seat is placed on an angle as shown in FIG. 29, this condition can be determined and taken into account when the decision is made to disable the deployment of the airbag.

The discussion above has partially centered on locating transducers and designing a system for determining whether the two target volumes, that adjacent the airbag and that adjacent the upper portion of the vehicle seat, are occupied. Other systems have been described in above-referenced patents using a sensor mounted on or adjacent the airbag module and a sensor mounted high in the vehicle to monitor the space near the vehicle seat. Such systems use the sensors as independent devices and do not use the combination of the two sensors to determine where the object is located. In fact, the location of such sensors is usually poorly chosen so that it is easy to blind either or both with a newspaper for those transducers using high frequency electromagnetic waves or ultrasonic waves, for example. Furthermore, no system is known to have been disclosed, except in patents and patent applications assigned to the current assignee, which uses more than two transducers especially such that one or more can be blocked without causing serious deterioration of the system. Again, the examples here have been for the purpose of suppressing the deployment of the airbag when it is necessary to prevent injury. The sensor system disclosed can be used for many other purposes such as disclosed in the above-mentioned patents and patent applications assigned to the current assignee. The ability to use the sensors for these other applications, such as for truck trailers and cargo containers or for controlling other systems within a vehicle is generally lacking in the systems disclosed in the other referenced patents.

Figure 34:
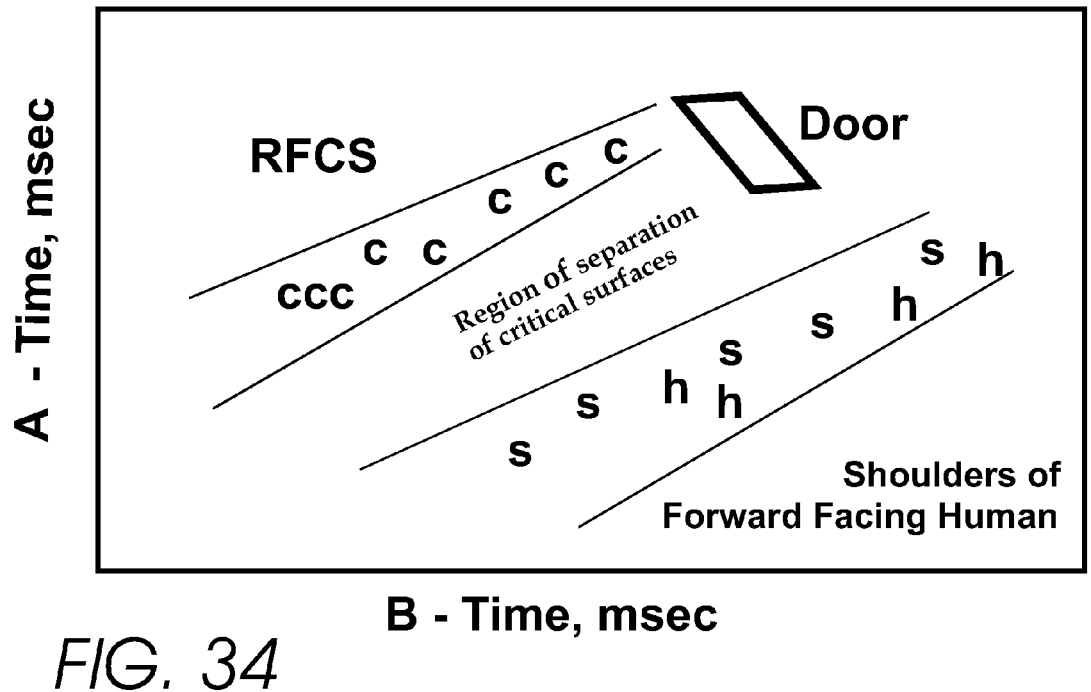
FIG. 34 is a plot showing the target volume discrimination for two transducers.
Figure 35:
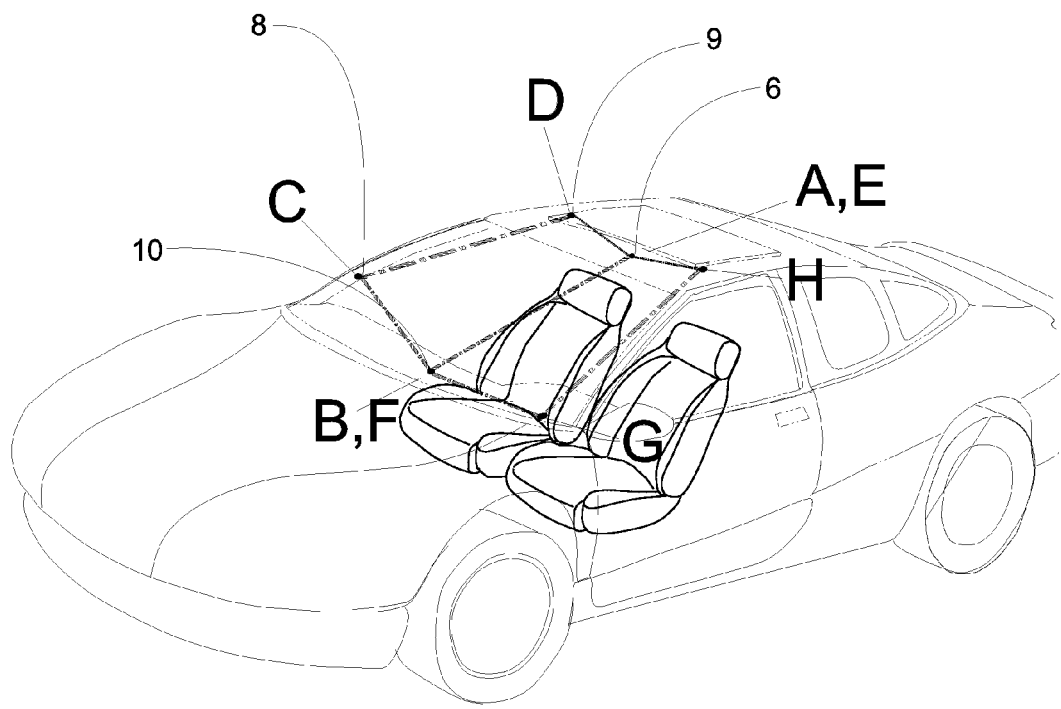
FIG. 35 illustrates a preferred mounting location of an eight-transducer system.

Considering once again the condition of these figures where two transducers are used, a plot can be made showing the reflection times of the objects which are located in the region of curve E and curve F of FIG. 35. This plot is shown on FIG. 34 where the c's represent ultrasound reflections from rear facing child seats from various tests where the seats were placed in a variety of different positions and similarly the s's and h's represent shoulders and heads respectively of various forward facing human occupants. In these results from actual experiments using ultrasonic transducers, the effect of body thickness is present and yet the results still show that the basic principles of separation of key volumes are valid. Note that there is a region of separation between corridors that house the different object classes. It is this fact which is used in conjunction with neural networks, as described here and in above-referenced patents and patent applications, which permit the design of a system that provides an accurate discrimination of rear facing child seats from forward facing humans. Previously, before the techniques for locating the transducers to separate these two zones were discovered, the entire discrimination task was accomplished using neural networks. There was significant overlap between the reflections from the various objects and therefore separation was done based on patterns of the reflected waves. By using the technology described herein to carefully position and orient the transducers so as to create this region of separation of the critical surfaces, wherein all of the rear facing child seat data falls within a known corridor, the task remaining for the neural networks is substantially simplified with the result that the accuracy of identification is substantially improved.

Three general classes of child seats exist as well as several models which are unique. First, there is the infant only seat as shown in FIG. 29 which is for occupants weighing up to about 20 pounds. This is designed to be only placed in the rear facing position. The second which is illustrated in FIG. 28 is for children from about 20 to about 40 pounds and can be used in both the forward and rear facing position and the third is for use only in the forward facing position and is for children weighing over about 40 pounds. All of these seats as well as the unique models are used in test setups according to at least one of the inventions disclosed herein for adapting a system to an automotive vehicle. For each child seat, there are several hundred unique orientations representing virtually every possible position of that seat within the vehicle. Tests are run, for example, with the seat tilted 22 degrees, rotated 17 degrees, placed on the front of the seat with the seat back fully up with the seat fully back and with the window open as well as all variations of these parameters. A large number of cases are also run, when practicing the teachings of at least one of the inventions disclosed herein, with various accessories, such as clothing, toys, bottles, blankets etc., added to the child seat.

Similarly, wide variations are used for the occupants including size, clothing and activities such as reading maps or newspapers, leaning forward to adjust the radio, for example. Also included are cases where the occupant puts his/her feet on the dashboard or otherwise assumes a wide variety of unusual positions. When all of the above configurations are considered along with many others not mentioned, the total number of configurations which are used to train the pattern recognition system for an automobile, for example, can exceed 500,000. The goal is to include in the configuration training set, representations of all occupancy states that occur in actual use. Since the system is highly accurate in making the correct decision for cases which are similar to those in the training set, the total system accuracy increases as the size of the training set increases providing the cases are all distinct and not copies of other cases.

In addition to all of the variations in occupancy states, it is important to consider environmental effects during the data collection. Thermal gradients or thermal instabilities are particularly important for systems based on ultrasound since sound waves can be significantly diffracted by density changes in air. There are two aspects of the use of thermal gradients or instability in training. First, the fact that thermal instabilities exist and therefore data with thermal instabilities present should be part of database. For this case, a rather small amount of data collected with thermal instabilities would be used. A much more important use of thermal instability comes from the fact that they add variability to data. Thus, considerably more data is taken with thermal instability and in fact, in some cases a substantial percentage of the database is taken with time varying thermal gradients in order to provide variability to the data so that the neural network does not memorize but instead generalizes from the data. This is accomplished by taking the data with a cold vehicle with the heater operating and with a hot vehicle with the air conditioner operating, for example. Additional data is also taken with a heat lamp in a closed vehicle to simulate a stable thermal gradient caused by sun loading.

To collect data for 500,000 vehicle configurations is not a formidable task. A trained technician crew can typically collect data on in excess on 2000 configurations or vectors per hour. The data is collected typically every 50 to 100 milliseconds. During this time, the occupant is continuously moving, assuming a continuously varying position and posture in the vehicle including moving from side to side, forward and back, twisting his/her head, reading newspapers and books, moving hands, arms, feet and legs, until the desired number of different seated state examples are obtained. In some cases, this process is practiced by confining the motion of an occupant into a particular zone. In some cases, for example, the occupant is trained to exercise these different seated state motions while remaining in a particular zone that may be the safe zone, the keep out zone, or an intermediate gray zone. In this manner, data is collected representing the airbag disable, depowered airbag-enabled or full power airbag-enabled states. In other cases, the actual position of the back of the head and/or the shoulders of the occupant are tracked using string pots, high frequency ultrasonic transducers, optically, by RF or other equivalent methods. In this manner, the position of the occupant can be measured and the decision as to whether this should be a disable or enable airbag case can be decided later. By continuously monitoring the occupant, an added advantage results in that the data can be collected to permit a comparison of the occupant from one seated state to another. This is particularly valuable in attempting to project the future location of an occupant based on a series of past locations as would be desirable for example to predict when an occupant would cross into the keep out zone during a panic braking situation prior to crash.

It is important to note that it is not necessary to tailor the system for every vehicle produced but rather to tailor it for each model or platform. However, a neural network, and especially a combination neural network, can be designed with some adaptability to compensate for vehicle to vehicle differences within a platform such as mounting tolerances, or to changes made by the owner or due to aging. A platform is an automobile manufacturer's designation of a group of vehicle models that are built on the same vehicle structure. A model would also apply to a particular size, shape or geometry of truck trailer or cargo container The methods above have been described mainly in connection with the use of ultrasonic transducers. Many of the methods, however, are also applicable to optical, radar, capacitive, electric field and other sensing systems and where applicable, at least one of the inventions disclosed herein is not limited to ultrasonic systems. In particular, an important feature of at least one of the inventions disclosed herein is the proper placement of two or more separately located receivers such that the system still operates with high reliability if one of the receivers is blocked by some object such as a newspaper or box. This feature is also applicable to systems using electromagnetic radiation instead of ultrasonic, however the particular locations will differ based on the properties of the particular transducers. Optical sensors based on two-dimensional cameras or other image sensors, for example, are more appropriately placed on the sides of a rectangle surrounding the seat to be monitored, for the automotive vehicle case, rather than at the corners of such a rectangle as is the case with ultrasonic sensors. This is because ultrasonic sensors measure an axial distance from the sensor where the 2D camera is most appropriate for measuring distances up and down and across its field view rather than distances to the object. With the use of electromagnetic radiation and the advances which have recently been made in the field of very low light level sensitivity, it is now possible, in some implementations, to eliminate the transmitters and use background light as the source of illumination along with using a technique such as auto-focusing or stereo vision to obtain the distance from the receiver to the object. Thus, only receivers would be required further reducing the complexity of the system.

Although implicit in the above discussion, an important feature of at least one of the inventions disclosed herein which should be emphasized is the method of developing a system having distributed transducer mountings. Other systems which have attempted to solve the rear facing child seat (RFCS) and out-of-position problems have relied on a single transducer mounting location or at most, two transducer mounting locations. Such systems can be easily blinded by a newspaper or by the hand of an occupant, for example, which is imposed between the occupant and the transducers. This problem is almost completely eliminated through the use of three or more transducers which are mounted so that they have distinctly different views of the passenger compartment volume of interest. If the system is adapted using four transducers as illustrated in the distributed system of FIG. 33, for example, the system suffers only a slight reduction in accuracy even if two of the transducers are covered so as to make them inoperable. However, the automobile manufacturers may not wish to pay the cost of several different mounting locations and an alternate is to mount the sensors high where blockage is difficult and to diagnose whether a blockage state exists.

It is important in order to obtain the full advantages of the system when a transducer is blocked, that the training and independent databases contains many examples of blocked transducers. If the pattern recognition system, the neural network in this case, has not been trained on a substantial number of blocked transducer cases, it will not do a good job in recognizing such cases later. This is yet another instance where the makeup of the databases is crucial to the success of designing the system that will perform with high reliability in a vehicle and is an important aspect of the instant invention. When camera-based transducers are used, for example, an alternative strategy is to diagnose when a newspaper or other object is blocking a camera, for example. In most cases, a short time blockage is of little consequence since earlier decisions provide the seat occupancy and the decision to enable deployment or suppress deployment of the occupant restraint will not change. For a prolonged blockage, the diagnostic system can provide a warning light indicating to the driver, operator or other interested party which may be remote from the vehicle, that the system is malfunctioning and the deployment decision is again either not changed or changed to the default decision, which is usually to enable deployment for the automobile occupant monitoring case.

Let us now consider some specific issues:

1. Blocked transducers. It is sometimes desirable to positively identify a blocked transducer and when such a situation is found to use a different neural network which has only been trained on the subset of unblocked transducers. Such a network, since it has been trained specifically on three transducers, for example, will generally perform more accurately than a network which has been trained on four transducers with one of the transducers blocked some of the time. Once a blocked transducer has been identified the occupant or other interested party can be notified if the condition persists for more than a reasonable time.

2. Transducer Geometry. Another technique, which is frequently used in designing a system for a particular vehicle, is to use a neural network to determine the optimum mounting locations, aiming or orientation directions and field angles of transducers. For particularly difficult vehicles, it is sometimes desirable to mount a large number of ultrasonic transducers, for example, and then use the neural network to eliminate those transducers which are least significant. This is similar to the technique described above where all kinds of transducers are combined initially and later pruned.

3. Data quantity. Since it is very easy to take large amounts data and yet large databases require considerably longer training time for a neural network, a test of the variability of the database can be made using a neural network. If, for example, after removing half of the data in the database, the performance of a trained neural network against the validation database does not decrease, then the system designer suspects that the training database contains a large amount of redundant data. Techniques such as similarity analysis can then be used to remove data that is virtually indistinguishable from other data. Since it is important to have a varied database, it is undesirable generally to have duplicate or essentially duplicate vectors in the database since the presence of such vectors can bias the system and drive the system more toward memorization and away from generalization.

4. Environmental factors. An evaluation can be made of the beneficial effects of using varying environmental influences, such as temperature or lighting, during data collection on the accuracy of the system using neural networks along with a technique such as design of experiments.

5. Database makeup. It is generally believed that the training database must be flat, meaning that all of the occupancy states that the neural network must recognize must be approximately equally represented in the training database. Typically, the independent database has approximately the same makeup as the training database. The validation database, on the other hand, typically is represented in a non-flat basis with representative cases from real world experience. Since there is no need for the validation database to be flat, it can include many of the extreme cases as well as being highly biased towards the most common cases. This is the theory that is currently being used to determine the makeup of the various databases. The success of this theory continues to be challenged by the addition of new cases to the validation database. When significant failures are discovered in the validation database, the training and independent databases are modified in an attempt to remove the failure.

6. Biasing. All seated state occupancy states are not equally important. The final system for the automotive case for example must be nearly 100% accurate for forward facing "in-position" humans, i.e., normally positioned humans. Since that will comprise the majority of the real world situations, even a small loss in accuracy here will cause the airbag to be disabled in a situation where it otherwise would be available to protect an occupant. A small decrease in accuracy will thus result in a large increase in deaths and injuries. On the other hand, there are no serious consequences if the airbag is deployed occasionally when the seat is empty. Various techniques are used to bias the data in the database to take this into account. One technique is to give a much higher value to the presence of a forward facing human during the supervised learning process than to an empty seat. Another technique is to include more data for forward facing humans than for empty seats. This, however, can be dangerous as an unbalanced network leads to a loss of generality.

7. Screening. It is important that the loop be closed on data acquisition. That is, the data must be checked at the time the data is acquired to be sure that it is good data. Bad data can happen, for example, because of electrical disturbances on the power line, sources of ultrasound such as nearby welding equipment, or due to human error. If the data remains in the training database, for example, then it will degrade the performance of the network. Several methods exist for eliminating bad data. The most successful method is to take an initial quantity of data, such as 30,000 to 50,000 vectors, and create an interim network. This is normally done anyway as an initial check on the system capabilities prior to engaging in an extensive data collection process. The network can be trained on this data and, as the real training data is acquired, the data can be tested against the neural network created on the initial data set. Any vectors that fail are examined for reasonableness.

8. Vector normalization method. Through extensive research, it has been found that the vector should be normalized based on all of the data in the vector, that is have all its data values range from 0 to 1. For particular cases, however, it has been found desirable to apply the normalization process selectively, eliminating or treating differently the data at the early part of the data from each transducer. This is especially the case when there is significant ringing on the transducer or cross talk when a separate ultrasonic send and receive transducer is used. There are times when other vector normalization techniques are required and the neural network system can be used to determine the best vector normalization technique for a particular application.

9. Feature extraction. The success of a neural network system can frequently be aided if additional data is inputted into the network. One ultrasonic example can be the number of 0 data points before the first peak is experienced. Alternately, the exact distance to the first peak can be determined prior to the sampling of the data. Other features can include the number of peaks, the distance between the peaks, the width of the largest peak, the normalization factor, the vector mean or standard deviation, etc. These normalization techniques are frequently used at the end of the adaptation process to slightly increase the accuracy of the system.

10. Noise. It has been frequently reported in the literature that adding noise to the data that is provided to a neural network can improve the neural network accuracy by leading to better generalization and away from memorization. However, the training of the network in the presence of thermal gradients has been shown to substantially eliminate the need to artificially add noise to the data for ultrasonic systems. Nevertheless, in some cases, improvements have been observed when random arbitrary noise of a rather low level is superimposed on the training data.

11. Photographic recording of the setup. After all of the data has been collected and used to train a neural network, it is common to find a significant number of vectors which, when analyzed by the neural network, give a weak or wrong decision. These vectors must be carefully studied especially in comparison with adjacent vectors to see if there is an identifiable cause for the weak or wrong decision. Perhaps the occupant was on the borderline of the keep out zone and strayed into the keep out zone during a particular data collection event. For this reason, it is desirable to photograph each setup simultaneous with the collection of the data. This can be done using one or more cameras mounted in positions where they can have a good view of the seat occupancy. Sometimes several cameras are necessary to minimize the effects of blockage by a newspaper, for example. Having the photographic record of the data setup is also useful when similar results are obtained when the vehicle is subjected to real world testing. During real world testing, one or more cameras should also be present and the test engineer is required to initiate data collection whenever the system does not provide the correct response. The vector and the photograph of this real world test can later be compared to similar setups in the laboratory to see whether there is data that was missed in deriving the matrix of vehicle setups for training the vehicle.

12. Automation. When collecting data in the vehicle it is desirable to automate the motion of the vehicle seat, seatback, windows, visors etc. so that in this manner, the positions of these items can be controlled and distributed as desired by the system designer. This minimizes the possibility of taking too much data at one configuration and thereby unbalancing the network.

13. Automatic setup parameter recording. To achieve an accurate data set, the key parameters of the setup should be recorded automatically. These include the temperatures at various positions inside the vehicle and for the automotive case, the position of the vehicle seat, and seatback, the position of the headrest, visor and windows and, where possible, the position of the vehicle occupant(s). The automatic recordation of these parameters minimizes the effects of human errors.

14. Laser Pointers. For the ultrasonic case, during the initial data collection with full horns mounted on the surface of the passenger compartment, care must the exercised so that the transducers are not accidentally moved during the data collection process. In order to check for this possibility, a small laser diode is incorporated into each transducer holder. The laser is aimed so that it illuminates some other surface of the passenger compartment at a known location. Prior to each data taking session, each of the transducer aiming points is checked.

15. Multi-frequency transducer placement. When data is collected for dynamic out-of-position, each of the ultrasonic transducers must operate at a different frequency so that all transducers can transmit simultaneously. By this method, data can be collected every 10 milliseconds, which is sufficiently fast to approximately track the motion of an occupant during pre-crash braking prior to an impact. A problem arises in the spacing of the frequencies between the different transducers. If the spacing is too close, it becomes very difficult to separate the signals from different transducers and it also affects the sampling rate of the transducer data and thus the resolution of the transducers. If an ultrasonic transducer operates at a frequency much below about 35 kHz, it can be sensed by dogs and other animals. If the transducer operates at a frequency much above 70 kHz, it is very difficult to make the open type of ultrasonic transducer, which produces the highest sound pressure. If the multiple frequency system is used for both the driver and passenger-side, as many as eight separate frequencies are required. In order to find eight frequencies between 35 kHz and 70 kHz, a frequency spacing of 5 kHz is required. In order to use conventional electronic filters and to provide sufficient spacing to permit the desired resolution at the keep out zone border, a 10 kHz spacing is desired. These incompatible requirements can be solved through a careful, judicious placement of the transducers such that transducers that are within 5 kHz of each other are placed such that there is no direct path between the transducers and any indirect path is sufficiently long so that it can be filtered temporally. An example of such an arrangement is shown in FIG. 35. For this example, the transducers operate at the following frequencies A 65 kHz, B 55 kHz, C 35 kHz, D 45 kHz, E 50 kHz, F 40 kHz, G 60 kHz, H 70 kHz. Actually, other arrangements adhering to the principle described above would also work.

16. Use of a PC in data collection. When collecting data for the training, independent, and validation databases, it is frequently desirable to test the data using various screening techniques and to display the data on a monitor. Thus, during data collection the process is usually monitored using a desktop PC for data taken in the laboratory and a laptop PC for data taken on the road.

17. Use of referencing markers and gages. In addition to and sometimes as a substitution for, the automatic recording of the positions of the seats, seatbacks, windows etc. as described above, a variety of visual markings and gages are frequently used. This includes markings to show the angular position of the seatback, the location of the seat on the seat track, the degree of openness of the window, etc. Also in those cases where automatic tracking of the occupant is not implemented, visual markings are placed such that a technician can observe that the test occupant remains within the required zone for the particular data taking exercise. Sometimes, a laser diode is used to create a visual line in the space that represents the boundary of the keep out zone or other desired zone boundary.

18. Subtracting out data that represents reflections from known seat parts or other vehicle components. This is particularly useful if the seat track and seatback recline positions are known.

19. Improved identification and tracking can sometimes be obtained if the object can be centered or otherwise located in a particular part of the neural network in a manner similar to the way the human eye centers an object to be examined in the center of its field of view.

20. Continuous tracking of the object in place of a zone-based system also improves the operation of the pattern recognition system since discontinuities are frequently difficult for the pattern recognition system, such as a neural network, to handle. In this case, the location of the occupant relative to the airbag cover, for example, would be determined and then a calculation as to what zone the object is located in can be determined and the airbag deployment decision made (suppression, depowered, delayed, deployment). This also permits a different suppression zone to be used for different sized occupants further improving the matching of the airbag deployment to the occupant.

It is important to realize that the adaptation process described herein applies to any combination of transducers that provide information about the vehicle occupancy. These include weight sensors, capacitive sensors, electric field sensors, inductive sensors, moisture sensors, chemical sensors, ultrasonic, radiation, optic, infrared, radar, X-ray among others. The adaptation process begins with a selection of candidate transducers for a particular vehicle model. This selection is based on such considerations as cost, alternate uses of the system other than occupant sensing, vehicle interior compartment geometry, desired accuracy and reliability, vehicle aesthetics, vehicle manufacturer preferences, and others. Once a candidate set of transducers has been chosen, these transducers are mounted in the test vehicle according to the teachings of at least one of the inventions disclosed herein. The vehicle is then subjected to an extensive data collection process wherein various objects are placed in the vehicle at various locations as described below and an initial data set is collected. A pattern recognition system is then developed using the acquired data and an accuracy assessment is made. Further studies are made to determine which, if any, of the transducers can be eliminated from the design. In general, the design process begins with a surplus of sensors plus an objective as to how many sensors are to be in the final vehicle installation. The adaptation process can determine which of the transducers are most important and which are least important and the least important transducers can be eliminated to reduce system cost and complexity.

A process for adapting an ultrasonic system to a vehicle will now be described. Note, some steps will not apply to some vehicles. A more detailed list of steps is provided in Appendix 2 of the '881 application. Although the pure ultrasonic system is described here for automotive applications, a similar or analogous set of steps applies for other vehicle types and when other technologies such as weight and optical (scanning or imager) or other electromagnetic wave or electric field systems such as capacitance and field monitoring systems are used. This description is thus provided to be exemplary and not limiting:

1. Select transducer, horn and grill designs to fit the vehicle. At this stage, usually full horns are used which are mounted so that they project into the compartment. No attempt is made at this time to achieve an esthetic matching of the transducers to the vehicle surfaces. An estimate of the desired transducer fields is made at this time either from measurements in the vehicle directly or from CAD drawings.

2. Make polar plots of the transducer ultrasonic fields. Transducers and candidate horns and grills are assembled and tested to confirm that the desired field angles have been achieved. This frequently requires some adjustment of the transducers in the horn and of the grill. A properly designed grill for ultrasonic systems can perform a similar function as a lens for optical systems.

3. Check to see that the fields cover the required volumes of the vehicle passenger compartment and do not impinge on adjacent flat surfaces that may cause multipath effects. Redesign horns and grills if necessary.

4. Install transducers into vehicle.

5. Map transducer fields in the vehicle and check for multipath effects and proper coverage.

6. Adjust transducer aim and re-map fields if necessary.

7. Install daily calibration fixture and take standard setup data.

8. Acquire 50,000 to 100,000 vectors of data

9. Adjust vectors for volume considerations by removing some initial data points if cross talk or ringing is present and some final points to keep data in the desired passenger compartment volume.

10. Normalize vectors.

11. Run neural network algorithm generating software to create algorithm for vehicle installation.

12. Check the accuracy of the algorithm. If not sufficiently accurate collect more data where necessary and retrain. If still not sufficiently accurate, add additional transducers to cover holes.

13. When sufficient accuracy is attained, proceed to collect ~500,000 training vectors varying:
Occupancy (see Appendices 1 and 3 of the '881 application):
Occupant size, position (zones), clothing etc
Child seat type, size, position etc.
Empty seat
Vehicle configuration:
Seat position
Window position
Visor and armrest position
Presence of other occupants in adjoining seat or rear seat
Temperature
Temperature gradient—stable
Temperature turbulence—heater and air conditioner
Wind turbulence—High speed travel with windows open, top down etc.
Other similar features when the adaptation is to a vehicle other than an automobile.

14. Collect ~100,000 vectors of Independent data using other combinations of the above 15. Collect ~50,000 vectors of "real world data" to represent the acceptance criteria and more closely represent the actual seated state probabilities in the real world.

16. Train network and create an algorithm using the training vectors and the Independent data vectors.

17. Validate the algorithm using the real world vectors.

18. Install algorithm into the vehicle and test.

19. Decide on post processing methodology to remove final holes (areas of inaccuracy) in system 20. Implement post-processing methods into the algorithm 21. Final test. The process up until step 13 involves the use of transducers with full horns mounted on the surfaces of the interior passenger compartment. At some point, the actual transducers which are to be used in the final vehicle must be substituted for the trial transducers. This is either done prior to step 13 or at this step. This process involves designing transducer holders that blend with the visual surfaces of the vehicle compartment so that they can be covered with a properly designed grill that helps control the field and also serves to retain the esthetic quality of the interior. This is usually a lengthy process and involves several consultations with the customer. Usually, therefore, the steps from 13-20 are repeated at this point after the final transducer and holder design has been selected. The initial data taken with full horns gives a measure of the best system that can be made to operate in the vehicle. Some degradation in performance is expected when the aesthetic horns and grills are substituted for the full horns. By conducting two complete data collection cycles, an accurate measure of this accuracy reduction can be obtained.

22. Up until this point, the best single neural network algorithm has been developed. The final step is to implement the principles of a combination neural network in order to remove some remaining error sources such as bad data and to further improve the accuracy of the system. It has been found that the implementation of combination neural networks can reduce the remaining errors by up to 50 percent. A combination neural network CAD optimization program provided by International Scientific Research Inc. can now be used to derive the neural network architecture. Briefly, the operator lays out a combination neural network involving many different neural networks arranged in parallel and in series and with appropriate feedbacks which the operator believes could be important. The software then optimizes each neural network and also provides an indication of the value of the network. The operator can then selectively eliminate those networks with little or no value and retrain the system.

Through this combination of pruning, retraining and optimizing the final candidate combination neural network results.

23. Ship to customers to be used in production vehicles.

24. Collect additional real world validation data for continuous improvement.

More detail on the operation of the transducers and control circuitry as well as the neural network is provided in above-referenced patents and patent applications and elsewhere herein. One particular example of a successful neural network for the two transducer case had 78 input nodes, 6 hidden nodes and 1 output node and for the four transducer case had 176 input nodes 20 hidden layer nodes on hidden layer one, 7 hidden layer nodes on hidden layer two and 1 output node. The weights of the network were determined by supervised training using the back propagation method as described in above-referenced patents and patent applications and in references cited therein. Other neural network architectures are possible including RCE, Logicon Projection, Stochastic, cellular, or support vector machine, etc. An example of a combination neural network system is shown in FIG. 37 of the '881 application. Any of the network architectures mention here can be used for any of the boxes in FIG. 37.

Finally, the system is trained and tested with situations representative of the manufacturing and installation tolerances that occur during the production and delivery of the vehicle as well as usage and deterioration effects. Thus, for example, the system is tested with the transducer mounting positions shifted by up to one inch in any direction and rotated by up to 5 degrees, with a simulated accumulation of dirt and other variations. This tolerance to vehicle variation also sometimes permits the installation of the system onto a different but similar model vehicle with, in many cases, only minimal retraining of the system.

3. Mounting Locations for and Quantity of Transducers

Ultrasonic transducers are relatively good at measuring the distance along a radius to a reflective object. An optical array, to be discussed now, on the other hand, can get accurate measurements in two dimensions, the lateral and vertical dimensions relative to the transducer. Assuming the optical array has dimensions of 100 by 100 as compared to an ultrasonic sensor that has a single dimension of 100, an optical array can therefore provide 100 times more information than the ultrasonic sensor. Most importantly, this vastly greater amount of information does not cost significantly more to obtain than the information from the ultrasonic sensor.

As illustrated in FIGS. 8A-8D, the optical sensors are typically located for an automotive vehicle at the positions where the desired information is available with the greatest resolution. These positions are typically in the center front and center rear of the occupancy seat and at the center on each side and top. This is in contrast to the optimum location for ultrasonic sensors, which are the corners of such a rectangle that outlines the seated volume. Styling and other constraints often prevent mounting of transducers at the optimum locations.

Figure 8B:
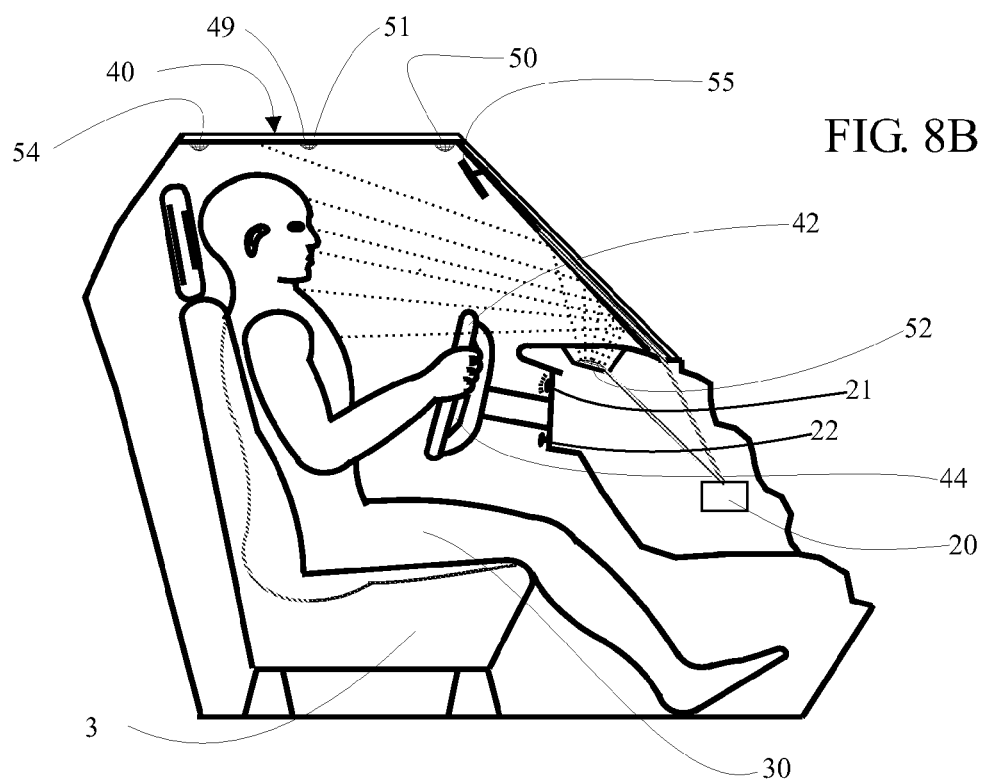
FIG. 8B is a view as in FIG. 8A illustrating the wave pattern from an optical system using an infrared light source and a CCD or CMOS array receiver using the windshield as a reflection surface and showing schematically the interface between the vehicle interior monitoring system of at least one of the inventions disclosed herein and an instrument panel mounted inattentiveness warning light or buzzer and reset button.

An optical infrared transmitter and receiver assembly is shown generally at 52 in FIG. 8B and is mounted onto the instrument panel facing the windshield. Assembly 52 can either be recessed below the upper face of the instrument panel or mounted onto the upper face of the instrument panel. Assembly 52, shown enlarged, comprises a source of infrared radiation, or another form of electromagnetic radiation, and a CCD, CMOS or other appropriate arrays of typically 160 pixels by 160 pixels. In this embodiment, the windshield is used to reflect the illumination light provided by the infrared radiation toward the objects in the passenger compartment and also reflect the light being reflected back by the objects in the passenger compartment, in a manner similar to the "heads-up" display which is now being offered on several automobile models. The "heads-up" display, of course, is currently used only to display information to the driver and is not used to reflect light from the driver to a receiver. Once again, unless one of the distance measuring systems as described below is used, this system alone cannot be used to determine distances from the objects to the sensor. Its main purpose is object identification and monitoring. Depending on the application, separate systems can be used for the driver and for the passenger. In some cases, the cameras located in the instrument panel which receive light reflected off of the windshield can be co-located with multiple lenses whereby the respective lenses aimed at the driver and passenger seats respectively.

Assembly 52 is actually about two centimeters or less in diameter and is shown greatly enlarged in FIG. 8B. Also, the reflection area on the windshield is considerably smaller than illustrated and special provisions are made to assure that this area of the windshield is flat and reflective as is done generally when heads-up displays are used. For cases where there is some curvature in the windshield, it can be at least partially compensated for by the CCD optics.

Transducers 23-25 are illustrated mounted onto the A-pillar of the vehicle, however, since these transducers are quite small, typically less than 2 cm on a side, they could alternately be mounted onto the windshield itself, or other convenient location which provides a clear view of the portion of the passenger compartment being monitored. Other preferred mounting locations include the headliner above and also the side of the seat. Some imagers are now being made that are less than 1 cm on a side.

Figure 36:
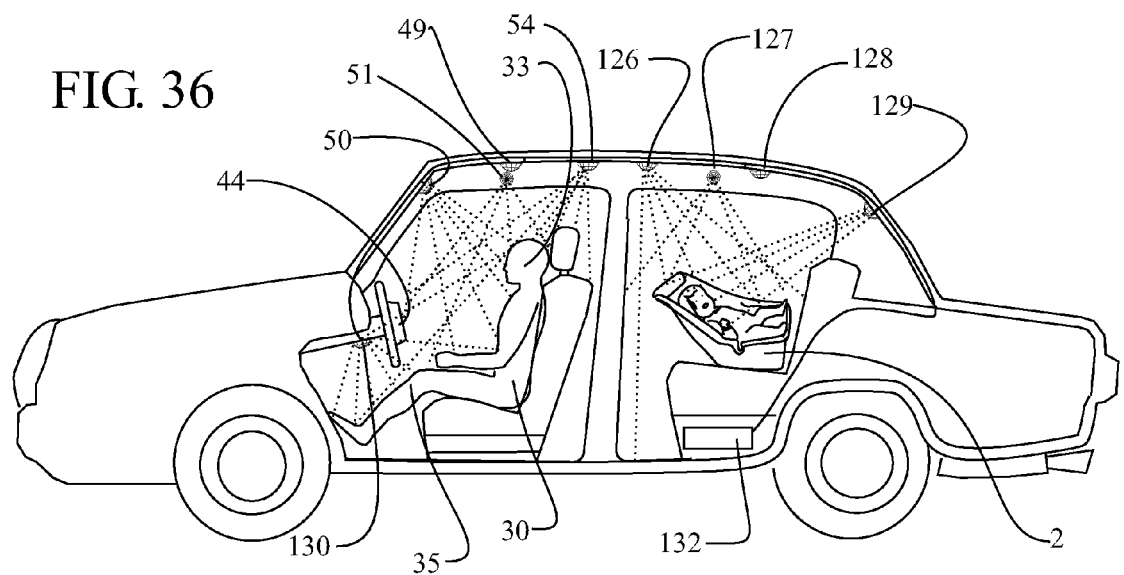
FIG. 36 is a side view, with certain portions removed or cut away, of a portion of the passenger compartment of a vehicle showing preferred mounting locations of optical interior vehicle monitoring sensors

FIG. 36 is a side view, with certain portions removed or cut away, of a portion of the passenger compartment of a vehicle showing preferred mounting locations of optical interior vehicle monitoring sensors (transmitter/receiver assemblies or transducers) 49, 50, 51, 54, 126, 127, 128, 129, and 130. Each of these sensors is illustrated as having a lens and is shown enlarged in size for clarity. In a typical actual device, the diameter of the lens is less than 2 cm and it protrudes from the mounting surface by less than 1 cm. Specially designed sensors can be considerably smaller. This small size renders these devices almost unnoticeable by vehicle occupants. Since these sensors are optical, it is important that the lens surface remains relatively clean. Control circuitry 132, which is coupled to each transducer, contains a self-diagnostic feature where the image returned by a transducer is compared with a stored image and the existence of certain key features is verified. If a receiver fails this test, a warning is displayed to the driver which indicates that cleaning of the lens surface is required.

The technology illustrated in FIG. 36 can be used for numerous purposes relating to monitoring of the space in the passenger compartment behind the driver including: (i) the determination of the presence and position of objects in the rear seat(s), (ii) the determination of the presence, position and orientation of child seats 2 in the rear seat, (iii) the monitoring of the rear of an occupant's head 33, (iv) the monitoring of the position of occupant 30, (v) the monitoring of the position of the occupant's knees 35, (vi) the monitoring of the occupant's position relative to the airbag 44, (vii) the measurement of the occupant's height, as well as other monitoring functions as described elsewhere herein.

Information relating to the space behind the driver can be obtained by processing the data obtained by the sensors 126, 127, 128 and 129, which data would be in the form of images if optical sensors are used as in the preferred embodiment.

Such information can be the presence of a particular occupying item or occupant, e.g., a rear facing child seat 2 as shown in FIG. 36, as well as the location or position of occupying items. Additional information obtained by the optical sensors can include an identification of the occupying item. The information obtained by the control circuitry by processing the information from sensors 126, 127, 128 and 129 may be used to affect any other system or component in the vehicle in a similar manner as the information from the sensors which monitor the front seat is used as described herein, such as the airbag system. Processing of the images obtained by the sensors to determine the presence, position and/or identification of any occupants or occupying item can be effected using a pattern recognition algorithm in any of the ways discussed herein, e.g., a trained neural network. For example, such processing can result in affecting a component or system in the front seat such as a display that allows the operator to monitor what is happening in the rear seat without having to turn his or her head.

In the preferred implementation, as shown in FIGS. 8A-8E, four transducer assemblies are positioned around the seat to be monitored, each can comprise one or more LEDs with a diverging lenses and a CMOS array. Although illustrated together, the illuminating source in many cases will not be co-located with the receiving array. The LED emits a controlled angle, 120° for example, diverging cone of infrared radiation that illuminates the occupant from both sides and from the front and rear. This angle is not to be confused with the field angle used in ultrasonic systems. With ultrasound, extreme care is required to control the field of the ultrasonic waves so that they will not create multipath effects and add noise to the system. With infrared, there is no reason, in the implementation now being described, other than to make the most efficient use of the infrared energy, why the entire vehicle cannot be flooded with infrared energy either from many small sources or from a few bright ones.

The image from each array is used to capture two dimensions of occupant position information, thus, the array of assembly 50 positioned on the windshield header, which is approximately 25% of the way laterally across the headliner in front of the driver, provides a both vertical and transverse information on the location of the driver. A similar view from the rear is obtained from the array of assembly 54 positioned behind the driver on the roof of the vehicle and above the seatback portion of the seat 72. As such, assembly 54 also provides both vertical and transverse information on the location of the driver. Finally, arrays of assemblies 49 and 51 provide both vertical and longitudinal driver location information. Another preferred location is the headliner centered directly above the seat of interest. The position of the assemblies 49-52 and 54 may differ from that shown in the drawings. In the invention, in order that the information from two or more of the assemblies 49-52 and 54 may provide a three-dimensional image of the occupant, or portion of the passenger compartment, the assemblies generally should not be arranged side-by-side. A side-by-side arrangement as used in several prior art references discussed above, will provide two essentially identical views with the difference being a lateral shift. This does not enable a complete three-dimensional view of the occupant.

One important point concerns the location and number of optical assemblies. It is possible to use fewer than four such assemblies with a possible resulting loss in accuracy. The number of four was chosen so that either a forward or rear assembly or either of the side assemblies can be blocked by a newspaper, for example, without seriously degrading the performance of the system. Since drivers rarely are reading newspapers while driving, fewer than four arrays are usually adequate for the driver side. In fact, one is frequently sufficient. One camera is also usually sufficient for the passenger side if the goal of the system is classification only or if camera blockage is tolerated for occupant tracking.

The particular locations of the optical assemblies were chosen to give the most accurate information as to the locations of the occupant. This is based on an understanding of what information can be best obtained from a visual image. There is a natural tendency on the part of humans to try to gauge distance from the optical sensors directly. This, as can be seen above, is at best complicated involving focusing systems, stereographic systems, multiple arrays and triangulation, time of flight measurement, etc. What is not intuitive to humans is to not try to obtain this distance directly from apparatus or techniques associated with the mounting location. Whereas ultrasound is quite good for measuring distances from the transducer (the z-axis), optical systems are better at measuring distances in the vertical and lateral directions (the x and y-axes). Since the precise locations of the optical transducers are known, that is, the geometry of the transducer locations is known relative to the vehicle, there is no need to try to determine the displacement of an object of interest from the transducer (the z-axis) directly. This can more easily be done indirectly by another transducer. That is, the vehicle z-axis to one transducer is the camera x-axis to another.

Figure 13:
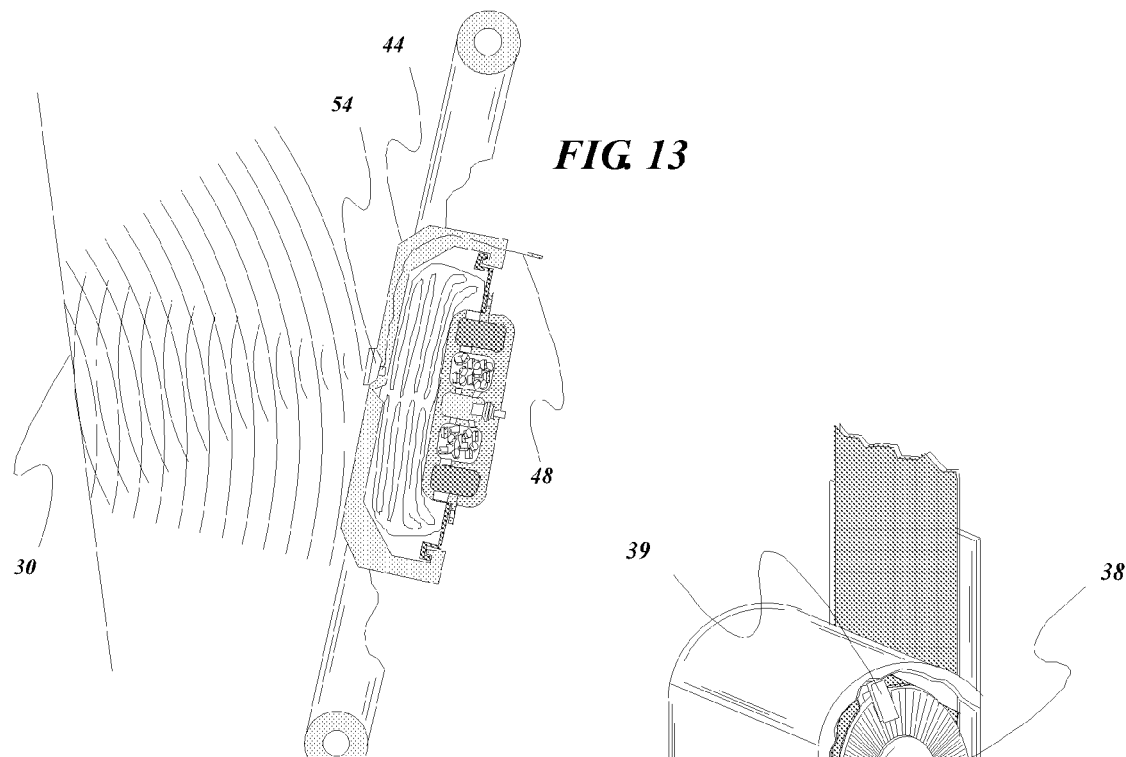
FIG. 13 is a cross section view of a steering wheel and airbag module assembly showing a preferred mounting location of an ultrasonic wave generator and receiver.
Figure 14:
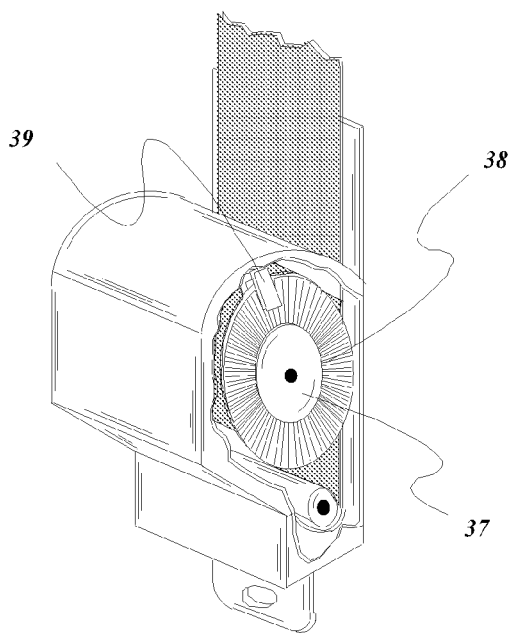
FIG. 14 is a partial cutaway view of a seatbelt retractor with a spool out sensor utilizing a shaft encoder.

Another preferred location of a transmitter/receiver for use with airbags is shown at 54 in FIGS. 5 and 13. In this case, the device is attached to the steering wheel and gives an accurate determination of the distance of the driver's chest from the airbag module. This implementation would generally be used with another device such as 50 at another location.

A transmitter/receiver 54 shown mounted on the cover of the airbag module 44 is shown in FIG. 13. The transmitter/receiver 54 is attached to various electronic circuitry 224 by means of wire cable 48. Circuitry 224 is coupled to the inflator portion of the airbag module 44 and as discussed below, can determine whether deployment of the airbag should occur, whether deployment should be suppressed and modify a deployment parameter, depending on the construction of the airbag module 44. When an airbag in the airbag module 44 deploys, the cover begins moving toward the driver. If the driver is in close proximity to this cover during the early stages of deployment, the driver can be seriously injured or even killed. It is important, therefore, to sense the proximity of the driver to the cover and if he or she gets too close, to disable deployment of the airbag. An accurate method of obtaining this information would be to place the distance-measuring device 54 onto the airbag cover as shown in FIG. 13. Appropriate electronic circuitry, either in the transmitter/receiver unit 54 (which can also be referred to as a distance measuring device for this embodiment) or circuitry 224 can be used to not only determine the actual distance of the driver from the cover but also the driver's velocity as discussed above. In this manner, a determination can be made as to where the driver is likely to be at the time of deployment of the airbag, i.e., the driver's expected position based on his current position and velocity. This constitutes a determination of the expected position of the driver based on the current measured position, measured by the transmitter/receiver 54, and current velocity, determined from multiple distance measurements or otherwise as discussed herein. For example, with knowledge of the driver's current position and velocity, the driver's future, expected position can be extrapolated (for example, future position equals current position plus velocity multiplied by the time at which the future position is desired to be known considering the velocity to be constant over the time difference). This information (about where the driver is likely to be at the time of deployment of the airbag) can be used by the circuitry 224 most importantly to prevent deployment of the airbag (which constitutes suppression of the deployment) but also to modify any deployment parameter of the airbag via control of the inflator module such as the rate of airbag deployment. This constitutes control of a component (the airbag module) in consideration of the expected position of the occupant. In FIG. 5, for one implementation, ultrasonic waves are transmitted by a transmitter/receiver 54 toward the chest of the driver 30. The reflected waves are then received by the same transmitter/receiver 54.

One problem of the system using a transmitter/receiver 54 in FIG. 5 or 13 is that a driver may have inadvertently placed his hand over the transmitter/receiver 54, thus defeating the operation of the device. A second confirming transmitter/receiver 50 can therefore be placed at some other convenient position such as on the roof or headliner of the passenger compartment as shown in FIG. 5. This transmitter/receiver 50 operates in a manner similar to transmitter/receiver 54.

The applications described herein have been illustrated using the driver of the vehicle. The same systems of determining the position of the occupant relative to the airbag apply to the passenger, sometimes requiring minor modifications. Also of course, a similar system can be appropriately designed for other monitoring situations such as for cargo containers and truck trailers.

It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag. The occupant position sensor, when used for the passenger side with proper pattern recognition circuitry, can also ascertain whether or not the seat is occupied, and if not, can disable the deployment of the passenger side airbag and thereby save the cost of its replacement. A sophisticated pattern recognition system could even distinguish between an occupant and a bag of groceries or a box, for example, which in some cargo container or truck trailer monitoring situations is desired. Finally, there has been much written about the out of position child who is standing or otherwise positioned adjacent to the airbag, perhaps due to pre-crash braking. The occupant position sensor described herein can prevent the deployment of the airbag in this situation.

3.1 Single Camera, Dual Camera with Single Light Source

Many automobile companies are opting to satisfy the requirements of FMVSS-208 by using a weight only system such as the bladder or strain gage systems disclosed here. Such a system provides an elementary measure of the weight of the occupying object but does not give a reliable indication of its position, at least for automotive vehicles. It can also be easily confused by any object that weighs 60 or more pounds and that is interpreted as an adult. Weight only systems are also static systems in that due to vehicle dynamics that frequently accompany a pre crash braking event they are unable to track the position of the occupant. The load from seatbelts can confuse the system and therefore a special additional sensor must be used to measure seatbelt tension. In some systems, the device must be calibrated for each vehicle and there is some concern as to whether this calibration will be proper for the life on the vehicle.

A single camera can frequently provide considerably more information than a weight only system without the disadvantages of weight sensors and do so at a similar cost. Such a single camera in its simplest installation can categorize the occupancy state of the vehicle and determine whether the airbag should be suppressed due to an empty seat or the presence of a child of a size that corresponds to one weighing less than 60 pounds. Of course, a single camera can also easily do considerably more by providing a static out-of-position indication and, with the incorporation of a faster processor, dynamic out-of-position determination can also be provided. Thus, especially with the costs of microprocessors continuing to drop, a single camera system can easily provide considerably more functionality than a weight only system and yet stay in the same price range.

A principal drawback of a single camera system is that it can be blocked by the hand of an occupant or by a newspaper, for example. This is a rare event since the preferred mounting location for the camera is typically high in the vehicle such as on the headliner. Also, it is considerably less likely that the occupant will always be reading a newspaper, for example, and if he or she is not reading it when the system is first started up, or at any other time during the trip, the camera system will still get an opportunity to see the occupant when he or she is not being blocked and make the proper categorization. The ability of the system to track the occupant will be impaired but the system can assume that the occupant has not moved toward the airbag while reading the newspaper and thus the initial position of the occupant can be retained and used for suppression determination. Finally, the fact that the camera is blocked can be determined and the driver made aware of this fact in much the same manner that a seatbelt light notifies the driver that the passenger is not wearing his or her seatbelt.

The accuracy of a single camera system can be above 99% which significantly exceeds the accuracy of weight only systems. Nevertheless, some automobile manufacturers desire even greater accuracy and therefore opt for the addition of a second camera. Such a camera is usually placed on the opposite side of the occupant as the first camera. The first camera may be placed on or near the dome light, for example, and the second camera can be on the headliner above the side door. A dual camera system such as this can operate more accurately in bright daylight situations where the window area needs to be ignored in the view of the camera that is mounted near the dome.

Sometimes, in a dual camera system, only a single light source is used. This provides a known shadow pattern for the second camera and helps to accentuate the edges of the occupying item rendering classification easier. Any of the forms of structured light can also be used and through these and other techniques the corresponding points in the two images can more easily be determined thus providing a three-dimensional model of the occupant or occupying object in the case of other vehicle types such as a cargo container or truck trailer.

As a result, the current assignee has developed a low cost single camera system which has been extensively tested for the most difficult problem of automobile occupant sensing but is nevertheless also applicable for monitoring of other vehicles such as cargo containers and truck trailers. The automotive occupant position sensor system uses a CMOS camera in conjunction with pattern recognition algorithms for the discrimination of out-of-position occupants and rear facing child safety seats. A single imager, located strategically within the occupant compartment, is coupled with an infrared LED that emits unfocused, wide-beam pulses toward the passenger volume. These pulses, which reflect off of objects in the passenger seat and are captured by the camera, contain information for classification and location determination in approximately 10 msec. The decision algorithm processes the returned information using a uniquely trained neural network, which may not be necessary in the simpler cargo container or truck trailer monitoring cases. The logic of the neural network was developed through extensive in-vehicle training with thousands of realistic occupant size and position scenarios. Although the optical occupant position sensor can be used in conjunction with other technologies (such as weight sensing, seat belt sensing, crash severity sensing, etc.), it is a stand-alone system meeting the requirements of FMVSS-208. This device will be discussed below.

3.2 Location of the Transducers

Any of the transducers discussed herein such as an active pixel or other camera can be arranged in various locations in the vehicle including in a headliner, roof, ceiling, rear view mirror assembly, an A-pillar, a B-pillar and a C-pillar or a side wall or even a door in the case of a cargo container or truck trailer. Images of the front seat area or the rear seat area can be obtained by proper placement and orientation of the transducers such as cameras. The rear view mirror assembly can be a good location for a camera, particularly if it is attached to the portion of the mirror support that does not move when the occupant is adjusting the mirror. Cameras at this location can get a good view of the driver, passenger as well as the environment surrounding the vehicle and particularly in the front of the vehicle. It is an ideal location for automatic dimming headlight cameras.

3.3 Color Cameras—Multispectral Imaging

All occupant sensing systems, except those of the current assignee, developed to date as reported in the patent and non-patent literature have been generally based on a single frequency. As discussed herein, the use of multiple frequencies with ultrasound makes it possible to change a static system into a dynamic system allowing the occupant to be tracked during pre-crash braking, for example. Multispectral imaging can also provide advantages for camera or other optical-based systems. The color of the skin of an occupant is a reliable measure of the presence of an occupant and also renders the segmentation of the image to be more easily accomplished. Thus, the face can be more easily separated from the rest of the image simplifying the determination of the location of the eyes of the driver, for example. This is particularly true for various frequencies of passive and active infrared. Also, as discussed below, life forms react to radiation of different frequencies differently than non-life forms again making the determination of the presence of a life form easier. Finally, there is just considerably more information in a color or multispectral image than in a monochromic image. This additional information improves the accuracy of the identification and tracking process and thus of the system. In many cases, this accuracy improvement is so small that the added cost is not justified but as costs of electronics and cameras continue to drop this equation is changing and it is expected that multispectral imaging will prevail.

Illumination for nighttime is frequently done using infrared. When multispectral imaging is used the designer has the choice of reverting to IR only for night time or using a multispectral LED and a very sensitive camera so that the flickering light does not annoy the driver. Alternately, a sensitive camera along with a continuous low level of illumination can be used. Of course, multispectral imaging does not require that the visible part of the spectrum be used. Ultraviolet, X-rays and many other frequencies in the infrared part of the spectrum are available. Life forms, particularly humans, exhibit particularly interesting and identifiable reactions (reflection, absorption, scattering, transmission, emission) to frequencies in other parts of the electromagnetic spectrum (see for example the book *Alien Vision* referenced above) as discussed elsewhere herein.

3.4 High Dynamic Range Cameras

An active pixel camera is a special camera which has the ability to adjust the sensitivity of each pixel of the camera similar to the manner in which an iris adjusts the sensitivity of all of the pixels together of a camera. Thus, the active pixel camera automatically adjusts to the incident light on a pixel-by-pixel basis. An active pixel camera differs from an active infrared sensor in that an active infrared sensor, such as of the type envisioned by Mattes et al. (discussed above), is generally a single pixel sensor that measures the reflection of infrared light from an object. In some cases, as in the HDRC camera, the output of each pixel is a logarithm of the incident light thus giving a high dynamic range to the camera. This is similar to the technique used to suppress the effects of thermal gradient distortion of ultrasonic signals as described in the above cross-referenced patents. Thus, if the incident radiation changes in magnitude by 1,000,000, for example, the output of the pixel may change by a factor of only 6.

A dynamic pixel camera is a camera having a plurality of pixels and which provides the ability to pick and choose which pixels should be observed, as long as they are contiguous.

An HDRC camera is a type of active pixel camera where the dynamic range of each pixel is considerably broader. An active pixel camera manufactured by the Photobit Corporation has a dynamic range of 70 db while an IMS Chips camera, an HDRC camera manufactured by another manufacturer, has a dynamic range of 120 db. Thus, the HDRC camera has a 100,000 times greater range of light sensitivity than the Photobit camera.

The accuracy of the optical occupant sensor is dependent upon the accuracy of the camera. The dynamic range of light within a vehicle can exceed 120 decibels. When a car is driving at night, for example, very little light is available whereas when driving in a bright sunlight, especially in a convertible, the light intensity can overwhelm many cameras. Additionally, the camera must be able to adjust rapidly to changes in light caused by, for example, the emergence of the vehicle from tunnel, or passing by other obstructions such as trees, buildings, other vehicles, etc. which temporarily block the sun and can cause a strobing effect at frequencies approaching 1 kHz.

As mentioned, the IMS HDRC technology provides a 120 dB dynamic intensity response at each pixel in a monochromatic mode. The technology has a 1 million to one dynamic range at each pixel. This prevents blooming, saturation and flaring normally associated with CMOS and CCD camera technology. This solves a problem that will be encountered in an automobile when going from a dark tunnel into bright sunlight. Such a range can even exceed the 120 dB intensity.

There is also significant infrared radiation from bright sunlight and from incandescent lights within the vehicle. Such situations may even exceed the dynamic range of the HDRC camera and additional filtering may be required. Changing the bias on the receiver array, the use of a mechanical iris, or of electrochromic glass or liquid crystal, or a Kerr or Pockel cell can provide this filtering on a global basis but not at a pixel level. Filtering can also be used with CCD arrays, but the amount of filtering required is substantially greater than for the HDRC camera. A notch filter can be used to block significant radiation from the sun, for example. This notch filter can be made as a part of the lens through the placement of various coatings onto the lens surface.

Liquid crystals operate rapidly and give as much as a dynamic range of 10,000 to 1 but may create a pixel interference affect. Electrochromic glass operates more slowly but more uniformly thereby eliminating the pixel affect. The pixel effect arises whenever there is one pixel device in front of another. This results in various aliasing, Moiré patterns and other ambiguities. One way of avoiding this is to blur the image. Another solution is to use a large number of pixels and combine groups of pixels to form one pixel of information and thereby to blur the edges to eliminate some of the problems with aliasing and Moiré patterns. An alternate to the liquid crystal device is the suspended particle device or SPD as discussed elsewhere herein. Other alternatives include spatial light monitors such as Pockel or Kerr cells also discussed elsewhere herein.

One straightforward approach is the use of a mechanical iris. Standard cameras already have response times of several tens of milliseconds range. They will switch, for example, in a few frames on a typical video camera (1 frame=0.033 seconds). This is sufficiently fast for categorization but much too slow for dynamic out-of-position tracking.

An important feature of the IMS Chips HDRC camera is that the full dynamic range is available at each pixel. Thus, if there are significant variations in the intensity of light within the vehicle, and thereby from pixel to pixel, such as would happen when sunlight streams and through a window, the camera can automatically adjust and provide the optimum exposure on a pixel by pixel basis. The use of the camera having this characteristic is beneficial to the invention described herein and contributes significantly to system accuracy. CCDs have a rather limited dynamic range due to their inherent linear response and consequently cannot come close to matching the performance of human eyes. A key advantage of the IMS Chips HDRC camera is its logarithmic response which comes closest to matching that of the human eye. The IMS HDRC camera is also useful in monitoring cargo containers and truck trailers where very little light is available when the door is shut. A small IR LED then can provide the necessary light at a low power consumption which is consistent with a system that may have to operate for long periods on battery power.

Another approach, which is applicable in some vehicles at some times, is to record an image without the infrared illumination and then a second image with the infrared illumination and to then subtract the first image from the second image. In this manner, illumination caused by natural sources such as sunlight or even from light bulbs within the vehicle can be subtracted out. Using the logarithmic pixel system of the IMS Chips camera, care must be taken to include the logarithmic effect during the subtraction process. For some cases, natural illumination such as from the sun, light bulbs within the vehicle, or radiation emitted by the object itself can be used alone without the addition of a special source of infrared illumination as discussed below.

Other imaging systems such as CCD arrays can also of course be used with at least one of the inventions disclosed herein. However, the techniques will be different since the camera is very likely to saturate when bright light is present and to require the full resolution capability, when the light is dim, of the camera iris and shutter speed settings to provide some compensation. Generally, when practicing at least one of the inventions disclosed herein, the interior of the passenger compartment will be illuminated with infrared radiation.

One novel solution is to form the image in memory by adding up a sequence of very short exposures. The number stored in memory would be the sum of the exposures on a pixel by pixel basis and the problem of saturation disappears since the memory location can be made as floating point numbers. This then permits the maximum dynamic range but requires that the information from all of the pixels be removed at high speed. In some cases, each pixel would then be zeroed while in others, the charge can be left on the pixel since when saturation occurs the relevant information will already have been obtained.

There are other bright sources of infrared that must be accounted for. These include the sun and any light bulbs that may be present inside the vehicle. This lack of a high dynamic range inherent with the CCD technology requires the use of an iris, fast electronic shutter, liquid crystal, Kerr or Pockel cell, or electrochromic glass filter to be placed between the camera and the scene. Even with these filters however, some saturation can take place with CCD cameras under bright sun or incandescent lamp exposure. This saturation reduces the accuracy of the image and therefore the accuracy of the system. In particular, the training regimen that must be practiced with CCD cameras is more severe since all of the saturation cases must be considered since the camera may be unable to appropriately adjust. Thus, although CCD cameras can be used, HDRC logarithmic cameras such as manufactured by IMS Chips are preferred. They not only provide a significantly more accurate image but also significantly reduce the amount of training effort and associated data collection that must be undertaken during the development of the neural network algorithm or other computational intelligence system. In some applications, it is possible to use other more deterministic image processing or pattern recognition systems than neural networks.

Another very important feature of the HDRC camera from IMS Chips is that the shutter time is constant at less than 100 ns irrespective of brightness of the scene. The pixel data arrives at constant rate synchronous with the internal imager clock. Random access to each pixel facilitates high-speed intelligent access to any sub-frame (block) size or sub-sampling ratio and a trade-off of frame speed and frame size therefore results. For example, a scene with 128 K pixels per frame can be taken at 120 frames per second, or about 8 milliseconds per frame, whereas a sub-frame can be taken in run at as high as 4000 frames per second with 4 K pixels per frame. This combination allows the maximum resolution for the identification and classification part of the occupant sensor problem while permitting a concentration on those particular pixels which track the head or chest, as described above, for dynamic out-of-position tracking. In fact, the random access features of these cameras can be used to track multiple parts of the image simultaneously while ignoring the majority of the image, and do so at very high speed. For example, the head can be tracked simultaneously with the chest by defining two separate sub-frames that need not be connected. This random access pixel capability, therefore, is optimally suited for recognizing and tracking vehicle occupants. It is also suited for monitoring the environment outside of the vehicle for the purposes of blind spot detection, collision avoidance and anticipatory sensing. Photobit Corporation of 135 North Los Robles Ave., Suite 700, Pasadena, Calif. 91101 manufactures a camera with some characteristics similar to the IMS Chips camera. Other competitive cameras can be expected to appear on the market.

Photobit refers to their Active Pixel Technology as APS. According to Photobit, in the APS, both the photo detector and readout amplifier are part of each pixel. This allows the integrated charge to be converted into a voltage in the pixel that can then be read out over X-Y wires instead of using a charge domain shift register as in CCDs. This column and row addressability (similar to common DRAM) allows for window of interest readout (windowing) which can be utilized for on chip electronic pan/tilt and zoom. Windowing provides added flexibility in applications, such as disclosed herein, needing image compression, motion detection or target tracking. The APS utilizes intra-pixel amplification in conjunction with both temporal and fixed pattern noise suppression circuitry (i.e., correlated double sampling), which produces exceptional imagery in terms of wide dynamic range (~75 dB) and low noise (~15 e-rms noise floor) with low fixed pattern noise (<0.15% sat). Unlike CCDs, the APS is not prone to column streaking due to blooming pixels. This is because CCDs rely on charge domain shift registers that can leak charge to adjacent pixels when the CCD registers overflows. Thus, bright lights "bloom" and cause unwanted streaks in the image. The active pixel can drive column busses at much greater rates than passive pixel sensors and CCDs. On-chip analog-to-digital conversion (ADC) facilitates driving high speed signals off chip. In addition, digital output is less sensitive to pickup and crosstalk, facilitating computer and digital controller interfacing while increasing system robustness. A high speed APS recently developed for a custom binary output application produced over 8,000 frames per second, at a resolution of 128×128 pixels. It is possible to extend this design to a 1024×1024 array size and achieve greater than 1000 frames per second for machine vision. All of these features can be important to many applications of at least one of the inventions disclosed herein.

These advanced cameras, as represented by the HDRC and the APS cameras, now make it possible to more accurately monitor the environment in the vicinity of the vehicle. Previously, the large dynamic range of environmental light has either blinded the cameras when exposed to bright light or else made them unable to record images when the light level was low. Even the HDRC camera with its 120 dB dynamic range may be marginally sufficient to handle the fluctuations in environmental light that occur. Thus, the addition of a electrochromic, liquid crystal, SPD, spatial light monitors or other similar filter may be necessary. This is particularly true for cameras such as the Photobit APS camera with its 75 dB dynamic range.

At about 120 frames per second, these cameras are adequate for cases where the relative velocity between vehicles is low. There are many cases, however, where this is not the case and a much higher monitoring rate is required. This occurs for example, in collision avoidance and anticipatory sensor applications. The HDRC camera is optimally suited for handling these cases since the number of pixels that are being monitored can be controlled resulting in a frame rate as high as about 4000 frames per second with a smaller number of pixels.

Another key advantage of the HDRC camera is that it is quite sensitive to infrared radiation in the 0.8 to 1 micron wavelength range. This range is generally beyond visual range for humans permitting this camera to be used with illumination sources that are not visible to the human eye. A notch filter is frequently used with the camera to eliminate unwanted wavelengths. These cameras are available from the Institute for Microelectronics (IMS Chips), Allamndring 30a, D-70569 Stuttgart, Germany with a variety of resolutions ranging from 512 by 256 to 720 by 576 pixels and can be custom fabricated for the resolution and response time required.

One problem with high dynamic range cameras, particularly those making use of a logarithmic compression is that the edges of objects in the field of view tend to wash out and the picture loses a lot of contrast. This causes problems for edge detecting algorithms and thus reduces the accuracy of the system. There are a number of other different methods of achieving a high dynamic range without sacrificing contrast. One system by Nayar, as discussed elsewhere herein, takes a picture using adjacent pixels with different radiation blocking filers. Four such pixel types are used allowing Nayar to essentially obtain 4 separate pictures with one snap of the shutter. Software then selects which of the four pixels to use for each part of the image so that the dark areas receive one exposure and somewhat brighter areas another exposure and so on. The brightest pixel receives all of the incident light, the next brightest filters half of the light, the next brightest half again and the dullest pixel half again. Other ratios could be used as could more levels of pixels, e.g., eight instead of four. Experiments have shown that this is sufficient to permit a good picture to be taken when bright sunlight is streaming into a dark room. A key advantage of this system is that the full frame rate is available and the disadvantage is that only 25% of the pixels are in fact used to form the image.

Another system drains the charge off of the pixels as the picture is being taken and stored the integrated results in memory. TFA technology lends itself to this implementation. As long as the memory capacity is sufficient, the pixel never saturates. An additional approach is to take multiple images at different iris or shutter settings and combine them in much the same way as with the Nayar method. A still different approach is to take several pictures at a short shutter time or a small iris setting and combine the pictures in a processor or other appropriate device. In this manner, the effective dynamic range of the camera can be extended. This method may be too slow for some dynamic applications.

3.5 Fisheye Lens, Pan and Zoom

Figure 8C:
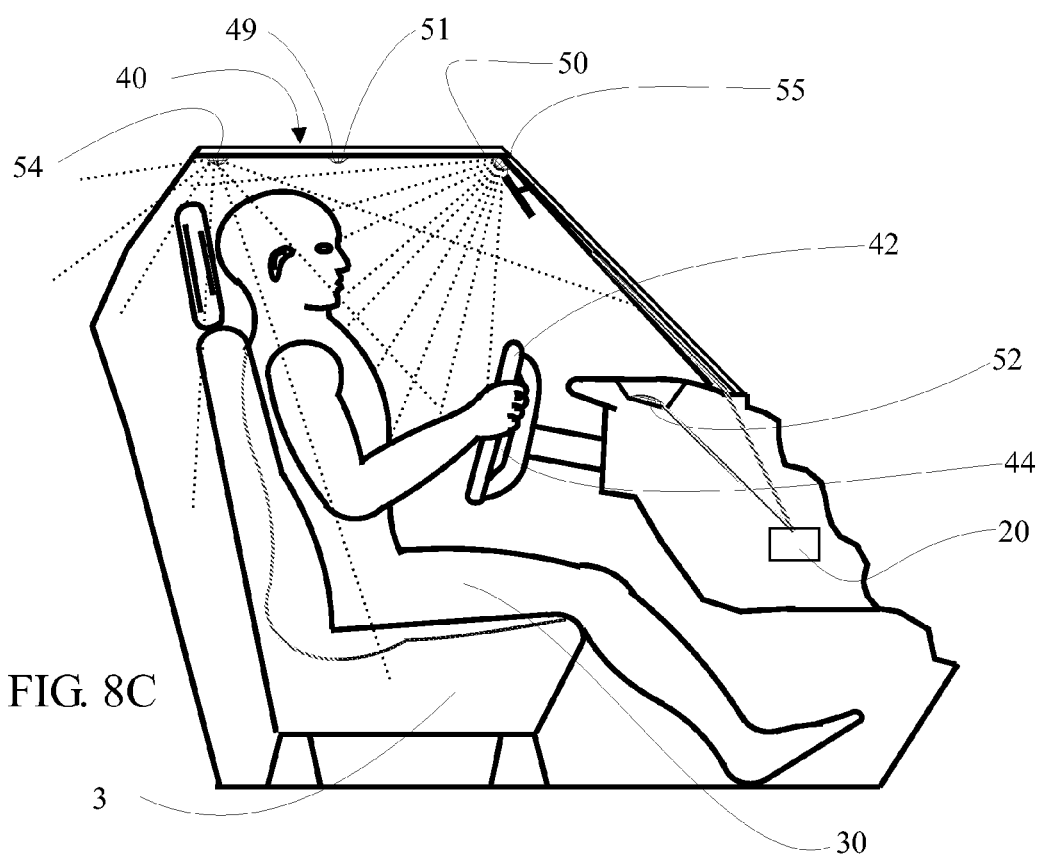
FIG. 8C is a view as in FIG. 8A illustrating the wave pattern from an optical system using an infrared light source and a CCD or CMOS array receiver where the CCD or CMOS array receiver is covered by a lens permitting a wide angle view of the contents of the passenger compartment.
Figure 8D:
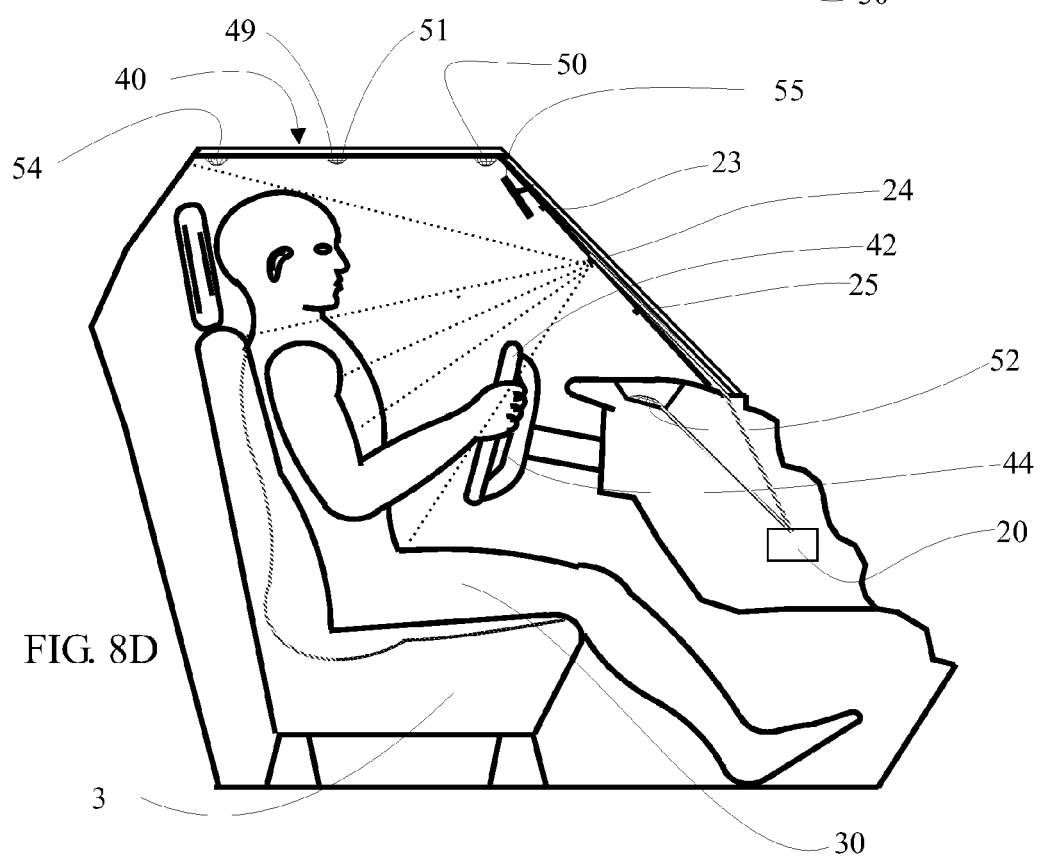
FIG. 8D is a view as in FIG. 8A illustrating the wave pattern from a pair of small CCD or CMOS array receivers and one infrared transmitter where the spacing of the CCD or CMOS arrays permits an accurate measurement of the distance to features on the occupant.
Figure 8E:
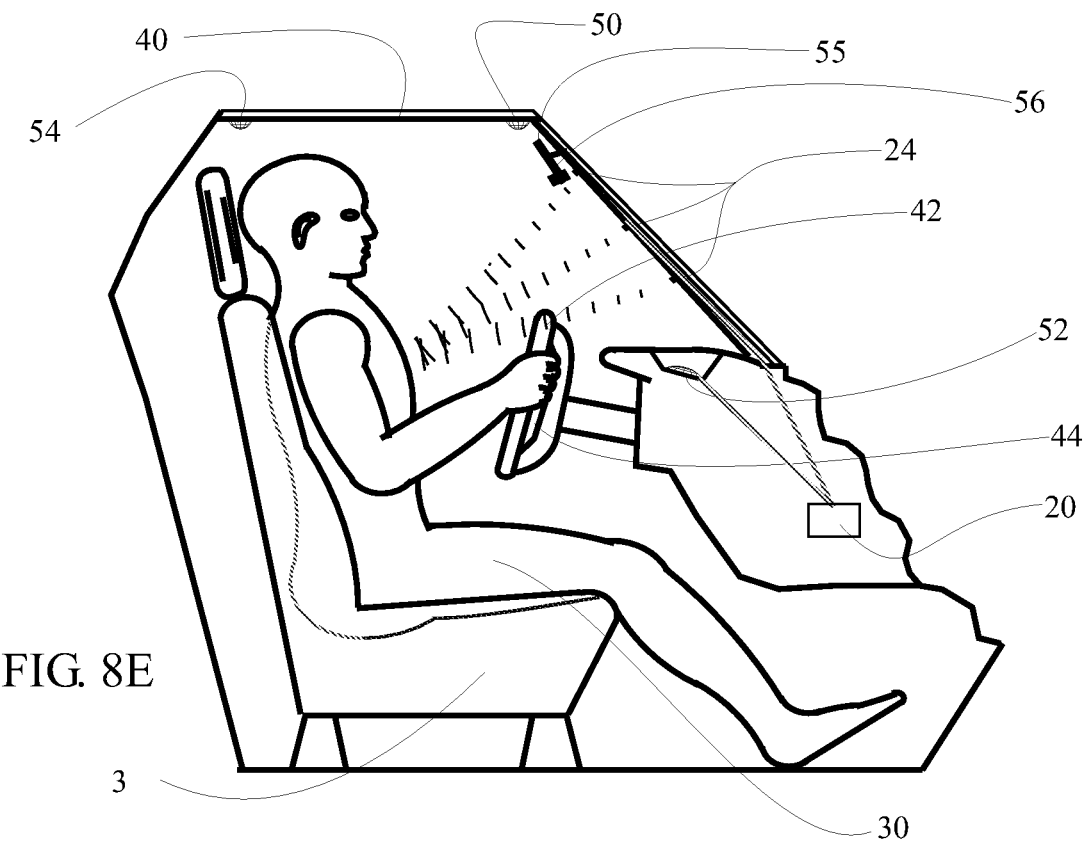
FIG. 8E is a view as in FIG. 8A illustrating the wave pattern from a set of ultrasonic transmitter/receivers where the spacing of the transducers and the phase of the signal permits an accurate focusing of the ultrasonic beam and thus the accurate measurement of a particular point on the surface of the driver.

Infrared waves are shown coming from the front and back transducer assemblies 54 and 55 in FIG. 8C. FIG. 8D illustrates two optical systems each having a source of infrared radiation and a CCD, CMOS, FPR, TFA or QWIP array receiver. The price of such arrays has dropped dramatically recently making most of them practical for interior and exterior vehicle monitoring. In this embodiment, transducers 54 and 55 are CMOS arrays having 160 pixels by 160 pixels covered by a lens. In some applications, this can create a "fisheye" effect whereby light from a wide variety of directions can be captured. One such transducer placed by the dome light or other central position in the vehicle headliner, such as the transducer designated 54, can monitor the entire vehicle interior with sufficient resolution to determine the occupancy of the vehicle, for example. Imagers such as those used herein are available from Marshall Electronics Inc. of Culver City, Calif. and others. A fisheye lens is " . . . a wide-angle photographic lens that covers an angle of about 180°, producing a circular image with exaggerated foreshortening in the center and increasing distortion toward the periphery". (*The American Heritage Dictionary of the English Language, Third Edition,* 1992 by Houghton Mifflin Company). This distortion of a fisheye lens can be substantially changed by modifying the shape of the lens to permit particular portions of the interior passenger compartment to be observed. Also, in many cases the full 180° is not desirable and a lens which captures a smaller angle may be used.

Although primarily spherical lenses are illustrated herein, it is understood that the particular lens design will depend on the location in the vehicle and the purpose of the particular receiver. A fisheye lens can be particularly useful for some truck trailer, cargo container, railroad car and automobile trunk monitoring cases.

A camera that provides for pan and zoom using a fisheye lens is described in U.S. Pat. No. 5,185,667 and is applicable to at least one of the inventions disclosed herein. Here, however, it is usually not necessary to remove the distortion since the image will in general not be viewed by a human but will be analyzed by software. One exception is when the image is sent to emergency services via telematics. In that case, the distortion removal is probably best done at the EMS site.

Although a fisheye camera has primarily been discussed above, other types of distorting lenses or mirrors can be used to accomplished particular objectives. A distorting lens or mirror, for example, can have the effect of dividing the image into several sub-pictures so that the available pixels can cover more than one area of a vehicle interior or exterior. Alternately, the volume in close proximity to an airbag, for example, can be allocated a more dense array of pixels so that measurements of the location of an occupant relative to the airbag can be more accurately achieved. Numerous other objectives can now be envisioned which can now be accomplished with a reduction in the number of cameras or imagers through either distortion or segmenting of the optical field.

Another problem associated with lens is cleanliness. In general, the optical systems of these inventions comprise methods to test for the visibility through the lens and issue a warning when that visibility begins to deteriorate. Many methods exist for accomplishing this feat including the taking of an image when the vehicle is empty and not moving and at night. Using neural networks, for example, or some other comparison technique, a comparison of the illumination reaching the imager can be compared with what is normal. A network can be trained on empty seats, for example, in all possible positions and compared with the new image. Or, those pixels that correspond to any movable surface in the vehicle can be removed from the image and a brightness test on the remaining pixels used to determine lens cleanliness.

Once a lens has been determined to be dirty, then either a warning light can be set telling the operator to visit the dealer or a method of cleaning the lens automatically invoked. One such method for night vision systems is disclosed in WO0234572. Another, which is one on the inventions disclosed herein, is to cover the lens with a thin film. This film may be ultrasonically excited thereby greatly minimizing the tendency for it to get dirty and/or the film can be part of a roll of film that is advanced when the diagnostic system detects a dirty lens thereby placing a new clean surface in front of the imager. The film roll can be sized such that under normal operation, the roll would last some period such as 20 years. A simple, powerless mechanism can be designed that will gradually advance the film across the lens over a period of 10 to 20 years using the normal daily thermal cycling to cause relative expansion and contraction of materials with differing thermal expansion coefficients.

4. 3D Cameras

Optical sensors can be used to obtain a three-dimensional measurement of the object through a variety of methods that use time of flight, modulated light and phase measurement, quantity of light received within a gated window, structured light and triangulation etc. Some of these techniques are discussed in the current assignee's U.S. Pat. No. 6,393,133 and below.

4.1 Stereo

One method of obtaining a three-dimensional image is illustrated in FIG. 8D wherein transducer 24 is an infrared source having a wide transmission angle such that the entire contents of the front driver's seat is illuminated. Receiving imager transducers 23 and 25 are shown spaced apart so that a stereographic analysis can be made by the control circuitry 20. This circuitry 20 contains a microprocessor with appropriate pattern recognition algorithms along with other circuitry as described above. In this case, the desired feature to be located is first selected from one of the two returned images from either imaging transducer 23 or 25. The software then determines the location of the same feature, through correlation analysis or other methods, on the other image and thereby, through analysis familiar to those skilled in the art, determines the distance of the feature from the transducers by triangulation.

As the distance between the two or more imagers used in the stereo construction increases, a better and better model of the object being imaged can be obtained since more of the object is observable. On the other hand, it becomes increasingly difficult to pair up points that occur in both images. Given sufficient computational resources, this not a difficult problem but with limited resources and the requirement to track a moving occupant during a crash, for example, the problem becomes more difficult. One method to ease the problem is to project onto the occupant, a structured light that permits a recognizable pattern to be observed and matched up in both images. The source of this projection should lie midway between the two imagers. By this method, a rapid correspondence between the images can be obtained.

On the other hand, if a source of structured light is available at a different location than the imager, then a simpler three-dimensional image can be obtained using a single imager. Furthermore, the model of the occupant really only needs to be made once during the classification phase of the process and there is usually sufficient time to accomplish that model with ordinary computational power. Once the model has been obtained, then only a few points need be tracked by either one or both of the cameras.

Another method exists whereby the displacement between two images from two cameras is estimated using a correlator. Such a fast correlator has been developed by Professor Lukin of Kyiv, Ukraine in conjunction with his work on noise radar. This correlator is very fast and can probably determine the distance to an occupant at a rate sufficient for tracking purposes.

4.2 Distance by Focusing

In the above-described imaging systems, a lens within a receptor captures the reflected infrared light from the head or chest of the driver, or other object to be monitored, and displays it onto an imaging device (CCD, CMOS, FPA, TFA, QWIP or equivalent) array. For the discussion of FIGS. 5 and 13-17 at least, either CCD or the word imager will be used to include all devices which are capable of converting light frequencies, including infrared, into electrical signals. In one method of obtaining depth from focus, the CCD is scanned and the focal point of the lens is altered, under control of an appropriate circuit, until the sharpest image of the driver's head or chest, or other object, results and the distance is then known from the focusing circuitry. This trial and error approach may require the taking of several images and thus may be time consuming and perhaps too slow for occupant tracking during pre-crash braking.

The time and precision of this measurement is enhanced if two receptors (e.g., lenses) are used which can either project images onto a single CCD or onto separate CCDs. In the first case, one of the lenses could be moved to bring the two images into coincidence while in the other case, the displacement of the images needed for coincidence would be determined mathematically. Other systems could be used to keep track of the different images such as the use of filters creating different infrared frequencies for the different receptors and again using the same CCD array. In addition to greater precision in determining the location of the occupant, the separation of the two receptors can also be used to minimize the effects of hands, arms or other extremities which might be very close to the airbag. In this case, where the receptors are mounted high on the dashboard on either side of the steering wheel, an arm, for example, would show up as a thin object but much closer to the airbag than the larger body parts and, therefore, easily distinguished and eliminated, permitting the sensors to determine the distance to the occupant's chest. This is one example of the use of pattern recognition.

An alternate method is to use a lens with a short focal length. In this case, the lens is mechanically focused, e.g., automatically, directly or indirectly, by the control circuitry 20, to determine the clearest image and thereby obtain the distance to the object. This is similar to certain camera auto-focusing systems such as one manufactured by Fuji of Japan. Again this is a time consuming method. Other methods can be used as described in the patents and patent applications referenced above.

Instead of focusing the lens, the lens could be moved relative to the array to thereby adjust the image on the array. Instead of moving the lens, the array could be moved to achieve the proper focus. In addition, it is also conceivable that software could be used to focus the image without moving the lens or the array especially if at least two images are available.

An alternative is to use the focusing systems described in patents U.S. Pat. No. 5,193,124 and U.S. Pat. No. 5,003,166. These systems are quite efficient requiring only two images with different camera settings. Thus, if there is sufficient time to acquire an image, change the camera settings and acquire a second image, this system is fine and can be used with the inventions disclosed herein. Once the position of the occupant has been determined for one point in time, then the process may not have to be repeated as a measurement of the size of a part of an occupant can serve as a measure of its relative location compared to the previous image from which the range was obtained. Thus, other than the requirement of a somewhat more expensive imager, the system of the '124 and '166 patents is fine. The accuracy of the range is perhaps limited to a few centimeters depending on the quality of the imager used. Also, if multiple ranges to multiple objects are required, then the process becomes a bit more complicated.

4.3 Ranging

The scanning portion of a pulse laser radar device can be accomplished using rotating mirrors, vibrating mirrors, or preferably, a solid state system, for example one utilizing $TeO_2$ as an optical diffraction crystal with lithium niobate crystals driven by ultrasound (although other solid state systems not necessarily using $TeO_2$ and lithium niobate crystals could also be used) which is an example of an acoustic optical scanner. An alternate method is to use a micromachined mirror, which is supported at its center and caused to deflect by miniature coils or equivalent MEMS device. Such a device has been used to provide two-dimensional scanning to a laser. This has the advantage over the $TeO_2$-lithium niobate technology in that it is inherently smaller and lower cost and provides two-dimensional scanning capability in one small device. The maximum angular deflection that can be achieved with this process is on the order of about 10 degrees. Thus, a diverging lens or equivalent will be needed for the scanning system.

Another technique to multiply the scanning angle is to use multiple reflections off of angled mirror surfaces. A tubular structure can be constructed to permit multiple interior reflections and thus a multiplying effect on the scan angle.

An alternate method of obtaining three-dimensional information from a scanning laser system is to use multiple arrays to replace the single arrays used in FIG. 8A. In the case, the arrays are displaced from each other and, through triangulation, the location of the reflection from the illumination by a laser beam of a point on the object can be determined in a manner that is understood by those skilled in the art. Alternately, a single array can be used with the scanner displaced from the array.

A new class of laser range finders has particular application here. This product, as manufactured by Power Spectra, Inc. of Sunnyvale, Calif., is a GaAs pulsed laser device which can measure up to 30 meters with an accuracy of <2 cm and a resolution of <1 cm. This system can be implemented in combination with transducer 24 and one of the receiving transducers 23 or 25 may thereby be eliminated. Once a particular feature of an occupying item of the passenger compartment has been located, this device is used in conjunction with an appropriate aiming mechanism to direct the laser beam to that particular feature. The distance to that feature can then be known to within 2 cm and with calibration even more accurately. In addition to measurements within the passenger compartment, this device has particular applicability in anticipatory sensing and blind spot monitoring applications exterior to the vehicle. An alternate technology using range gating to measure the time of flight of electromagnetic pulses with even better resolution can be developed based on the teaching of the McEwan patents listed above.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 17. This system was designed for automobile occupant sensing and a similar system having any reasonable range up to and exceeding 100 meters can be designed on the same principles for other monitoring applications. The operation is as follows. A 48 MHz signal, f1, is generated by a crystal oscillator 81 and fed into a frequency tripler 82 which produces an output signal at 144 MHz. The 144 MHz signal is then fed into an infrared diode driver 83 which drives the infrared diode 84 causing it to emit infrared light modulated at 144 MHz and a reference phase angle of zero degrees. The infrared diode 84 is directed at the vehicle occupant. A second signal f2 having a frequency of 48.05 MHz, which is slightly greater than f1, is similarly fed from a crystal oscillator 85 into a frequency tripler 86 to create a frequency of 144.15 MHz. This signal is then fed into a mixer 87 which combines it with the 144 MHz signal from frequency tripler 82. The combined signal from the mixer 87 is then fed to filter 88 which removes all signals except for the difference, or beat frequency, between 3 times f1 and 3 times f2, of 150 kHz. The infrared signal which is reflected from the occupant is received by receiver 89 and fed into pre-amplifier 91, a resistor 90 to bias being coupled to the connection between the receiver 89 and the pre-amplifier 91. This signal has the same modulation frequency, 144 MHz, as the transmitted signal but now is out of phase with the transmitted signal by an angle x due to the path that the signal took from the transmitter to the occupant and back to the receiver.

The output from pre-amplifier 91 is fed to a second mixer 92 along with the 144.15 MHz signal from the frequency tripler 86. The output from mixer 92 is then amplified by an automatic gain amplifier 93 and fed into filter 94. The filter 94 eliminates all frequencies except for the 150 kHz difference, or beat, frequency, in a similar manner as was done by filter 88. The resulting 150 kHz frequency, however, now has a phase angle x relative to the signal from filter 88. Both 150 kHz signals are now fed into a phase detector 95 which determines the magnitude of the phase angle x. It can be shown mathematically that, with the above values, the distance from the transmitting diode to the occupant is x/345.6 where x is measured in degrees and the distance in meters. The velocity can also be obtained using the distance measurement as represented by 96. An alternate method of obtaining distance information, as discussed above, is to use the teachings of the McEwan patents discussed elsewhere herein.

As reported above, cameras can be used for obtaining three-dimensional images by modulation of the illumination as taught in U.S. Pat. No. 5,162,861. The use of a ranging device for occupant sensing is believed to have been first disclosed by the current assignee in above-referenced patents. More recent attempts include the PMD camera as disclosed in PCT application WO09810255 and similar concepts disclosed in U.S. Pat. No. 6,057,909 and U.S. Pat. No. 6,100, 517.

Note that although the embodiment in FIG. 17 uses near infrared, it is possible to use other frequencies of energy without deviating from the scope of the invention. In particular, there are advantages in using the short wave (SWIR), medium wave (MWIR) and long wave (LWIR) portions of the infrared spectrum as the interact in different and interesting ways with living occupants as described elsewhere herein and in the book *Alien Vision* referenced above.

4.4 Pockel or Kerr Cell for Determining Range

Pockel and Kerr cells are well known in optical laboratories. They act as very fast shutters (up to 10 billion cycles per second) and as such can be used to range-gate the reflections based on distance giving a range resolution of up to 3 cm without the use of phase techniques to divide the interval into parts or sub millimeter resolution using phasing techniques. Thus, through multiple exposures the range to all reflecting surfaces inside and outside of the vehicle can be determined to any appropriate degree of accuracy. The illumination is transmitted, the camera shutter opened and the cell allows only that reflected light to enter the camera that arrived at the cell a precise time range after the illumination was initiated.

These cells are part of a class of devices called spatial light modulators (SLM). One novel application of an SLM is reported in U.S. Pat. No. 5,162,861. In this case, an SLM is used to modulate the light returning from a transmitted laser pulse that is scattered from a target. By comparing the intensities of the modulated and unmodulated images, the distance to the target can be ascertained. Using a SLM in another manner, the light valve can be kept closed for all ranges except the ones of interest. Thus, by changing the open time of the SLM, only returns from certain distances are permitted to pass through to the imager. By selective changing the opened time, the range to the target can be "range-gated" and thereby accurately determined. Thus, the outgoing light need not be modulated and a scanner is not necessary unless there is a need to overcome the power of the sun reflecting off of the object of interest. This form of range-gating can of course be used for either external or internal applications.

4.5 Thin Film on ASIC (TFA)

Since the concepts of using cameras for monitoring the passenger compartment of a vehicle and measuring distance to a vehicle occupant based on the time of flight were first disclosed in the commonly assigned above-referenced patents, several improvements have been reported in the literature including the thin film on ASIC (TFA) (references 6-11) and photonic mixing device (PMD) (reference 12) camera technologies. Both of these technologies and combinations thereof are good examples of devices that can be used in practicing the inventions herein and those in above-referenced patents and applications for monitoring both inside and exterior to a vehicle.

An improvement to these technologies is to use noise or pseudo noise modulation for a PMD-like device to permit more accurate distance to object determination especially for exterior to the vehicle monitoring through correlation of the generated and reflected modulation sequences. This has the further advantage that systems from different vehicles will not interfere with each other.

The TFA is an example of a high dynamic range camera (HDRC) the use of which for interior monitoring was first disclosed in U.S. Pat. No. 6,393,133. Since there is direct connection between each pixel and an associated electronic circuit, the potential exists for range gating the sensor to isolate objects between certain limits thus simplifying the identification process by eliminating reflections from objects that are closer or further away than the object of interest. A further advantage of the TFA is that it can be doped to improve its sensitivity to infrared and it also can be fabricated as a three-color camera system.

Another novel HDRC camera is disclosed by Nayar (reference 13), as discussed above, and involves varying the sensitivity of pixels in the imager. Each of four adjacent pixels has a different exposure sensitivity and an algorithm is presented that combines the four exposures in a manner that loses little resolution but provides a high dynamic range picture. This particularly simple system is a preferred approach to handling the dynamic range problem in several monitoring applications of at least one of the inventions disclosed herein.

Figure 52:
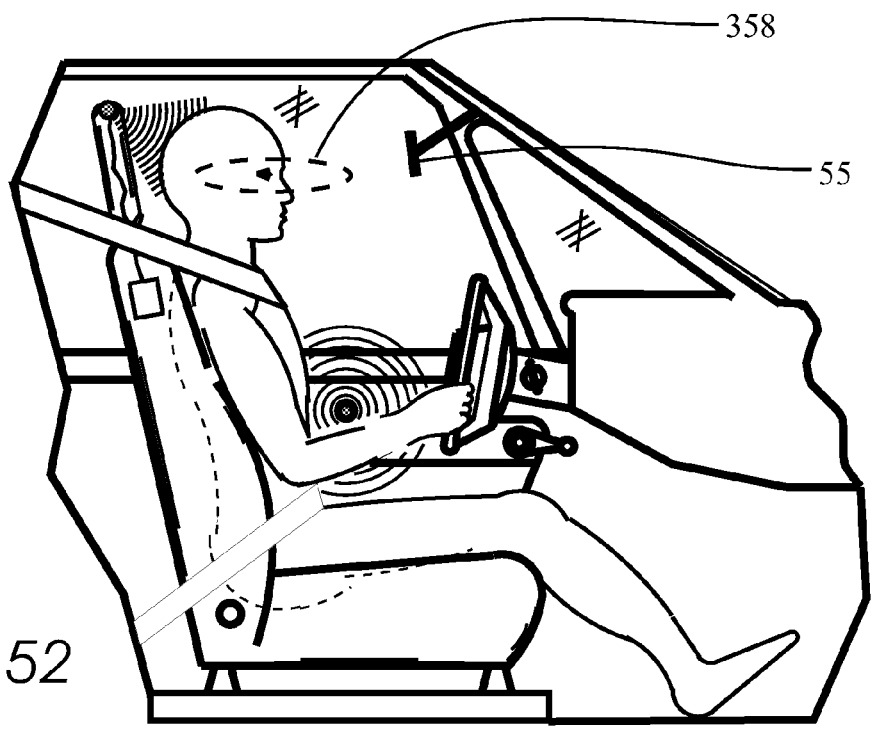
FIG. 52 is a view similar to FIG. 48 showing the occupant's eyes and the seat adjusted to place the eyes at a particular vertical position for proper viewing through the windshield and rear view mirror.
Figure 53:
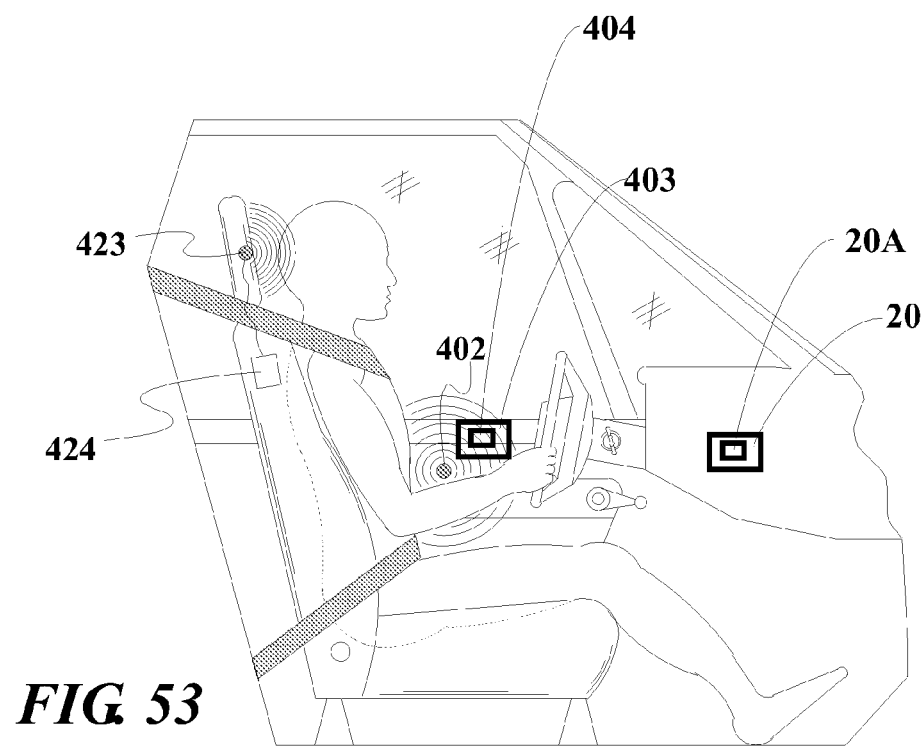
FIG. 53 is a side view with parts cutaway and removed of a vehicle showing the passenger compartment containing a driver and a preferred mounting location for an occupant position sensor for use in side impacts and also of a rear of occupant's head locator for use with a headrest adjustment system to reduce whiplash injuries in rear impact crashes.

A great deal of development effort has gone into automatic camera focusing systems such as described in the Scientific American Article "Working Knowledge: Focusing in a Flash" (reference 14). The technology is now to the point that it can be taught to focus on a particular object, such as the head or chest of an occupant, or other object, and measure the distance to the object to within approximately 1 inch. If this technology is coupled with the Nayar camera, a very low cost semi 3D high dynamic range camera or imager results that is sufficiently accurate for locating an occupant in the passenger compartment or an object in another container. If this technology is coupled with an eye locator and the distance to the eyes of the occupant are determined, then a single camera is all that is required for either the driver or passenger. Such a system would display a fault warning when it is unable to find the occupant's eyes. Such a system is illustrated in FIGS. 52 and 53.

As discussed above, thin film on ASIC technology, as described in Lake, D. W. "TFA Technology: The Coming Revolution in Photography", Advanced Imaging Magazine, April, 2002 (www.advancedimagingmag.com) shows promise of being the next generation of imager for automotive and other vehicle monitoring applications. The anticipated specifications for this technology, as reported in the Lake article, are:

| Dynamic Range | 120 db |
|---|---|
| Sensitivity | 0.01 lux |

| | |
|---|---|
| Anti-blooming | 1,000,000:1 |
| Pixel Density | 3,200,000 |
| Pixel Size | 3.5 um |
| Frame Rate | 30 fps |
| DC Voltage | 1.8 v |
| Compression | 500 to 1 |

All of these specifications, except for the frame rate, are attractive for occupant sensing. It is believed that the frame rate can be improved with subsequent generations of the technology. Some advantages of this technology for occupant sensing include the possibility of obtaining a three-dimensional image by varying the pixel on time in relation to a modulated illumination in a simpler manner than that proposed with the PMD imager or with a Pockel or Kerr cell. The ability to build the entire package on one chip will reduce the cost of this imager compared with two or more chips required by current technology. Other technical papers on TFA are referenced above.

TFA thus appears to be a major breakthrough when used in the interior and exterior imaging systems. Its use in these applications falls within the teachings of the inventions disclosed herein.

5. Glare Control

The headlights of oncoming vehicles frequently make it difficult for the driver of a vehicle to see the road and safely operate the vehicle. This is a significant cause of accidents and much discomfort. The problem is especially severe during bad weather where rain can cause multiple reflections. Opaque visors are now used to partially solve this problem but they do so by completely blocking the view through a large portion of the window and therefore cannot be used to cover the entire windshield. Similar problems happen when the sun is setting or rising and the driver is operating the vehicle in the direction of the sun. U.S. Pat. No. 4,874,938 attempts to solve this problem through the use of a motorized visor but although it can block some glare sources, it also blocks a substantial portion of the field of view.

The vehicle interior monitoring system disclosed herein can contribute to the solution of this problem by determining the position of the driver's eyes. If separate sensors are used to sense the direction of the light from the oncoming vehicle or the sun, and through the use of electrochromic glass, a liquid crystal device, suspended particle device glass (SPD) or other appropriate technology, a portion of the windshield, or special visor, can be darkened to impose a filter between the eyes of the driver and the light source. Electrochromic glass is a material where the transparency of the glass can be changed through the application of an electric current. The term "liquid crystal" as used herein will be used to represent the class of all such materials where the optical transmissibility can be varied electrically or electronically. Electrochromic products are available from Gentex of Zeeland, Mich., and Donnelly of Holland, Mich. Other systems for selectively imposing a filter between the eyes of an occupant and the light source are currently under development.

By dividing the windshield into a controlled grid or matrix of contiguous areas and through feeding the current into the windshield from orthogonal directions, selective portions of the windshield can be darkened as desired. Other systems for selectively imposing a filter between the eyes of an occupant and the light source are currently under development. One example is to place a transparent sun visor type device between the windshield and the driver to selectively darken portions of the visor as described above for the windshield.

5.1 Windshield

FIG. 37 illustrates how such a system operates for the windshield. A sensor 135 located on vehicle 136 determines the direction of the light 138 from the headlights of oncoming vehicle 137. Sensor 135 is comprised of a lens and a charge-coupled device (CCD), CMOS or similar device, with appropriate software or electronic circuitry that determines which elements of the CCD are being most brightly illuminated. An algorithm stored in processor 20 then calculates the direction of the light from the oncoming headlights based on the information from the CCD, or CMOS device. Usually two systems 135 are required to fix the location of the offending light. Transducers 6, 8 and 10 determine the probable location of the eyes of the operator 30 of vehicle 136 in a manner such as described above and below. In this case, however, the determination of the probable locus of the driver's eyes is made with an accuracy of a diameter for each eye of about 3 inches (7.5 cm). This calculation sometimes will be in error especially for ultrasonic occupant sensing systems and provision is made for the driver to make an adjustment to correct for this error as described below.

Figure 37A:
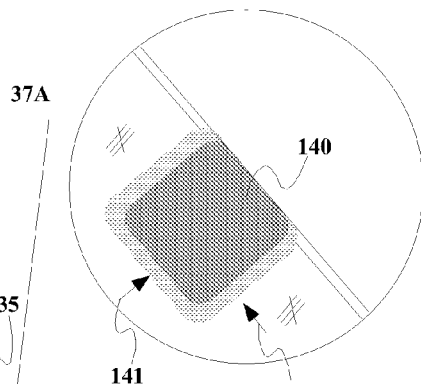
FIG. 37A is an enlarged view of the section 37A in FIG. 37.
Figure 37:
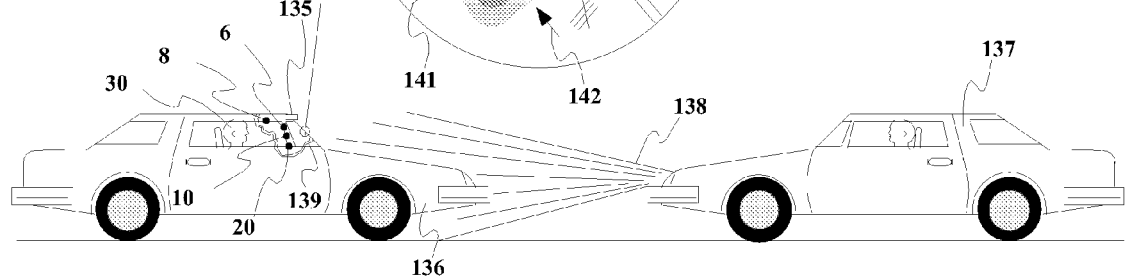
FIG. 37 is a side view with parts cutaway and removed of a subject vehicle and an oncoming vehicle, showing the headlights of the oncoming vehicle and the passenger compartment of the subject vehicle, containing detectors of the driver's eyes and detectors for the headlights of the oncoming vehicle and the selective filtering of the light of the approaching vehicle's headlights through the use of electro-chromic glass, organic or metallic semiconductor polymers or electropheric particulates (SPD) in the windshield.

The windshield 139 of vehicle 136 comprises electrochromic glass, a liquid crystal, SPD device or similar system, and is selectively darkened at area 140, FIG. 37A, due to the application of a current along perpendicular directions 141 and 142 of windshield 139. The particular portion of the windshield to be darkened is determined by processor 20. Once the direction of the light from the oncoming vehicle is known and the locations of the driver's eyes are known, it is a matter of simple trigonometry to determine which areas of the windshield matrix should be darkened to impose a filter between the headlights and the driver's eyes. This is accomplished by the processor 20. A separate control system, not shown, located on the instrument panel, steering wheel or at some other convenient location, allows the driver to select the amount of darkening accomplished by the system from no darkening to maximum darkening. In this manner, the driver can select the amount of light that is filtered to suit his particular physiology. Alternately, this process can take place automatically. The sensor 135 can either be designed to respond to a single light source or to multiple light sources to be sensed and thus multiple portions of the vehicle windshield 139 to be darkened. Unless the camera is located on the same axis at the eyes of the driver, two cameras would in general be required to determine the distance of the glare causing object from the eyes of the driver. Without this third dimension, two glare sources that are on the same axis to the camera could be on different axes to the driver, for example.

As an alternative to locating the direction of the offending light source, a camera looking at the eyes of the driver can determine when they are being subjected to glare and then impose a filter. A trial and error process or through the use of structured light created by a pattern on the windshield, determines where to create the filter to block the glare.

More efficient systems are now becoming available to permit a substantial cost reduction as well as higher speed selective darkening of the windshield for glare control. These systems permit covering the entire windshield which is difficult to achieve with LCDs. For example, such systems are made from thin sheets of plastic film, sometimes with an entrapped liquid, and can usually be sandwiched between the two pieces of glass that make up a typical windshield. The development of conductive plastics permits the addressing and thus the manipulation of pixels of a transparent film that previously was not possible. These new technologies will now be discussed.

If the objective is for glare control, then the Xerox Gyricon technology applied to windows can be appropriate. Previously, this technology has only been used to make e-paper and a modification to the technology is necessary for it to work for glare control. Gyricon is a thin layer of transparent plastic full of millions of small black and white or red and white beads, like toner particles. The beads are contained in an oil-filled cavity. When voltage is applied, the beads rotate to present a colored side to the viewer. The advantages of Gyricon are: (1) it is electrically writeable and erasable; (2) it can be re-used thousands of times; (3) it does not require backlighting or refreshing; (4) it is brighter than today's reflective displays; and, (5) it operates on low power. The changes required are to cause the colored spheres to rotate 90 degrees rather than 180 degrees and to make half of each sphere transparent so that the display switches from opaque to 50% transparent.

Another technology, SPD light control technology from Research Frontiers Inc., has been used to darken entire windows but not as a system for darkening only a portion of the glass or sun visor to impose a selective filter to block the sun or headlights of an oncoming vehicle. Although it has been used as a display for laptop computers, it has not been used as a heads-up display (HUD) replacement technology for automobile or truck windshields.

Both SPD and Gyricon technologies require that the particles be immersed in a fluid so that the particles can move. Since the properties of the fluid will be temperature sensitive, these technologies will vary somewhat in performance over the automotive temperature range. The preferred technology, therefore, is plastic electronics although in many applications either Gyricon or SPD will also be used in combination with plastic electronics, at least until the technology matures. Currently plastic electronics can only emit light and not block it. However, research is ongoing to permit it to also control the transmission of light.

The calculations of the location of the driver's eyes using acoustic systems may be in error and therefore provision must be made to correct for this error. One such system permits the driver to adjust the center of the darkened portion of the windshield to correct for such errors through a knob, mouse pad, joy stick or other input device, on the instrument panel, steering wheel, door, armrest or other convenient location. Another solution permits the driver to make the adjustment by slightly moving his head. Once a calculation as to the location of the driver's eyes has been made, that calculation is not changed even though the driver moves his head slightly. It is assumed that the driver will only move his head in a very short time period to center the darkened portion of the windshield to optimally filter the light from the oncoming vehicle. The monitoring system will detect this initial head motion and make the correction automatically for future calculations. Additionally, a camera observing the driver or other occupant can monitor the reflections of the sun or the headlights of oncoming vehicles off of the occupant's head or eyes and automatically adjust the filter in the windshield or sun visor.

5.2 Glare in Rear View Mirrors

Electrochromic glass is currently used in rear view mirrors to darken the entire mirror in response to the amount of light striking an associated sensor. This substantially reduces the ability of the driver to see objects coming from behind his vehicle. If one rear-approaching vehicle, for example, has failed to dim his lights, the mirror will be darkened to respond to the light from that vehicle making it difficult for the driver to see other vehicles that are also approaching from the rear. If the rear view mirror is selectively darkened on only those portions that cover the lights from the offending vehicle, the driver is able to see all of the light coming from the rear whether the source is bright or dim. This permits the driver to see all of the approaching vehicles not just the one with bright lights.

Such a system is illustrated in FIGS. 38, 38A and 38B wherein rear view mirror 55 is equipped with electrochromic glass, or comprises a liquid crystal or similar device, having the capability of being selectively darkened, e.g., at area 143. Associated with mirror 55 is a light sensor 144 that determines the direction of light 138 from the headlights of rear approaching vehicle 137. Again, as with the windshield, a stereo camera is used if the camera is not aligned with the eye view path. This is easier to accomplish with a mirror due to its much smaller size. In such a case, the imager could be mounted on the movable part of the mirror and could even look through the mirror from behind. In the same manner as above, transducers 6, 8 and 10 determine the location of the eyes of the driver 30. The signals from both sensor systems, 6, 8, 10 and 144, are combined in the processor 20, where a determination is made as to what portions of the mirror should be darkened, e.g., area 143. Appropriate currents are then sent to the mirror 55 in a manner similar to the windshield system described above. Again, an alternative solution is to observe a glare reflection on the face of the driver and remove the glare with a filter.

Note, the rearview mirror is also an appropriate place to display icons of the contents of the blind spot or other areas surrounding the vehicle as disclosed in U.S. Pat. No. 7,049,945.

5.3 Visor for Glare Control and HUD

FIG. 39 illustrates the interior of a passenger compartment with a rear view mirror assembly 55, a camera for viewing the eyes of the driver 56 and a large generally transparent sun visor 145. The sun visor 145 is normally largely transparent and is made from electrochromic glass, suspended particle glass, a liquid crystal device or equivalent. The camera 56 images the eyes of the driver and looks for a reflection indicating that glare is impinging on the driver's eyes. The camera system may have a source of infrared or other frequency illumination that would be momentarily activated to aid in locating the driver's eyes. Once the eyes have been located, the camera monitors the area around the eyes, or direct reflections from the eyes themselves, for an indication of glare. The camera system in this case would not know the direction from which the glare is originating; it would only know that the glare was present. The glare blocker system then can darken selected portions of the visor to attempt to block the source of glare and would use the observation of the glare from or around the eyes of the driver as feedback information. When the glare has been eliminated, the system maintains the filter, perhaps momentarily reducing it from time to time to see that the source of glare has not stopped.

If the filter is electrochromic glass, a significant time period is required to activate the glare filter and therefore a trial and error search for the ideal filter location could be too slow. In this case, a non-recurring spatial pattern can be placed in the visor such that when light passes through the visor and illuminates the face of the driver, the location where the filter should be placed can be easily determined. That is, the pattern reflection off of the face of the driver would indicate the location of the visor through which the light causing the glare was passing. Such a structured light system can also be used for the SPD and LCD filters but since they act significantly more rapidly, it would serve only to simplify the search algorithm for filter placement.

A second photo sensor 135 can also be used pointing through the windshield to determine only that glare was present. In this manner, when the source of the glare disappears, the filter can be turned off. A more sophisticated system as described above for the windshield system whereby the direction of the light is determined using a camera-type device can also be implemented.

The visor 145 is illustrated as substantially covering the front windshield in front of the driver. This is possible since it is transparent except where the filter is applied, which would in general be a small area. A second visor, not shown, can also be used to cover the windshield for the passenger side that would also be useful when the light-causing glare on the driver's eyes enters through the windshield in front of the passenger or if a passenger system is also desired. In some cases, it might even be advantageous to supply a similar visor to cover the side windows but in general, standard opaque visors would serve for both the passenger side windshield area and the side windows since the driver in general only needs to look through the windshield in front of him or her.

A smaller visor can also be used as long as it is provided with a positioning system or method. The visor only needs to cover the eyes of the driver. This could either be done manually or by electric motors similar to the system disclosed in U.S. Pat. No. 4,874,938. If electric motors are used, then the adjustment system would first have to move the visor so that it covered the driver's eyes and then provide the filter. This could be annoying if the vehicle is heading into the sun and turning and/or going up and down hills. In any case, the visor should be movable to cover any portion of the windshield where glare can get through, unlike conventional visors that only cover the top half of the windshield. The visor also does not need to be close to the windshield and the closer that it is to the driver, the smaller and thus the less expensive it can be.

As with the windshield, the visor of at least one of the inventions disclosed herein can also serve as a display using plastic electronics as described above either with or without the SPD or other filter material. Additionally, visor-like displays can now be placed at many locations in the vehicle for the display of Internet web pages, movies, games etc. Occupants of the rear seat, for example, can pull down such displays from the ceiling, up from the front seatbacks or out from the B-pillars or other convenient locations.

A key advantage of the systems disclosed herein is the ability to handle multiple sources of glare in contrast to the system of U.S. Pat. No. 4,874,938, which requires that the multiple sources must be close together.

5.4 Headlamp Control

In a similar manner, the forward looking camera(s) can also be used to control the lights of vehicle 136 when either the headlights or taillights of another vehicle are sensed. In this embodiment, the CCD array is designed to be sensitive to visible light and a separate source of illumination is not used. The key to this technology can be the use of trained pattern recognition algorithms and particularly the artificial neural network. Here, as in the other cases above and in the patents and patent applications referenced above, the pattern recognition system is trained to recognize the pattern of the headlights of an oncoming vehicle or the tail lights of a vehicle in front of vehicle 136 and to then dim the headlights when either of these conditions is sensed. It is also trained to not dim the lights for other reflections such as reflections off of a sign post or the roadway. One problem is to differentiate taillights where dimming is desired from distant headlights where dimming is not desired. At least three techniques can be used: (i) measurement of the spacing of the light sources, (ii) determination of the location of the light sources relative to the vehicle, and (iii) use of a red filter where the brightness of the light source through the filter is compared with the brightness of the unfiltered light. In the case of the taillight, the brightness of the red filtered and unfiltered light is nearly the same while there is a significant difference for the headlight case. In this situation, either two CCD arrays are used, one with a filter, or a filter which can be removed either electrically, such as with a liquid crystal, or mechanically. Alternately a fast Fourier transform, or other spectral analysis technique, of the data can be taken to determine the relative red content.

6. Weight Measurement and Biometrics

One way to determine motion of the occupant(s) is to monitor the weight distribution of the occupant whereby changes in weight distribution after an accident would be highly suggestive of movement of the occupant. A system for determining the weight distribution of the occupants can be integrated or otherwise arranged in the seats 3 and 4 of the vehicle and several patents and publications describe such systems.

More generally, any sensor that determines the presence and health state of an occupant can also be integrated into the vehicle interior monitoring system in accordance with the inventions herein. For example, a sensitive motion sensor can determine whether an occupant is breathing and a chemical sensor, such as accomplished using SAW technology, can determine the amount of carbon dioxide, or the concentration of carbon dioxide, in the air in the vehicle, which can be correlated to the health state of the occupant(s). The motion sensor and chemical sensor can be designed to have a fixed operational field situated near the occupant. In the alternative, the motion sensor and chemical sensor can be adjustable and adapted to adjust their operational field in conjunction with a determination by an occupant position and location sensor that would determine the location of specific parts of the occupant's body such as his or her chest or mouth. Furthermore, an occupant position and location sensor can be used to determine the location of the occupant's eyes and determine whether the occupant is conscious, that is, whether his or her eyes are open or closed or moving.

Chemical sensors can also be used to detect whether there is blood present in the vehicle such as after an accident. Additionally, microphones can detect whether there is noise in the vehicle caused by groaning, yelling, etc., and transmit any such noise through the cellular or similar connection to a remote listening facility using a telematics communication system such as operated by OnStar™.

Figure 61:
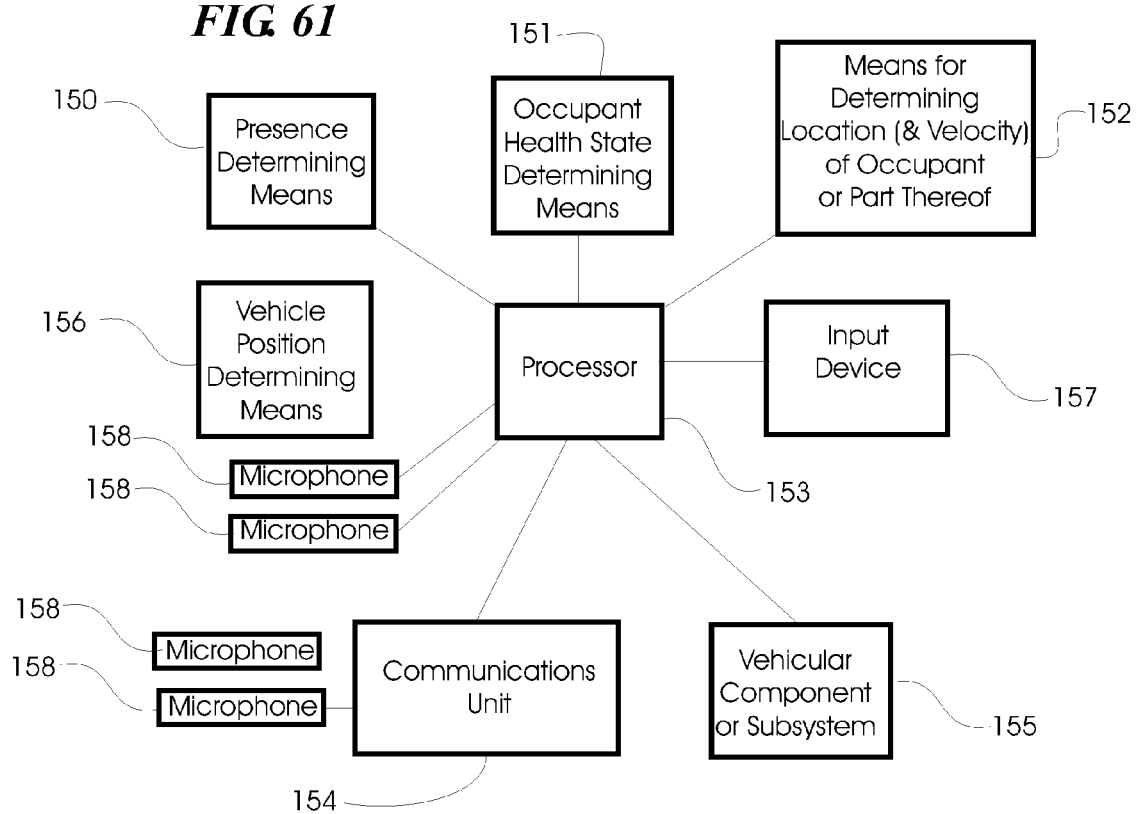
FIG. 61 is a diagram of one exemplifying embodiment of the invention.

FIG. 61 shows a schematic diagram of an embodiment of the invention including a system for determining the presence and health state of any occupants of the vehicle and a telecommunications link. This embodiment includes a system for determining the presence of any occupants 151 which may take the form of a heartbeat sensor or motion sensor as described above and a system for determining the health state of any occupants 151. The health state determining system 151 may be integrated into the system for determining the presence of any occupants, i.e., one and the same component, or separate therefrom. The presence determining system 150 may encompass a dedicated presence determination device associated with each seating location in the vehicle, or at least sufficient presence determination devices having the ability to determine the presence of an occupant at each seating location in the vehicle. Further, a system for determining the location, and optionally velocity, of the occupants or one or more parts thereof 152 are provided and may be any conventional occupant position sensor or preferably, one of the occupant position sensors as described herein (e.g., those utilizing waves. electromagnetic radiation or electric fields) or as described in the current assignee's patents and patent applications referenced herein.

A processor 153 is coupled to the presence determining system 150, the health state determining system 151 and the location determining system 152. A communications system or unit 154 is coupled to the processor 153. The processor 153 and/or communications unit 154 can also be coupled to one or more microphones 155 that can be distributed throughout the vehicle and include voice-processing circuitry to enable the occupant(s) to effect vocal control of the processor 153, communications unit 154 or any coupled component or oral communications via the communications unit 154. The processor 153 is also coupled to another vehicular system, component or subsystem 156 and can issue control commands to effect adjustment of the operating conditions of the system, component or subsystem 156. Such a system, component or subsystem can be the heating or air-conditioning system, the entertainment system, an occupant restraint device such as an airbag, a glare prevention system, etc. Also, a positioning system 157 could be coupled to the processor 153 and provides an indication of the absolute position of the vehicle, preferably using satellite-based positioning technology (e.g., a GPS receiver).

In normal use (other than after a crash), the presence determining system 150 determines whether any human occupants are present, i.e., adults or children, and the location determining system 152 determines the occupant's location. The processor 153 receives signals representative of the presence of occupants and their location and determines whether the vehicular system, component or subsystem 156 can be modified to optimize its operation for the specific arrangement of occupants. For example, if the processor 153 determines that only the front seats in the vehicle are occupied, it could control the heating system to provide heat only through vents situated to provide heat for the front-seated occupants.

Another possible vehicular system, component or subsystem is a navigational aid, i.e., a route display or map. In this case, the position of the vehicle as determined by the positioning system 157 is conveyed through processor 153 to the communications unit 154 to a remote facility and a map is transmitted from this facility to the vehicle to be displayed on the route display. If directions are needed, a request for the same could be entered into an input unit 158 associated with the processor 153 and transmitted to the facility. Data for the display map and/or vocal instructions could be transmitted from this facility to the vehicle. The communications unit 154 thus performs the function of enabling establishment of a communications channel to a remote facility to receive information about the occupancy of the vehicle as determined by the presence determining system 150, occupant health state determining system 151 and/or occupant location determining system 152. The communications unit 154 thus can be designed to transmit over a sufficiently large range and at an established frequency monitored by the remote facility, which may be an EMS facility, sheriff department, or fire department. Alternately, it can communicate with a satellite system such as the Skybitz system and the information can be forwarded to the appropriate facility via the Internet or other appropriate link.

Another vehicular telematics system, component or subsystem is a navigational aid, such as a route guidance display or map. In this case, the position of the vehicle as determined by the positioning system 156 is conveyed through processor 153 to the communications unit 154 to a remote facility and a map is transmitted from this facility to the vehicle to be displayed on the route display. If directions are needed, a request for such directions can be entered into an input unit 157 associated with the processor 153 and transmitted to the facility. Data for the display map and/or vocal instructions can then be transmitted from this facility to the vehicle.

Moreover, using this embodiment, it is possible to remotely monitor the health state of the occupants in the vehicle and most importantly, the driver. The health state determining system 151 may be used to detect whether the driver's breathing is erratic or indicative of a state in which the driver is dozing off. The health state determining system 151 could also include a breath-analyzer to determine whether the driver's breath contains alcohol. In this case, the health state of the driver is relayed through the processor 153 and the communications unit 154 to the remote facility and appropriate action can be taken. For example, it would be possible to transmit a command (from the remote facility) to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 156. The vehicular component or subsystem could be activated directly by the signal from the remote facility, if they include a signal receiver, or indirectly via the communications unit 154 and processor 153.

In use after a crash, the presence determining system 150, health state determining system 151 and location determining system 152 can obtain readings from the passenger compartment and direct such readings to the processor 153. The processor 153 analyzes the information and directs or controls the transmission of the information about the occupant(s) to a remote, manned facility. Such information would include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making sounds (as detected by a microphone). The determination of the number of occupants is obtained from the presence determining mechanism 150, i.e., the number of occupants whose presence is detected is the number of occupants in the passenger compartment. The determination of the status of the occupants, i.e., whether they are moving is performed by the health state determining mechanism 151, such as the motion sensors, heartbeat sensors, chemical sensors, etc. Moreover, the communications link through the communications unit 154 can be activated immediately after the crash to enable personnel at the remote facility to initiate communications with the vehicle.

Pressure or weight sensors 7, 76 and 97 are also included in the system shown in FIGS. 6 and 6A. Although strain gage-type sensors are schematically illustrated mounted to the supporting structure of the seat portion 4, and a bladder pressure sensor mounted in the seat portion 4, any other type of pressure or weight sensor can be used including mat or butt spring sensors. Strain gage sensors are described in U.S. Pat. No. 6,242,701 as well as herein. Weight can be used to confirm the occupancy of the seat, i.e., the presence or absence of an occupant as well as whether the seat is occupied by a light or heavy object. In the latter case, a measured weight of less than 60 pounds is often determinative of the presence of a child seat whereas a measured weight of greater than 60 pounds is often indicative of the absence of a child seat. The weight sensors 7 can also be used to determine the weight distribution of the occupant of the seat and thereby ascertain whether the occupant is moving and the position of the occupant. As such, the weight sensors 7 could be used to confirm the position and motion of the occupant. The measured pressure or weight or distribution thereof can also be used in combination with the data from the transmitter/receiver assemblies 49, 50, 51, 52 and 54 of FIG. 8C to provide an identification of the occupants in the seat.

As discussed below, weight can be measured both statically and dynamically. Static weight measurements require that the pressure or strain gage system be accurately calibrated and care must be taken to compensate for the effects of seatbelt load, aging, unwanted stresses in the mounting structures, temperature etc. Dynamic measurements, on the other hand, can be used to measure the mass of an object on the seat, the presence of a seatbelt load and can be made insensitive to unwanted static stresses in the supporting members and to aging of the seat and its structure. In the simplest implementation, the natural frequency of seat is determined due to the random vibrations or accelerations that are input to the seat from the vehicle suspension system. In more sophisticated embodiments, an accelerometer and/or seatbelt tension sensor is also used to more accurately determine the forces acting on the occupant. In another embodiment, a vibrator can be used in conjunction with the seat to excite the seat occupying item either on a total basis or on a local basis using PVDF film as an exciter and a determination of the contact pattern of the occupant with the seat determined by the local response to the PVDF film. This latter method using the PVDF film or equivalent is closer to a pattern determination rather than a true weight measurement.

Although many weight sensing systems are described herein, at least one of the inventions disclosed herein is, among other things, directed to the use of weight in any manner to determine the occupancy of a vehicle. Prior art mat sensors determined the occupancy through the butt print of the occupying item rather than actually measuring its weight. In an even more general sense, at least one of the inventions disclosed herein is the use of any biometric measurement to determine vehicle occupancy.

As to the latter issue, when an occupant or object is strapped into the seat using a seatbelt, it can cause an artificial load on a bladder-type weight sensor and/or strain gage-type weight sensors when the seatbelt anchorage points are not on the seat. The effects of seatbelt load can be separated from the effects of object or occupant weight, as disclosed in U.S. Pat. No. 6,242,701, if the time-varying signals are considered rather than merely using averaging to obtain the static load. If a vehicle-mounted vertical accelerometer is present, then the forcing function on the seat caused by road roughness, steering maneuvers, and the vehicle suspension system can be compared with the response of the seat as measured by the bladder or strain gage pressure or weight sensors. Through mathematical analysis, the magnitude of the bladder pressure or strain caused by seat belt loads can be separated from pressure and strain caused by occupant or object mass. Also, since animated objects such as people cannot sit still indefinitely, such occupants can be distinguished from inanimate objects by similarly observing the change in pressure and strain distribution over time.

A serious problem that has plagued researchers attempting to adapt strain gage technology to seat weight sensing arises from fact that a typical automobile seat is an over-determined structure containing indeterminate stresses and strains in the supporting structure. This arises from a variety of causes such as the connection between the seat structure and the slide mechanisms below the seat or between the slide mechanisms and the floor which induces twisting and bending moments in the seat structural members. Similarly, since most seats have four attachment points and since only three points are necessary to determine a plane, there can be an unexpected distribution of compression and tensile stresses in the support structure. To complicate the situation, these indeterminable stresses and strains can vary as a function of seat position and temperature. The combination of all of these effects produces a significant error in the calculation of the weight of an occupying item and the distribution of this weight.

This problem can be solved by looking at changes in pressure and strain readings in addition to the absolute values. The dynamic response of an occupied seat is a function of the mass of the occupying item. As the car travels down the road, a forcing function is provided to the seat which can be measured by the vertical acceleration component and other acceleration components. This provides a method of measuring the response of the seat as well as the forcing function and thereby determining the mass of occupying item.

For example, when an occupant first enters the vehicle and sits on a seat, the change in pressure and/or strain measurements will provide an accurate measurement of the occupant's weight. This accuracy deteriorates as soon as the occupant attaches a seatbelt and/or moves the seat to a new position. Nevertheless, the change in occupancy of the seat is a significant event that can be easily detected and if the change in pressure and strain measurements are used as the measurement of the occupant weight, then the weight can be accurately determined. Similarly, the sequence of events for attaching a child seat to a vehicle is one that can be easily discerned since the seat is first placed into the vehicle and the seat belt cinched followed by placing the child in the seat or, alternately, the child and seat are placed in the vehicle followed by a cinching of the seatbelt. Either of these event sequences gives a high probability of the occupancy being a child in a child seat. This decision can be confirmed by dynamical measurements as described above.

A control system for controlling a component of the vehicle based on occupancy of the seat in accordance with the invention may comprise a plurality of strain gages, or bladder chambers, mounted in connection with the seat, each measuring strain or pressure of a respective location caused by occupancy of the seat, and a processor coupled to the strain or pressure gages and arranged to determine the weight of an occupying item based on the strain or pressure measurements from the strain or pressure gages over a period of time, i.e., dynamic measurements. The processor controls the vehicle component based at least in part on the determined weight of the occupying item of the seat. The processor can also determine motion of the occupying item of the seat based on the strain or pressure measurements from the strain or pressure gages over the period of time. One or more accelerometers may be mounted on the vehicle for measuring acceleration in which case, the processor may control the component based at least in part on the determined weight of the occupying item of the seat and the acceleration measured by the accelerometer(s). (See the discussion about FIG. 23.)

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, or bladder sensors, a characterization can be made of the occupancy of the seat. Not only can the weight of an object occupying the seat be determined, but also the gross motion of such an object can be ascertained and thereby an assessment can be made as to whether the object is a life form such as a human being and whether the seatbelt is engaged. Strain gage weight sensors are disclosed, for example, in U.S. Pat. No. 6,242,701. In particular, the inventors contemplate the combination of all of the ideas expressed in the '701 patent with those expressed in the current invention.

Thus, the combination of the outputs from these accelerometer sensors and the output of strain gage or bladder weight sensors in a vehicle seat, or in or on a support structure of the seat, can be used to make an accurate assessment of the occupancy of the seat and differentiate between animate and inanimate occupants as well as determining where in the seat the occupants are sitting and whether the seatbelt is engaged. This can be done by observing the acceleration signals from the sensors of FIG. 23 and simultaneously the dynamic strain gage measurements from seat-mounted strain or pressure gages or pressure measurements of bladder weight sensors. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being and whether a seatbelt is used and if so how tightly it is cinched.

Both strain gage and bladder weight sensors will be considered below. There are of course several ways to process the acceleration signal and the stain or pressure signal or any other weight measuring apparatus. In general, the dynamic load applied to the seat is measured or a forcing function of the seat is measured, as a function of the acceleration signal. This represents the effect of the movement of the vehicle on the occupant which is reflected in the measurement of weight by the strain or pressure gages. Thus, the measurement obtained by the strain or pressure gages can be considered to have two components, one component resulting from the weight applied by the occupant in a stationary state of the vehicle and the other arising or resulting from the movement of the vehicle. The vehicle-movement component can be separated from the total strain or pressure gage measurement to provide a more accurate indication of the weight of the occupant.

To provide a feeling for the implementation of at least one of the inventions disclosed herein, an approximate analysis is set forth in the '881 application with reference to FIG. 6B.

6.1 Strain Gage Weight Sensors

Strain gage weight sensors for use in the invention are disclosed in the '881 application with reference to FIGS. 42-47E.

6.2 Bladder Weight Sensors

Bladder weight sensors for use in the invention are disclosed in the '881 application with reference to FIGS. 48-49A 6.3 Dynamic Weight Sensing The combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting and the state of the use of the seatbelt. This can be done by observing the acceleration signals from the sensors of FIG. 141 of the '881 application and simultaneously the dynamic strain gage measurements from seat-mounted strain gages. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

Several ways to process the acceleration signal and the stain or pressure signal are discussed herein with reference to FIG. 141 of the '881 application.

6.5 Face Recognition

A neural network, or other pattern recognition system, can be trained to recognize certain people as permitted operators of a vehicle or for granting access to a cargo container or truck trailer. In this case, if a non-recognized person attempts to operate the vehicle or to gain access, the system can disable the vehicle and/or sound an alarm or send a message to a remote site via telematics. Since it is unlikely that an unauthorized operator will resemble the authorized operator, the neural network system can be quite tolerant of differences in appearance of the operator. The system defaults to where a key or other identification system must be used in the case that the system doesn't recognize the operator or the owner wishes to allow another person to operate the vehicle or have access to the container. The transducers used to identify the operator can be any of the types described above. A preferred method is to use optical imager-based transducers perhaps in conjunction with a weight sensor for automotive applications. This is necessary due to the small size of the features that need to be recognized for a high accuracy of recognition. An alternate system uses an infrared laser, which can be modulated to provide three-dimensional measurements, to irradiate or illuminate the operator and a CCD or CMOS device to receive the reflected image. In this case, the recognition of the operator is accomplished using a pattern recognition system such as described in Popesco, V. and Vincent, J. M. "Location of Facial Features Using a Boltzmann Machine to Implement Geometric Constraints", Chapter 14 of Lisboa, P. J. G. and Taylor, M. J. Editors, *Techniques and Applications of Neural Networks*, Ellis Horwood Publishers, New York, 1993. In the present case, a larger CCD element array containing 50,000 or more elements would typically be used instead of the 16 by 16 or 256 element CCD array used by Popesco and Vincent.

FIG. 22 shows a schematic illustration of a system for controlling operation of a vehicle based on recognition of an authorized individual in accordance with the invention. A similar system can be designed for allowing access to a truck trailer, cargo container or railroad car, for example. One or more images of the passenger compartment 260 are received at 261 and data derived therefrom at 262. Multiple image receivers may be provided at different locations. The data derivation may entail any one or more of numerous types of image processing techniques such as those described in the current assignee's U.S. Pat. No. 6,397,136 including those designed to improve the clarity of the image. A pattern recognition algorithm, e.g., a neural network, is trained in a training phase 263 to recognize authorized individuals. The training phase can be conducted upon purchase of the vehicle by the dealer or by the owner after performing certain procedures provided to the owner, e.g., entry of a security code or key or at another appropriate time and place. In the training phase for a theft prevention system, the authorized operator(s) would sit themselves in the passenger seat and optical images would be taken and processed to obtain the pattern recognition algorithm. Alternately, the training can be done away from the vehicle which would be more appropriate for cargo containers and the like.

A processor 264 is embodied with the pattern recognition algorithm thus trained to identify whether a person is the authorized individual by analysis of subsequently obtained data derived from optical images 262. The pattern recognition algorithm in processor 264 outputs an indication of whether the person in the image is an authorized individual for which the system is trained to identify. A security system 265 enables operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

In some cases, the recognition system can be substantially improved if different parts of the electromagnetic spectrum are used. As taught in the book *Alien Vision* referenced above, distinctive facial markings are evident when viewed under near UV or MWIR illumination that can be used to positively identify a person. Other biometric measures can be used with, or in place of, a facial or iris image to further improve the recognition accuracy such as voice recognition (voice-print), finger or hand prints, weight, height, arm length, hand size etc.

Instead of a security system, another component in the vehicle can be affected or controlled based on the recognition of a particular individual. For example, the rear view mirror, seat, seat belt anchorage point, headrest, pedals, steering wheel, entertainment system, air-conditioning/ventilation system can be adjusted. Additionally, the door can be unlocked upon approach of an authorized person.

FIG. 23 is a schematic illustration of a method for controlling operation of a vehicle based on recognition of a person as one of a set of authorized individuals. Although the method is described and shown for permitting or preventing ignition of the vehicle based on recognition of an authorized driver, it can be used to control for any vehicle component, system or subsystem based on recognition of an individual.

Initially, the system is set in a training phase 266 in which images, and other biometric measures, including the authorized individuals are obtained by means of at least one optical receiving unit 267 and a pattern recognition algorithm is trained based thereon 268, usually after application of one or more image processing techniques to the images. The authorized individual(s) occupy the passenger compartment, or some other appropriate location, and have their picture taken by the optical receiving unit to enable the formation of a database on which the pattern recognition algorithm is trained. Training can be performed by any known method in the art, although combination neural networks are preferred.

The system is then set in an operational phase 269 wherein an image is operatively obtained 270, including the driver when the system is used for a security system. If the system is used for component adjustment, then the image would include any passengers or other occupying items in the vehicle. The obtained image, or images if multiple optical receiving units are used, plus other biometric information, are input into the pattern recognition algorithm 271, preferably after some image processing, and a determination is made whether the pattern recognition algorithm indicates that the image includes an authorized driver 272. If so, ignition, or some other system, of the vehicle is enabled 273, or the vehicle may actually be started automatically. If not, an alarm is sounded and/or the police or other remote site may be contacted 274.

Once an optic-based system is present in a vehicle, other options can be enabled such as eye-tracking as a data input device or to detect drowsiness, as discussed above, and even lip reading as a data input device or to augment voice input. This is discussed, for example, Eisenberg, Anne, "Beyond Voice Recognition to a Computer That Reads Lips", New York Times, Sep. 11, 2003. Lip reading can be implemented in a vehicle through the use of IR illumination and training of a pattern recognition algorithm, such as a neural network or a combination network. This is one example of where an adaptive neural or combination network can be employed that learns as it gains experience with a particular driver. The word "radio", for example, can be associated with lip motions when the vehicle is stopped or moving slowly and then at a later time when the vehicle is traveling at high speed with considerable wind noise, the voice might be difficult for the system to understand. When augmented with lip reading, the word "radio" can be more accurately recognized. Thus, the combination of lip reading and voice recognition can work together to significantly improve accuracy.

Face recognition can of course be done in two or three dimensions and can involve the creation of a model of the person's head that can aid when illumination is poor, for example. Three dimensions are available if multiple two dimensional images are acquired as the occupant moves his or her head or through the use of a three-dimensional camera. A three-dimensional camera generally has two spaced-apart lenses plus software to combine the two views. Normally, the lenses are relatively close together but this may not need to be the case and significantly more information can be acquired if the lenses are spaced further apart and in some cases, even such that one camera has a frontal view and the other a side view, for example. The software is complicated for such cases but the system becomes more robust and less likely to be blocked by a newspaper, for example. A scanning laser radar, PMD or similar system with a modulated beam or with range gating as described above can also be used to obtain three-dimensional information or a 3D image.

Eye tracking as disclosed in Jacob, "Eye Tracking in Advanced Interface Design", Robert J. K. Jacob, Human-Computer Interaction Lab, Naval Research Laboratory, Washington, D.C, can be used by vehicle operator to control various vehicle components such as the turn signal, lights, radio, air conditioning, telephone, Internet interactive commands, etc. much as described in U.S. Pat. No. 7,126,583. The display used for the eye tracker can be a heads-up display reflected from the windshield or it can be a plastic electronics display located either in the visor or the windshield.

The eye tracker works most effectively in dim light where the driver's eyes are sufficiently open that the cornea and retina are clearly distinguishable. The direction of operator's gaze is determined by calculation of the center of pupil and the center of the iris that are found by illuminating the eye with infrared radiation. FIG. 8E illustrates a suitable arrangement for illuminating eye along the same axis as the pupil camera. The location of occupant's eyes must be first determined as described elsewhere herein before eye tracking can be implemented. In FIG. 8E, imager system 52, 54, or 56 are candidate locations for eye tracker hardware.

The technique is to shine a collimated beam of infrared light on to be operator's eyeball producing a bright corneal reflection can be bright pupil reflection. Imaging software analyzes the image to identify the large bright circle that is the pupil and a still brighter dot which is the corneal reflection and computes the center of each of these objects. The line of the gaze is determined by connecting the centers of these two reflections.

It is usually necessary only to track a single eye as both eyes tend to look at the same object. In fact, by checking that both eyes are looking at the same object, many errors caused by the occupant looking through the display onto the road or surrounding environment can be eliminated Object selection with a mouse or mouse pad, as disclosed in the '709 application cross-referenced above is accomplished by pointing at the object and depressing a button. Using eye tracking, an additional technique is available based on the length of time the operator gazes at the object. In the implementations herein, both techniques are available. In the simulated mouse case, the operator gazes at an object, such as the air conditioning control, and depresses a button on the steering wheel, for example, to select the object. Alternately, the operator merely gazes at the object for perhaps one-half second and the object is automatically selected. Both techniques can be implemented simultaneously allowing the operator to freely choose between them. The dwell time can be selectable by the operator as an additional option. Typically, the dwell times will range from about 0.1 seconds to about 1 second.

The problem of finding the eyes and tracking the head of the driver, for example, is handled in Smeraldi, F., Carmona, J. B., "Saccadic search with Garbor features applied to eye detection and real-time head tracking", Image and Vision Computing 18 (2000) 323-329, Elsevier Science B. V. The Saccadic system described is a very efficient method of locating the most distinctive part of a persons face, the eyes, and in addition to finding the eyes, a modification of the system can be used to recognize the driver. The system makes use of the motion of the subject's head to locate the head prior to doing a search for the eyes using a modified Garbor decomposition method. By comparing two consecutive frames, the head can usually be located if it is in the field of view of the camera. Although this is the preferred method, other eye location and tracking methods can also be used as reported in the literature and familiar to those skilled in the art.

6.6 Heartbeat and Health State

In addition to the use of transducers to determine the presence and location of occupants in a vehicle, other sensors can also be used. For example, as discussed above, a heartbeat sensor, which determines the number and presence of heartbeats, can also be arranged in the vehicle. Heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the seat or other position, if such a human occupant is present. The output of the heartbeat sensor is input to the processor of the interior monitoring system. One heartbeat sensor for use in the invention may be of the types as disclosed in McEwan in U.S. Pat. No. 5,573,012 and U.S. Pat. No. 5,766,208. The heartbeat sensor can be positioned at any convenient position relative to the seats or other appropriate location where occupancy is being monitored. A preferred automotive location is within the vehicle seatback.

This type of micropower impulse radar (MIR) sensor is not believed to have been used in an interior monitoring system in the past. It can be used to determine the motion of an occupant and thus can determine his or her heartbeat (as evidenced by motion of the chest), for example. Such an MIR sensor can also be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan U.S. Pat. No. 5,361,070, as well as other patents by the same inventor. Motion sensing is accomplished by monitoring a particular range from the sensor as disclosed in that patent. MIR is one form of radar that has applicability to occupant sensing and can be mounted at various locations in the vehicle. Other forms include, among others, ultra wideband (UWB) by the Time Domain Corporation and noise radar (NR) by Professor Konstantin Lukin of the National Academy of Sciences of Ukraine Institute of Radiophysics and Electronics. Radar has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR, UWB or NR have additional advantages in their lack of sensitivity to temperature variation and have a comparable resolution to about 40 kHz ultrasound. Resolution comparable to higher frequency is of course possible using millimeter waves, for example. Additionally, multiple MIR, UWB or NR sensors can be used when high-speed tracking of the motion of an occupant during a crash is required since they can be individually pulsed without interfering with each other through frequency, time or code division multiplexing or other multiplexing schemes.

Other methods have been reported for measuring heartbeat including vibrations introduced into a vehicle and variations in the electric field in the vicinity of where an occupant might reside. All such methods are considered encompassed by the teachings of at least one of the inventions disclosed herein. The detection of a heartbeat regardless of how it is accomplished is indicative of the presence of a living being within the vehicle and such a detection as part of an occupant presence detection system is novel to at least one of the inventions disclosed herein. Similarly, any motion of an object that is not induced by the motion of the vehicle itself is indicative of the presence of a living being and thus part of the teachings herein. The sensing of occupant motion regardless of how it is accomplished when used in a system to affect another vehicle system is contemplated herein.

6.7 Other Inputs

Information can be provided as to the location of the driver, or other vehicle occupant, relative to an airbag, to appropriate circuitry which will process this information and make a decision as to whether to prevent deployment of the airbag in a situation where it would otherwise be deployed, or otherwise affect the time of deployment, rate of inflation, rate of deflation etc. One method of determining the position of the driver as discussed above is to actually measure his or her position either using electric fields, radar, optics or acoustics. An alternate approach, which is preferably used to confirm the measurements made by the systems described above, is to use information about the position of the seat and the seatbelt spool out to determine the likely location of the driver relative to the airbag. To accomplish this, the length of belt material which has been pulled out of the seatbelt retractor can be measured using conventional shaft encoder technology using either magnetic or optical systems. An example of an optical encoder is illustrated generally as 37 in FIG. 14. It consists of an encoder disk 38 and a receptor 39 which sends a signal to appropriate circuitry every time a line on the encoder disk 38 passes by the receptor 39.

Figure 15:
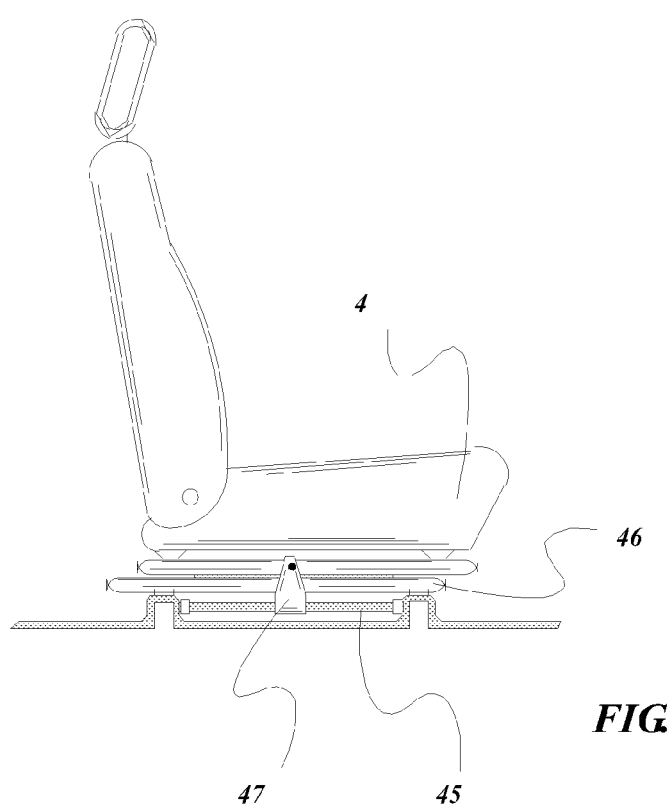
FIG. 15 is a side view of a portion of a seat and seat rail showing a seat position sensor utilizing a potentiometer.

In a similar manner, the position of the seat can be determined through either a linear encoder or a potentiometer as illustrated in FIG. 15. In this case, a potentiometer 45 is positioned along the seat track 46 and a sliding brush assembly 47 can be used with appropriate circuitry to determine the fore and aft location of the seat 4. For those seats which permit the seat back angle to be adjusted, a similar measuring system would be used to determine the angle of the seat back. In this manner, the position of the seat relative to the airbag module can be determined. This information can be used in conjunction with the seatbelt spool out sensor to confirm the approximate position of the chest of the driver relative to the airbag. Of course, there are many other ways of measuring the angles and positions of the seat and its component parts.

For a simplified occupant position measuring system, a combination of seatbelt spool out sensor, seat belt buckle sensor, seat back position sensor, and seat position sensor (the "seat" in this last case meaning the seat portion) can be used either together or as a subset of such sensors to make an approximation as to the location of the driver or passenger in the vehicle. This information can be used to confirm the measurements of the electric field, ultrasonic and infrared sensors or as a stand-alone system. As a stand-alone system, it will not be as accurate as systems using ultrasonics or electromagnetics. Since a significant number of fatalities involve occupants who are not wearing seatbelts, and since accidents frequently involved significant pre-crash maneuvers and breaking that can cause at least the vehicle passenger to be thrown out of position, this system has serious failure modes. Nevertheless, sensors that measure seat position, for example, are available now and this system permits immediate introduction of a crude occupant position sensing system immediately and therefore it has great value. One such simple system, employs a seat position sensor only. For the driver, for example, if the seat is in the forwardmost position, then it makes no sense to deploy the driver airbag at full power. Instead, either a depowered deployment or no deployment would be called for in many crash situations.

For most cases, the seatbelt spool out sensor would be sufficient to give a good confirming indication of the position of the occupant's chest regardless of the position of the seat and seat back. This is because the seatbelt is usually attached to the vehicle at least at one end. In some cases, especially where the seat back angle can be adjusted, separate retractors can be used for the lap and shoulder portions of the seatbelt and the belt would not be permitted to slip through the "D-ring". The length of belt spooled out from the shoulder belt retractor then becomes a very good confirming measure of the position of the occupant's chest.

7. Illumination 7.1 Infrared Light

Many forms illumination can of course be used as discussed herein. Near infrared is a preferred source since it can be produced relatively inexpensively with LEDs and is not seen by vehicle occupants or others outside of the vehicle. The use of spatially modulated (as in structured light) and temporally modulated (as in amplitude, frequency, pulse, code, random or other such methods) permits additional information to be obtained such as a three-dimensional image as first disclosed by the current assignee in earlier patents. Infrared is also interesting since the human body naturally emits IR and this fact can be used to positively identify that there is a human occupying a vehicle seat and to determine fairly accurately the size of the occupant. This technique only works when the ambient temperature is different from body temperature, which is most of the time. In some climates, it is possible that the interior temperature of a vehicle can reach or exceed 100 degrees F., but it is unlikely to stay at that temperature for long as humans find such a temperature uncomfortable. However, it is even more unlikely that such a temperature will exist except when there is significant natural illumination in the visible part of the spectrum. Thus, a visual size determination is possible especially since it is very unlikely that such an occupant will be wearing heavy or thick clothing. Passive infrared, used of course with an imaging system, is thus a viable technique for the identification of a human occupant if used in conjunction with an optical system for high temperature situations. Even if the ambient temperature is nearly the same as body temperature, there will still be contrasts in the image which are sufficient to differentiate an occupant or his or her face from the background. Whereas a single pixel sensor, as in the prior art patents to Colorado and Mattes referenced above, could give false results, an imaging system such as a focal plane array as disclosed herein can still operate effectively.

Passive IR is also a good method of finding the eyes and other features of the occupant since hair, some hats and other obscuring items frequently do not interfere with the transmission of IR. When active IR illumination is used, the eyes are particularly easy to find due to corneal reflection and the eyes will be dilated at night when finding the eyes is most important. Even in glare situations, where the glare is coming through the windshield, passive IR is particularly useful since glass blocks most IR with wavelengths beyond 1.1 microns and thus the glare will not interfere with the imaging of the face.

Particular frequencies of active IR are especially useful for external monitoring. Except for monitoring objects close to the vehicle, most radar systems have a significant divergence angle making imaging more than a few meters from the vehicle problematic. Thus there is typically not enough information from a scene say 100 meters away to permit the monitor to obtain an image that would permit classification of sensed objects. Using radar, it is difficult to distinguish a car from a truck or a parked car at the side of the road from one on the same lane as the vehicle or from an advertising sign, for example. Normal visual imaging also will not work in bad weather situations however some frequencies of IR do penetrate fog, rain and snow sufficiently well as to permit the monitoring of the road at a significant distance and with enough resolution to permit imaging and thus classification even in the presence of rain, snow and fog.

As mentioned elsewhere herein, there are various methods of illuminating the object or occupant in the passenger compartment. A scanning point of IR can be used to overcome reflected sunlight. A structured pattern can be used to help achieve a three-dimensional representation of the vehicle contents. An image can be compared with illumination and without in an attempt to eliminate the effects on natural and uncontrollable illumination. This generally doesn't work very well since the natural illumination can overpower the IR. Thus it is usually better to develop two pattern recognition algorithms, one for IR illumination and one for natural illumination. For the natural illumination case, the entire visual and near visual spectrum can be used or some subset of it. For the case where a rolling shutter is used, the process can be speeded up substantially if one line of pixels is subtracted from the adjacent line where the illumination is turned on for every other row and off for the intervening rows. In addition to structured light, there are many other methods of obtaining a 3D image as discussed above.

7.2 Structured Light

In the applications discussed and illustrated above, the source and receiver of the electromagnetic radiation have frequently been mounted in the same package. This is not necessary and in some implementations, the illumination source will be mounted elsewhere. For example, a laser beam can be used which is directed along an axis which bisects the angle between the center of the seat volume, or other volume of interest, and two of the arrays. Such a beam may come from the A-Pillar, for example. The beam, which may be supplemental to the main illumination system, provides a point reflection from the occupying item that, in most cases, can be seen by two receivers, even if they are significantly separated from each other, making it easier to identify corresponding parts in the two images. Triangulation thereafter can precisely determination the location of the illuminated point. This point can be moved, or a pattern of points provided, to provide even more information. In another case where it is desired to track the head of the occupant, for example, several such beams can be directed at the occupant's head during pre-crash braking or even during a crash to provide the fastest information as to the location of the head of the occupant for the fastest tracking of the motion of the occupant's head. Since only a few pixels are involved, even the calculation time is minimized.

In most of the applications above, the assumption has been made that either a uniform field of light or a scanning spot of light will be provided. This need not be the case. The light that is emitted or transmitted to illuminate the object can be structured light. Structured light can take many forms starting with, for example, a rectangular or other macroscopic pattern of light and dark that can be superimposed on the light by passing it through a filter. If a similar pattern is interposed between the reflections and the camera, a sort of pseudo-interference pattern can result sometimes known as Moiré patterns. A similar effect can be achieved by polarizing transmitted light so that different parts of the object that is being illuminated are illuminated with light of different polarization. Once again, by viewing the reflections through a similarly polarized array, information can be obtained as to where the source of light came from which is illuminating a particular object. Any of the transmitter/receiver assemblies or transducers in any of the embodiments above using optics can be designed to use structured light.

Usually the source of the structured light is displaced either vertically, laterally or axially from the imager, but this need not necessarily be the case. One excellent example of the use of structured light to determine a 3D image where the source of the structured light and the imager are on the same axis is illustrated in U.S. Pat. No. 5,003,166. Here, the third dimension is obtained by measuring the degree of blur of the pattern as reflected from the object. This can be done since the focal point of the structured light is different from the camera. This is accomplished by projecting it through its own lens system and then combining the two paths through the use of a beam splitter. The use of this or any other form of structured light is within the scope of at least one of the inventions disclosed herein. There are so many methods that the details of all of them cannot be enumerated here.

One consideration when using structured light is that the source of structured light should not generally be exactly co-located with the array because in this case, the pattern projected will not change as a function of the distance between the array and the object and thus the distance between the array and the object cannot be determined, except by the out-of-focus and similar methods discussed above. Thus, it is usually necessary to provide a displacement between the array and the light source. For example, the light source can surround the array, be on top of the array or on one side of the array. The light source can also have a different virtual source, i.e., it can appear to come from behind of the array or in front of the array, a variation of the out-of-focus method discussed above.

For a laterally displaced source of structured light, the goal is to determine the direction that a particular ray of light had when it was transmitted from the source. Then, by knowing which pixels were illuminated by the reflected light ray along with the geometry of the vehicle, the distance to the point of reflection off of the object can be determined. If a particular light ray, for example, illuminates an object surface which is near to the source, then the reflection off of that surface will illuminate a pixel at a particular point on the imaging array. If the reflection of the same ray however occurs from a more distant surface, then a different pixel will be illuminated in the imaging array. In this manner, the distance from the surface of the object to the array can be determined by triangulation formulas. Similarly, if a given pixel is illuminated in the imager from a reflection of a particular ray of light from the transmitter, and knowing the direction that that ray of light was sent from the transmitter, then the distance to the object at the point of reflection can be determined. If each ray of light is individually recognizable and therefore can be correlated to the angle at which it was transmitted, a full three-dimensional image can be obtained of the object that simplifies the identification problem. This can be done with a single imager.

One particularly interesting implementation due to its low cost is to project one or more dots or other simple shapes onto the occupant from a position which is at an angle relative to the occupant such as 10 to 45 degrees from the camera location. These dots will show up as bright spots even in bright sunlight and their location on the image will permit the position of the occupant to be determined. Since the parts of the occupant are all connected with relative accuracy, the position of the occupant can now be accurately determined using only one simple camera. Additionally, the light that makes up the dots can be modulated and the distance from the dot source can then be determined if there is a receiver at the light source and appropriate circuitry such as used with a scanning range meter.

The coding of the light rays coming from the transmitter can be accomplished in many ways. One method is to polarize the light by passing the light through a filter whereby the polarization is a combination of the amount and angle of the polarization. This gives two dimensions that can therefore be used to fix the angle that the light was sent. Another method is to superimpose an analog or digital signal onto the light which could be done, for example, by using an addressable light valve, such as a liquid crystal filter, electrochromic filter, or, preferably, a garnet crystal array. Each pixel in this array would be coded such that it could be identified at the imager or other receiving device. Any of the modulation schemes could be applied such as frequency, phase, amplitude, pulse, random or code modulation.

The techniques described above can depend upon either changing the polarization or using the time, spatial or frequency domains to identify particular transmission angles with particular reflections. Spatial patterns can be imposed on the transmitted light which generally goes under the heading of structured light. The concept is that if a pattern is identifiable, then either the direction of transmitted light can be determined or, if the transmission source is co-linear with the receiver, then the pattern differentially expands or contracts relative to the field of view as it travels toward the object and then, by determining the size or focus of the received pattern, the distance to the object can be determined. In some cases, Moiré pattern techniques are utilized.

When the illumination source is not placed on the same axis as the receiving array, it is typically placed at an angle such as 45 degrees. At least two other techniques can be considered. One is to place the illumination source at 90 degrees to the imager array. In this case, only those surface elements that are closer to the receiving array than previous surfaces are illuminated. Thus, significant information can be obtained as to the profile of the object. In fact, if no object is occupying the seat, then there will be no reflections except from the seat itself. This provides a very powerful technique for determining whether the seat is occupied and where the initial surfaces of the occupying item are located. A combination of the above techniques can be used with temporally or spatially varying illumination. Taking images with the same imager but with illumination from different directions can also greatly enhance the ability to obtain three-dimensional information.

The particular radiation field of the transmitting transducer can also be important to some implementations of at least one of the inventions disclosed herein. In some techniques, the object which is occupying the seat is the only part of the vehicle which is illuminated. Extreme care is exercised in shaping the field of light such that this is true. For example, the objects are illuminated in such a way that reflections from the door panel do not occur. Ideally, if only the items which occupy the seat can be illuminated, then the problem of separating the occupant from the interior vehicle passenger compartment surfaces can be more easily accomplished. Sending illumination from both sides of the vehicle across the vehicle can accomplish this.

The above discussion has concentrated on automobile occupant sensing but the teachings, with some modifications, are applicable to monitoring of other vehicles including railroad cars, truck trailers and cargo containers.

7.3 Color and Natural Light

As discussed above, the use of multispectral imaging can be a significant aid in recognizing objects inside and outside of a vehicle. Two objects may not be separable under monochromic illumination yet be quite distinguishable when observed in color or with illumination from other parts of the electromagnetic spectrum. Also, the identification of a particular individual is enhanced using near UV radiation, for example. Even low level X-rays can be useful in identifying and locating objects in a vehicle.

7.4 Radar

Particular mention should be made of the use of radar since novel inexpensive antennas and ultra wideband radars are now readily available. A scanning radar beam can be used in this implementation and the reflected signal is received by a phase array antenna to generate an image of the occupant for input into the appropriate pattern detection circuitry. The image is not very clear due to the longer wave lengths used and the difficulty in getting a small enough radar beam. The word circuitry as used herein includes, in addition to normal electronic circuits, a microprocessor and appropriate software.

Another preferred embodiment makes use of radio waves and a voltage-controlled oscillator (VCO). In this embodiment, the frequency of the oscillator is controlled through the use of a phase detector which adjusts the oscillator frequency so that exactly one half wave occupies the distance from the transmitter to the receiver via reflection off of the occupant. The adjusted frequency is thus inversely proportional to the distance from the transmitter to the occupant. Alternately, an FM phase discriminator can be used as known to those skilled in the art. These systems could be used in any of the locations illustrated in FIG. 5 as well as in the monitoring of other vehicle types.

In FIG. 6, a motion sensor 73 is arranged to detect motion of an occupying item on the seat 4 and the output thereof is input to the neural network 65. Motion sensors can utilize a micro-power impulse radar (MIR) system as disclosed, for example, in McEwan U.S. Pat. No. 5,361,070, as well as many other patents by the same inventor. Motion sensing is accomplished by monitoring a particular range from the sensor as disclosed in that patent. MIR is one form of radar which has applicability to occupant sensing and can be mounted, for example, at locations such as designated by reference numerals 6 and 8-10 in FIG. 7. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages over ultrasound in lack of sensitivity to temperature variation and has a comparable resolution to about 40 kHz ultrasound. Resolution comparable to higher frequency is feasible but has not been demonstrated. Additionally, multiple MIR sensors can be used when high speed tracking of the motion of an occupant during a crash is required since they can be individually pulsed without interfering with each, through time division multiplexing. MIR sensors are also particularly applicable to the monitoring of other vehicles and can be configured to provide a system that requires very low power and thus is ideal for use with battery-operated systems that require a very long life.

Sensors 126, 127, 128, 129 in FIG. 36 can also be microwave or mm wave radar sensors which transmit and receive radar waves. As such, it is possible to determine the presence of an object in the rear seat and the distance between the object and the sensors. Using multiple radar sensors, it would be possible to determine the contour of an object in the rear seat and thus using pattern recognition techniques, the classification or identification of the object. Motion of objects in the rear seat can also be determined using radar sensors. For example, if the radar sensors are directed toward a particular area and/or are provided with the ability to detect motion in a predetermined frequency range, they can be used to determine the presence of children or pets left in the vehicle, i.e., by detecting heartbeats or other body motions such as movement of the chest cavity.

7.5 Frequency or Spectrum Considerations

The maximum acoustic frequency range that is practical to use for acoustic imaging in the acoustic systems herein is about 40 to 160 kilohertz (kHz). The wavelength of a 50 kHz acoustic wave is about 0.6 cm, which is too coarse to determine the fine features of a person's face, for example. It is well understood by those skilled in the art that features that are smaller than the wavelength of the irradiating radiation cannot be distinguished. Similarly, the wavelength of common radar systems varies from about 0.9 cm (for 33 GHz K band) to 133 cm (for 225 MHz P band), which is also too coarse for person identification systems. Millimeter wave and sub-millimeter wave radar can of course emit and receive waves considerably smaller. Millimeter wave radar and Micropower Impulse Radar (MIR) as discussed above are particularly useful for occupant detection and especially the motion of occupants such as motion caused by heartbeats and breathing, but still too course for feature identification. For security purposes, for example, MIR can be used to detect the presence of weapons on a person that might be approaching a vehicle such as a bus, truck or train and thus provide a warning of a potential terrorist threat. Passive IR is also useful for this purpose.

MIR is reflected by edges, joints and boundaries and through the technique of range gating, particular slices in space can be observed. Millimeter wave radar, particularly in the passive mode, can also be used to locate life forms because they naturally emit waves at particular wave lengths such as 3 mm. A passive image of such a person will also show the presence of concealed weapons as they block this radiation. Similarly, active millimeter wave radar reflects off of metallic objects but is absorbed by the water in a life form. The absorption property can be used by placing a radar receiver or reflector behind the occupant and measuring the shadow caused by the absorption. The reflective property of weapons including plastics can be used as above to detect possible terrorist threats. Finally, the use of sub-millimeter waves again using a detector or reflector on the other side of the occupant can be used not only to determine the density of the occupant but also some measure of its chemical composition as the chemical properties alter the pulse shape. Such waves are more readily absorbed by water than by plastic. From the above discussion, it can be seen that there are advantages of using different frequencies of radar for different purposes and, in some cases, a combination of frequencies is most useful. This combination occurs naturally with noise radar (NR), ultra-wideband radar (UWB) and MIR and these technologies are most appropriate for occupant detection when using electromagnetic radiation at longer wavelengths than visible light and IR.

Another variant on the invention is to use no illumination source at all. In this case, the entire visible and infrared spectrum could be used. CMOS arrays are now available with very good night vision capabilities making it possible to see and image an occupant in very low light conditions. QWIP, as discussed above, may someday become available when on-chip cooling systems using a dual stage Peltier system become cost effective or when the operating temperature of the device rises through technological innovation. For a comprehensive introduction to multispectral imaging, see Richards, Austin *Alien Vision, Exploring the Electromagnetic Spectrum with Imaging Technology*, SPIE Press, 2001.

Thus many different frequencies can be used to image a scene each having particular advantages and disadvantages. At least one of the inventions disclosed herein is not limited to using a particular frequency or part of the electromagnetic spectrum and images can advantageously be combined from different frequencies. For example, a radar image can be combined or fused with an image from the infrared or ultraviolet portions of the spectrum. Additionally, the use of a swept frequency range such as in a chirp can be advantageously used to distinguish different objects or in some cases different materials. It is well known that different materials absorb and reflect different electromagnetic waves and that this fact can be used to identify the material as in spectrographic analysis.

8. Field Sensors and Antennas

A living object such as an animal or human has a fairly high electrical permittivity (Dielectric Constant) and relatively lossy dielectric properties (Loss Tangent) absorbs a lot of energy absorption when placed in an appropriate varying electric field. This effect varies with the frequency. If a human, which is a lossy dielectric, is present in the detection field, then the dielectric absorption causes the value of the capacitance of the object to change with frequency. For a human (poor dielectric) with high dielectric losses (loss tangent), the decay with frequency will be more pronounced than objects that do not present this high loss tangency. Exploiting this phenomena, it is possible to detect the presence of an adult, child, baby or pet that is in the field of the detection circuit.

In FIG. 6, a capacitive sensor 78 is arranged to detect the presence of an occupying item on the seat 4 and the output thereof is input to the neural network 65. Capacitive sensors can be located many other places in the passenger compartment. Capacitive sensors appropriate for this function are disclosed in U.S. Pat. No. 5,602,734, U.S. Pat. No. 5,802,479, U.S. Pat. No. 5,844,486 and U.S. Pat. No. 5,948,0311. Capacitive sensors can in general be mounted at locations designated by reference numerals 6 and 8-10 in FIG. 7 or as shown in FIG. 6 or in the vehicle seat and seatback, although by their nature they can occupy considerably more space than shown in the drawings.

In FIG. 4, transducers 5, 11, 12, 13, 14 and 15 can be antennas placed in the seat and headrest such that the presence of an object, particularly a water-containing object such as a human, disturbs the near field of the antenna. This disturbance can be detected by various means such as with Micrel parts MICREF102 and MICREF104, which have a built-in antenna auto-tune circuit. Note, these parts cannot be used as is and it is necessary to redesign the chips to allow the auto-tune information to be retrieved from the chip.

Note that the bio-impedance that can be measured using the methods described above can be used to obtain a measure of the water mass, for example, of an object and thus of its weight.

9. Telematics

Some of the inventions herein relate generally to telematics and the transmission of information from a vehicle to one or more remote sites which can react to the position or status of the vehicle and/or occupant(s) therein.

Initially, sensing of the occupancy of the vehicle and the optional transmission of this information, which may include images, to remote locations will be discussed. This entails obtaining information from various sensors about the occupants in the passenger compartment of the vehicle, e.g., the number of occupants, their type and their motion, if any. Then, the concept of a low cost automatic crash notification system will be discussed. Next, a diversion into improvements in cell phones will be discussed followed by a discussion of trapped children and how telematics can help save their lives. Finally, the use of telematics with non-automotive vehicles will round out this section.

Elsewhere in section 13, the use of telematics is included with a discussion of general vehicle diagnostic methods with the diagnosis being transmittable via a communications device to the remote locations. The diagnostics section includes an extensive discussion of various sensors for use on the vehicle to sense different operating parameters and conditions of the vehicle is provided. All of the sensors discussed herein can be coupled to a communications device enabling transmission of data, signals and/or images to the remote locations, and reception of the same from the remote locations.

9.1 Transmission of Occupancy Information

The cellular phone system, or other telematics communication device, is shown schematically in FIG. 2 by box 34 and outputs to an antenna 32. The phone system or telematics communication device 34 can be coupled to the vehicle interior monitoring system in accordance with any of the embodiments disclosed herein and serves to establish a communications channel with one or more remote assistance facilities, such as an EMS facility or dispatch facility from which emergency response personnel are dispatched. The telematics system can also be a satellite-based system such as provided by Skybitz.

In the event of an accident, the electronic system associated with the telematics system interrogates the various interior monitoring system memories in processor 20 and can arrive at a count of the number of occupants in the vehicle, if each seat is monitored, and, in more sophisticated systems, even makes a determination as to whether each occupant was wearing a seatbelt and if he or she is moving after the accident, and/or the health state of one or more of the occupants as described above, for example. The telematics communication system then automatically notifies an EMS operator (such as 911, OnStar® or equivalent) and the information obtained from the interior monitoring systems is forwarded so that a determination can be made as to the number of ambulances and other equipment to send to the accident site. Vehicles having the capability of notifying EMS in the event one or more airbags deployed are now in service but are not believed to use any of the innovative interior monitoring systems described herein. Such vehicles will also have a system, such as the global positioning system, which permits the vehicle to determine its location and to forward this information to the EMS operator.

In relation to this aspect, see the discussion above of the schematic shown in FIG. 61.

Once an occupying item has been located in a vehicle, or any object outside of the vehicle, the identification or categorization information along with an image, including an IR or multispectral image, or icon of the object can be sent via a telematics channel to a remote location. A passing vehicle, for example, can send a picture of an accident or a system in a vehicle that has had an accident can send an image of the occupant(s) of the vehicle to aid in injury assessment by the EMS team.

Although in most if not all of the embodiments described above, it has been assumed that the transmission of images or other data from the vehicle to the EMS or other off-vehicle (remote) site is initiated by the vehicle, this may not always be the case and in some embodiments, provision is made for the off-vehicle site to initiate the acquisition and/or transmission of data including images from the vehicle. Thus, for example, once an EMS operator knows that there has been an accident, he or she can send a command to the vehicle to control components in the vehicle to cause the components send images and other data so that the situation can be monitored by the operator or other person. The capability to receive and initiate such transmissions can also be provided in an emergency vehicle such as a police car or ambulance. In this manner, for a stolen vehicle situation, the police officer, for example, can continue to monitor the interior of the stolen vehicle.

Figure 62:
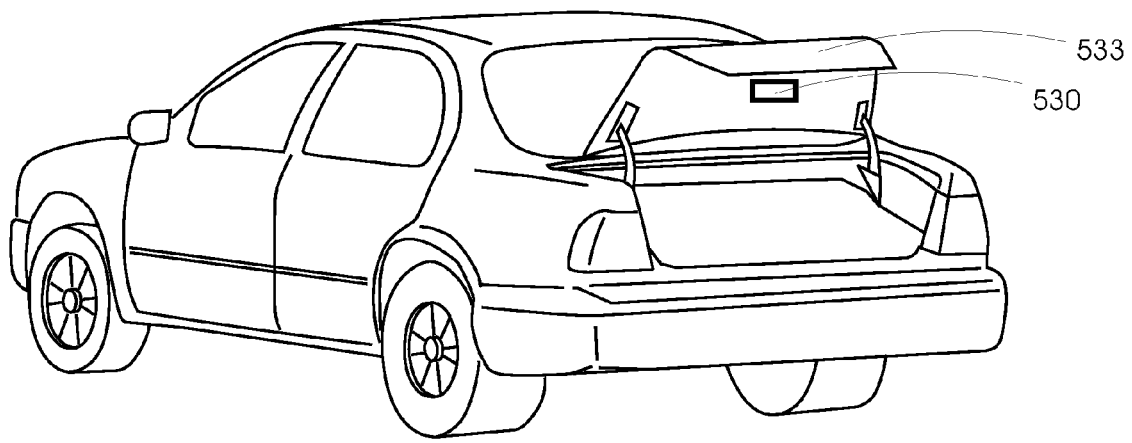
FIG. 62 is a perspective view of a carbon dioxide SAW sensor for mounting in the trunk lid for monitoring the inside of the trunk for detecting trapped children or animals.
Figure 63:
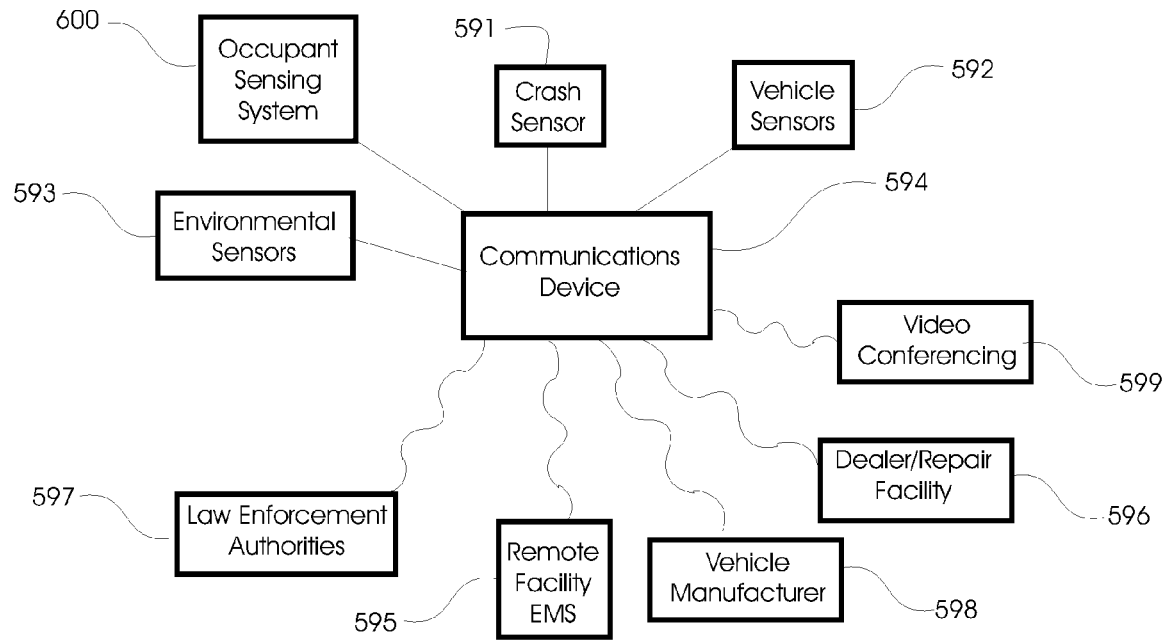
FIG. 63 is a schematic view of overall telematics system in accordance with the invention.

FIG. 63 shows a schematic of the integration of the occupant sensing with a telematics link and the vehicle diagnosis with a telematics link. As envisioned, the occupant sensing system 600 includes those components which determine the presence, position, health state, and other information relating to the occupants, for example the transducers discussed above with reference to FIGS. 1, 2 and 61 and the SAW device discussed above with reference to FIG. 62. Information relating to the occupants includes information as to what the driver is doing, talking on the phone, communicating with OnStar® or other route guidance, listening to the radio, sleeping, drunk, drugged, having a heart attack The occupant sensing system may also be any of those systems and apparatus described in the current assignee's patents and patent applications or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor system 591 is provided and determines when the vehicle experiences a crash. This crash sensor may be part of the occupant restraint system or independent from it. Crash sensor system 591 may include any type of crash sensors, including one or more crash sensors of the same or different types.

Vehicle sensors 592 include sensors which detect the operating conditions of the vehicle such as those sensors discussed with reference to FIGS. 136-141 of the '881 application. Also included are tire sensors such as disclosed in U.S. Pat. No. 6,662,642. Other examples include velocity and acceleration sensors, and angle and angular rate pitch, roll and yaw sensors. Of particular importance are sensors that tell what the car is doing: speed, skidding, sliding, location, communicating with other cars or the infrastructure, etc.

Environment sensors 593 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provides data on the blind spot of the driver, automatic cruise control sensors that can provide images of vehicles in front of the host vehicle, various radar devices which provide the position of other vehicles and objects relative to the subject vehicle.

The occupant sensing system 600, crash sensors 591, vehicle sensors 592, environment sensors 593 and all other sensors listed above can be coupled to a communications device 594 which may contain a memory unit and appropriate electrical hardware to communicate with the sensors, process data from the sensors, and transmit data from the sensors. The memory unit would be useful to store data from the sensors, updated periodically, so that such information could be transmitted at set time intervals.

The communications device 594 can be designed to transmit information to any number of different types of facilities. For example, the communications device 594 would be designed to transmit information to an emergency response facility 595 in the event of an accident involving the vehicle. The transmission of the information could be triggered by a signal from a crash sensor 591 that the vehicle was experiencing a crash or experienced a crash. The information transmitted could come from the occupant sensing system 600 so that the emergency response could be tailored to the status of the occupants. For example, if the vehicle was determined to have ten occupants, multiple ambulances might be sent. Also, if the occupants are determined not be breathing, then a higher priority call with living survivors might receive assistance first. As such, the information from the occupant sensing system 600 would be used to prioritize the duties of the emergency response personnel.

Information from the vehicle sensors 592 and environment sensors 593 can also be transmitted to law enforcement authorities 597 in the event of an accident so that the cause(s) of the accident could be determined. Such information can also include information from the occupant sensing system 600, which might reveal that the driver was talking on the phone, putting on make-up, or another distracting activity, information from the vehicle sensors 592 which might reveal a problem with the vehicle, and information from the environment sensors 593 which might reveal the existence of slippery roads, dense fog and the like.

Information from the occupant sensing system 600, vehicle sensors 592 and environment sensors 593 can also be transmitted to the vehicle manufacturer 598 in the event of an accident so that a determination can be made as to whether failure of a component of the vehicle caused or contributed to the cause of the accident. For example, the vehicle sensors might determine that the tire pressure was too low so that advice can be disseminated to avoid maintaining the tire pressure too low in order to avoid an accident. Information from the vehicle sensors 592 relating to component failure could be transmitted to a dealer/repair facility 596 which could schedule maintenance to correct the problem.

The communications device 594 can be designed to transmit particular information to each site, i.e., only information important to be considered by the personnel at that site. For example, the emergency response personnel have no need for the fact that the tire pressure was too low but such information is important to the law enforcement authorities 597 (for the possible purpose of issuing a recall of the tire and/or vehicle) and the vehicle manufacturer 598.

In one exemplifying use of the system shown in FIG. 63, the operator at the remote facility 595 could be notified when the vehicle experiences a crash, as detected by the crash sensor system 591 and transmitted to the remote facility 595 via the communications device 594. In this case, if the vehicle occupants are unable to, or do not, initiate communications with the remote facility 595, the operator would be able to receive information from the occupant sensing system 600, as well as the vehicle sensors 592 and environmental sensors 593. The operator could then direct the appropriate emergency response personnel to the vehicle. The communications device 594 could thus be designed to automatically establish the communications channel with the remote facility when the crash sensor system 591 determines that the vehicle has experienced a crash.

The communications device 594 can be a cellular phone, OnStar® or other subscriber-based telematics system, a peer-to-peer vehicle communication system that eventually communicates to the infrastructure and then, perhaps, to the Internet with e-mail to the dealer, manufacturer, vehicle owner, law enforcement authorities or others. It can also be a vehicle to LEO or Geostationary satellite system such as Skybitz which can then forward the information to the appropriate facility either directly or through the Internet.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar®, a cellular phone system, a communication via GEO, geocentric or other satellite system and any communication that communicates the results of a pattern recognition system analysis. Also, any communication from a vehicle that combines sensor information with location information is anticipated by at least one of the inventions disclosed herein.

When optical sensors are provided as part of the occupant sensing system 600, video conferencing becomes a possibility, whether or not the vehicle experiences a crash. That is, the occupants of the vehicle can engage in a video conference with people at another location 599 via establishment of a communications channel by the communications device 594.

The vehicle diagnostic system described above using a telematics link can transmit information from any type of sensors on the vehicle.

9.2 Low Cost Automatic Crash Notification

A system for notifying remote personnel, e.g., emergency response personnel, of an accident is described herein.

9.3 Cell Phone Improvements

When the driver of a vehicle is using a cellular phone, the phone microphone frequently picks up other noise in the vehicle making it difficult for the other party to hear what is being said. This noise can be reduced if a directional microphone is used and directed toward the mouth of the driver. This is difficult to do since the position of driver's mouth varies significantly depending on such things as the size and seating position of the driver. By using the vehicle interior identification and monitoring system of at least one of the inventions disclosed herein, and through appropriate pattern recognition techniques, the location of the driver's head can be determined with sufficient accuracy even with ultrasonics to permit a directional microphone assembly to be sensitized to the direction of the mouth of the driver resulting in a clear reception of his voice. The use of directional speakers in a similar manner also improves the telephone system performance. In the extreme case of directionality, the techniques of hypersonic sound can be used. Such a system can also be used to permit effortless conversations between occupants of the front and rear seats. Such a system is shown in FIG. 40, which is a system similar to that of FIG. 2 only using three ultrasonic transducers 6, 8 and 10 to determine the location of the driver's head and control the pointing direction of a microphone 158. Speaker 19 is shown connected schematically to the phone system 34 completing the system.

The transducer 8 can be placed high in the A-pillar, transducer 8 on the headliner and transducer 10 on the IP. Other locations are possible as discussed above. The three transducers are placed high in the vehicle passenger compartment so that the first returned signal is from the head. Temporal filtering is used to eliminate signals that are reflections from beyond the head and the determination of the head center location is then found by the approximate centroid of the head-returned signal. That is, once the location of the return signal centroid is found from the three received signals from transducers 6, 8 and 10, the distance to that point is known for each of the transducers based on the time it takes the signal to travel from the head to each transducer. In this manner, by using the three transducers, all of which send and receive, plus an algorithm for finding the coordinates of the head center, using processor 20, and through the use of known relationships between the location of the mouth and the head center, an estimate of the mouth location, and the ear locations, can be determined within a circle having a diameter of about five inches (13 cm). This is sufficiently accurate for a directional microphone to cover the mouth while excluding the majority of unwanted noise. Camera-based systems can be used to more accurately locate parts of the body such as the head.

The placement of multiple imagers in the vehicle, the use of a plastic electronics-based display plus telematics permits the occupants of the vehicle to engage in a video conference if desired. Until autonomous vehicles appear, it would be best if the driver did not participate.

9.4 Children Trapped in a Vehicle

An occupant sensing system can also involve sensing for the presence of a living occupant in a trunk of a vehicle or in a closed vehicle, for example, when a child is inadvertently left in the vehicle or enters the trunk and the trunk closes. To this end, a SAW-based chemical sensor 530 is illustrated in FIG. 62A for mounting in a vehicle trunk as illustrated in FIG. 62. The chemical sensor 530 is designed to measure carbon dioxide concentration through the mass loading effects as described in U.S. Pat. No. 4,895,017 with a polymer coating selected that is sensitive to carbon dioxide. The speed of the surface acoustic wave is a function of the carbon dioxide level in the atmosphere. Section 532 of the chemical sensor 530 contains a coating of such a polymer and the acoustic velocity in this section is a measure of the carbon dioxide concentration. Temperature effects are eliminated through a comparison of the sonic velocities in sections 531 and 532 as described above.

Thus, when trunk lid 533 is closed and a source of carbon dioxide such as a child or animal is trapped within the trunk, the chemical sensor 530 will provide information indicating the presence of the carbon dioxide producing object to the interrogator which can then release the trunk lock, permitting trunk to automatically open. In this manner, the problem of children and animals suffocating in closed trunks is eliminated. Alternately, information that a person or animal is trapped in a trunk can be sent by the telematics system to law enforcement authorities or other location remote from the vehicle.

A similar device can be distributed at various locations within the passenger compartment of vehicle along with a combined temperature sensor. If the car has been left with a child or other animal while owner is shopping, for example, and if the temperature rises within the vehicle to an unsafe level or, alternately, if the temperature drops below an unsafe level, then the vehicle can be signaled to take appropriate action which may involve opening the windows or starting the vehicle with either air conditioning or heating as appropriate. Alternately, information that a person or animal is trapped within a vehicle can be sent by the telematics system to law enforcement authorities or other location remote from the vehicle. Thus, through these simple wireless powerless sensors, the problem of suffocation either from lack of oxygen or death from excessive heat or cold can all be solved in a simple, low-cost manner through using an interrogator as disclosed in the current assignee's U.S. Pat. No. 6,662,642.

Additionally, a sensitive layer on a SAW can be made to be sensitive to other chemicals such as water vapor for humidity control or alcohol for drunken driving control. Similarly, the sensitive layer can be designed to be sensitive to carbon monoxide thereby preventing carbon monoxide poisoning. Many other chemicals can be sensed for specific applications such as to check for chemical leaks in commercial vehicles, for example. Whenever such a sensor system determines that a dangerous situation is developing, an alarm can be sounded and/or the situation can be automatically communicated to an off vehicle location through telematics, a cell phone such as a 911 call, the Internet or through a subscriber service such as OnStar®.

9.5 Telematics with Non-Automotive Vehicles

The transmission of data obtained from imagers, or other transducers, to another location, requiring the processing of the information, using neural networks for example, to a remote location is an important feature of the inventions disclosed herein. This capability can permit an owner of a cargo container or truck trailer to obtain a picture of the interior of the vehicle at any time via telematics. When coupled with occupant sensing, the driver of a vehicle can be recognized and the result sent by telematics for authorization to minimize the theft or unauthorized operation of a vehicle. The recognition of the driver can either be performed on the vehicle or an image of the driver can be sent to a remote location for recognition at that location.

Generally monitoring of containers, trailers, chassis etc. is accomplished through telecommunications primarily with LEO or geostationary satellites or through terrestrial-based communication systems. These systems are commercially available and will not be discussed here. Expected future systems include communication between the container and the infrastructure to indicate to the monitoring authorities that a container with a particular identification number is passing a particular terrestrial point. If this is expected, then no action would be taken. The container identification number can be part of a national database that contains information as to the contents of the container. Thus, for example, if a container containing hazardous materials approaches a bridge or tunnel that forbids such hazardous materials from passing over the bridge or through the tunnel, then an emergency situation can be signaled and preventive action taken.

It is expected that monitoring of the transportation of cargo containers will dramatically increase as the efforts to reduce terrorist activities also increase. If every container that passes within the borders of the United States has an identification number and that number is in a database that provides the contents of that container, then the use of shipping containers by terrorists or criminals should gradually be eliminated. If these containers are carefully monitored by satellite or another communication system that indicates any unusual activity of a container, an immediate investigation can result and then the cargo transportation system will gradually approach perfection where terrorists or criminals are denied this means of transporting material into and within the United States. If any container is found containing contraband material, then the entire history of how that container entered the United States can be checked to determine the source of the failure. If the failure is found to have occurred at a loading port outside of the United States, then sanctions can be imposed on the host country that could have serious effects on that country's ability to trade worldwide. Just the threat of such an action would be a significant deterrent. Thus, the use of containers to transport hazardous materials or weapons of mass destruction as well as people, narcotics, or other contraband and can be effectively eliminated through the use of the container monitoring system of at least one of the inventions disclosed herein.

Prior to the entry of a container ship into a harbor, a Coast Guard boat from the U.S. Customs Service can approach the container vessel and scan all of the containers thereon to be sure that all such containers are registered and tracked including their contents. Where containers contain dangerous material legally, the seals on those containers can be carefully investigated prior to the ship entering U.S. waters. Obviously, many other security precautions can now be conceived once the ability to track all containers and their contents has been achieved according to the teachings of at least one of the inventions disclosed herein.

Containers that enter the United States through land ports of entry can also be interrogated in a similar fashion. As long as the shipper is known and reputable and the container contents are in the database, which would probably be accessible over the Internet, is properly updated, then all containers will be effectively monitored that enter the United States with the penalty of an error resulting in the disenfranchisement of the shipper, and perhaps sanctions against the country, which for most reputable shippers or shipping companies would be a severe penalty sufficient to cause such shippers or shipping companies to take appropriate action to assure the integrity of the shipping containers. Intelligent selected random inspections guided by the container history would still take place.

Although satellite communication is preferred, communication using cell phones and infrastructure devices placed at appropriate locations along roadways are also possible. Eventually there will be a network linking all vehicles on the highways in a peer-to-peer arrangement (perhaps using Bluetooth, IEEE 802.11 (WI-FI), Wi-Mobile or other local, mesh or ad-hoc network) at which time information relative to container contents etc. can be communicated to the Internet or elsewhere through this peer-to-peer network. It is expected that a pseudo-noise-based or similar communication system such as a code division multiple access (CDMA) system, wherein the identifying code of a vehicle is derived from the vehicle's GPS determined location, will be the technology of choice for this peer-to-peer vehicle network. It is expected that this network will be able to communicate such information to the Internet (with proper security precautions including encryption where necessary or desired) and that all of the important information relative to the contents of moving containers throughout the United States will be available on the Internet on a need-to-know basis. Thus, law enforcement agencies can maintain computer programs that will monitor the contents of containers using information available from the Internet. Similarly, shippers and receivers can monitor the status of their shipments through a connection onto the Internet. Thus, the existence of the Internet or equivalent can be important to the monitoring system described herein.

An alternate method of implementing the invention is to make use of a cell phone or PDA. Cell phones that are now sold contain a GPS-based location system as do many PDAs. Such a system along with minimal additional apparatus can be used to practice the teachings disclosed herein. In this case, the cell phone, PDA or similar portable device could be mounted through a snap-in attachment system, for example, wherein the portable device is firmly attached to the vehicle. The device can at that point, for example, obtain an ID number from the container through a variety of methods such as a RFID, SAW or hardwired based system. It can also connect to a satellite antenna that would permit the device to communicate to a LEO or GEO satellite system, such as Skybitz as described above. Since the portable device would only operate on a low duty cycle, the battery should last for many days or perhaps longer. Of course, if it is connected to the vehicle power system, its life could be indefinite. When power is waning, this fact can be sent to the satellite or cell phone system to alert the appropriate personnel. Since a cell phone contains a microphone, it could be trained, using an appropriate pattern recognition system, to recognize the sound of an accident or the deployment of an airbag or similar event. It thus becomes a very low cost OnStar® type telematics system.

As an alternative to using a satellite network, the cell phone network can be used in essentially the same manner when a cell phone signal is available. All of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired, keeping the overall system at the highest technical state. Existing telematics systems such as OnStar® can of course also be used with this system.

Importantly, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen vehicle location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, voice print, facial or iris recognition etc. thereby giving that capability to vehicles. The device can thus become the general key to the vehicle or house, and can even open the garage door etc. If the cell phone is lost, its whereabouts can be instantly found since it has a GPS receiver and knows where it is. If it is stolen, it will become inoperable without the biometric identification from the owner.

Other communication systems will also frequently be used to connect the container with the chassis and/or the tractor and perhaps the identification of the driver or operator. Thus, information can be available on the Internet showing what tractor, what trailer, what container and what driver is operating at a particular time, at a particular GPS location, on a particular roadway, with what particular container contents. Suitable security will be provided to ensure that this information is not freely available to the general public. Redundancy can be provided to prevent the destruction or any failure of a particular site from failing the system.

This communication between the various elements of the shipping system which are co-located (truck, trailer, container, container contents, driver etc.) can be connected through a wired or wireless bus such as the CAN bus. Also, an electrical system such as disclosed in U.S. Pat. No. 5,809,437, U.S. Pat. No. 6,175,787 and U.S. Pat. No. 6,326,704 can also be used in the invention.

10. Display

A portion of the windshield, such as the lower left corner, can be used to display the vehicle and surrounding vehicles or other objects as seen from above, for example, as described in U.S. Pat. No. 7,126,583. This display can use pictures or icons as appropriate. In another case, the condition of the road such as the presence, or likelihood of black ice can be displayed on the windshield where it would show on the road if the driver could see it. This would require a source of information that such a condition exists, however, here the concern is that it can be displayed whatever the source of this or any other relevant information. When used in conjunction with a navigation system, directions including pointing arrows or a path outline perhaps in color, similar to the first down line on a football field as seen on TV, can be displayed to direct the driver to his destination or to points of interest. Additional details about displays is found in the '881 application.

11. Pattern Recognition

In basic embodiments of the inventions, wave or energy-receiving transducers are arranged in the vehicle at appropriate locations, associated algorithms are trained, if necessary depending on the particular embodiment, and function to determine whether a life form, or other object, is present in the vehicle and if so, how many life forms or objects are present. A determination can also be made using the transducers as to whether the life forms are humans, or more specifically, adults, child in child seats, etc. As noted above and below, this is possible using pattern recognition techniques. Moreover, the processor or processors associated with the transducers can be trained (loaded with a trained pattern recognition algorithm) to determine the location of the life forms or objects, either periodically or continuously or possibly only immediately before, during and after a crash. The location of the life forms or objects can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as determining the position of his or her extremities and head and chest (specific). Or, a determination can be made as to the size or type of objects such as boxes are in a truck trailer or cargo container. The degree of detail is limited by several factors, including, e.g., the number, position and type of transducers and the training of the pattern recognition algorithm.

When different objects are placed on the front passenger seat, the images (here "image" is used to represent any form of signal) from transducers 6, 8, 10 (FIG. 1) are different for different objects but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the set of "rules" or an algorithm that differentiates the images of one type of object from the images of other types of objects, for example which differentiate the adult occupant images from the rear facing child seat images or boxes. The similarities of these images for various child seats are frequently not obvious to a person looking at plots of the time series from ultrasonic sensors, for example, and thus computer algorithms are developed to sort out the various patterns. For a more detailed discussion of pattern recognition see U.S. RE37260 and discussions elsewhere herein.

The determination of these rules is important to the pattern recognition techniques used in at least one of the inventions disclosed herein. In general, three approaches have been useful, artificial intelligence, fuzzy logic and artificial neural networks including modular or combination neural networks. Other types of pattern recognition techniques may also be used, such as sensor fusion as disclosed in Corrado U.S. Pat. No. 5,482,314, U.S. Pat. No. 5,890,085, and U.S. Pat. No. 6,249,729. In some of the inventions disclosed herein, such as the determination that there is an object in the path of a closing window or door using acoustics or optics as described herein, the rules are sufficiently obvious that a trained researcher can look at the returned signals and devise an algorithm to make the required determinations. In others, such as the determination of the presence of a rear facing child seat or of an occupant, artificial neural networks are used to determine the rules. Neural network software for determining the pattern recognition rules is available from various sources such as International Scientific Research, Inc., Panama City, Panama.

The human mind has little problem recognizing faces even when they are partially occluded such as with a hat, sunglasses or a scarf, for example. With the increase in low cost computing power, it is now becoming possible to train a rather large neural network, perhaps a combination neural network, to recognize most of those cases where a human mind will also be successful.

Other techniques which may or may not be part of the process of designing a system for a particular application include the following:

1. Fuzzy logic. Neural networks frequently exhibit the property that when presented with a situation that is totally different from any previously encountered, an irrational decision can result. Frequently, when the trained observer looks at input data, certain boundaries to the data become evident and cases that fall outside of those boundaries are indicative of either corrupted data or data from a totally unexpected situation. It is sometimes desirable for the system designer to add rules to handle these cases. These can be fuzzy logic-based rules or rules based on human intelligence. One example would be that when certain parts of the data vector fall outside of expected bounds that the system defaults to an airbag-enable state or the previously determined state.

2. Genetic algorithms. When developing a neural network algorithm for a particular vehicle, there is no guarantee that the best of all possible algorithms has been selected. One method of improving the probability that the best algorithm has been selected is to incorporate some of the principles of genetic algorithms. In one application of this theory, the network architecture and/or the node weights are varied pseudo-randomly to attempt to find other combinations which have higher success rates. The discussion of such genetic algorithms systems appears in the book *Computational Intelligence* referenced above.

Although neural networks are preferred other classifiers such as Bayesian classifiers can be used as well as any other pattern recognition system. A key feature of most of the inventions disclosed herein is the recognition that the technology of pattern recognition rather than deterministic mathematics should be applied to solving the occupant sensing problem.

11.1 Neural Networks

Figure 64:
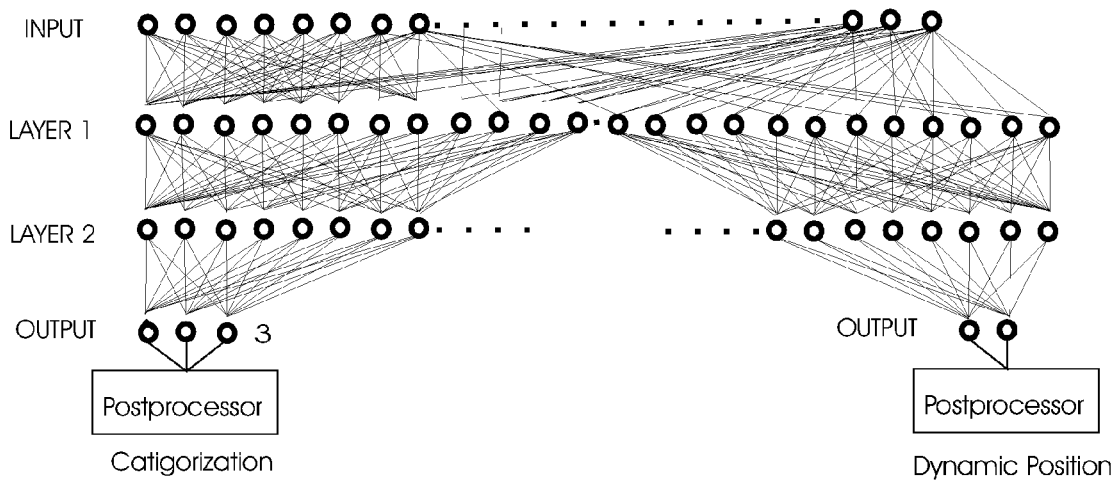
FIG. 64 is a diagram of a neural network similar to FIG. 19b only with a dual architecture with the addition of a post processing operation for both the categorization and position measurement networks and separate hidden layer nodes for each of the two networks.

An occupant can move from a position safely displaced from the airbag to a position where he or she can be seriously injured by the deployment of an airbag within a fraction of a second during pre-crash braking, for example. On the other hand, it takes a substantially longer time period to change the seat occupancy state from a forward facing person to a rear facing child seat, or even from a forward facing child seat to a rear facing child seat. This fact can be used in the discrimination process through post-processing algorithms. One method, which also prepares for DOOP, is to use a two-layered neural network or two separate neural networks. The first one categorizes the seat occupancy into, for example, (1) empty seat, (2) rear facing child seat, (3) forward facing child seat and (4) forward facing human (not in a child seat). The second is used for occupant position determination. In the implementation, the same input layer can be used for both neural networks but separate hidden and output layers are used. This is illustrated in FIG. 64 which is similar to FIG. 19*b* with the addition of a post processing operation for both the categorization and position networks and the separate hidden layer nodes for each network.

If the categorization network determines that either a category (3) or (4) exists, then the second network is run, which determines the location of the occupant. Significant averaging of the vectors is used for the first network and substantial evidence is required before the occupancy class is changed. For example, if data is acquired every 10 milliseconds, the first network might be designed to require 600 out of 1000 changed vectors before a change of state is determined. In this case, at least 6 seconds of confirming data would be required. Such a system would therefore not be fooled by a momentary placement of a newspaper by a forward facing human, for example, that might look like a rear-facing child seat.

If, on the other hand, a forward facing human were chosen, his or her position could be determined every 10 milliseconds. A decision that the occupant had moved out of position would not necessarily be made from one 10 millisecond reading unless that reading was consistent with previous readings. Nevertheless, a series of consistent readings would lead to a decision within 10 milliseconds of when the occupant crossed over into the danger zone proximate to the airbag module. This method of using history is used to eliminate the effects of temperature gradients, for example, or other events that could temporarily distort one or more vectors. The algorithms which perform this analysis are part of the post-processor.

More particularly, in one embodiment of the method in accordance with at least one of the inventions herein in which two neural networks are used in the control of the deployment of an occupant restraint device based on the position of an object in a passenger compartment of a vehicle, several wave-emitting and receiving transducers are mounted on the vehicle. In one preferred embodiment, the transducers are ultrasonic transducers which simultaneously transmit and receive waves at different frequencies from one another. A determination is made by a first neural network whether the object is of a type requiring deployment of the occupant restraint device in the event of a crash involving the vehicle based on the waves received by at least some of the transducers after being modified by passing through the passenger compartment. If so, another determination is made by a second neural network whether the position of the object relative to the occupant restraint device would cause injury to the object upon deployment of the occupant restraint device based on the waves received by at least some of the transducers. The first neural network is trained on signals from at least some of the transducers representative of waves received by the transducers when different objects are situated in the passenger compartment. The second neural network is trained on signals from at least some of the transducers when different objects in different positions are situated in the passenger compartment.

The transducers used in the training of the first and second neural networks and operational use of method are not necessary the same transducers and different sets of transducers can be used for the typing or categorizing of the object via the first neural network and the position determination of the object via the second neural network.

The modifications described above with respect to the use of ultrasonic transducers can also be used in conjunction with a dual neural network system. For example, motion of a respective vibrating element or cone of one or more of the transducers may be electronically or mechanically diminished or suppressed to reduce ringing of the transducer and/or one or more of the transducers may be arranged in a respective tube having an opening through which the waves are transmitted and received.

In another embodiment of the invention, a method for categorizing and determining the position of an object in a passenger compartment of a vehicle entails mounting a plurality of wave-receiving transducers on the vehicle, training a first neural network on signals from at least some of the transducers representative of waves received by the transducers when different objects in different positions are situated in the passenger compartment, and training a second neural network on signals from at least some of the transducers representative of waves received by the transducers when different objects in different positions are situated in the passenger compartment. As such, the first neural network provides an output signal indicative of the categorization of the object while the second neural network provides an output signal indicative of the position of the object. The transducers may be controlled to transmit and receive waves each at a different frequency, as discussed elsewhere herein, and one or more of the transducers may be arranged in a respective tube having an opening through which the waves are transmitted and received.

Although this system is described with particular advantageous use for ultrasonic and optical transducers, it is conceivable that other transducers other than the ultrasonics or optics can also be used in accordance with the invention. A dual neural network is a form of a modular neural network and both are subsets of combination neural networks.

The system used in a preferred implementation of at least one of the inventions disclosed herein for the determination of the presence of a rear facing child seat, of an occupant or of an empty seat, for example, is the artificial neural network, which is also commonly referred to as a trained neural network. In one case, illustrated in FIG. 1, the network operates on the returned signals as sensed by transducers 6, 8, 9 and 10, for example. Through a training session, the system is taught to differentiate between the different cases. This is done by conducting a large number of experiments where a selection of the possible child seats is placed in a large number of possible orientations on the front passenger seat. Similarly, a sufficiently large number of experiments are run with human occupants and with boxes, bags of groceries and other objects (both inanimate and animate). For each experiment with different objects and the same object in different positions, the returned signals from the transducers 6, 8, 9 and 10, for example, are associated with the identification of the occupant in the seat or the empty seat and information about the occupant such as its orientation if it is a child seat and/or position. Data sets are formed from the returned signals and the identification and information about the occupant or the absence of an occupant. The data sets are input into a neural network-generating program that creates a trained neural network that can, upon receiving input of returned signals from the transducers 6, 8, 9 and 10, provide an output of the identification and information about the occupant most likely situated in the seat or ascertained the existence of an empty seat. Sometimes as many as 1,000,000 such experiments are run before the neural network is sufficiently trained and tested so that it can differentiate among the several cases and output the correct decision with a very high probability. The data from each trial is combined to form a one-dimensional array of data called a vector. Of course, it must be realized that a neural network can also be trained to differentiate among additional cases, for example, a forward facing child seat. It can also be trained to recognize the existence of one or more boxes or other cargo within a truck trailer, cargo container, automobile trunk or railroad car, for example.

Considering now FIG. 9, the normalized data from the ultrasonic transducers 6, 8, 9 and 10, the seat track position detecting sensor 74, the reclining angle detecting sensor 57, from the weight sensor(s) 7, 76 and 97, from the heartbeat sensor 71, the capacitive sensor 78 and the motion sensor 73 are input to the neural network 65, and the neural network 65 is then trained on this data. More specifically, the neural network 65 adds up the normalized data from the ultrasonic transducers, from the seat track position detecting sensor 74, from the reclining angle detecting sensor 57, from the weight sensor(s) 7, 76 and 97, from the heartbeat sensor 71, from the capacitive sensor 78 and from the motion sensor 73 with each data point multiplied by an associated weight according to the conventional neural network process to determine correlation function (step S6 in FIG. 18).

Looking now at FIG. 19B, in this embodiment, 144 data points are appropriately interconnected at 25 connecting points of layer 1, and each data point is mutually correlated through the neural network training and weight determination process. The 144 data points consist of 138 measured data points from the ultrasonic transducers, the data (139th) from the seat track position detecting sensor 74, the data (140th) from the reclining angle detecting sensor 57, the data (141st) from the weight sensor(s) 7 or 76, the data ($142^{nd}$) from the heartbeat sensor 71, the data ($143^{rd}$) from the capacitive sensor and the data ($144^{th}$) from the motion sensor (the last three inputs are not shown on FIG. 19B. Each of the connecting points of the layer 1 has an appropriate threshold value, and if the sum of measured data exceeds the threshold value, each of the connecting points will output a signal to the connecting points of layer 2. Although the weight sensor input is shown as a single input, in general there will be a separate input from each weight sensor used. For example, if the seat has four seat supports and a strain measuring element is used on each support, what will be four data inputs to the neural network.

The connecting points of the layer 2 comprises 20 points, and the 25 connecting points of the layer 1 are appropriately interconnected as the connecting points of the layer 2. Similarly, each data is mutually correlated through the training process and weight determination as described above and in above-referenced neural network texts. Each of the 20 connecting points of the layer 2 has an appropriate threshold value, and if the sum of measured data exceeds the threshold value, each of the connecting points outputs a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively, for example.

The neural network 65 recognizes the seated-state of a passenger A by training as described in several books on Neural Networks mentioned in the above referenced patents and patent applications. Then, after training the seated-state of the passenger A and developing the neural network weights, the system is tested. The training procedure and the test procedure of the neural network 65 will hereafter be described with a flowchart shown in FIG. 18.

The threshold value of each connecting point is determined by multiplying weight coefficients and summing up the results in sequence, and the aforementioned training process is to determine a weight coefficient Wj so that the threshold value (ai) is a previously determined output.

$$ai = \Sigma Wj \cdot Xj (j=1 \text{ to } N)$$

wherein
Wj is the weight coefficient,
Xj is the data and
N is the number of samples.

Based on this result of the training, the neural network 65 generates the weights for the coefficients of the correlation function or the algorithm (step S7).

At the time the neural network 65 has learned a suitable number of patterns of the training data, the result of the training is tested by the test data. In the case where the rate of correct answers of the seated-state detecting unit based on this test data is unsatisfactory, the neural network is further trained and the test is repeated. In this embodiment, the test was performed based on about 600,000 test patterns. When the rate of correct test result answers was at about 98%, the training was ended. Further improvements to the ultrasonic occupant sensor system has now resulted in accuracies exceeding 98% and for the optical system exceeding 99%.

The neural network software operates as follows. The training data is used to determine the weights which multiply the values at the various nodes at the lower level when they are combined at nodes at a higher level. Once a sufficient number of iterations have been accomplished, the independent data is used to check the network. If the accuracy of the network using the independent data is lower than the last time that it was checked using the independent data, then the previous weights are substituted for the new weights and training of the network continues on a different path. Thus, although the independent data is not used to train the network, it does strongly affect the weights. It is therefore not really independent. Also, both the training data and the independent data are created so that all occupancy states are roughly equally represented. As a result, a third set of data is used which is structured to more closely represent the real world of vehicle occupancy. This third data set, the "real world" data, is then used to arrive at a figure as to the real accuracy of the system.

The neural network 65 has outputs 65a, 65b and 65c (FIG. 9). Each of the outputs 65a, 65b and 65c outputs a signal of logic 0 or 1 to a gate circuit or algorithm 77. Based on the signals from the outputs 65a, 65b and 65c, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat, a seat occupied by an inanimate object or a seat occupied by a pet (VACANT), the output (010) corresponds to a rear facing child seat (RFCS) or an abnormally seated passenger (ASP or OOPA), and the output (100) corresponds to a normally seated passenger (NSP or FFA) or a forward facing child seat (FFCS).

The gate circuit (seated-state evaluation circuit) 77 can be implemented by an electronic circuit or by a computer algorithm by those skilled in the art and the details will not be presented here. The function of the gate circuit 77 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) and a forward facing child seat (FFCS). By the addition of one or more weight sensors in the function of acting as a switch when the weight is above or below 60 lbs., it has been found that this ambiguity can be eliminated. The gate circuit therefore takes into account the output of the neural network and also the weight from the weight sensor(s) as being above or below 60 lbs. and thereby separates the two cases just described and results in five discrete outputs.

The use of weight data must be heavily filtered since during driving conditions, especially on rough roads or during an accident, the weight sensors will give highly varying output. The weight sensors, therefore, are of little value during the period of time leading up to and including a crash and their influence must be minimized during this time period. One way of doing this is to average the data over a long period of time such as from 5 seconds to a minute or more.

Thus, the gate circuit 77 fulfills a role of outputting five kinds of seated-state evaluation signals, based on a combination of three kinds of evaluation signals from the neural network 65 and superimposed information from the weight sensor(s). The five seated-state evaluation signals are input to an airbag deployment determining circuit that is part of the airbag system and will not be described here. As disclosed in above-referenced patents and patent applications, the output of this system can also be used to activate a variety of lights or alarms to indicate to the operator of the vehicle the seated state of the passenger. The system that has been here described for the passenger side is also applicable for the most part for the driver side.

An alternate and preferred method of accomplishing the function performed by the gate circuit is to use a modular neural network. In this case, the first level neural network is trained on determining whether the seat is occupied or vacant. The input to this neural network consists of all of the data points described above. Since the only function of this neural network is to ascertain occupancy, the accuracy of this neural network is very high. If this neural network determines that the seat is not vacant, then the second level neural network determines the occupancy state of the seat.

In this embodiment, although the neural network 65 has been employed as an evaluation circuit, the mapping data of the coefficients of a correlation function may also be implemented or transferred to a microcomputer to constitute the evaluation circuit (see Step S8 in FIG. 18).

According to the seated-state detecting unit of the present invention, the identification of a vacant seat (VACANT), a rear facing child seat (RFCS), a forward facing child seat (FFCS), a normally seated adult passenger (NSP), an abnormally seated adult passenger (ASP), can be reliably performed. Based on this identification, it is possible to control a component, system or subsystem in the vehicle. For example, a regulation valve which controls the inflation or deflation of an airbag may be controlled based on the evaluated identification of the occupant of the seat. This regulation valve may be of the digital or analog type. A digital regulation valve is one that is in either of two states, open or closed. The control of the flow is then accomplished by varying the time that the valve is open and closed, i.e., the duty cycle.

The neural network has been previously trained on a significant number of occupants of the passenger compartment. The number of such occupants depends strongly on whether the driver or the passenger seat is being analyzed. The variety of seating states or occupancies of the passenger seat is vastly greater than that of the driver seat. For the driver seat, a typical training set will consist of approximately 100 different vehicle occupancies. For the passenger seat, this number can exceed 1000. These numbers are used for illustration purposes only and will differ significantly from vehicle model to vehicle model. Of course many vectors of data will be taken for each occupancy as the occupant assumes different positions and postures.

The neural network is now used to determine which of the stored occupancies most closely corresponds to the measured data. The output of the neural network can be an index of the setup that was used during training that most closely matches the current measured state. This index can be used to locate stored information from the matched trained occupancy. Information that has been stored for the trained occupancy typically includes the locus of the centers of the chest and head of the driver, as well as the approximate radius of pixels which is associated with this center to define the head area, for example. For the case of FIG. 8A, it is now known from this exercise where the head, chest, and perhaps the eyes and ears, of the driver are most likely to be located and also which pixels should be tracked in order to know the precise position of the driver's head and chest. What has been described above is the identification process for automobile occupancy and is only representative of the general process. A similar procedure, although usually simpler with fewer steps, is applicable to other vehicle monitoring cases.

The use of trainable pattern recognition technologies such as neural networks is an important part of the some of the inventions discloses herein particularly for the automobile occupancy case, although other non-trained pattern recognition systems such as fuzzy logic, correlation, Kalman filters, and sensor fusion can also be used. These technologies are implemented using computer programs to analyze the patterns of examples to determine the differences between different categories of objects. These computer programs are derived using a set of representative data collected during the training phase, called the training set. After training, the computer programs output a computer algorithm containing the rules permitting classification of the objects of interest based on the data obtained after installation in the vehicle. These rules, in the form of an algorithm, are implemented in the system that is mounted onto the vehicle. The determination of these rules is important to the pattern recognition techniques used in at least one of the inventions disclosed herein. Artificial neural networks using back propagation are thus far the most successful of the rule determination approaches, however, research is underway to develop systems with many of the advantages of back propagation neural networks, such as learning by training, without the disadvantages, such as the inability to understand the network and the possibility of not converging to the best solution. In particular, back propagation neural networks will frequently give an unreasonable response when presented with data than is not within the training data. It is well known that neural networks are good at interpolation but poor at extrapolation. A combined neural network fuzzy logic system, on the other hand, can substantially solve this problem. Additionally, there are many other neural network systems in addition to back propagation. In fact, one type of neural network may be optimum for identifying the contents of the passenger compartment and another for determining the location of the object dynamically.

Numerous books and articles, including more than 500 U.S. patents, describe neural networks in great detail and thus the theory and application of this technology is well known and will not be repeated here. Except in a few isolated situations where neural networks had been used to solve particular problems limited to engine control, for example, it was not believed that they had previously been applied to automobiles, trucks or other vehicle monitoring situations for the same problems as to which it was first applied by the current assignee.

The system generally used in the instant invention, therefore, for the determination of the presence of a rear facing child seat, an occupant, or an empty seat is the artificial neural network or a neural-fuzzy system. In this case, the network operates on the returned signals from a CCD or CMOS array as sensed by transducers 49, 50, 51 and 54 in FIG. 8D, for example. For the case of the front passenger seat, for example, through a training session, the system is taught to differentiate between the three cases. This is done by conducting a large number of experiments where available child seats are placed in numerous positions and orientations on the front passenger seat of the vehicle.

Once the network is determined, it is possible to examine the result to determine, from the algorithm created by the neural network software, the rules that were finally arrived at by the trial and error training technique. In that case, the rules can then be programmed into a microprocessor. Alternately, a neural computer can be used to implement the neural network directly. In either case, the implementation can be carried out by those skilled in the art of pattern recognition using neural networks. If a microprocessor is used, a memory device is also required to store the data from the analog to digital converters which digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

A review of the literature on neural networks yields the conclusion that the use of such a large training set is unique in the neural network field. The rule of thumb for neural networks is that there must be at least three training cases for each network weight. Thus, for example, if a neural network has 156 input nodes, 10 first hidden layer nodes, 5 second hidden layer nodes, and one output node this results in a total of 1,622 weights. According to conventional theory 5000 training examples should be sufficient. It is highly unexpected, therefore, that greater accuracy would be achieved through 100 times that many cases. It is thus not obvious and cannot be deduced from the neural network literature that the accuracy of the system will improve substantially as the size of the training database increases even to tens of thousands of cases. It is also not obvious looking at the plots of the vectors obtained using ultrasonic transducers that increasing the number of tests or the database size will have such a significant effect on the system accuracy. Each of the vectors is typically a rather course plot with a few significant peaks and valleys. Since the spatial resolution of an ultrasonic system is typically about 2 to 4 inches, it is once again surprising that such a large database is required to achieve significant accuracy improvements.

The back propagation neural network is a very successful general-purpose network. However, for some applications, there are other neural network architectures that can perform better. If it has been found, for example, that a parallel network as described above results in a significant improvement in the system, then, it is likely that the particular neural network architecture chosen has not been successful in retrieving all of the information that is present in the data. In such a case, an RCE, Stochastic, Logicon Projection, cellular, support vector machine or one of the other approximately 30 types of neural network architectures can be tried to see if the results improve. This parallel network test, therefore, is a valuable tool for determining the degree to which the current neural network is capable of using efficiently the available data.

One of the salient features of neural networks is their ability of find patterns in data regardless of its source. Neural networks work well with data from ultrasonic sensors, optical imagers, strain gage and bladder weight sensors, temperature sensors, chemical sensors, radiation sensors, pressure sensors, electric field sensors, capacitance based sensors, any other wave sensors including the entire electromagnetic spectrum, etc. If data from any sensors can be digitized and fed into a neural network generating program and if there is information in the pattern of the data then neural networks can be a viable method of identifying those patterns and correlating them with a desired output function. Note that although the inventions disclosed herein preferably use neural networks and combination neural networks to be described next, these inventions are not limited to this form or method of pattern recognition. The major breakthrough in occupant sensing came with the recognition by the current assignee that ordinary analysis using mathematical equations where the researcher looks at the data and attempts, based on the principles of statistics, engineering or physics, to derive the relevant relationships between the data and the category and location of an occupying item, is not the proper approach and that pattern recognition technologies should be used. This is believed to be the first use of such pattern recognition technologies in the automobile safety and monitoring fields with the exception that neural networks have been used by the current assignee and others as the basis of a crash sensor algorithm and by certain automobile manufacturers for engine control. Note for many monitoring situations in truck trailers, cargo containers and railroad cars where questions such as "is there anything in the vehicle?" are asked, neural networks may not always be required.

11.2 Combination Neural Networks

The technique that was described above for the determination of the location of an occupant during panic or braking pre-crash situations involved the use of a modular neural network. In that case, one neural network was used to determine the occupancy state of the vehicle and one or more neural networks were used to determine the location of the occupant within the vehicle. The method of designing a system utilizing multiple neural networks is a key teaching of the present invention. When this idea is generalized, many potential combinations of multiple neural network architectures become possible. Some of these will now be discussed.

One of the earliest attempts to use multiple neural networks was to combine different networks trained differently but on substantially the same data under the theory that the errors which affect the accuracy of one network would be independent of the errors which affect the accuracy of another network. For example, for a system containing four ultrasonic transducers, four neural networks could be trained each using a different subset of the data from the four transducers. Thus, if the transducers are arbitrarily labeled A, B, C and D, the first neural network would be trained on data from A, B and C. The second neural network would be trained on data from B, C, and D etc. This technique has not met with a significant success since it is an attempt to mask errors in the data rather than to eliminate them. Nevertheless, such a system does perform marginally better in some situations compared to a single network using data from all four transducers. The penalty for using such a system is that the computational time is increased by approximately a factor of three. This significantly affects the cost of the system installed in a vehicle.

An alternate method of obtaining some of the advantages of the parallel neural network architecture described above, is to form a single neural network but where the nodes of one or more of the hidden layers are not all connected to all of the input nodes. Alternately, if the second hidden layer is chosen, all of the notes from the previous hidden layer are not connected to all of the nodes of the subsequent layer. The alternate groups of hidden layer nodes can then be fed to different output notes and the results of the output nodes combined, either through a neural network training process into a single decision or a voting process. This latter approach retains most of the advantages of the parallel neural network while substantially reducing the computational complexity.

The fundamental problem with parallel networks is that they focus on achieving reliability or accuracy by redundancy rather than by improving the neural network architecture itself or the quality of the data being used. They also increase the cost of the final vehicle installed systems. Alternately, modular neural networks improve the accuracy of the system by dividing up the tasks. For example, if a system is to be designed to determine the type of tree or the type of animal in a particular scene, the modular approach would be to first determine whether the object of interest is an animal or a tree and then use separate neural networks to determine the type of tree and the type of animal. When a human looks at a tree, he is not asking himself "is that a tiger or a monkey?". Modular neural network systems are efficient since once the categorization decision is made, e.g., the seat is occupied by forward facing human, the location of that object can be determined more accurately and without requiring increased computational resources.

Another example where modular neural networks have proven valuable is to provide a means for separating "normal cases" from "special cases". It has been found that in some cases, the vast majority of the data falls into what might be termed "normal" cases that are easily identified with a neural network. The balance of the cases cause the neural network considerable difficulty, however, there are identifiable characteristics of the special cases that permits them to be separated from the normal cases and dealt with separately. Various types of human intelligence rules can be used, in addition to a neural network, to perform this separation including fuzzy logic, statistical filtering using the average class vector of normal cases, the vector standard deviation, and threshold where a fuzzy logic network is used to determine chance of a vector belonging to a certain class. If the chance is below a threshold, the standard neural network is used and if above the threshold, the special one is used.

Mean-Variance calculations, Fuzzy Logic, Stochastic, and Genetic Algorithm networks, and combinations thereof such as Neuro-Fuzzy systems are other technologies considered in designing an appropriate system. During the process of designing a system to be adapted to a particular vehicle, many different neural networks and other pattern recognition architectures are considered including those mentioned above. The particular choice of architecture is frequently determined on a trial and error basis by the system designer in many cases using the combination neural network CAD software from International Scientific Research Inc. (ISR). Although the parallel architecture system described above has not proven to be in general beneficial, one version of this architecture has shown some promise. It is known that when training a neural network, that as the training process proceeds, the accuracy of the decision process improves for the training and independent databases. It is also known that the ability of the network to generalize suffers. That is, when the network is presented with a system which is similar to some case in the database but still with some significant differences, the network may make the proper decision in the early stages of training, but the wrong decisions after the network has become fully trained. This is sometimes called the young network vs. old network dilemma. In some cases, therefore, using an old network in parallel with a young network can retain some of the advantages of both networks, that is, the high accuracy of the old network coupled with the greater generality of the young network. Once again, the choice of any of these particular techniques is part of the process of designing a system to be adapted to a particular vehicle and is a prime subject of at least one of the inventions disclosed herein. The particular combination of tools used depends on the particular application and the experience of the system designer.

It has been found that the accuracy of the neural network pattern recognition system can be substantially enhanced if the problem is broken up into several problems. Thus, for example, rather than deciding that the airbag should be deployed or not using a single neural network and inputting all of the available data, the accuracy is improved it is first decided whether the data is good, then whether the seat is empty or occupied and then whether it is occupied by an adult or a child. Finally, if the decisions say that there is a forward facing adult occupying the seat, then the final level of neural network determines the location of the adult. Once the location is determined, a non-neural network algorithm can determine whether to enable deployment of the restraint system. The process of using multiple layers of neural networks is called modular neural networks and when other features are added, it is called combination neural networks.

Examples of combination neural networks are found in U.S. patent application Ser. No. 10/940,881 and are incorporated by reference herein.

11.3 Interpretation of Other Occupant States

Once a vehicle interior monitoring system employing a sophisticated pattern recognition system, such as a neural network or modular neural network, is in place, it is possible to monitor the motions of the driver over time and determine if he is falling asleep or has otherwise become incapacitated. In such an event, the vehicle can be caused to respond in a number of different ways. One such system is illustrated in FIG. 6 and consists of a monitoring system having transducers 8 and 9 plus microprocessor 20 programmed to compare the motions of the driver over time and trained to recognize changes in behavior representative of becoming incapacitated e.g., the eyes blinking erratically and remaining closed for ever longer periods of time. If the system determines that there is a reasonable probability that the driver has fallen asleep, for example, then it can turn on a warning light shown here as 41 or send a warning sound. If the driver fails to respond to the warning by pushing a button 43, for example, then the horn and lights can be operated in a manner to warn other vehicles and the vehicle brought to a stop. One novel approach, not shown, would be to use the horn as the button 43. For a momentary depression of the horn, for this case, the horn would not sound. Other responses can also be programmed and other tests of driver attentiveness can be used, without resorting to attempting to monitor the motions of the driver's eyes that would signify that the driver was alert. These other responses can include an input to the steering wheel, motion of the head, blinking or other motion of the eyes etc. In fact, by testing a large representative sample of the population of drivers, the range of alert responses to the warning light and/or sound can be compared to the lack of response of a sleeping driver and thereby the state of attentiveness determined.

An even more sophisticated system of monitoring the behavior of the driver is to track his eye motions using such techniques as are described in: Freidman et al., U.S. Pat. No. 4,648,052 "Eye Tracker Communication System"; Heyner et al., U.S. Pat. No. 4,720,189 "Eye Position Sensor"; Hutchinson, U.S. Pat. No. 4,836,670 "Eye Movement Detector"; and Hutchinson, U.S. Pat. No. 4,950,069 "Eye Movement Detector With Improved Calibration and Speed" as well as U.S. Pat. No. 5,008,946 and U.S. Pat. No. 5,305,012 referenced above. The detection of the impaired driver in particular can be best determined by these techniques. These systems use pattern recognition techniques plus, in many cases, the transmitter and CCD receivers must be appropriately located so that the reflection off of the cornea of the driver's eyes can be detected as discussed in above-referenced patents. The size of the CCD arrays used herein permits their location, sometimes in conjunction with a reflective windshield, where this corneal reflection can be detected with some difficulty. Sunglasses or other items can interfere with this process.

In a similar manner as described in these patents, the motion of the driver's eyes can be used to control various systems in the vehicle permitting hands off control of the entertainment system, heating and air conditioning system or all of the other systems described above. Although some of these systems have been described in the afore-mentioned patents, none have made use of neural networks for interpreting the eye movements. The use of particular IR wavelengths permits the monitoring of the driver's eyes without the driver knowing that this is occurring. IR with a wave length above about 1.1 microns, however, is blocked by glass eyeglasses and thus other invisible frequencies may be required.

The use of the windshield as a reflector is particularly useful when monitoring the eyes of the driver by means of a camera mounted on the rear view mirror assembly. The reflections from the cornea are highly directional, as every driver knows whose lights have reflected off the eyes of an animal on the roadway. For this to be effective, the eyes of the driver must be looking at the radiation source. Since the driver is presumably looking through the windshield, the source of the radiation must also come from the windshield and the reflections from the driver's eyes must also be in the direction of the windshield. Using this technique, the time that the driver spends looking through the windshield can be monitored and if that time drops below some threshold value, it can be presumed that the driver is not attentive and may be sleeping or otherwise incapacitated.

The location of the eyes of the driver, for this application, is greatly facilitated by the teachings of the inventions as described above. Although others have suggested the use of eye motions and corneal reflections for drowsiness determination, up until now there has not been a practical method for locating the driver's eyes with sufficient precision and reliability as to render this technique practical. Also, although sunglasses might defeat such a system, most drowsiness caused accidents happen at night when it is less likely that sunglasses are worn.

11.4 Combining Occupant Monitoring and Car Monitoring

There is an inertial measurement unit (IMU) under development by the current assignee that will have the equivalent accuracy as an expensive military IMU but will sell for under $200 in sufficient volume. This IMU can contain three accelerometers and three gyroscopes and permit a very accurate tracking of the motion of the vehicle in three dimensions. The main purposes of this device will be replace all non-crush zone crash and rollover sensors, chassis control gyros etc. with a single device that will be up to 100 times more accurate. Another key application will be in vehicle guidance systems and it will eventually form the basis of a system that will know exactly where the vehicle is on the face of the earth within a few centimeters.

An additional use will be to monitor the motion of the vehicle in comparison with that of an occupant. From this, several facts can be gained. First, if the occupant moves in such a manner that is not caused by the motion of the vehicle, then the occupant must be alive. Conversely, if the driver motion is only caused by the vehicle, then perhaps he or she is asleep or otherwise incapacitated. A given driver will usually have a characteristic manner of operating the steering wheel to compensate for drift on the road. If this manner changes, then again, the occupant may be falling asleep. If the motion of the occupant seems to be restrained relative to what a free body would do, then there would be an indication that the seatbelt is in use, and if not, that the seatbelt is not in use or that it is too slack and needs to be retracted somewhat.

11.5 Continuous Tracking

Previously, the output of the pattern recognition system, the neural network or combined neural network, has been the zone that the occupant is occupying. This is a somewhat difficult task for the neural network since it calls for a discontinuous output for a continuous input. If the occupant is in the safe seating zone, then the output may be 0, for example and 1 if he moves into the at-risk zone. Thus, for a small motion there is a big change in output. On the other hand, as long as the occupant remains in the safe seating zone, he or she can move substantially with no change in output. A better method is to have as the output the position of the occupant from the airbag, for example, which is a continuous function and easier for the neural network to handle. This also provides for a meaningful output that permits, for example, the projection or extrapolation of the occupant's position forward in time and thus a prediction as to when he or she will enter another zone. This training of a neural network using a continuous position function is an important teaching of at least one of the inventions disclosed herein.

To do continuous tracking, however, the neural network must be trained on data that states the occupant location rather than the zone that he or she is occupying. This requires that this data be measured by a different system than is being used to monitor the occupant. Various electromagnetic systems have been tried but they tend to get foiled by the presence of metal in the interior passenger compartment. Ultrasonic systems have provided such information as have various optical systems. Tracking with a stereo camera arrangement using black light for illumination, for example is one technique. The occupant can even be illuminated with a UV point of light to make displacement easier to measure.

In addition, when multiple cameras are used in the final system, a separate tracking system may not be required. The normalization process conducted above, for example, created a displacement value for each of the CCD or CMOS arrays in the assemblies 49, 50, 52, 52, and 54, (FIG. 8A) or a subset thereof, which can now be used in reverse to find the precise location of the driver's head or chest, for example, relative to the known location of the airbag. From the vehicle geometry, and the head and chest location information, a choice can now be made as to whether to track the head or chest for dynamic out-of-position analysis.

Tracking of the motion of the occupant's head or chest can be done using a variety of techniques. One preferred technique is to use differential motion, that is, by subtracting the current image from the previous image to determine which pixels have changed in value and by looking at the leading edge of the changed pixels and the width of the changed pixel field, a measurement of the movement of the pixels of interest, and thus the driver, can be readily accomplished. Alternately, a correlation function can be derived which correlates the pixels in the known initial position of the head, for example, with pixels that were derived from the latest image. The displacement of the center of the correlation pixels would represent the motion of the head of the occupant. A wide variety of other techniques will now be obvious to those skilled in the art.

In a method disclosed above for tracking motion of a vehicular occupant's head or chest in accordance with the inventions, electromagnetic waves are transmitted toward the occupant from at least one location, a first image of the interior of the passenger compartment is obtained from each location, the first image being represented by a matrix of pixels, and electromagnetic waves are transmitted toward the occupant from the same location(s) at a subsequent time and an additional image of the interior of the passenger compartment is obtained from each location, the additional image being represented by a matrix of pixels. The additional image is subtracted from the first image to determine which pixels have changed in value. A leading edge of the changed pixels and a width of a field of the changed pixels is determined to thereby determine movement of the occupant from the time between which the first and additional images were taken. The first image is replaced by the additional image and the steps of obtaining an additional image and subtracting the additional image from the first image are repeated such that progressive motion of the occupant is attained.

Other methods of continuous tracking include placing an ultrasonic transducer in the seatback and also on the airbag, each providing a measure of the displacement of the occupant. Knowledge of vehicle geometry is required here, such as the position of the seat. The thickness of the occupant can then be calculated and two measures of position are available. Other ranging systems such as optical range meters and stereo or distance by focusing cameras could be used in place of the ultrasonic sensors. Another system involves the placement on the occupant of a resonator or reflector such as a radar reflector, resonating antenna, or an RFID or SAW tag. In several of these cases, two receivers and triangulation based on the time of arrival of the returned pulses may be required.

Tracking can also be done during data collection using the same or a different system comprising structured light. If a separate tracking system is used, the structured light can be projected onto the object at time intervals in-between the taking of data with the main system. In this manner, the tracking system would not interfere with the image being recorded by the primary system. All of the methods of obtaining three-dimensional information described above can be implemented in a separate tracking system.

11.6 Preprocessing

Another important feature of a system, developed in accordance with the teachings of at least one of the inventions disclosed herein, is the realization that motion of the vehicle can be used in a novel manner to substantially increase the accuracy of the system. Ultrasonic waves reflect on most objects as light off a mirror. This is due to the relatively long wavelength of ultrasound as compared with light. As a result, certain reflections can overwhelm the receiver and reduce the available information. When readings are taken while the occupant and/or the vehicle is in motion, and these readings averaged over several transmission/reception cycles, the motion of the occupant and vehicle causes various surfaces to change their angular orientation slightly but enough to change the reflective pattern and reduce this mirror effect. The net effect is that the average of several cycles gives a much clearer image of the reflecting object than is obtainable from a single cycle. This then provides a better image to the neural network and significantly improves the identification accuracy of the system. The choice of the number of cycles to be averaged depends on the system requirements. For example, if dynamic out-of-position is required, then each vector must be used alone and averaging in the simple sense cannot be used (as discussed below). Similar techniques can be used for other transducer technologies. Averaging, for example, can be used to minimize the effects of flickering light in camera-based systems.

Only rarely is unprocessed or raw data that is received from the A to D converters fed directly into the pattern recognition system. Instead, it is preprocessed to extract features, normalize, eliminate bad data, remove noise and elements that have no informational value etc.

For example, for military target recognition is common to use the Fourier transform of the data rather than the data itself. This can be especially valuable for categorization as opposed to location of the occupant and the vehicle. When used with a modular network, for example, the Fourier transform of the data may be used for the categorization neural network and the non-transformed data used for the position determination neural network. Recently wavelet transforms have also been considered as a preprocessor.

Above, under the subject of dynamic out-of-position, it was discussed that the position of the occupant can be used as a preprocessing filter to determine the quality of the data in a particular vector. This technique can also be used in general as a method to improve the quality of a vector of data based on the previous positions of the occupant. This technique can also be expanded to help differentiate live objects in the vehicle from inanimate objects. For example, a forward facing human will change his position frequently during the travel of the vehicle whereas a box will tend to show considerably less motion. This is also useful, for example, in differentiating a small human from an empty seat. The motion of a seat containing a small human will be significantly different from that of an empty seat even though the particular vector may not show significant differences. That is, a vector formed from the differences from two successive vectors is indicative of motion and thus of a live occupant.

Preprocessing can also be used to prune input data points. If each receiving array of assemblies, 49, 50, 51, and 54 for example (FIG. 8A), contains a matrix of 100 by 100 pixels, then 40,000 (4×100×100) pixels or data elements of information will be created each time the system interrogates the driver seat, for example. There are many pixels of each image that can be eliminated as containing no useful information. This typically includes the corner pixels, back of the seat and other areas where an occupant cannot reside. This pixel pruning can typically reduce the number of pixels by up to 50 percent resulting in approximately 20,000 remaining pixels. The output from each array is then compared with a series of stored arrays representing different unoccupied positions of the seat, seatback, steering wheel etc. For each array, each of the stored arrays is subtracted from the acquired array and the results analyzed to determine which subtraction resulted in the best match. The best match is determined by such things as the total number of pixels reduced below the threshold level, or the minimum number of remaining detached pixels, etc. Once this operation is completed for all four images, the position of the movable elements within the passenger compartment has been determined. This includes the steering wheel angle, telescoping position, seatback angle, headrest position, and seat position. This information can be used elsewhere by other vehicle systems to eliminate sensors that are currently being used to sense such positions of these components. Alternately, the sensors that are currently on the vehicle for sensing these component positions can be used to simplify processes described above. Each receiving array may also be a 256×256 CMOS pixel array as described in the paper by C. Sodini et al. referenced above greatly increasing the need for an efficient pruning process.

An alternate technique of differentiating between the occupant and the vehicle is to use motion. If the images of the passenger seat are compared over time, reflections from fixed objects will remain static whereas reflections from vehicle occupants will move. This movement can be used to differentiate the occupant from the background.

Following the subtraction process described above, each image now consists of typically as many as 50 percent fewer pixels leaving a total of approximately 10,000 pixels remaining, for the 4 array 100×100 pixel case. The resolution of the images in each array can now be reduced by combining adjacent pixels and averaging the pixel values. This results in a reduction to a total pixel count of approximately 1000. The matrices of information that contains the pixel values is now normalized to place the information in a location in the matrix which is independent of the seat position. The resulting normalized matrix of 1000 pixel values can now be used as input into an artificial neural network and represents the occupancy of the seat independent of the position of the occupant. This is a brut force method and better methods based on edge detection and feature extraction can greatly simplify this process as discussed below.

There are many mathematical techniques that can be applied to simplify the above process. One technique used in military pattern recognition, as mentioned above, uses the Fourier transform of particular areas in an image to match with known Fourier transforms of known images. In this manner, the identification and location can be determined simultaneously. There is even a technique used for target identification whereby the Fourier transforms are compared optically as mentioned elsewhere herein. Other techniques utilize thresholding to limit the pixels that will be analyzed by any of these processes. Other techniques search for particular features and extract those features and concentrate merely on the location of certain of these features. (See for example the Kage et al. artificial retina publication referenced above.)

Generally, however as mentioned, the pixel values are not directly fed into a pattern recognition system but rather the image is preprocessed through a variety of feature extraction techniques such as an edge detection algorithm. Once the edges are determined, a vector is created containing the location of the edges and their orientation and that vector is fed into the neural network, for example, which performs the pattern recognition.

Another preprocessing technique that improves accuracy is to remove the fixed parts of the image, such as the seatback, leaving only the occupying object. This can be done many ways such as by subtracting one image from another after the occupant has moved, as discussed above. Another is to eliminate pixels related to fixed parts of the image through knowledge of what pixels to remove based on seat position and previous empty seat analysis. Other techniques are also possible. Once the occupant has been isolated, then those pixels remaining can be placed in a particular position in the neural network vector. This is akin to the fact that a human, for example, will always move his or her eyes so as to place the object under observation into the center of the field of view, which is a small percent of the total field of view. In this manner, the same limited number in pixels always observe the image of the occupying item thereby removing a significant variable and greatly improving system accuracy. The position of the occupant then can be determined by the displacement required to put the image into the appropriate part of the vector.

11.7 Post Processing

Once the pattern recognition system has been applied to the preprocessed data, one or more decisions are available as output. The output from the pattern recognition system is usually based on a snapshot of the output of the various transducers unless a combination neural network with feedback was used. Thus, it represents one epoch or time period. The accuracy of such a decision can usually be substantially improved if previous decisions from the pattern recognition system are also considered. In the simplest form, which is typically used for the occupancy identification stage, the results of many decisions are averaged together and the resulting averaged decision is chosen as the correct decision. Once again, however, the situation is quite different for dynamic out-of-position occupants. The position of the occupant must be known at that particular epoch and cannot be averaged with his previous position. On the other hand, there is information in the previous positions that can be used to improve the accuracy of the current decision. For example, if the new decision says that the occupant has moved six inches since the previous decision, and, from physics, it is known that this could not possibly take place, then a better estimate of the current occupant position can be made by extrapolating from earlier positions. Alternately, an occupancy position versus time curve can be fitted using a variety of techniques such as the least squares regression method, to the data from previous 10 epochs, for example. This same type of analysis could also be applied to the vector itself rather than to the final decision thereby correcting the data prior to entry into the pattern recognition system. An alternate method is to train a module of a modular neural network to predict the position of the occupant based on feedback from previous results of the module.

Summarizing, when an occupant is sitting in the vehicle during normal vehicle operation, the determination of the occupancy state can be substantially improved by using successive observations over a period of time. This can either be accomplished by averaging the data prior to insertion into a neural network, or alternately the decision of the neural network can be averaged. This is known as the categorization phase of the process. During categorization, the occupancy state of the vehicle is determined. Is the vehicle occupied by the forward facing human, an empty seat, a rear facing child seat, or an out-of-position human? Typically many seconds of data can be accumulated to make the categorization decision. For non-automotive vehicles this categorization process may be the only process that is required. Is the container occupied or is it empty? If occupied is there a human or other life form present? Is there a hazardous chemical or a source of radioactivity present etc.?

When a driver senses an impending crash, he or she will typically slam on the brakes to try to slow vehicle prior to impact. If an occupant, particularly the passenger, is unbelted, he or she will begin moving toward the airbag during this panic braking. For the purposes of determining the position of the occupant, there is not sufficient time to average data as in the case of categorization. One method is to determine the location of the occupant using the neural network based on previous training. The motion of the occupant can then be compared to a maximum likelihood position based on the position estimate of the occupant at previous vectors. Thus, for example, perhaps the existence of thermal gradients in the vehicle caused an error in the current vector leading to a calculation that the occupant has moved 12 inches since the previous vector. Since this could be a physically impossible move during ten milliseconds, the measured position of the occupant can be corrected based on his previous positions and known velocity. If an accelerometer is present in the vehicle and if the acceleration data is available for this calculation, a much higher accuracy prediction can be made. Thus, there is information in the data in previous vectors as well as in the positions of the occupant determined from the latest data that can be used to correct erroneous data in the current vector and, therefore, in a manner not too dissimilar from the averaging method for categorization, the position accuracy of the occupant can be known with higher accuracy.

Post processing can use a comparison of the results at each time interval along with a test of reasonableness to remove erroneous results. Also averaging through a variety of techniques can improve the stability of the output results. Thus the output of a combination neural network is not necessarily the final decision of the system.

One principal used in a preferred implementation of at least one invention herein is to use images of different views of the occupant to correlate with known images that were used to train a neural network for vehicle occupancy. Then carefully measured positions of the known images are used to locate particular parts of the occupant such as his or her head, chest, eyes, ears, mouth, etc. An alternate approach is to make a three-dimensional map of the occupant and to precisely locate these features using neural networks, sensor fusion, fuzzy logic or other pattern recognition techniques. One method of obtaining a three-dimensional map is to utilize a scanning laser radar system where the laser is operated in a pulse mode and the distance from the object being illuminated is determined using range gating in a manner similar to that described in various patents on micropower impulse radar to McEwan. (See, for example, U.S. Pat. No. 5,457,394 and U.S. Pat. No. 5,521,600). Many other methods of obtaining a 3D representation can be used as discussed above. This post processing step allows the determination of occupant parts from the image once the object is classified as an occupant.

Many other post processing techniques are available as discussed elsewhere herein.

11.8 An Example of Image Processing

An example of the above concepts, namely, a description of a single imager optical occupant classification 12. Optical Correlators A great deal of effort has been ongoing to develop fast optical pattern recognition systems to allow military vehicles such as helicopters to locate all of the enemy vehicles in a field of view. Some of the systems that have been developed are called optical correlation systems and have the property that the identification and categorization of various objects in the field of view happens very rapidly. A helicopter, for example coming onto a scene with multiple tanks and personnel carriers in a wide variety of poses and somewhat camouflaged can locate, identify and count all such vehicles in a fraction of a second. The cost of these systems has been prohibitively expensive for their use in automobiles for occupant tracking or for collision avoidance but this is changing.

Theoretically system performance is simple. The advantage of optical correlation approach is that correlation function is calculated almost instantly, much faster that with microprocessors and neural networks, for example. In simplest case one looks for correlation of an input image with reference samples. The sample which has the largest correlation peak is assumed as a match. In practice, the system is based on a training set of reference samples. Special filters are constructed for correlation with input image. Filters are used in order to reduce number of correlations to calculate. The output of the filters, the result of the correlation, is frequently a set of features. Finally the features are fed into a classifier for decision making. This classifier can use Neural Networks.

The main bottleneck of optical correlators is large number of filters, or reference image samples, that are required. For example, if it is requirement to detect 10 different types of objects at different orientation, scale and illumination conditions, every modification factor enlarges number of filters for feature selection or correlation by factor of approximately 10. So, in a real system one may have to input 10,000 filters or reference images. Most correlators are able to find correlation of an input image with about of 5-20 filters during single correlation cycle. In other words the reference image contains 5-20 filters. Therefore during decision making cycle one needs to feed into correlator and find correlation with approximately 1000 filters.

If the problem is broken down, as was done with modular neural networks, then the classification stage may take on the order of a second while the tracking stage can be done perhaps in a millisecond.

U.S. Pat. No. 5,473,466 and U.S. Pat. No. 5,051,738 describe a miniature high resolution display system for use with heads up displays for installation into the helmets of fighter pilots. This system, which is based on a thin garnet crystal, requires very little power and maintains a particular display until display is changed. Thus, for example, if there is a loss of power the display will retain the image that was last displayed. This technology has the capability of producing a very small heads up display unit as described below. This technology has also been used as a spatial light monitor for pattern recognition based on optical correlation. Although this technology has been applied to military helicopters, it has previously not been used for occupant sensing, collision avoidance, anticipatory sensing, blind spot monitoring or any other ground vehicle application.

Although the invention described herein is not limited to a particular spatial light monitor (SLM) technology, the preferred or best mode technology is to use the garnet crystal system described U.S. Pat. No. 5,473,466. Although the system has never been applied to automobiles, it has significant advantages over other systems particularly in the resolution and optical intensity areas. The resolution of the garnet crystals as manufactured by Revtek is approximately 600 by 600 pixels. The size of the crystal is typically 1 cm square.

Basically, the optical correlation pattern recognition system works as follows. Stored in a computer are many Fourier transforms of images of objects that the system should identify. For collision avoidance, these include cars, trucks, deer or other animals, pedestrians, motorcycles, bicycles, or any other objects that could occur on a roadway. For an interior monitoring, these objects could include faces (particularly ones that are authorized to operate the vehicle), eyes, ears, child seats, children, adults of all sizes etc. The image from the scene that is captured by the lens is fed through a diffraction grating that optically creates the Fourier transform of the scene and projects it through SLM such as the garnet crystal of the '466 patent. The SLM is simultaneously fed and displays the Fourier stored transforms and a camera looks at the light that comes through the SLM. If there is a match then the camera sees a spike that locates the matching objects in the scene, there can be many such objects, all are found. The main advantage of this system over neural network pattern recognition systems is speed since it is all done optically and in parallel.

For collision avoidance, for example, many vehicles can be easily classified and tracked. For occupant sensing, the occupant's eyes can be tracked even if he is rapidly moving his head and the occupant herself can be tracked during a crash.

14. Other Products, Outputs, Features

Once the occupancy state of the seat (or seats) in the vehicle or of the vehicle itself, as in a cargo container, truck trailer or railroad car, is known, this information can be used to control or affect the operation of a significant number of vehicular systems, components and devices. That is, the systems, components and devices in the vehicle can be controlled and perhaps their operation optimized in consideration of the occupancy of the seat(s) in the vehicle or of the vehicle itself. Thus, the vehicle includes control means coupled to the processor means for controlling a component or device in the vehicle in consideration of the output indicative of the current occupancy state of the seat obtained from the processor means. The component or device can be an airbag system including at least one deployable airbag whereby the deployment of the airbag is suppressed, for example, if the seat is occupied by a rear-facing child seat, or otherwise the parameters of the deployment are controlled. Thus, the seated-state detecting unit described above may be used in a component adjustment system and method described below when the presence of a human being occupying the seat is detected. The component can also be a telematics system such as the Skybitz or OnStar systems where information about the occupancy state of the vehicle, or changes in that state, can be sent to a remote site.

The component adjustment system and methods in accordance with the invention can automatically and passively adjust the component based on the morphology of the occupant of the seat. As noted above, the adjustment system may include the seated-state detecting unit described above so that it will be activated if the seated-state detecting unit detects that an adult or child occupant is seated on the seat, that is, the adjustment system will not operate if the seat is occupied by a child seat, pet or inanimate objects. Obviously, the same system can be used for any seat in the vehicle including the driver seat and the passenger seat(s). This adjustment system may incorporate the same components as the seated-state detecting unit described above, that is, the same components may constitute a part of both the seated-state detecting unit and the adjustment system, for example, the weight measuring system.

The adjustment system described herein, although improved over the prior art, will at best be approximate since two people, even if they are identical in all other respects, may have a different preferred driving position or other preferred adjusted component location or orientation. A system that automatically adjusts the component, therefore, should learn from its errors. Thus, when a new occupant sits in the vehicle, for example, the system automatically estimates the best location of the component for that occupant and moves the component to that location, assuming it is not already at the best location. If the occupant changes the location, the system should remember that change and incorporate it into the adjustment the next time that person enters the vehicle and is seated in the same seat. Therefore, the system need not make a perfect selection the first time but it should remember the person and the position the component was in for that person. The system, therefore, makes one, two or three measurements of morphological characteristics of the occupant and then adjusts the component based on an algorithm. The occupant will correct the adjustment and the next time that the system measures the same measurements for those measurement characteristics, it will set the component to the corrected position. As such, preferred components for which the system in accordance with the invention is most useful are those which affect a driver of the vehicle and relate to the sensory abilities of the driver, i.e., the mirrors, the seat, the steering wheel and steering column and accelerator, clutch and brake pedals.

Thus, although the above description mentions that the airbag system can be controlled by the control circuitry 20 (FIG. 1), any vehicular system, component or subsystem can be controlled based on the information or data obtained by transmitter and/or receiver assemblies 6, 8, 9 and 10. Control circuitry 20 can be programmed or trained, if for example a neural network is used, to control heating an air-conditioning systems based on the presence of occupants in certain positions so as to optimize the climate control in the vehicle. The entertainment system can also be controlled to provide sound only to locations at which occupants are situated. There is no limit to the number and type of vehicular systems, components and subsystems that can be controlled using the analysis techniques described herein.

Furthermore, if multiple vehicular systems are to be controlled by control circuitry 20, then these systems can be controlled by the control circuitry 20 based on the status of particular components of the vehicle. For example, an indication of whether a key is in the ignition can be used to direct the control circuitry 20 to either control an airbag system (when the key is present in the ignition) or an antitheft system (when the key is not present in the ignition). Control circuitry 20 would thus be responsive to the status of the ignition of the motor vehicle to perform one of a plurality of different functions. More particularly, the pattern recognition algorithm, such as the neural network described herein, could itself be designed to perform in a different way depending on the status of a vehicular component such as the detected presence of a key in the ignition. It could provide one output to control an antitheft system when a key is not present and another output when a key is present using the same inputs from the transmitter and/or receiver assemblies 6, 8, 9 and 10.

The algorithm in control circuitry 20 can also be designed to determine the location of the occupant's eyes either directly or indirectly through a determination of the location of the occupant and an estimation of the position of the eyes therefrom. As such, the position of the rear view mirror 55 can be adjusted to optimize the driver's use thereof.

Once a characteristic of the object is obtained, it can be used for numerous purposes. For example, the processor can be programmed to control a reactive component, system or subsystem 103 in FIG. 24 based on the determined characteristic of the object. When the reactive component is an airbag assembly including one or more airbags, the processor can control one or more deployment parameters of the airbag(s).

The apparatus can operate in a manner as illustrated in FIG. 41 wherein as a first step 335, one or more images of the environment are obtained. One or more characteristics of objects in the images are determined at 336, using, for example, pattern recognition techniques, and then one or more components are controlled at 337 based on the determined characteristics. The process of obtaining and processing the images, or the processing of data derived from the images or data representative of the images, is periodically continued at least throughout the operation of the vehicle.

14.1 Control of Passive Restraints

The use of the vehicle interior monitoring system to control the deployment of an airbag is discussed in U.S. Pat. No. 5,653,462. In that case, the control is based on the use of a pattern recognition system, such as a neural network, to differentiate between the occupant and his extremities in order to provide an accurate determination of the position of the occupant relative to the airbag. If the occupant is sufficiently close to the airbag module that he is more likely to be injured by the deployment itself than by the accident, the deployment of the airbag is suppressed. This process is carried further by the interior monitoring system described herein in that the nature or identity of the object occupying the vehicle seat is used to contribute to the airbag deployment decision. FIG. 4 shows a side view illustrating schematically the interface between the vehicle interior monitoring system of at least one of the inventions disclosed herein and the vehicle airbag system 44. A similar system can be provided for the passenger as described in U.S. Pat. No. 6,820,897.

In this embodiment, ultrasonic transducers 8 and 9 transmit bursts of ultrasonic waves that travel to the occupant where they are reflected back to transducers or receptors/receivers 8 and 9. The time period required for the waves to travel from the generator and return is used to determine the distance from the occupant to the airbag as described in the aforementioned U.S. Pat. No. 5,653,462, i.e., and thus may also be used to determine the position or location of the occupant. An optical imager based system would also be appropriate. In the invention, however, the portion of the return signal that represents the occupants' head or chest, has been determined based on pattern recognition techniques such as a neural network. The relative velocity of the occupant toward the airbag can then be determined, by Doppler principles or from successive position measurements, which permits a sufficiently accurate prediction of the time when the occupant would become proximate to the airbag. By comparing the occupant relative velocity to the integral of the crash deceleration pulse, a determination as to whether the occupant is being restrained by a seatbelt can also be made which then can affect the airbag deployment initiation decision. Alternately, the mere knowledge that the occupant has moved a distance that would not be possible if he were wearing a seatbelt gives information that he is not wearing one.

Another method of providing a significant improvement to the problem of determining the position of the occupant during vehicle deceleration is to input the vehicle deceleration directly into the occupant sensing system. This can be done through the use of the airbag crash sensor accelerometer or a dedicated accelerometer can be used. This deceleration or its integral can be entered directly into the neural network or can be integrated through an additional post-processing algorithm. Post processing in general is discussed in section 11.7. One significant advantage of neural networks is their ability to efficiently use information from any source. It is the ultimate "sensor fusion" system.

A more detailed discussion of this process and of the advantages of the various technologies, such as acoustic or electromagnetic, can be found in SAE paper 940527, "Vehicle Occupant Position Sensing" by Breed et al., In this paper, it is demonstrated that the time delay required for acoustic waves to travel to the occupant and return does not prevent the use of acoustics for position measurement of occupants during the crash event. For position measurement and for many pattern recognition applications, ultrasonics is the preferred technology due to the lack of adverse health effects and the low cost of ultrasonic systems compared with either camera, laser or radar based systems. This situation has changed, however, as the cost of imagers has come down. The main limiting feature of ultrasonics is the wavelength, which places a limitation on the size of features that can be discerned. Optical systems, for example, are required when the identification of particular individuals is desired.

FIG. 42 is a schematic drawing of one embodiment of an occupant restraint device control system in accordance with the invention. The first step is to obtain information about the contents of the seat at step 338, when such contents are present on the seat. To this end, a presence sensor can be employed to activate the system only when the presence of an object, or living being, is detected. Next, at step 339, a signal is generated based on the contents of the seat, with different signals being generated for different contents of the seat. Thus, while a signal for a dog will be different than the signal for a child set, the signals for different child seats will not be that different. Next, at step 340, the signal is analyzed to determine whether a child seat is present, whether a child seat in a particular orientation is present and/or whether a child seat in a particular position is present. Deployment control 341 provides a deployment control signal or command based on the analysis of the signal generated based on the contents of the seat. This signal or command is directed to the occupant protection or restraint device 342 to provide for deployment for that particular content of the seat. The system continually obtains information about the contents of the seat until such time as a deployment signal is received from, e.g., a crash sensor, to initiate deployment of the occupant restraint device.

FIG. 43 is a flow chart of the operation of one embodiment of an occupant restraint device control method in accordance with the invention. The first step is to determine whether contents are present on the seat at step 910. If so, information is obtained about the contents of the seat at step 344. At step 345, a signal is generated based on the contents of the seat, with different signals being generated for different contents of the seat. The signal is analyzed to determine whether a child seat is present at step 346, whether a child seat in a particular orientation is present at step 347 and/or whether a child seat in a particular position is present at step 348. Deployment control 349 provides a deployment control signal or command based on the analysis of the signal generated based on the contents of the seat. This signal or command is directed to the occupant protection or restraint device 350 to provide for deployment for those particular contents of the seat. The system continually obtains information about the contents of the seat until such time as a deployment signal is received from, e.g., a crash sensor 351, to initiate deployment of the occupant restraint device.

In another implementation, the sensor algorithm may determine the rate that gas is generated to affect the rate that the airbag is inflated. In all of these cases, the position of the occupant is used to affect the deployment of the airbag either as to whether or not it should be deployed at all, the time of deployment and/or the rate of inflation and/or deflation.

Such a system can also be used to positively identify or confirm the presence of a rear facing child seat in the vehicle, if the child seat is equipped with a resonator. In this case, a resonator 18 is placed on the forward most portion of the child seat, or in some other convenient position, as shown in FIG. 1. The resonator 18, or other type of signal generating device, such as an RFID tag, which generates a signal upon excitation, e.g., by a transmitted energy signal, can be used not only to determine the orientation of the child seat but also to determine the position of the child seat (in essentially the same manner as described above with respect to determining the position of the seat and the position of the seatbelt).

The determination of the presence of a child seat can be used to affect another system in the vehicle. Most importantly, deployment of an occupant restraint device can be controlled depending on whether a child seat is present. Control of the occupant restraint device may entail suppression of deployment of the device. If the occupant restraint device is an airbag, e.g., a frontal airbag or a side airbag, control of the airbag deployment may entail not only suppression of the deployment but also depowered deployment, adjustment of the orientation of the airbag, adjustment of the inflation rate or inflation time and/or adjustment of the deflation rate or time.

Figure 44:
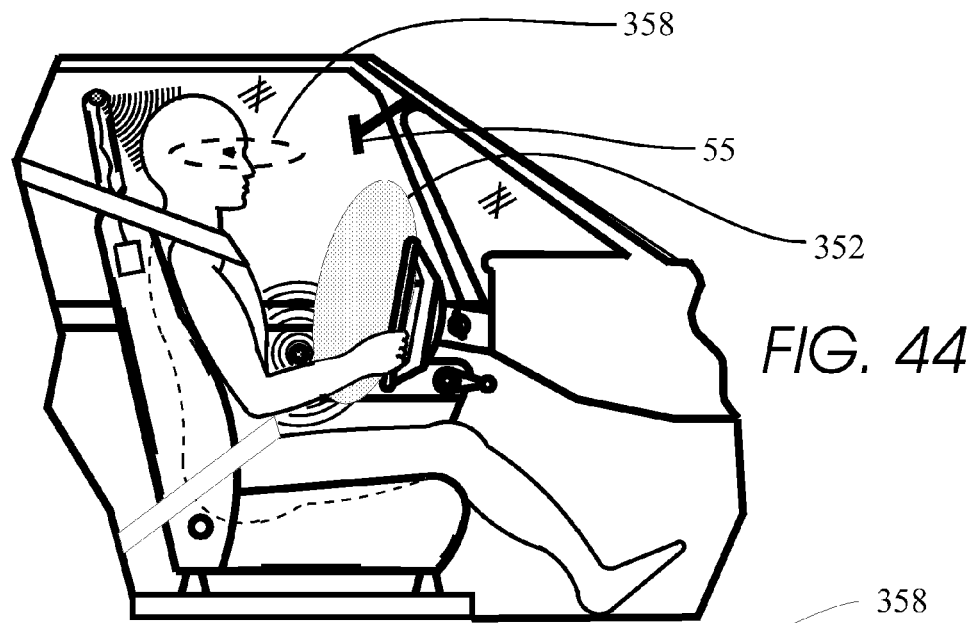
FIG. 44 is a view similar to FIG. 40 showing an inflated airbag and an arrangement for controlling both the flow of gas into and the flow of gas out of the airbag during the crash where the determination is made based on a height sensor located in the headrest and a weight sensor in the seat.

Several systems are in development for determining the location of an occupant and modifying the deployment of the airbag based of his or her position. These systems are called "smart airbags". The passive seat control system in accordance with at least one of the inventions disclosed herein can also be used for this purpose as illustrated in FIG. 44. This figure shows an inflated airbag 352 and an arrangement for controlling both the flow of gas into and out of the airbag during a crash. The determination is made based on height sensors 353, 354 and 355 (FIG. 49) located in the headrest, a weight sensor 252 in the seat and the location of the seat which is known by control circuit 254. Other smart airbags systems rely only on the position of the occupant determined from various position sensors using ultrasonics or optical sensors, or equivalent.

The weight sensor coupled with the height sensor and the occupant's velocity relative to the vehicle, as determined by the occupant position sensors, provides information as to the amount of energy that the airbag will need to absorb during the impact of the occupant with the airbag. This, along with the location of the occupant relative to the airbag, is then used to determine the amount of gas that is to be injected into the airbag during deployment and the size of the exit orifices that control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant's relative velocity is arrested. Similarly, for a small occupant the initial pressure would be reduced and the size of the exit orifices increased. If, on the other hand, the occupant is already close to the airbag then the amount of gas injected into the airbag will need to be reduced.

Another and preferred approach is to incorporate an accelerometer into the seatbelt or the airbag surface and to measure the deceleration of the occupant and to control the outflow of gas from the airbag to maintain the occupant's chest acceleration below some maximum value such as 40 Gs. This maximum value can be set based on the forecasted severity of the crash. If the occupant is wearing a seatbelt the outflow from the airbag can be significantly reduced since the seatbelt is taking up most of the load and the airbag then should be used to help spread the load over more of the occupant's chest. Although the pressure in the airbag is one indication of the deceleration being imparted to the occupant it is a relatively crude measure since it does not take into account the mass of the occupant. Since it is acceleration that should be controlled it is better to measure acceleration rather than pressure in the airbag.

There are many ways of varying the amount of gas injected into the airbag some of which are covered in the patent literature and include, for example, inflators where the amount of gas generated and the rate of generation is controllable. For example, in a particular hybrid inflator once manufactured by the Allied Signal Corporation, two pyrotechnic charges are available to heat the stored gas in the inflator. Either or both of the pyrotechnic charges can be ignited and the timing between the ignitions can be controlled to significantly vary the rate of gas flow to the airbag.

The flow of gas out of the airbag is traditionally done through fixed diameter orifices placed in the bag fabric. Some attempts have been made to provide a measure of control through such measures as blowout patches applied to the exterior of the airbag. Other systems were disclosed in U.S. patent application Ser. No. 07/541,464 filed Feb. 9, 1989, now abandoned.

Figure 44A:
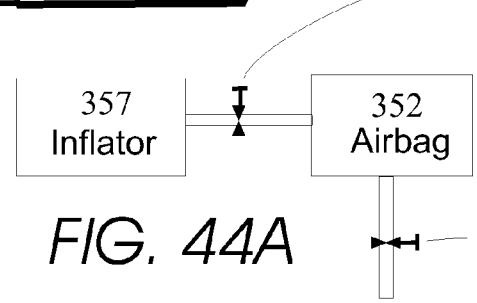
FIG. 44A illustrates the valving system of FIG. 44.

FIG. 44A illustrates schematically an inflator 357 generating gas to fill airbag 352 through control valve 358. If the control valve 358 is closed while a pyrotechnic generator is operating, provision must be made to store or dump the gas being generated so to prevent the inflator from failing from excess pressure. The flow of gas out of airbag 352 is controlled by exit control valve 359. The exit valve 359 can be implemented in many different ways including, for example, a motor operated valve located adjacent the inflator and in fluid communication with the airbag or a digital flow control valve as discussed elsewhere herein. When control circuit 254 (FIG. 49) determines the size and weight of the occupant, the seat position and the relative velocity of the occupant, it then determines the appropriate opening for the exit valve 359, which is coupled to the control circuit 254. A signal is then sent from control circuit 254 to the motor controlling this valve which provides the proper opening.

Consider, for example, the case of a vehicle that impacts with a pole or brush in front of a barrier. The crash sensor system may deduce that this is a low velocity crash and only initiate the first inflator charge. Then as the occupant is moving close to the airbag the barrier is struck but it may now be too late to get the benefit of the second charge. For this case, a better solution might be to always generate the maximum amount of gas but to store the excess in a supplemental chamber until it is needed.

In a like manner, other parameters can also be adjusted, such as the direction of the airbag, by properly positioning the angle and location of the steering wheel relative to the driver.

If seatbelt pretensioners are used, the amount of tension in the seatbelt or the force at which the seatbelt spools out, for the case of force limiters, could also be adjusted based on the occupant morphological characteristics determined by the system of at least one of the inventions disclosed herein. The force measured on the seatbelt, if the vehicle deceleration is known, gives a confirmation of the mass of the occupant. This force measurement can also be used to control the chest acceleration given to the occupant to minimize injuries caused by the seatbelt. As discussed above, it is better to measure the acceleration of the chest directly.

In the embodiment shown in FIG. 8A, transmitter/receiver assemblies 49, 50, 51 and 54 emit infrared waves that reflect off of the head and chest of the driver and return thereto. Periodically, the device, as commanded by control circuitry 20, transmits a pulse of infrared waves and the reflected signal is detected by the same (i.e. the LEDs and imager are in the same housing) or a different device. The transmitters can either transmit simultaneously or sequentially. An associated electronic circuit and algorithm in control circuitry 20 processes the returned signals as discussed above and determines the location of the occupant in the passenger compartment. This information is then sent to the crash sensor and diagnostic circuitry, which may also be resident in control circuitry 20 (programmed within a control module), which determines if the occupant is close enough to the airbag that a deployment might, by itself, cause injury which exceeds that which might be caused by the accident itself. In such a case, the circuit disables the airbag system and thereby prevents its deployment.

In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises above 95% for a more distant occupant. In the alternative, the crash sensor and diagnostic circuitry optionally resident in control circuitry 20 may tailor the parameters of the deployment (time to initiation of deployment, rate of inflation, rate of deflation, deployment time, etc.) based on the current position and possibly velocity of the occupant, for example a depowered deployment.

In another implementation, the sensor algorithm may determine the rate that gas is generated to affect the rate that the airbag is inflated. One method of controlling the gas generation rate is to control the pressure in the inflator combustion chamber. The higher the internal pressure the faster gas is generated. Once a method of controlling the gas combustion pressure is implemented, the capability exists to significantly reduce the variation in inflator properties with temperature. At lower temperatures the pressure control system would increase the pressure in the combustion chamber and at higher ambient temperatures it would reduce the pressure. In all of these cases, the position of the occupant can be used to affect the deployment of the airbag as to whether or not it should be deployed at all, the time of deployment and/or the rate of inflation.

The applications described herein have been illustrated using the driver and sometimes the passenger of the vehicle. The same systems of determining the position of the occupant relative to the airbag apply to a driver, front and rear seated passengers, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for the passenger and driver, the airbag system can be individually optimized for each occupant and result in further significant injury reduction. In particular, either the driver or passenger system can be disabled if either the driver or passenger is out-of-position or if the passenger seat is unoccupied.

There is almost always a driver present in vehicles that are involved in accidents where an airbag is needed. Only about 30% of these vehicles, however, have a passenger. If the passenger is not present, there is usually no need to deploy the passenger side airbag. The occupant monitoring system, when used for the passenger side with proper pattern recognition circuitry, can also ascertain whether or not the seat is occupied, and if not, can disable the deployment of the passenger side airbag and thereby save the cost of its replacement. The same strategy applies also for monitoring the rear seat of the vehicle. Also, a trainable pattern recognition system, as used herein, can distinguish between an occupant and a bag of groceries, for example. Finally, there has been much written about the out-of-position child who is standing or otherwise positioned adjacent to the airbag, perhaps due to pre-crash braking. The occupant position sensor described herein can prevent the deployment of the airbag in this situation as well as in the situation of a rear facing child seat as described above.

As discussed elsewhere herein, occupant sensors can also be used for monitoring the rear seats of the vehicle for the purpose, among others, of controlling airbag or other restraint deployment.

14.2 Seat, Seatbelt, Steering Wheel and Pedal Adjustment and Resonators

Acoustic or electromagnetic resonators are active or passive devices that resonate at a preset frequency when excited at that frequency. If such a device, which has been tuned to 40 kHz for example, or some other appropriate frequency, is subjected to radiation at 40 kHz it will return a signal that can be stronger than the reflected radiation. Tuned radar antennas, RFID tags and SAW resonators are examples of such devices as is a wine glass.

If such a device is placed at a particular point in the passenger compartment of a vehicle, and irradiated with a signal that contains the resonant frequency, the returned signal can usually be identified as a high magnitude narrow signal at a particular point in time that is proportional to the distance from the resonator to the receiver. Since this device can be identified, it provides a particularly effective method of determining the distance to a particular point in the vehicle passenger compartment (i.e., the distance between the location of the resonator and the detector). If several such resonators are used they can be tuned to slightly different frequencies and therefore separated and identified by the circuitry. If, for example, an ultrasonic signal is transmitted that is slightly off of the resonator frequency then a resonance can still be excited in the resonator and the return signal positively identified by its frequency. Ultrasonic resonators are rare but electromagnetic resonators are common. The distance to a resonator can be more easily determined using ultrasonics, however, due to its lower propagation velocity.

Figure 45:
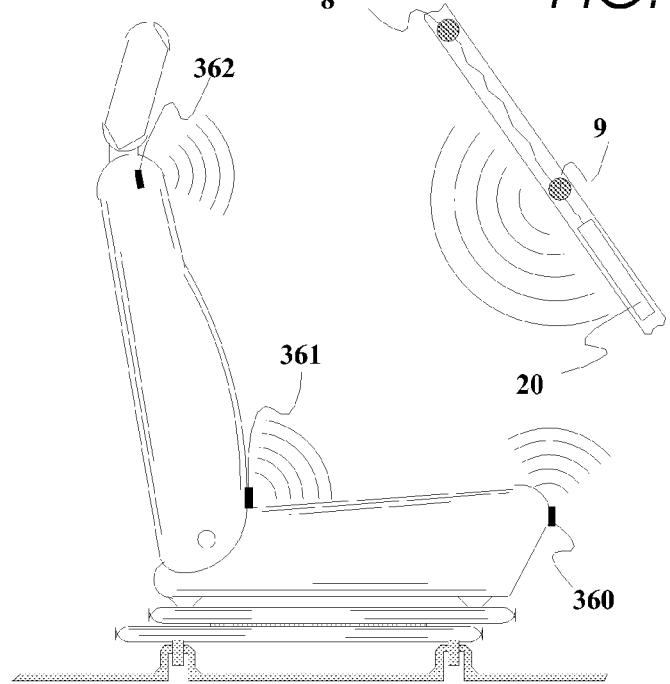
FIG. 45 is a side view with parts cutaway and removed of a seat in the passenger compartment of a vehicle showing the use of resonators or reflectors to determine the position of the seat.

Using such resonators, the positions of various objects in the vehicle can be determined. In FIG. 45, for example, three such resonators are placed on the vehicle seat and used to determine the location of the front and back of the seat portion and the top of the seat back portion. The seat portion is connected to the frame of the vehicle. In this case, transducers 8 and 9, mounted in the A-pillar, are used in conjunction with resonators 360, 361 and 362 to determine the position of the seat. Transducers 8 and 9 constitute both transmitter means for transmitting energy signals at the excitation frequencies of the resonators 360, 361 and 362 and detector means for detecting the return energy signals from the excited resonators. Processor 20 is coupled to the transducers 8 and 9 to analyze the energy signals received by the detectors and provide information about the object with which the resonators are associated, i.e., the position of the seat in this embodiment. This information is then fed to the seat memory and adjustment system, not shown, eliminating the currently used sensors that are placed typically beneath the seat adjacent the seat adjustment motors. In the conventional system, the seat sensors must be wired into the seat adjustment system and are prone to being damaged. By using the vehicle interior monitoring system alone with inexpensive passive resonators, the conventional seat sensors can be eliminated resulting in a cost saving to the vehicle manufacturer. An efficient reflector, such as a parabolic shaped reflector, or in some cases a corner cube reflector (which can be a multiple cube pattern array), can be used in a similar manner as the resonator. Similarly, a surface acoustic wave (SAW) device, RFID, variable resistor, inductor or capacitor device and radio frequency radiation can be used as a resonator or a delay line returning a signal to the interrogator permitting the presence and location of an object to be obtained as described in U.S. Pat. No. 6,662,642. Optical reflectors such as an array of corner cube reflectors can also be used with infrared. Additionally such an array can comprise a pattern so that there is no doubt that infrared is reflecting off of the reflector. These reflectors can be similar to those found on bicycles, joggers athletic clothes, rear of automobiles, signs, reflective tape on roadways etc.

Resonators or reflectors, of the type described above can be used for making a variety of position measurements in the vehicle. They can be placed on an object such as a child seat 2 (FIG. 1) to permit the direct detection of its presence and, in some cases, its orientation. Optical reflecting tape, for example, could be easily applied to child seats. These resonators are made to resonate at a particular frequency. If the number of resonators increases beyond a reasonable number, dual frequency resonators can be used, or alternately, resonators that return an identification number such as can be done with an RFID or SAW device or a pattern as can be done with optical reflectors. For the dual frequency case, a pair of frequencies is then used to identify a particular location. Alternately, resonators tuned to a particular frequency can be used in combination with special transmitters, which transmit at the tuned frequency, which are designed to work with a particular resonator or group of resonators. The cost of the transducers is sufficiently low to permit special transducers to be used for special purposes. The use of resonators that resonate at different frequencies requires that they be irradiated by radiation containing those frequencies. This can be done with a chirp circuit, for example.

An alternate approach is to make use of secondary emission where the frequency emitted from the device is at a different frequency than the frequency of the interrogator. Phosphors, for example, convert ultraviolet to visible and devices exist that convert electromagnetic waves to ultrasonic waves. Other devices can return a frequency that is a subharmonic of the interrogation frequency. Additionally, an RFID tag can use the incident RF energy to charge up a capacitor and then radiate energy at a different frequency. Additionally, sufficient energy can also be supplied using energy harvesting principles wherein the vibrations associated with vehicle motion can be used to generate electric power which can then be stored in a battery, capacitor or ultracapacitor.

Another application for a resonator of the type described is to determine the location of the seatbelt and therefore determine whether it is in use. If it is known that the occupants are wearing seatbelts, the airbag deployment parameters can be controlled or adjusted based on the knowledge of seatbelt use, e.g., the deployment threshold can be increased since the airbag is not needed in low velocity accidents if the occupants are already restrained by seatbelts. Deployment of other occupant restraint devices could also be effected based on the knowledge of seatbelt use. This will reduce the number of deployments for cases where the airbag provides little or no improvement in safety over the seatbelt. FIG. 2, for example, shows the placement of a resonator 26 on the front surface of the seatbelt where it can be sensed by the transducer 8. Such a system can also be used to positively identify the presence of a rear facing child seat in the vehicle. In this case, a resonator 18 is placed on the forward most portion of the child seat, or in some other convenient position, as shown in FIG. 1. As illustrated and discussed in U.S. Pat. No. 6,662,642, there are various methods of obtaining distance from a resonator, reflector, RFID or SAW device which include measuring the time of flight, using phase measurements, correlation analysis and triangulation.

Figure 46:
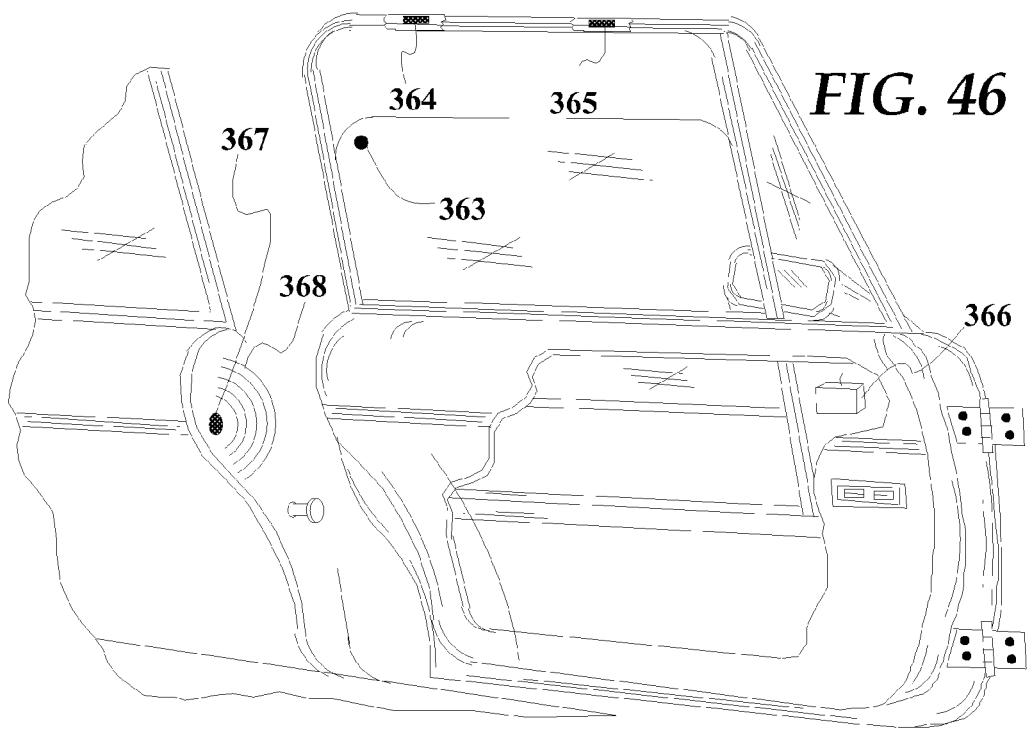
FIG. 46 is a side view with parts cutaway and removed of the door system of a passenger compartment of a vehicle showing the use of a resonator or reflector to determine the extent of opening of the driver window and of a system for determining the presence of an object, such as the hand of an occupant, in the window opening and showing the use of a resonator or reflector to determine the extent of opening of the driver window and of another system for determining the presence of an object, such as the hand of an occupant, in the window opening, and also showing the use of a resonator or reflector to determine the extent of opening position of the driver side door.
Figure 47A:
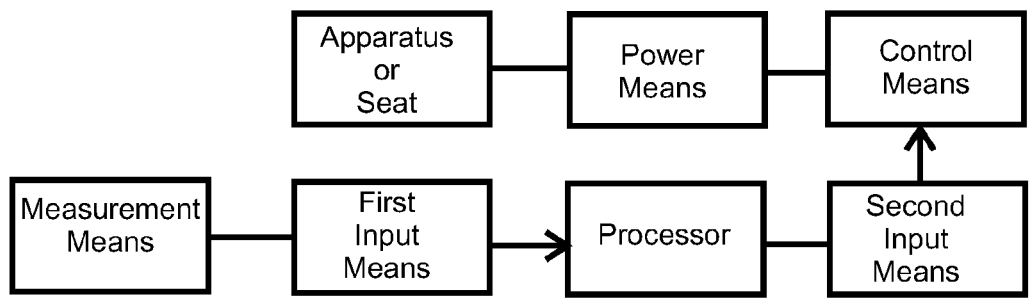
FIG. 47A is a schematic drawing of the basic embodiment of the adjustment system in accordance with the invention.
Figure 47B:
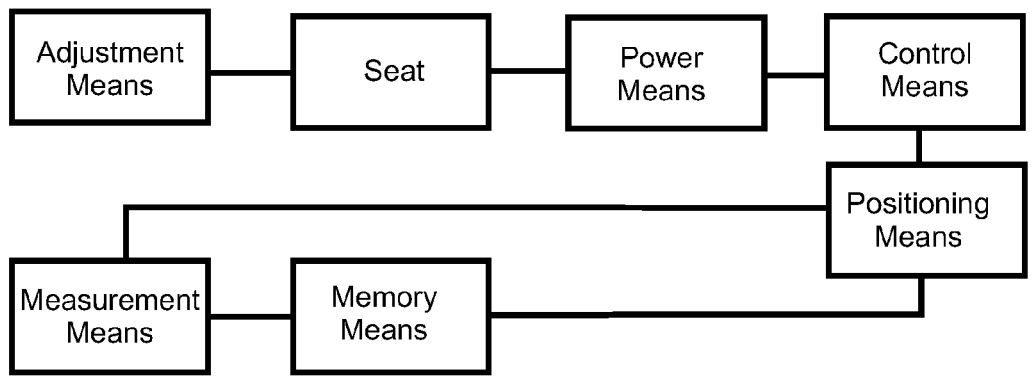
FIG. 47B is a schematic drawing of another basic embodiment of the adjustment system in accordance with the invention.

Other uses for such resonators or reflectors include placing them on doors and windows in order to determine whether either is open or closed. In FIG. 46, for example, such a resonator 363 is placed on the top of the window and is sensed by transducers 364 and 365. In this case, transducers 364 and 365 also monitor the space between the edge of the window glass and the top of the window opening. Many vehicles now have systems that permit the rapid opening of the window, called "express open", by a momentary push of a button. For example, when a vehicle approaches a tollbooth, the driver needs only touch the window control button and the window opens rapidly. Some automobile manufacturers do not wish to use such systems for closing the window, called "express close", because of the fear that the hand of the driver, or of a child leaning forward from the rear seat, or some other object, could get caught between the window and window frame. If the space between the edge of the window and the window frame were monitored with an interior monitoring system, this problem can be solved. The presence of the resonator or reflector 363 on the top of the window glass also gives a positive indication of where the top surface is and reflections from below that point can be ignored. Other solutions to the express close problem are presented elsewhere herein.

Various design variations of the window monitoring system are possible and the particular choice will depend on the requirements of the vehicle manufacturer and the characteristics of the vehicle. Two systems will be briefly described here.

A recording of the output of transducers 364 and 365 is made of the open window without an object in the space between the window edge and the top of the window frame. When in operation, the transducers 364 and 365 receive the return signal from the space it is monitoring and compares that signal with the stored signal referenced above. This is done by processor 366. If the difference between the test signal and the stored signal indicates that there is a reflecting object in the monitored space, the window is prevented from closing in the express close mode. If the window is part way up, a reflection will be received from the edge of the window glass that, in most cases, is easily identifiable from the reflection of a hand for example. A simple algorithm based on the intensity, or timing, of the reflection in most cases is sufficient to determine that an object rather than the window edge is in the monitored space. In other cases, the algorithm is used to identify the window edge and ignore that reflection and all other reflections that are lower (i.e., later in time) than the window edge. In all cases, the system will default in not permitting the express close if there is any doubt. The operator can still close the window by holding the switch in the window closing position and the window will then close slowly as it now does in vehicles without the express close feature.

Alternately, the system can use pattern recognition using the two transducers 364 and 365 as shown in FIG. 46 and the processor 366 which comprises a neural network. In this example the system is trained for all cases where the window is down and at intermediate locations. In operation, the transducers monitor the window space and feed the received signals to processor 366. As long as the signals are similar to one of the signals for which the network was trained, the express close system is enabled. As before, the default is to suppress the express close.

If there are sufficient imagers placed at appropriate locations, a likely condition as the cost of imagers and processors continues to drop, the presence of an obstruction in an open window, door, sunroof, trunk opening, hatchback etc., can be sensed by such an imager and the closing of the opening stopped. This likely outcome will simplify interior monitoring by permitting one device to carry out multiple functions.

The use of a resonator, RFID or SAW tag, or reflector, to determine whether the vehicle door is properly shut is also illustrated in FIG. 46. In this case, the resonator or reflector 367 is placed in the B-pillar in such a manner that it is shielded by the door, or by a cover or other inhibiting mechanism (not shown) engaged by the door, and blocked or prevented from resonating when the door is closed. Resonator 367 provides waves 368. If transducers such as 8 and 10 in FIG. 1 are used in this system, the closed-door condition would be determined by the absence of a return signal from the B-pillar resonator 367. This system permits the substitution of an inexpensive resonator or reflector for a more expensive and less reliable electrical switch plus wires.

The use of a resonator or reflector has been described above. For those cases where an infrared laser system is used, an optical mirror, reflector or even a bar code or equivalent would replace the mechanical resonator used with the acoustic system. In the acoustic system, the resonator can be any of a variety of tuned resonating systems including an acoustic cavity or a vibrating mechanical element. As discussed above, a properly designed antenna, corner reflector, or a SAW or RFID device fulfills this function for radio frequency waves.

For the purposes herein, the word resonator will frequently be used to include any device that returns a signal when excited by a signal sent by another device through the air. Thus, resonator would include a resonating antenna, a reflector, a surface acoustic wave (SAW) device, an RFID tag, an acoustic resonator, or any other device that performs substantially the same function such as a bar or other coded tag.

Other types of tags can also be used such as disclosed in U.S. Pat. No. 5,821,859. Concealed magnetic ID code and antitheft tags can also be used.

In most of the applications described above, single frequency energy was used to irradiate various occupying items of the passenger compartment. This was for illustrative purposes only and at least one of the inventions disclosed herein is not limited to single frequency irradiation. In many applications, it is useful to use several discrete frequencies or a band of frequencies or a chirp. In this manner, considerably greater information is received from the reflected irradiation permitting greater discrimination between different classes of objects. In general each object will have a different reflectivity, absorptivity and transmissivity at each frequency. Also, the different resonators placed at different positions in the passenger compartment can now be tuned to different frequencies making it easier to isolate one resonator from another.

Let us now consider the adjustment of a seat to adapt to an occupant. First some measurements of the morphological properties of the occupant are necessary. The first characteristic considered is a measurement of the height of the occupant from the vehicle seat. This can be done by a sensor in the ceiling of the vehicle but this becomes difficult since, even for the same seat location, the head of the occupant will not be at the same angle with respect to the seat and therefore the angle to a ceiling mounted sensor is in general unknown at least as long as only one ceiling mounted sensor is used. This problem can be solved if two or three sensors are used as described below. The simplest implementation is to place the sensor in the seat. In U.S. Pat. No. 5,694,320, a rear impact occupant protection apparatus is disclosed which uses sensors mounted within the headrest. This same system can also be used to measure the height of the occupant from the seat and thus, for no additional cost assuming the rear impact occupant protection system described in the '320 patent is provided, the first measure of the occupant's morphology can be achieved. See also FIGS. 48 and 49. For some applications, this may be sufficient since it is unlikely that two operators will use the vehicle that both have the same height. For other implementations, one or more additional measurements are used. A face, fingerprint, voiceprint or iris recognition system will have the least problem identifying a previous occupant.

Figure 48:
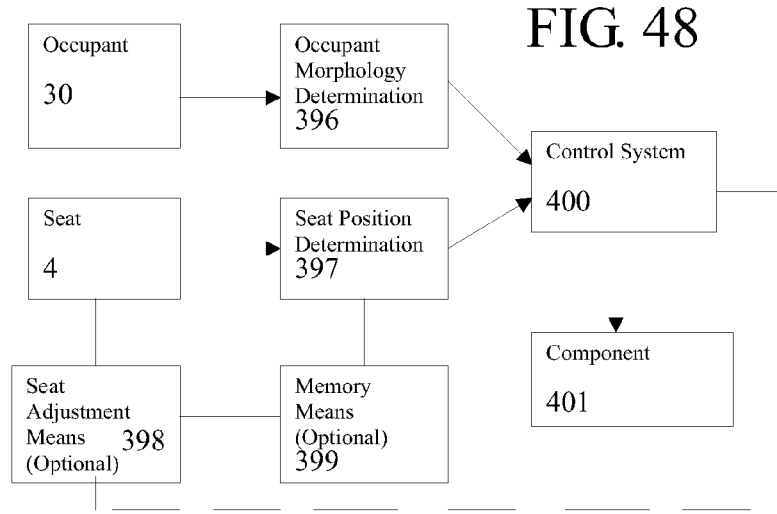
FIG. 48 is a flow chart of an arrangement for controlling a component in accordance with the invention.

Referring now to FIG. 48, an automatic adjustment system for adjusting a seat (which is being used only as an example of a vehicle component) is shown generally at 371 with a movable headrest 356 and ultrasonic sensors 353, 354 and 355 for measuring the height of the occupant of the seat. Other types of wave, energy or radiation receiving sensors may also be used in the invention instead of the ultrasonic transmitter/receiver set 353, 354, 355. Power means such as motors 371, 372, and 373 connected to the seat for moving the base of the seat, control means such as a control circuit, system or module 254 connected to the motors and a headrest actuation mechanism using servomotors 374 and 375, which may be servomotors, are also illustrated. The seat 4 and headrest 356 are shown in phantom. Vertical motion of the headrest 356 is accomplished when a signal is sent from control module 254 to servomotor 374 through a wire 376. Servomotor 374 rotates lead screw 377 which engages with a threaded hole in member 378 causing it to move up or down depending on the direction of rotation of the lead screw 377. Headrest support rods 379 and 380 are attached to member 378 and cause the headrest 356 to translate up or down with member 378. In this manner, the vertical position of the headrest can be controlled as depicted by arrow A-A. Ultrasonic transmitters and receivers 353, 354, 355 may be replaced by other appropriate wave-generating and receiving devices, such as electromagnetic, active infrared transmitters and receivers, and capacitance sensors and electric field sensors.

Wire 381 leads from control module 254 to servomotor 375 which rotates lead screw 382. Lead screw 382 engages with a threaded hole in shaft 383 which is attached to supporting structures within the seat shown in phantom. The rotation of lead screw 382 rotates servo motor support 384, upon which servomotor 374 is situated, which in turn rotates headrest support rods 379 and 380 in slots 385 and 386 in the seat 4.

Rotation of the servomotor support 384 is facilitated by a rod 387 upon which the servo motor support 384 is positioned. In this manner, the headrest 356 is caused to move in the fore and aft direction as depicted by arrow B-B. There are other designs which accomplish the same effect in moving the headrest up and down and fore and aft.

The operation of the system is as follows. When an adult or child occupant is seated on a seat containing the headrest and control system described above as determined by the neural network 65, the ultrasonic transmitters 353, 354 and 355 emit ultrasonic energy which reflects off of the head of the occupant and is received by the same transducers. An electronic circuit in control module 254 contains a microprocessor which determines the distance from the head of the occupant based on the time between the transmission and reception of the ultrasonic pulses. In the embodiment wherein capacitance or electric field sensors are used instead of ultrasonic transducers, the manner in which the distance can be determined using such sensors is known to those skilled in the art.

Control module 254 may be within the same microprocessor as neural network 65 or separate therefrom. The headrest 356 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 4, the headrest 356 moves to find the top of the occupant's head as discussed above. This is accomplished using an algorithm and a microprocessor which is part of control circuit 254. The headrest 356 then moves to the optimum location for rear impact protection as described in the above referenced '320 patent. Once the height of the occupant has been measured, another algorithm in the microprocessor in control circuit 254 compares the occupant's measured height with a table representing the population as a whole and from this table, the appropriate positions for the seat corresponding to the occupant's height is selected. For example, if the occupant measured 33 inches from the top of the seat bottom, this might correspond to an 85% human, depending on the particular seat and statistical table of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, etc. Of course one or more pedals can be manually adjusted providing they are provided with an actuator such as an electric motor and any such adjustment, either manual or automatic, is contemplated by the inventions disclosed herein.

Once the proper position has been determined by control circuit 254, signals are sent to motors 371, 372, and 373 to move the seat to that position, if such movement is necessary. That is, it is possible that the seat will be in the proper position so that movement of the seat is not required. As such, the position of the motors 371,372,373 and/or the position of the seat prior to occupancy by the occupant may be stored in memory so that after occupancy by the occupant and determination of the desired position of the seat, a comparison is made to determine whether the desired position of the seat deviates from the current position of the seat. If not, movement of the seat is not required. Otherwise, the signals are sent by the control circuit 254 to the motors. In this case, control circuit 254 would encompass a seat controller.

Instead of adjusting the seat to position the driver in an optimum driving position, or for use when adjusting the seat of a passenger, it is possible to perform the adjustment with a view toward optimizing the actuation or deployment of an occupant protection or restraint device. For example, after obtaining one or more morphological characteristics of the occupant, the processor can analyze them and determine one or more preferred positions of the seat, with the position of the seat being related to the position of the occupant, so that if the occupant protection device is deployed, the occupant will be in an advantageous position to be protected against injury by such deployment. In this case then, the seat is adjusted based on the morphology of the occupant view a view toward optimizing deployment of the occupant protection device. The processor is provided in a training or programming stage with the preferred seat positions for different morphologies of occupants.

Movement of the seat can take place either immediately upon the occupant sitting in the seat or immediately prior to a crash requiring deployment of the occupant protection device. In the latter case, if an anticipatory sensing arrangement is used, the seat can be positioned immediately prior to the impact, much in a similar manner as the headrest is adjusted for a rear impact as disclosed in the '320 patent referenced above.

If during some set time period after the seat has been positioned, the operator changes these adjustments, the new positions of the seat are stored in association with an occupant height class in a second table within control circuit 254. When the occupant again occupies the seat and his or her height has once again been determined, the control circuit 254 will find an entry in the second table which takes precedence over the basic, original table and the seat returns to the adjusted position. When the occupant leaves the vehicle, or even when the engine is shut off and the door opened, the seat can be returned to a neutral position which provides for easy entry and exit from the vehicle.

The seat 4 also contains two control switch assemblies 388 and 389 for manually controlling the position of the seat 4 and headrest 356. The seat control switches 388 permits the occupant to adjust the position of the seat if he or she is dissatisfied with the position selected by the algorithm. The headrest control switches 389 permit the occupant to adjust the position of the headrest in the event that the calculated position is uncomfortably close to or far from the occupant's head. A woman with a large hairdo might find that the headrest automatically adjusts so as to contact her hairdo. This adjustment she might find annoying and could then position the headrest further from her head. For those vehicles which have a seat memory system for associating the seat position with a particular occupant, which has been assumed above, the position of the headrest relative to the occupant's head could also be recorded. Later, when the occupant enters the vehicle, and the seat automatically adjusts to the recorded preference, the headrest will similarly automatically adjust as diagrammed in FIGS. 47A and 47B.

The height of the occupant, although probably the best initial morphological characteristic, may not be sufficient especially for distinguishing one driver from another when they are approximately the same height. A second characteristic, the occupant's weight, can also be readily determined from sensors mounted within the seat in a variety of ways as shown in FIG. 42 which is a perspective view of the seat shown in FIG. 48 with a displacement or weight sensor 159 shown mounted onto the seat.

Displacement sensor 159 is supported from supports 165. In general, displacement sensor 164, or another non-displacement sensor, measures a physical state of a component affected by the occupancy of the seat. An occupying item of the seat will cause a force to be exerted downward and the magnitude of this force is representative of the weight of the occupying item. Thus, by measuring this force, information about the weight of the occupying item can be obtained. A physical state may be any force changed by the occupancy of the seat and which is reflected in the component, e.g., strain of a component, compression of a component, tension of a component. Other weight measuring systems as described herein and elsewhere including bladders and strain gages can be used.

An alternative approach is to measure the load on the vehicle suspension system while the vehicle is at rest (static) or when it is in motion (dynamic). The normal empty state of the vehicle can be determined when the vehicle is at rest for a prolonged time period. After then the number and location of occupying items can be determined by measuring the increased load on the suspension devices that attach the vehicle body to its frame. SAW strain measuring elements can be placed on each suspension spring, for example, and used to measure the increased load on the vehicle as an object or occupant is placed in the vehicle. This approach has the advantage that it is not affected by seatbelt loadings, for example. If the vehicle is monitored as each item is paced in the vehicle a characterization of that item can be made. The taking on of fuel, for example, will correspond to a particular loading pattern over time that will permit the identification of the amount of the weight on the suspension that can be attributed to fuel. Dynamic measuring systems are similar to those used in section 6.3 and thus will not be repeated here.

The system described above is based on the assumption that the occupant will be satisfied with one seat position throughout an extended driving trip. Studies have shown that for extended travel periods that the comfort of the driver can be improved through variations in the seat position. This variability can be handled in several ways. For example, the amount and type of variation preferred by an occupant of the particular morphology can be determined through case studies and focus groups. If it is found, for example, that the 50 percentile male driver prefers the seat back angle to vary by 5 degrees sinusodially with a one-hour period, this can be programmed to the system. Since the system knows the morphology of the driver it can decide from a lookup table what is the best variability for the average driver of that morphology. The driver then can select from several preferred possibilities if, for example, he or she wishes to have the seat back not move at all or follow an excursion of 10 degrees over two hours.

This system provides an identification of the driver based on two morphological characteristics which is adequate for most cases. As additional features of the vehicle interior identification and monitoring system described in the above referenced patent applications are implemented, it will be possible to obtain additional morphological measurements of the driver which will provide even greater accuracy in driver identification. Such additional measurements include iris scans, voice prints, face recognition, fingerprints, voiceprints hand or palm prints etc. Two characteristics may not be sufficient to rely on for theft and security purposes, however, many other driver preferences can still be added to seat position with this level of occupant recognition accuracy. These include the automatic selection of a preferred radio station, pedal position, vehicle temperature, steering wheel and steering column position, etc.

One advantage of using only the height and weight is that it avoids the necessity of the seat manufacturer from having to interact with the headliner manufacturer, or other component suppliers, since all of the measuring transducers are in the seat. This two characteristic system is generally sufficient to distinguish drivers that normally drive a particular vehicle. This system costs little more than the memory systems now in use and is passive, i.e., it does not require action on the part of the occupant after his initial adjustment has been made.

Instead of measuring the height and weight of the occupant, it is also possible to measure a combination of any two morphological characteristics and during a training phase, derive a relationship between the occupancy of the seat, e.g., adult occupant, child occupant, etc., and the data of the two morphological characteristic. This relationship may be embodied within a neural network so that during use, by measuring the two morphological characteristics, the occupancy of the seat can be determined.

There are other methods of measuring the height of the driver such as placing the transducers at other locations in the vehicle. Some alternatives are shown in other figures herein and include partial side images of the occupant and ultrasonic transducers positioned on or near the vehicle headliner. These transducers may already be present because of other implementations of the vehicle interior identification and monitoring system described in the above referenced patent applications. The use of several transducers provides a more accurate determination of location of the head of the driver. When using a headliner mounted sensor alone, the exact position of the head is ambiguous since the transducer measures the distance to the head regardless of what direction the head is. By knowing the distance from the head to another headliner mounted transducer the ambiguity is substantially reduced. This argument is of course dependent on the use of ultrasonic transducers. Optical transducers using CCD, CMOS or equivalent arrays are now becoming price competitive and, as pointed out in the above referenced patent applications, will be the technology of choice for interior vehicle monitoring. A single CMOS array of 160 by 160 pixels, for example, coupled with the appropriate pattern recognition software, can be used to form an image of the head of an occupant and accurately locate the head for the purposes of at least one of the inventions disclosed herein. It can also be used with a face recognition algorithm to positively identify the occupant.

Figure 49:
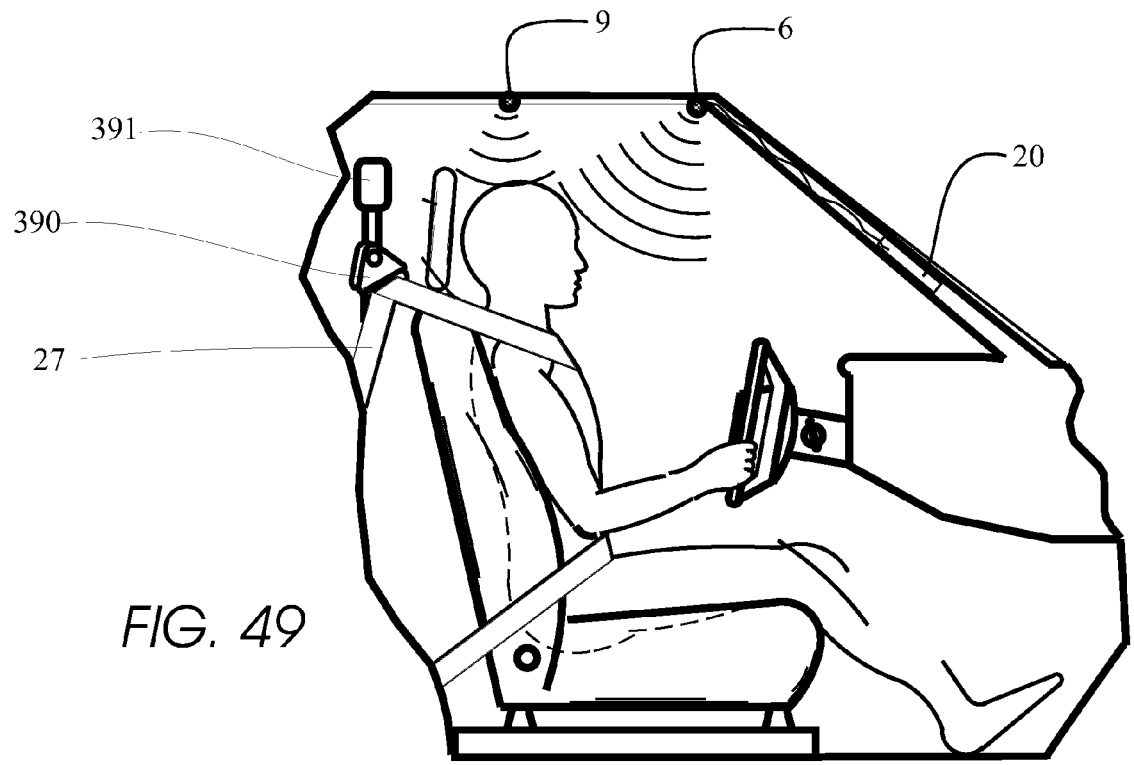
FIG. 49 is a side plan view of the interior of an automobile, with portions cut away and removed, with two occupant height measuring sensors, one mounted into the headliner above the occupant's head and the other mounted onto the A-pillar and also showing a seatbelt associated with the seat wherein the seatbelt has an adjustable upper anchorage point which is automatically adjusted based on the height of the occupant.

FIG. 49 also illustrates a system where the seatbelt 27 has an adjustable upper anchorage point 390 which is automatically adjusted by a motor 391 to a location optimized based on the height of the occupant. In this system, infrared transmitter and CCD array receivers 6 and 9 are positioned in a convenient location proximate the occupant's shoulder, such as in connection with the headliner, above and usually to the outside of the occupant's shoulder. An appropriate pattern recognition system, as may be resident in control circuitry 20 to which the receivers 6 and 9 are coupled, as described above is then used to determine the location and position of the shoulder. This information is provided by control circuitry 20 to the seatbelt anchorage height adjustment system 391 (through a conventional coupling arrangement), shown schematically, which moves the attachment point 390 of the seatbelt 27 to the optimum vertical location for the proper placement of the seatbelt 27.

The calculations for this feature and the appropriate control circuitry can also be located in control module 20 or elsewhere if appropriate. Seatbelts are most effective when the upper attachment point to the vehicle is positioned vertically close to the shoulder of the occupant being restrained. If the attachment point is too low, the occupant experiences discomfort from the rubbing of the belt on his or her shoulder. If it is too high, the occupant may experience discomfort due to the rubbing of the belt against his or her neck and the occupant will move forward by a greater amount during a crash which may result in his or her head striking the steering wheel. For these reasons, it is desirable to have the upper seatbelt attachment point located slightly above the occupant's shoulder. To accomplish this for various sized occupants, the location of the occupant's shoulder should be known, which can be accomplished by the vehicle interior monitoring system described herein.

Figure 50:
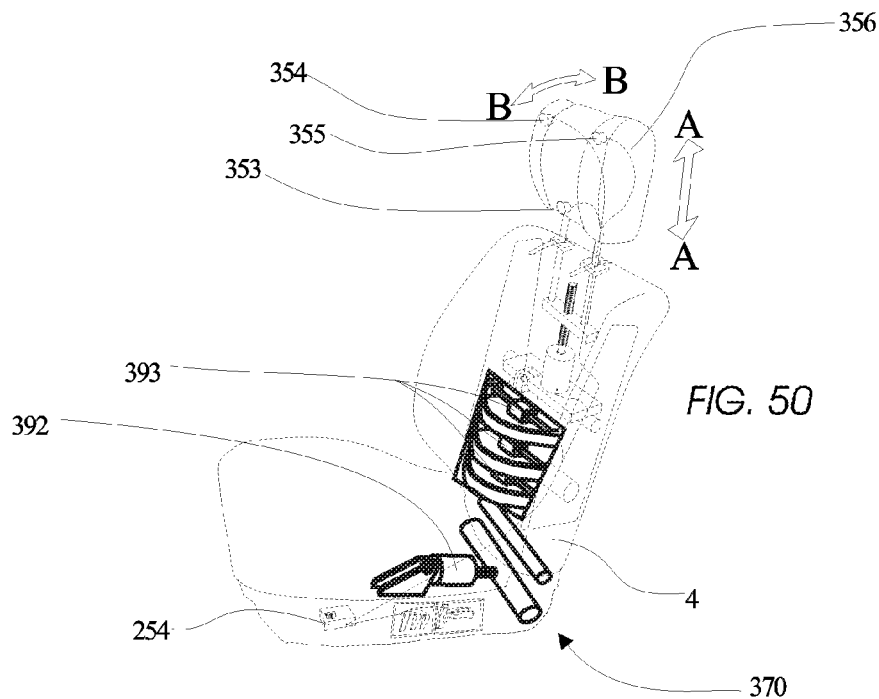
FIG. 50 is a view of the seat of FIG. 48 showing motors for changing the tilt of seat back and the lumbar support.

Many luxury automobiles today have the ability to control the angle of the seat back as well as a lumbar support. These additional motions of the seat can also be controlled by the seat adjustment system in accordance with the invention. FIG. 50 is a view of the seat of FIG. 48 showing motors 392 and 393 for changing the tilt of the seat back and the lumbar support. Three motors 393 are used to adjust the lumbar support in this implementation. The same procedure is used for these additional motions as described for FIG. 48 above.

An initial table is provided based on the optimum positions for various segments of the population. For example, for some applications the table may contain a setting value for each five percentile of the population for each of the 6 possible seat motions, fore and aft, up and down, total seat tilt, seat back angle, lumbar position, and headrest position for a total of 120 table entries. The second table similarly would contain the personal preference modified values of the 6 positions desired by a particular driver.

The angular resolution of a transducer is proportional to the ratio of the wavelength to the diameter of the transmitter. Once three transmitters and receivers are used, the approximate equivalent single transmitter and receiver is one which has a diameter approximately equal to the shortest distance between any pair of transducers. In this case, the equivalent diameter is equal to the distance between transmitter 354 or 355 and 353. This provides far greater resolution and, by controlling the phase between signals sent by the transmitters, the direction of the equivalent ultrasonic beam can be controlled. Thus, the head of the driver can be scanned with great accuracy and a map made of the occupant's head. Using this technology plus an appropriate pattern recognition algorithm, such as a neural network, an accurate location of the driver's head can be found even when the driver's head is partially obscured by a hat, coat, or hairdo. This also provides at least one other identification morphological characteristic which can be used to further identify the occupant, namely the diameter of the driver's head.

In an automobile, there is an approximately fixed vertical distance between the optimum location of the occupant's eyes and the location of the pedals. The distant from a driver's eyes to his or her feet, on the other hand, is not the same for all people. An individual driver now compensates for this discrepancy by moving the seat and by changing the angle between his or hers legs and body. For both small and large drivers, this discrepancy cannot be fully compensated for and as a result, their eyes are not appropriately placed. A similar problem exists with the steering wheel. To help correct these problems, the pedals and steering column should be movable as illustrated in FIG. 51 which is a plan view similar to that of FIG. 49 showing a driver and driver seat with an automatically adjustable steering column and pedal system which is adjusted based on the morphology of the driver.

In FIG. 51, a motor 394 is connected to and controls the position of the steering column and another motor 395 is connected to and controls the position of the pedals. Both motors 394 and 395 are coupled to and controlled by control circuit 254 wherein now the basic table of settings includes values for both the pedals and steering column locations.

The settings may be determined through experimentation or empirically by determining an optimum position of the pedals and steering wheel for drivers having different morphologies, i.e., different heights, different leg lengths, etc.

More specifically, as shown in FIG. 51A, the morphology determination system 430 determines one or more physical properties or characteristics of the driver 30 which would affect the position of the steering column, e.g., leg length, height, and arm length. The determination of these properties may be obtained in any of the manners disclosed herein. For example, height may be determined using the system shown in FIG. 48. Leg length and arm length may be determined by measuring the weight, height, etc of the driver and then using a table to obtain an estimated or average leg length or arm length based on the measured properties. In the latter case, the control circuit 431 could obtain the measurements and include data for the leg length and arm length, or would include data on the position of the steering wheel for the measured driver, i.e., the table of settings.

In either case, the control system 431 is provided with the setting for the steering wheel and if necessary, directs the motor 394 to move the steering wheel to the desired position. Movement of the steering wheel is thus provided in a totally automatic manner without manual intervention by the driver, either, by adjusting a knob on the steering wheel or by depressing a button.

Although movement of the steering wheel is shown here as being controlled by a motor 394 that moves the steering column fore and aft, other methods are sometimes used in various vehicles such as changing the tilt angle of the steering column or the tilt angle of the steering wheel. Motors can be provided that cause these other motions and are contemplated by at least one of the inventions disclosed herein as is any other method that controls the position of the steering wheel. For example, FIG. 51 shows a schematic of a motor 429 which may be used to control the tilt angle of the steering wheel relative to the steering column.

Regardless of which motor or motors are used, the invention contemplates the adjustment or movement of the steering wheel relative to the front console of the vehicle and thus relative to the driver of the vehicle. This movement may be directly effective on the steering wheel (via motor 429) or effective on the steering column and thus indirectly effective on the steering wheel since movement of the steering column will cause movement of the steering wheel. Additionally when the ignition is turned off the steering wheel and column and any other adjustable device or component can be automatically moved to a more out of the way position to permit easier ingress and egress from the vehicle, for example.

The steering wheel adjustment feature may be designed to be activated upon detection of the presence of an object on the driver's seat. Thus, when a driver's first sits on the seat, the sensors could be designed to initiate measurement of the driver's morphology and then control the motor or motors to adjust the steering wheel, if such adjustment is deemed necessary. This is because an adjustment in the position of the steering wheel is usually not required during the course of driving but is generally only required when a driver first sits in the seat. The detection of the presence of the driver may be achieved using the weight sensors and/or other presence detection means, such as using the wave-based sensors, capacitance sensors, electric field sensors, etc.

The eye ellipse discussed above is illustrated at 358 in FIG. 52, which is a view showing the occupant's eyes and the seat adjusted to place the eyes at a particular vertical position for proper viewing through the windshield and rear view mirror. Many systems are now under development to improve vehicle safety and driving ease. For example, night vision systems are being sold which project an enhanced image of the road ahead of the vehicle onto the windshield in a "heads-up display". The main problem with the systems now being sold is that the projected image does not precisely overlap the image as seen through the windshield. This parallax causes confusion in the driver and can only be corrected if the location of the driver's eyes is accurately known. One method of solving this problem is to use the passive seat adjustment system described herein to place the occupant's eyes at the optimum location as described above. Once this has been accomplished, in addition to solving the parallax problem, the eyes are properly located with respect to the rear view mirror 55 and little if any adjustment is required in order for the driver to have the proper view of what is behind the vehicle. Currently the problem is solved by projecting the heads-up display onto a different portion of the windshield, the bottom.

Although it has been described herein that the seat can be automatically adjusted to place the driver's eyes in the "eye-ellipse", there are many manual methods that can be implemented with feedback to the driver telling him or her when his or her eyes are properly position. At least one of the inventions disclosed herein is not limited by the use of automatic methods.

Once the morphology of the driver and the seat position is known, many other objects in the vehicle can be automatically adjusted to conform to the occupant. An automatically adjustable seat armrest, a cup holder, the cellular phone, or any other objects with which the driver interacts can be now moved to accommodate the driver. This is in addition to the personal preference items such as the radio station, temperature, etc. discussed above.

Once the system of at least one of the inventions disclosed herein is implemented, additional features become possible such as a seat which automatically makes slight adjustments to help alleviate fatigue or to account for a change of position of the driver in the seat, or a seat which automatically changes position slightly based on the time of day. Many people prefer to sit more upright when driving at night, for example. Other similar improvements based on knowledge of the occupant morphology will now become obvious to those skilled in the art.

FIG. 48 shows a flow chart of one manner in the arrangement and method for controlling a vehicle component in accordance with the invention functions. A measurement of the morphology of the occupant 30 is performed at 396, i.e., one or more morphological characteristics are measured in any of the ways described above. The position of the seat portion 4 is obtained at 397 and both the measured morphological characteristic of the occupant 30 and the position of the seat portion 4 are forwarded to the control system 400. The control system considers these parameters and determines the manner in which the component 401 should be controlled or adjusted, and even whether any adjustment is necessary.

Preferably, seat adjustment means 398 are provided to enable automatic adjustment of the seat portion 4. If so, the current position of the seat portion 4 is stored in memory means 399 (which may be a previously adjusted position) and additional seat adjustment, if any, is determined by the control system 400 to direct the seat adjustment means 398 to move the seat. The seat portion 4 may be moved alone, i.e., considered as the component, or adjusted together with another component, i.e., considered separate from the component (represented by way of the dotted line in FIG. 48).

Although several preferred embodiments are illustrated and described above, there are other possible combinations using different sensors which measure either the same or different morphological characteristics, such as knee position, of an occupant to accomplish the same or similar goals as those described herein.

It should be mentioned that the adjustment system may be used in conjunction with each vehicle seat. In this case, if a seat is determined to be unoccupied, then the processor means may be designed to adjust the seat for the benefit of other occupants, i.e., if a front passenger side seat is unoccupied but the rear passenger side seat is occupied, then adjustment system could adjust the front seat for the benefit of the rear-seated passenger, e.g., move the seat base forward.

In additional embodiments, the present invention involves the measurement of one or more morphological characteristics of a vehicle occupant and the use of these measurements to classify the occupant as to size and weight, and then to use this classification to position a vehicle component, such as the seat, to a near optimum position for that class of occupant. Additional information concerning occupant preferences can also be associated with the occupant class so that when a person belonging to that particular class occupies the vehicle, the preferences associated with that class are implemented. These preferences and associated component adjustments include the seat location after it has been manually adjusted away from the position chosen initially by the system, the mirror location, temperature, radio station, steering wheel and steering column positions, pedal positions etc. The preferred morphological characteristics used are the occupant height from the vehicle seat, weight of the occupant and facial features. The height is determined by sensors, usually ultrasonic or electromagnetic, located in the headrest, headliner or another convenient location. The weight is determined by one of a variety of technologies that measure either pressure on or displacement of the vehicle seat or the force in the seat supporting structure. The facial features are determined by image analysis comprising an imager such as a CCD or CMOS camera plus additional hardware and software.

The eye tracker systems discussed above are facilitated by at least one of the inventions disclosed herein since one of the main purposes of determining the location of the driver's eyes either by directly locating them with trained pattern recognition technology or by inferring their location from the location of the driver's head, is so that the seat can be automatically positioned to place the driver's eyes into the "eye-ellipse". The eye-ellipse is the proper location for the driver's eyes to permit optimal operation of the vehicle and for the location of the mirrors etc. Thus, if the location of the driver's eyes are known, then the driver can be positioned so that his or her eyes are precisely situated in the eye ellipse and the reflection off of the eye can be monitored with a small eye tracker system. Also, by ascertaining the location of the driver's eyes, a rear view mirror positioning device can be controlled to adjust the mirror 55 to an optimal position. See section 6.5.

14.3 Side Impacts

Side impact airbags are now used on some vehicles. Some are quite small compared to driver or passenger airbags used for frontal impact protection. Nevertheless, a small child could be injured if he is sleeping with his head against the airbag module when the airbag deploys and a vehicle interior monitoring system is needed to prevent such a deployment. In FIG. 53, a single ultrasonic transducer 420 is shown mounted in a door adjacent airbag system 403 which houses an airbag 404. This sensor has the particular task of monitoring the space adjacent to the door-mounted airbag. Sensor 402 may also be coupled to control circuitry 20 which can process and use the information provided by sensor 402 in the determination of the location or identity of the occupant or location of a part of the occupant.

Similar to the embodiment in FIG. 4 with reference to U.S. Pat. No. 5,653,462, the airbag system 403 and components of the interior monitoring system, e.g., transducer 402, can also be coupled to a processor 20 including a control circuit 20A for controlling deployment of the airbag 404 based on information obtained by the transducer 402. This device does not have to be used to identify the object that is adjacent the airbag but it can be used to merely measure the position of the object. It can also be used to determine the presence of the object, i.e., the received waves are indicative of the presence or absence of an occupant as well as the position of the occupant or a part thereof. Instead of an ultrasonic transducer, another wave-receiving transducer may be used as described in any of the other embodiments herein, either solely for performing a wave-receiving function or for performing both a wave-receiving function and a wave-transmitting function.

FIG. 69 is an angular perspective overhead view of a vehicle 405 about to be impacted in the side by an approaching vehicle 406, where vehicle 405 is equipped with an anticipatory sensor system showing a transmitter 408 transmitting electromagnetic, such as infrared, waves toward vehicle 406. This is one example of many of the uses of the instant invention for exterior monitoring. The transmitter 408 is connected to an electronic module 412. Module 412 contains circuitry 413 to drive transmitter 408 and circuitry 414 to process the returned signals from receivers 409 and 410 which are also coupled to module 412. Circuitry 414 contains a processor such as a neural computer 415 or microprocessor with a pattern recognition algorithm, which performs the pattern recognition determination based on signals from receivers 409 and 410. Receivers 409 and 410 are mounted onto the B-Pillar of the vehicle and are covered with a protective transparent cover. An alternate mounting location is shown as 411 which is in the door window trim panel where the rear view mirror (not shown) is frequently attached. One additional advantage of this system is the ability of infrared to penetrate fog and snow better than visible light which makes this technology particularly applicable for blind spot detection and anticipatory sensing applications. Although it is well known that infrared can be significantly attenuated by both fog and snow, it is less so than visual light depending on the frequency chosen. (See for example L. A. Klein, *Millimeter-Wave and Infrared Multisensor Design and Signal Processing*, Artech House, Inc, Boston 1997, ISBN 0-89006-764-3).

14.4 Children and Animals Left Alone

The various occupant sensing systems described herein can be used to determine if a child or animal has been left alone in a vehicle and the temperature is increasing or decreasing to where the child's or animal's health is at risk. When such a condition is discovered, the owner or an authority can be summoned for help or, alternately, the vehicle engine can be started and the vehicle warmed or cooled as needed. See section 9.4.

14.5 Vehicle Theft

If a vehicle is stolen then several options are available when the occupant sensing system is installed. Upon command by the owner over a telematics system, a picture of the vehicles interior can be taken and transmitted to the owner. Alternately a continuous flow of pictures can be sent over the telematics system along with the location of the vehicle if a GPS system is available or from the cell phone otherwise to help the owner or authorities determine where the vehicle is.

14.6 Security, Intruder Protection

If the owner has parked the vehicle and is returning, and an intruder has entered and is hiding, that fact can be made known to the owner before he or she opens the vehicle door. This can be accomplished through a wireless transmission to any of a number of devices that have been programmed for that function such as a vehicle remote key fob, cell phones, PDAs etc.

14.7 Entertainment System Control

Control of the entertainment system applying teachings of the invention is discussed in the '881 application.

Additionally, it is well known among acoustics engineers that the quality of sound coming from an entertainment system can be substantially affected by the characteristics and contents of the space in which it operates and the surfaces surrounding that space. When an engineer is designing a system for an automobile, he or she has a great deal of knowledge about that space and of the vehicle surfaces surrounding it. He or she has little knowledge of how many occupants are likely to be in the vehicle on a particular day, however, and therefore the system is a compromise. If the system knew the number and position of the vehicle occupants, and maybe even their size, then adjustments could be made in the system output and the sound quality improved. FIG. 8A, therefore, illustrates schematically the interface between the vehicle interior monitoring system of at least one of the inventions disclosed herein, i.e., transducers 49-52 and 54 and processor 20 which operate as set forth above, and the vehicle entertainment system 99. The particular design of the entertainment system that uses the information provided by the monitoring system can be determined by those skilled in the appropriate art. Perhaps in combination with this system, the quality of the sound system can be measured by the audio system itself either by using the speakers as receiving units also or through the use of special microphones. The quality of the sound can then be adjusted according to the vehicle occupancy and the reflectivity, or absorbtivity, of the vehicle occupants. If, for example, certain frequencies are being reflected, or absorbed, more than others, the audio amplifier can be adjusted to amplify those frequencies to a lesser, or greater, amount than others.

The acoustic frequencies that are practical to use for acoustic imaging in the systems are between 40 to 160 kilohertz (kHz). The wavelength of a 50 kHz acoustic wave is about 0.6 cm which is too coarse to determine the fine features of a person's face, for example. It is well understood by those skilled in the art that features which are smaller than the wavelength of the illuminating radiation cannot be distinguished. Similarly the wave length of common radar systems varies from about 0.9 cm (for 33,000 MHz K band) to 133 cm (for 225 MHz P band) which is also too coarse for person identification systems. In FIG. 4, therefore, the ultrasonic transducers of the previous designs are replaced by laser transducers 8 and 9 which are connected to a microprocessor 20. In all other manners, the system operates similarly. The design of the electronic circuits for this laser system is described in U.S. Pat. No. 5,653,462 and in particular FIG. 8 thereof and the corresponding description. In this case, a pattern recognition system such as a neural network system is employed and uses the demodulated signals from the receptors 8 and 9. The output of processor 20 of the monitoring system is shown connected schematically to a general interface 36 which can be the vehicle ignition enabling system; the entertainment system; the seat, mirror, suspension or other adjustment systems; or any other appropriate vehicle system.

Recent developments in the field of directing sound using hyper-sound (also referred to as hypersonic sound) now make it possible to accurately direct sound to the vicinity of the ears of an occupant so that only that occupant can hear the sound. The system of at least one of the inventions disclosed herein can thus be used to find the proximate direction of the ears of the occupant for this purpose.

Hypersonic sound is described in U.S. Pat. No. 5,885,129, U.S. Pat. No. 5,889,870 and U.S. Pat. No. 6,016,351 and International Publication No. WO 00/18031. By practicing the techniques described in these patents and the publication, in some cases coupled with a mechanical or acoustical steering mechanism, sound can be directed to the location of the ears of a particular vehicle occupant in such a manner that the other occupants can barely hear the sound, if at all. This is particularly the case when the vehicle is operating at high speeds on the highway and a high level of "white" noise is present. In this manner, one occupant can be listening to the news while another is listening to an opera, for example. White noise can also be added to the vehicle and generated by the hypersonic sound system if necessary when the vehicle is stopped or traveling in heavy traffic. Thus, several occupants of a vehicle can listen to different programming without the other occupants hearing that programming. This can be accomplished using hypersonic sound without requiring earphones.

In principle, hypersonic sound utilizes the emission of inaudible ultrasonic frequencies that mix in air and result in the generation of new audio frequencies. A hypersonic sound system is a highly efficient converter of electrical energy to acoustical energy. Sound is created in air at any desired point that provides flexibility and allows manipulation of the perceived location of the source of the sound. Speaker enclosures are thus rendered dispensable. The dispersion of the mixing area of the ultrasonic frequencies and thus the area in which the new audio frequencies are audible can be controlled to provide a very narrow or wide area as desired.

The audio mixing area generated by each set of two ultrasonic frequency generators in accordance with the invention could thus be directly in front of the ultrasonic frequency generators in which case the audio frequencies would travel from the mixing area in a narrow straight beam or cone to the occupant. Also, the mixing area can include only a single ear of an occupant (another mixing area being formed by ultrasonic frequencies generated by a set of two other ultrasonic frequency generators at the location of the other ear of the occupant with presumably but not definitely the same new audio frequencies) or be large enough to encompass the head and both ears of the occupant. If so desired, the mixing area could even be controlled to encompass the determined location of the ears of multiple occupants, e.g., occupants seated one behind the other or one next to another.

Vehicle entertainment system 99 may include means for generating and transmitting sound waves at the ears of the occupants, the position of which are detected by transducers 49-52 and 54 and processor 20, as well as means for detecting the presence and direction of unwanted noise. In this manner, appropriate sound waves can be generated and transmitted to the occupant to cancel the unwanted noise and thereby optimize the comfort of the occupant, i.e., the reception of the desired sound from the entertainment system 99.

More particularly, the entertainment system 99 includes sound generating components such as speakers, the output of which can be controlled to enable particular occupants to each listen to a specific musical selection. As such, each occupant can listen to different music, or multiple occupants can listen to the same music while other occupant(s) listen to different music. Control of the speakers to direct sound waves at a particular occupant, i.e., at the ears of the particular occupant located in any of the ways discussed herein, can be enabled by any known manner in the art, for example, speakers having an adjustable position and/or orientation or speakers producing directable sound waves. In this manner, once the occupants are located, the speakers are controlled to direct the sound waves at the occupant, or even more specifically, at the head or ears of the occupants.

Additional details about control of an entertainment system using teachings of the invention are found in the '881 application, e.g., with reference to FIG. 70 therein.

14.8 HVAC

Considering again FIG. 2A. In normal use (other than after a crash), the system determines whether any human occupants are present, i.e., adults or children, and the location determining means 152 determines the occupant's location. The processor 152 receives signals representative of the presence of occupants and their location and determines whether the vehicular system, component or subsystem 155 can be modified to optimize its operation for the specific arrangement of occupants. For example, if the processor 153 determines that only the front seats in the vehicle are occupied, it could control the heating system to provide heat only through vents situated to provide heat for the front-seated occupants.

Thus, the control of the heating, ventilating, and air conditioning (HVAC) system can also be a part of the monitoring system although alone it would probably not justify the implementation of an interior monitoring system at least until the time comes when electronic heating and cooling systems replace the conventional systems now used. Nevertheless, if the monitoring system is present, it can be used to control the HVAC for a small increment in cost. The advantage of such a system is that since most vehicles contain only a single occupant, there is no need to direct heat or air conditioning to unoccupied seats. This permits the most rapid heating or cooling for the driver when the vehicle is first started and he or she is alone without heating or cooling unoccupied seats. Since the HVAC system does consume energy, an energy saving also results by only heating and cooling the driver when he or she is alone, which is about 70% of the time.

Figure 54:
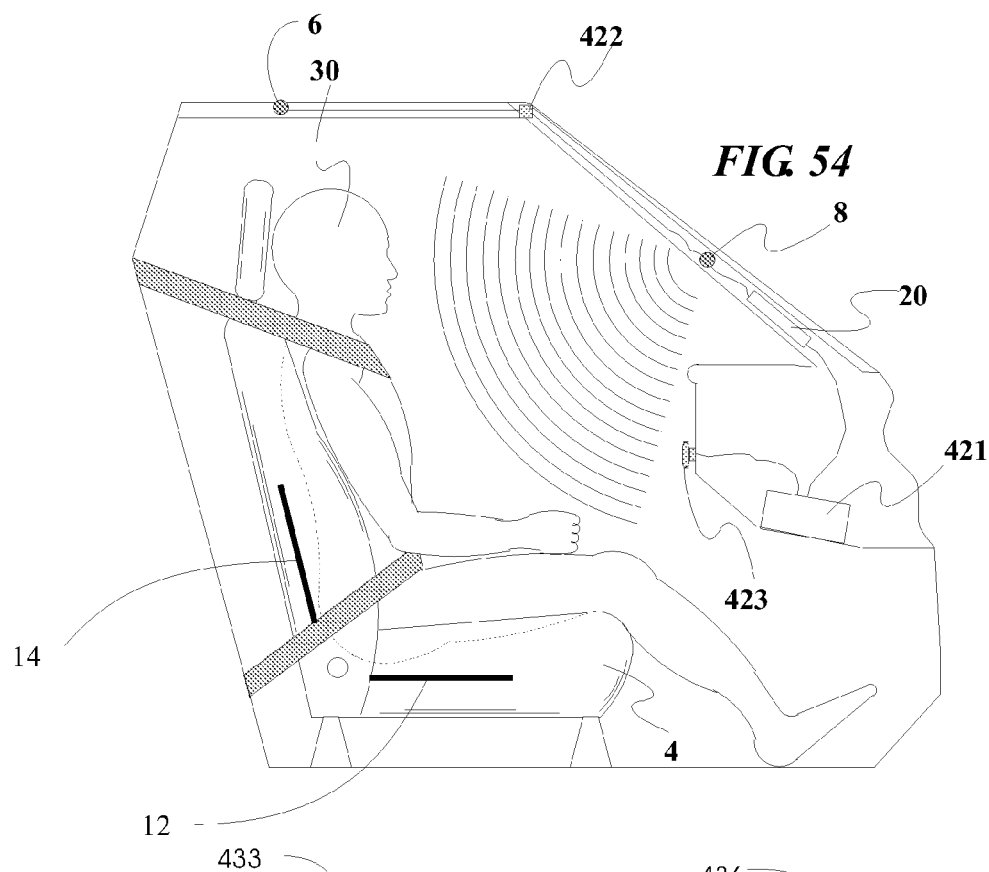
FIG. 54 is a side view with parts cutaway and removed showing schematically the interface between the vehicle interior monitoring system of at least one of the inventions disclosed herein and the vehicle heating and air conditioning system and including an antenna field sensor.

FIG. 54 shows a side view of a vehicle passenger compartment showing schematically an interface 421 between the vehicle interior monitoring system of at least one of the inventions disclosed herein and the vehicle heating and air conditioning system. In addition to the transducers 6 and 8, which at least in this embodiment are preferably acoustic transducers, an infrared sensor 422 is also shown mounted in the A-pillar and is constructed and operated to monitor the temperature of the occupant. The output from each of the transducers is fed into processor 20 that is in turn connected to interface 421. In this manner, the HVAC control is based on the occupant's temperature rather than that of the ambient air in the vehicle, as well as the determined presence of the occupant via transducers 6 and 8 as described above. This also permits each vehicle occupant to be independently monitored and the HVAC system to be adjusted for each occupant either based on a set temperature for all occupants or, alternately, each occupant could be permitted to set his or her own preferred temperature through adjusting a control knob shown schematically as 423 in FIG. 54.

Since the monitoring system is already installed in the vehicle with its associated electronics including processor 20, the infrared sensor can be added with little additional cost and can share the processing unit. The infrared sensor can be a single pixel device as in the Corrado patents discussed above or an infrared imager. In the former case the temperature being measured may be that of a cup of coffee or other articles rather then the occupant. It will also tend to be an average temperature that may take into account a heated seat. Thus much more accurate results can be obtained using an infrared imager and a pattern recognition algorithm to find the occupant before the temperature is determined. Not only can this system be used for directing hot and cold air, but developments in the field of directing sound using hyper-sound (also referred to as hypersonic sound herein) now makes it possible to accurately direct sound to the vicinity of the ears of an occupant so that only that occupant can hear the sound. The system of at least one of the inventions disclosed herein can thus be used to find the proximate direction of the ears of the occupant for this purpose. Additional discussion of this aspect is set forth above.

14.9 Obstruction Sensing

To the extent that occupant monitoring transducers can locate and track parts of an occupant, this system can also be used to prevent arms, hands, fingers or heads from becoming trapped in a closing window or door. Although specific designs have been presented above for window and door anti-trap solutions, if there are several imagers in the vehicle these same imagers can monitor the various vehicle openings such as the windows, sunroof, doors, trunk lid, hatchback door etc. In some cases, the system can be aided through the use of special lighting designs that either cover only the opening or comprise structured light so that the distance to a reflecting surface in or near to an opening can be determined. Additional details about obstruction sensing are set forth in U.S. patent application Ser. No. 10/940,881 with reference to FIGS. 167-173.

14.10 Rear Impacts

Rear impact protection is also discussed elsewhere herein. A rear-of-head detector 423 is illustrated in FIG. 53. This detector 423, which can be one of the types described above, is used to determine the distance from the headrest to the rearmost position of the occupant's head and to therefore control the position of the headrest so that it is properly positioned behind the occupant's head to offer optimum support during a rear impact. Although the headrest of most vehicles is adjustable, it is rare for an occupant to position it properly if at all. Each year there are in excess of 400,000 whiplash injuries in vehicle impacts approximately 90,000 of which are from rear impacts (source: National Highway Traffic Safety Admin.). A properly positioned headrest could substantially reduce the frequency of such injuries, which can be accomplished by the head detector of at least one of the inventions disclosed herein. The head detector 423 is shown connected schematically to the headrest control mechanism and circuitry 424. This mechanism is capable of moving the headrest up and down and, in some cases, rotating it fore and aft.

Additional disclosure relating to rear impact protection is discussed in the '881 application with reference to FIGS. 119-129B.

14.11 Combined with SDM and Other Systems

Figure 55:
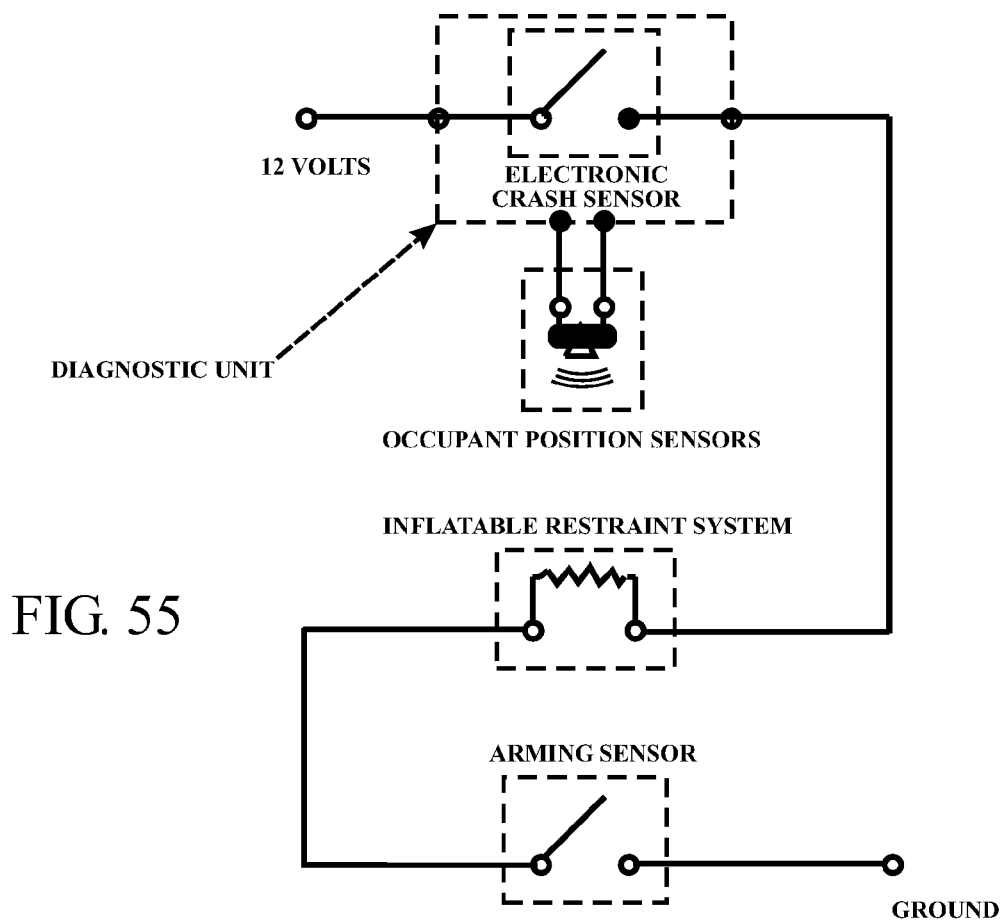
FIG. 55 is a circuit schematic illustrating the use of the vehicle interior monitoring sensor used as an occupant position sensor in conjunction with the remainder of the inflatable restraint system.

The occupant position sensor in any of its various forms is integrated into the airbag system circuitry as shown schematically in FIG. 55. In this example, the occupant position sensors are used as an input to a smart electronic sensor and diagnostic system. The electronic sensor determines whether one or more of the airbags should be deployed based on the vehicle acceleration crash pulse, or crush zone mounted crash sensors, or a combination thereof, and the occupant position sensor determines whether the occupant is too close to any of the airbags and therefore that the deployment should not take place. In FIG. 55, the electronic crash sensor located within the sensor and diagnostic unit determines whether the crash is of such severity as to require deployment of one or more of the airbags. The occupant position sensors determine the location of the vehicle occupants relative to the airbags and provide this information to the sensor and diagnostic unit that then determines whether it is safe to deploy each airbag and/or whether the deployment parameters should be adjusted. The arming sensor, if one is present, also determines whether there is a vehicle crash occurring. In such a case, if the sensor and diagnostic unit and the arming sensor both determine that the vehicle is undergoing a crash requiring one or more airbags and the position sensors determine that the occupants are safely away from the airbag(s), the airbag(s), or inflatable restraint system, is deployed.

The above applications illustrate the wide range of opportunities, which become available if the identity and location of various objects and occupants, and some of their parts, within the vehicle were known. Once the system of at least one of the inventions disclosed herein is operational, integration with the airbag electronic sensor and diagnostics system (SDM) is likely since an interface with the SDM is necessary. This sharing of resources will result in a significant cost saving to the auto manufacturer. For the same reasons, the vehicle interior monitoring system (VIMS) can include the side impact sensor and diagnostic system.

Figure 56:
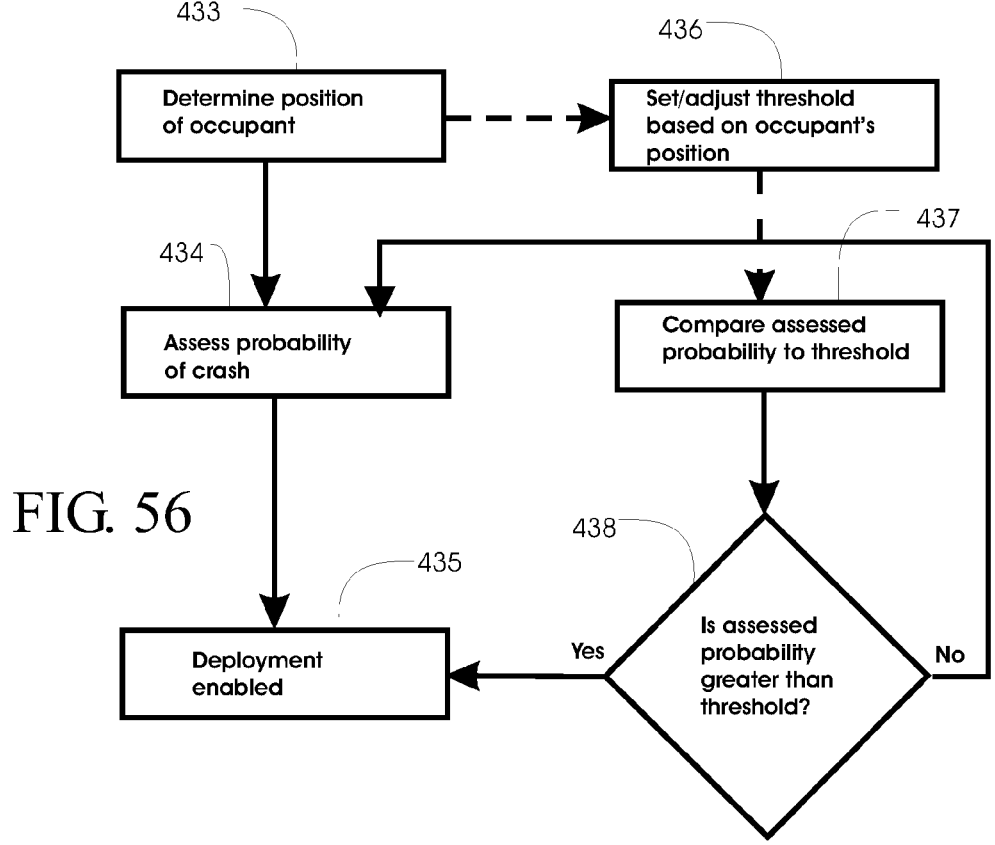
FIG. 56 shows a flowchart of the manner in which an airbag or other occupant restraint or protection device may be controlled based on the position of an occupant.

FIG. 56 shows a flowchart of the manner in which an airbag or other occupant restraint or protection device may be controlled based on the position of an occupant. The position of the occupant is determined at 433 by any one of a variety of different occupant sensing systems including a system designed to receive waves, energy or radiation from a space in a passenger compartment of the vehicle occupied by the occupant, and which also optionally transmit such waves, energy or radiation. A camera or other device for obtaining images, two or three-dimensional, of a passenger compartment of the vehicle occupied by the occupant and analyzing the images may be used. The image device may include a focusing system which focuses the images onto optical arrays and analyzes the focused images. A device which moves a beam of radiation through a passenger compartment of the vehicle occupied by the occupant may also be used, e.g., a scanning type of system. An electric field sensor operative in a seat occupied by the occupant and a capacitance sensor operative in the seat occupied by the occupant may also be used.

The probability of a crash is assessed at 434, e.g., by a crash sensor. Deployment of the airbag is then enabled at 435 in consideration of the determined position of the occupant and the assessed probability that a crash is occurring. A sensor algorithm may be used to receive the input from the crash sensor and occupant position determining system and direct or control deployment of the airbag based thereon. More particularly, in another embodiment, the assessed probability is analyzed, e.g., by the sensor algorithm, relative to a predetermined threshold at 437 whereby a determination is made at 438 if the assessed probability is greater than the threshold. If not, the probability of the crash is again assessed until the probability of a crash is greater than the threshold.

Optionally, the threshold is set or adjusted at 436 based on the determined position of the occupant.

Deployment of the airbag can entail disabling deployment of the airbag when the determined position is too close to the airbag, determining the rate at which the airbag is inflated based on the determined position of the occupant and/or determining the time in which the airbag is deployed based on the determined position of the occupant.

Disclosed above is an airbag system for inflation and deployment of an air bag in front of the passenger during a collision which comprises an air bag, an inflator connected to the air bag and structured and arranged to inflate the air bag with a gas, a passenger sensor system mounted at least partially adjacent to or on the interior roof of the vehicle, and a microprocessor electrically connected to the sensor system and to the inflator. The sensor system continuously senses the position of the passenger and generates electrical output indicative of the position of the passenger. The microprocessor compares and performs an analysis of the electrical output from the sensor system and activates the inflator to inflate and deploy the air bag when the analysis indicates that the vehicle is involved in a collision and that deployment of the air bag would likely reduce a risk of serious injury to the passenger which would exist absent deployment of the air bag and likely would not present an increased risk of injury to the passenger resulting from deployment of the air bag.

The sensor system might be designed to continuously sense position of the passenger relative to the air bag. The sensor system may comprise an array of passenger proximity sensors, each sensing distance from a passenger to the proximity sensor. In this case, the microprocessor determines the passenger's position by determining each of the distances and then triangulating the distances from the passenger to each of the proximity sensors. The microprocessor can include memory in which the positions of the passenger over some interval of time are stored. The sensor system may be particularly sensitive to the position of the head of the passenger.

14.12 Exterior Monitoring

Use of the invention for detecting objects in blind spots and other areas surrounding the vehicle and displaying an image for the operator to see or activating a warning system is discussed in the '881 application, e.g., with reference to FIGS. 69 and 73-75.

14.13 Monitoring of Other Vehicles Such as Cargo Containers, Truck Trailers and Railroad Cars 14.13.1 Monitoring the Interior Contents of a Shipping Container, Trailer, Boat, Shed, Etc.

Commercial systems are now available from companies such as Skybitz Inc. 45365 Vintage Park Plaza, Suite 210, Dulles, Va. 20166-6700, which will monitor the location of an asset anywhere on the surface of the earth. Each monitored asset contains a low cost GPS receiver and a satellite communication system. The system can be installed onto a truck, trailer, container, or other asset and it well periodically communicate with a low earth orbit (LEO) or a geostationary satellite providing the satellite with its location as determined by the GPS receiver or a similar system such as the Skybitz Global Locating System (GLS). The entire system operates off of a battery, for example, and if the system transmits information to the satellite once per day, the battery can last many years before requiring replacement. Thus, the system can monitor the location of a trailer, for example, once per day, which is sufficient if trailer is stationary. The interrogation rate can be automatically increased if the trailer begins moving. Such a system can last for 2 to 10 years without requiring maintenance depending on design, usage and the environment. Even longer periods are possible if power is periodically or occasionally available to recharge the battery such as by vibration energy harvesting, solar cells, capacitive coupling, inductive coupling, RF or vehicle power. In some cases, an ultracapacitor as discussed above can be used in place of a battery.

The Skybitz system by itself only provides information as to the location of a container and not information about its contents, environment, and/or other properties. At least one of the inventions disclosed herein disclosed here is intended to provide this additional information, which can be coded typically into a few bytes and sent to the satellite along with the container location information and identification. First consider monitoring of the interior contents of a container. From here on, the terms "shipping container" or "container" will be used as a generic cargo holder and will include all cargo holders including standard and non-standard containers, boats, trucks, trailers, sheds, warehouses, storage facilities, tanks, buildings or any other such object that has space and can hold cargo. Most of these "containers" are also vehicles as defined above.

One method of monitoring the space inside such a container is to use ultrasound such as disclosed in U.S. Pat. No. 5,653,462, U.S. Pat. No. 5,829,782, U.S. RE37260 (a reissue of U.S. Pat. No. 5,943,295), U.S. Pat. No. 5,901,978, U.S. Pat. No. 6,116,639, U.S. Pat. No. 6,186,537, U.S. Pat. No. 6,234,520, U.S. Pat. No. 6,254,127, U.S. Pat. No. 6,270,117, U.S. Pat. No. 6,283,503, U.S. Pat. No. 6,341,798, U.S. Pat. No. 6,397,136 and RE 37,260 for monitoring the interior of a vehicle. Also, reference is made to U.S. Patents U.S. Pat. No. 6,279,946, which discusses various ways to use an ultrasonic transducer while compensating for thermal gradients. Reference is also made to U.S. Pat. No. 5,653,462, U.S. Pat. No. 5,694,320, U.S. Pat. No. 5,822,707, U.S. Pat. No. 5,829,782, U.S. Pat. No. 5,835,613, U.S. Pat. No. 5,485,000, U.S. Pat. No. 5,488,802, U.S. Pat. No. 5,901,978, U.S. Pat. No. 6,309,139, U.S. Pat. No. 6,078,854, U.S. Pat. No. 6,081,757, U.S. Pat. No. 6,088,640, U.S. Pat. No. 6,116,639, U.S. Pat. No. 6,134,492, U.S. Pat. No. 6,141,432, U.S. Pat. No. 6,168,198, U.S. Pat. No. 6,186,537, U.S. Pat. No. 6,234,519, U.S. Pat. No. 6,234,520, U.S. Pat. No. 6,242,701, U.S. Pat. No. 6,253,134, U.S. Pat. No. 6,254,127, U.S. Pat. No. 6,270,116, U.S. Pat. No. 6,279,946, U.S. Pat. No. 6,283,503, U.S. Pat. No. 6,324,453, U.S. Pat. No. 6,325,414, U.S. Pat. No. 6,330,501, U.S. Pat. No. 6,331,014, RE37260 U.S. Pat. No. 6,393,133, U.S. Pat. No. 6,397,136, U.S. Pat. No. 6,412,813, U.S. Pat. No. 6,422,595, U.S. Pat. No. 6,452,870, U.S. Pat. No. 6,442,504, U.S. Pat. No. 6,445,988, U.S. Pat. No. 6,442,465, which disclose inventions that may be incorporated into the invention(s) disclosed herein.

Consider now a standard shipping container that is used for shipping cargo by boat, trailer, or railroad. Such containers are nominally 8' w×8' h×20' or 40' long outside dimensions, however, a container 48' in length is also sometimes used. The inside dimensions are frequently around 4" less than the outside dimensions. In a simple interior container monitoring system, one or more ultrasonic transducers can be mounted on an interior part of the container adjacent the container's ceiling in a protective housing. Periodically, the ultrasonic transducers can emit a few cycles of ultrasound and receive reflected echoes of this ultrasound from walls and contents of the trailer. In some cases, especially for long containers, one or more transducers, typically at one end of the container, can send to one or more transducers located at, for example, the opposite end. Usually, however, the transmitters and receivers are located near each other. Due to the long distance that the ultrasound waves must travel especially in the 48 foot container, it is frequently desirable to repeat the send and receive sequence several times and to add or average the results. This has the effect of improving the signal to noise ratio. Note that the system disclosed herein and in the parent patents and applications is able to achieve such long sensing distances due to the principles disclosed herein. Competitive systems that are now beginning to enter the market have much shorter sensing distances and thus a key invention herein is the ability to achieve sensing distances in excess of 20 feet.

Note that in many cases several transducers are used for monitoring the vehicle such as a container that typically point in slightly different directions. This need not be the case and a movable mounting is also contemplated where the motion is accomplished by any convenient method such as a magnet, motor, etc.

Figure 57:
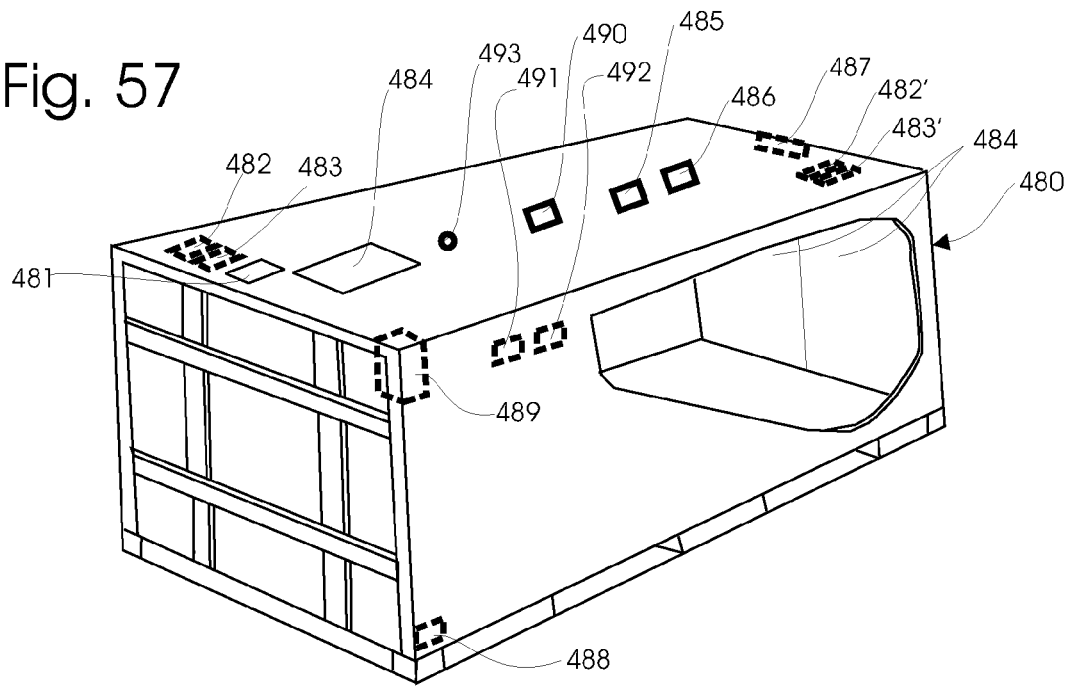
FIG. 57 is a perspective view showing a shipping container including one embodiment of the monitoring system in accordance with the present invention.

Referring to FIG. 57, a container 480 is shown including an interior sensor system 481 arranged to obtain information about contents in the interior of the container 480. The interior sensor system includes a wave transmitter 482 mounted at one end of the container 480 and which operatively transmits waves into the interior of the container 480 and a wave receiver 483 mounted adjacent the wave transmitter 482 and which operatively receives waves from the interior of the container 480. As shown, the transmitter 482 and receiver 483 are adjacent one another but such a positioning is not intended to limit the invention. The transmitter 482 and receiver 483 can be formed as a single transducer or may be spaced apart from one another. Multiple pairs of transmitter/receivers can also be provided, for example transmitter 482' and receiver 483' are located at an opposite end of the container 480 proximate the doors 484.

The interior sensor system 481 includes a processor coupled to the receiver 483, and optionally the transmitter 482, and which is resident on the container 480, for example, in the housing of the receiver 483 or in the housing of a communication system 485. The processor is programmed to compare waves received by each receiver 483, 483' at different times and analyze either the received waves individually or the received waves in comparison to or in relation to other received waves for the purpose of providing information about the contents in the interior of the container 480. The processor can employ pattern recognition techniques and as discussed more fully below, be designed to compensate for thermal gradients in the interior of the container 480. Information about the contents of the container 480 may comprise the presence or motion of objects in the interior. The processor may be associated with a memory unit which can store data on the location of the container 480 and the analysis of the data from the interior sensor system 481.

The container 480 also includes a location determining system 486 which monitors the location of the container 480. To this end, the location determining system can be any asset locator in the prior art, which typically include a GPS receiver, transmitter and appropriate electronic hardware and software to enable the position of the container 480 to be determined using GPS technology or other satellite or ground-based technology including those using the cell phone system or similar location based systems.

The communication system 485 is coupled to both the interior sensor system 481 and the location determining system 486 and transmits the information about the contents in the interior of the container 480 (obtained from the interior sensor system 481) and the location of the container 480 (obtained from the location determining system 486). This transmission may be to a remote facility wherein the information about the container 480 is stored, processed, counted, reviewed and/or monitored and/or retransmitted to another location, perhaps by way of the Internet.

The container 480 also includes a door status sensor 487 arranged to detect when one or both doors 484 is/are opened or closed after having been opened. The door status sensor 487 may be an ultrasonic sensor which is positioned a fixed distance from the doors 484 and registers changes in the position of the doors 484. Alternately, other door status systems can be used such as those based on switches, magnetic sensors or other technologies. The door status sensor 487 can be programmed to associate an increase in the distance between the sensor 487 and each of the doors 484 and a subsequent decrease in the distance between the sensor 487 and that door 484 as an opening and subsequent closing of that door 484. In the alternative, a latching device can be provided to detect latching of each door 484 upon its closure. The door status sensor 487 is coupled to the interior sensor system 481, or at least to the transmitters 482,482' so that the transmitters 482,482' can be designed to transmit waves into the interior of the container 480 only when the door status sensor 487 detects when at least one door 484 is closed after having been opened. For other purposes, the ultrasonic sensors may be activated on opening of the door(s) in order to monitor the movement of objects into or out of the container, which might in turn be used to activate an RFID or bar code reading system or other object identification system.

When the ultrasonic transducers are first installed into the container 480 and the doors 484 closed, an initial pulse transmission can be initiated and the received signal stored to provide a vector of data that is representative of an empty container. To initiate the pulse transmission, an initiation device or function is provided in the interior sensor system 481, e.g., the door status sensor 487. At a subsequent time when contents have been added to the container (as possibly reflected in the opening and closing of the doors 484 as detected by the door status sensor 487), the ultrasonic transducers can be commanded to again issue a few cycles of ultrasound and record the reflections. If the second pattern is subtracted from the first pattern, or otherwise compared, in the processor the existence of additional contents in the container 480 will cause the signal to change, which thus causes the differential signal to change and the added contents detected. Vector as used herein with ultrasonic systems is a linear array of data values obtained by rectifying, taking the envelope and digitizing the returned signal as received by the transducer or other digital representation comprising at least a part of the returned signal.

When a container 480 is exposed to sunlight on its exterior top, a stable thermal gradient can occur inside the container 480 where the top of the container 480 near the ceiling is at a significantly higher temperature than the bottom of the container 480. This thermal gradient changes the density of the gas inside the container causing it to act as a lens to ultrasound that diffracts or bends the ultrasonic waves and can significantly affect the signals sensed by the receiver portions 483, 483' of the transducers. Thus, the vector of sensed data when the container is at a single uniform temperature will look significantly different from the vector of sensed data acquired within the same container when thermal gradients are present.

It is even possible for currents of heated air to occur within a container 480 if a side of the container is exposed to sunlight. Since these thermal gradients can substantially affect the vector, the system must be examined under a large variety of different thermal environments. This generally requires that the electronics be designed to mask somewhat the effects of the thermal gradients on the magnitude of the sensed waves while maintaining the positions of these waves in time. This can be accomplished as described in above-referenced patents and patent applications through the use, for example, of a logarithmic compression circuit. There are other methods of minimizing the effect on the reflected wave magnitudes that will accomplish substantially the same result some of which are disclosed elsewhere herein.

When the complicating aspects of thermal gradients are taken into account, in many cases a great deal of data must be taken with a large number of different occupancy situations to create a database of perhaps 10,000 to one million vectors each representing the different occupancy state of the container in a variety of thermal environments. This data can then be used to train a pattern recognition system such as a neural network, modular or combination neural network, cellular neural network, support vector machine, fuzzy logic system, Kalman filter system, sensor fusion system, data fusion system or other classification system. Since all containers of the type transported by ships, for example, are of standard sizes, only a few of these training exercises need to be conducted, typically one for each different geometry container. The process of adapting an ultrasonic occupancy monitoring system to a container or other space is described for automobile interior monitoring in above-referenced patents and patent applications, and therefore this process is not repeated here.

Other kinds of interior monitoring systems can be used to determine and characterize the contents of a space such as a container. One example uses a scanner and photocell 488, as in a laser radar system, and can be mounted near the floor of the container 480 and operated to scan the space above the floor in a plane located, for example, 10 cm above the floor. Since the distance to a reflecting wall of the container 480 can be determined and recorded for each angular position of the scanner, the distance to any occupying item will show up as a reflection from an object closer to the scanner and therefore a shadow graph of the contents of the container 10 cm above the floor can be obtained and used to partially categorize the contents of the container 480. Categorization of the contents of the container 480 may involve the use of pattern recognition technologies. Other locations of such a scanning system are possible.

In both of these examples, relatively little can be said about the contents of the container other then that something is present or that the container is empty. Frequently this is all that is required. A more sophisticated system can make use of one or more imagers (for example cameras) 489 mounted near the ceiling of the container, for example. Such imagers can be provided with a strobe flash and then commanded to make an image of the trailer interior at appropriate times. The output from such an imager 489 can also be analyzed by a pattern recognition system such as a neural network or equivalent, to reduce the information to a few bytes that can be sent to a central location via an LEO or geostationary satellite, for example. As with the above ultrasonic example, one image can be subtracted from the empty container image and if anything remains then that is a representation of the contents that have been placed in the container. Also, various images can be subtracted to determine the changes in container contents when the doors are opened and material is added or removed or to determine changes in position of the contents. Various derivatives of this information can be extracted and sent by the telematics system to the appropriate location for monitoring or other purposes.

Each of the systems mentioned above can also be used to determine whether there is motion of objects within the container relative to the container. Motion of objects within the container 480 would be reflected as differences between the waves received by the transducers (indicative of differences in distances between the transducer and the objects in the container) or images (indicative of differences between the position of objects in the images). Such motion can also aid in image segmentation which in turn can aid in the object identification process. This is particularly valuable if the container is occupied by life forms such as humans.

In the system of FIG. 57, wires (not shown) are used to connect the various sensors and devices. It is contemplated that all of the units in the monitoring system can be coupled together wirelessly, using for example the Bluetooth, WI-FI or other protocol.

If an inertial device 490 is also incorporated, such as the MEMSIC dual axis accelerometer, which provides information as to the accelerations of the container 480, then this relative motion can be determined by the processor and it can be ascertained whether this relative motion is caused by acceleration of the container 480, which may indicate loose cargo, and/or whether the motion is caused by the sensed occupying item. In latter case, a conclusion can perhaps be reached that container is occupied by a life form such as an animal or human. Additionally, it may be desirable to place sensors on an item of cargo itself since damage to the cargo could occur from excessive acceleration, shock, temperature, vibration, etc. regardless of whether the same stimulus was experienced by the entire container. A loose item of cargo, for example, may be impacting the monitored item of cargo and damaging it. Relative motion can also be sensed in some cases from outside of the container through the use of accelerometers, microphones or MIR (Micropower Impulse Radar). Note that all such sensors regardless of where they are placed are contemplated herein and are part of the present inventions.

Chemical sensors 491 based on surface acoustic wave (SAW) or other technology can in many cases be designed to sense the presence of certain vapors in the atmosphere and can do so at very low power. A properly designed SAW or equivalent sensing device, for example, can measure acceleration, angular rate, strain, temperature, pressure, carbon dioxide concentration, humidity, hydrocarbon concentration, and the presence or concentration of many other chemicals. A separate SAW or similar device may be needed for each chemical species (or in some cases each class of chemicals) where detection is desired. The devices, however, can be quite small and can be designed to use very little power. Such a system of SAW or equivalent devices can be used to measure the existence of certain chemical vapors in the atmosphere of the container much like a low power electronic nose. In some cases, it can be used to determine whether a carbon dioxide source such as a human is in the container. Such chemical sensing devices can also be designed, for example, to monitor for many other chemicals including some narcotics, hydrocarbons, mercury vapor, and other hazardous chemicals including some representative vapors of explosives or some weapons of mass destruction. With additional research, SAW or similar devices can also be designed or augmented to sense the presence of radioactive materials, and perhaps some biological materials such as smallpox or anthrax. In many cases, such SAW devices do not now exist, however, researchers believe that given the proper motivation that such devices can be created. Thus, although heretofore not appreciated, SAW or equivalent based systems can monitor a great many dangerous and hazardous materials that may be either legally or illegally occupying space within a container, for example. In particular, the existence of spills or leakages from the cargo can be detected in time to perhaps save damage to other cargo either within the container or in an adjacent container. Although SAW devices have in particular been described, other low power devices using battery or RF power can also be used where necessary. Note, the use of any of the afore mentioned SAW devices in connection within or on a vehicle for any purpose other than tire pressure and temperature monitoring or torque monitoring is new and contemplated by the inventions disclosed herein. Only a small number of examples are presented of the general application of the SAW, or RFID, technology to vehicles.

Other sensors that can be designed to operate under very low power levels include microphones 492 and light sensors 493 or sensors sensitive to other frequencies in the electromagnetic spectrum as the need arises. The light sensors 493 could be designed to cause activation of the interior sensor system 481 when the container is being switched from a dark condition (normally closed) to a light situation (when the door or other aperture is opened). A flashlight could also activate the light sensor 493.

Instead of one or more batteries providing power to the interior sensor system 481, the communication system 485 and the location determining system 486, solar power can be used. In this case, one or more solar panels 494 are attached to the upper wall of the container 480 (see FIG. 1) and electrically coupled to the various power-requiring components of the monitoring system. A battery can thus be eliminated. In the alternative, since the solar panel(s) 494 will not always be exposed to sunlight, a rechargeable battery can be provided which is charged by the solar panel 494 when the solar panels are exposed to sunlight. A battery could also be provided in the event that the solar panel 494 does not receive sufficient light to power the components of the monitoring system. In a similar manner, power can temporarily be supplied by a vehicle such as a tractor either by a direct connection to the tractor power or through capacitive, inductive or RF coupling power transmission systems. As above, an ultracapacitor can be used instead of a battery and energy harvesting can be used if there is a source of energy such as light or vibration in the environment.

In some cases, a container is thought to be empty when in fact it is being surreptitiously used for purposes beyond the desires of the container owner or law enforcement authorities. The various transducers that can be used to monitor interior of a container as described above, plus others, can also be used to allow the trailer or container owner to periodically monitor the use of his property.

14.13.2 Monitoring the Entire Asset

Immediately above, monitoring of the interior of the container is described. If the container is idle, there may not the need to frequently monitor the status of the container interior or exterior until some event happens. Thus, all monitoring systems on the container can be placed in the sleep mode until some event such as a motion or vibration of the container takes place. Other wakeup events could include the opening of the doors, the sensing of light or a change in the interior temperature of the container above a reference level, for example. When any of these chosen events occurs, the system can be instructed to change the monitoring rate and to immediately transmit a signal to a satellite or another communication system, or respond to a satellite-initiated signal for some LEO-based, or geocentric systems, for example. Such an event may signal to the container owner that a robbery was in progress either of the interior contents of the container or of the entire container. It also might signal that the contents of the container are in danger of being destroyed through temperature or excessive motion or that the container is being misappropriated for some unauthorized use.

Figure 58:
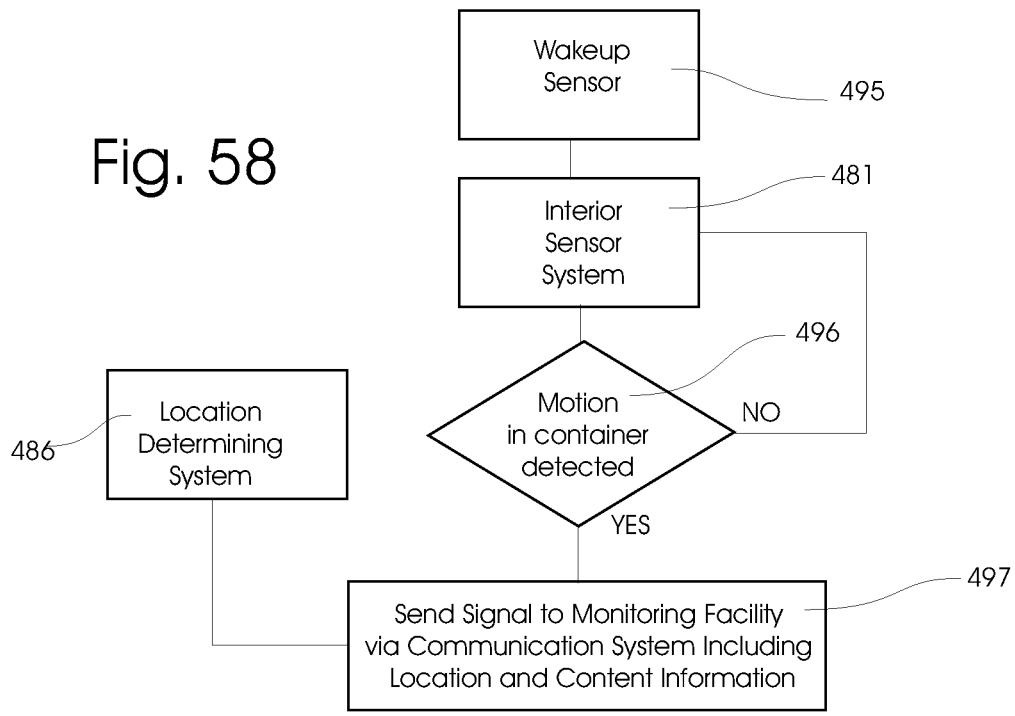
FIG. 58 is a flow chart showing one manner in which a container is monitored in accordance with the invention.

FIG. 58 shows a flowchart of the manner in which container 480 may be monitored by personnel or a computer program at a remote facility for the purpose of detecting unauthorized entry into the container and possible theft of the contents of the container 480. Initially, the wakeup sensor 495 detects motion, sound, light or vibration including motion of the doors 484, or any other change of the condition of the container 480 from a stationary or expected position. The wakeup sensor 495 can be designed to provide a signal indicative of motion only after a fixed time delay, i.e., a period of "sleep". In this manner, the wakeup sensor would not be activated repeatedly in traffic stop and go situations.

The wakeup sensor 495 initiates the interior sensor system 481 to perform the analysis of the contents in the interior of the container, e.g., send waves into the interior, receive waves and then process the received waves. If motion in the interior of the container is not detected at 496, then the interior sensor system 481 may be designed to continue to monitor the interior of the container, for example, by periodically re-sending waves into the interior of the container. If motion is detected at 496, then a signal is sent at 497 to a monitoring facility via the communication system 485 and which includes the location of the container 480 obtained from the location determining system 486 or by the ID for a permanently fixed container or other asset, structure or storage facility. In this manner, if the motion is determined to deviate from the expected handling of the container 480, appropriate law enforcement personnel can be summoned to investigate.

When it is known and expected that the container should be in motion, monitoring of this motion can still be important. An unexpected vibration could signal the start of a failure of the chassis tire, for example, or failure of the attachment to the chassis or the attachment of the chassis to the tractor. Similarly, an unexpected tilt angle of the container may signify a dangerous situation that could lead to a rollover accident and an unexpected shock could indicate an accident has occurred. Various sensors that can be used to monitor the motion of the container include gyroscopes, accelerometers and tilt sensors. An IMU (Inertial Measurement Unit) containing for example three accelerometers and three gyroscopes can be used.

In some cases, the container or the chassis can be provided with weight sensors that measure the total weight of the cargo as well as the distribution of weight. By monitoring changes in the weight distribution as the vehicle is traveling, an indication can result that the contents within the trailer are shifting which could cause damage to the cargo. An alternate method is to put weight sensors in the floor or as a mat on the floor of the vehicle. The mat design can use the bladder principles described above for weighing b vehicle occupants using, in most cases, multiple chambers. Strain gages can also be configured to measure the weight of container contents. An alternate approach is to use inertial sensors such as accelerometers and gyroscopes to measure the motion of the vehicle as it travels. If the characteristics of the input accelerations (linear and angular) are known from a map, for example, or by measuring them on the chassis then the inertial properties of the container can be determined and thus the load that the container contains. This is an alternate method of determining the contents of a container. If several (usually 3) accelerometers and several (usually 3) gyroscopes are used together in a single package then this is known as an inertial measurement unit. If a source of position is also known such as from a GPS system then the errors inherent in the IMU can be corrected using a Kalman filter.

Other container and chassis monitoring can include the attachment of a trailer to a tractor, the attachment of electrical and/or communication connections, and the status of the doors to the container. If the doors are opened when this is not expected, this could be an indication of a criminal activity underway. Several types of security seals are available including reusable seals that indicate when the door is open or closed or if it was ever opened during transit, or single use seals that are destroyed during the process of opening the container.

Another application of monitoring the entire asset would be to incorporate a diagnostic module into the asset. Frequently, the asset may have operating parts, e.g., if it is a refrigerated and contains a refrigeration unit. To this end, sensors can be installed on the asset and monitored using pattern recognition techniques as disclosed in U.S. Pat. No. 5,809,437 and U.S. Pat. No. 6,175,787. As such, various sensors would be placed on the container 480 and used to determine problems with the container 480 which might cause it to operate abnormally, e.g., if the refrigeration unit were about to fail because of a refrigerant leak. In this case, the information about the expected failure of the refrigeration unit could be transmitted to a facility and maintenance of the refrigeration unit could be scheduled.

It can also be desirable to detect unauthorized entry into container, which could be by cutting with a torch, or motorized saw, grinding, or blasting through the wall, ceiling, or floor of the container. This event can be detected by one or more of the following methods:

1. A light sensor which measures any part of the visible or infrared part of the spectrum and is calibrated to the ambient light inside the container when the door is closed and which then triggers when light is detected above ambient levels and door is closed.
2. A vibration sensor attached to wall of container which triggers on vibrations of an amplitude and/or frequency signature indicative of forced entry into the container. The duration of signal would also be a factor to consider. The algorithm could be derived from observations and tests or it could use a pattern recognition approach such as Neural Networks.
3. An infrared or carbon dioxide sensor could be used to detect human presence, although a carbon dioxide sensor would probably require a prolonged exposure.
4. Various motion sensors as discussed above can also be used, but would need to be resistant to triggering on motion typical of cargo transport. Thus a trained pattern recognition algorithm might be necessary.
5. The Interior of the container can be flooded with waves (ultrasonic or electromagnetic) and the return signature evaluated by a pattern recognition system such as a neural network trained to recognize changes consistent with the removal of cargo or the presence of a person or people. Alternately the mere fact that the pattern was changing could be indicative of human presence.

As discussed above and below, information from entry/person detector could be sent to communication network to notify interested parties of current status. Additionally, an audible alarm may be sounded and a photo could also be taken to identify the intruder. Additionally, motion sensors such as an accelerometer on a wall or floor of a vehicle such as a container or an ultrasonic or optical based motion detector such as used to turn on residential lights and the like, can also be used to detect intrusion into a vehicle and thus are contemplated herein. Such sensors can be mounted at any of the preferred locations disclosed herein or elsewhere in or on the vehicle. If a container, for example, is closed, a photocell connected to a pattern recognition system such as a neural network, for example can be trained to be sensitive to very minute changes in light such as would occur when an intruder opens a door or cuts a hole in a wall, ceiling or the floor of a vehicle even on a dark night. Even if there are holes in the vehicle that allow light to enter, the rate of change of this illumination can be detected and used as an indication of an intrusion.

It is noteworthy that systems based on the disclosure above can be configured to monitor construction machinery to prevent theft or at least to notify others that a theft is in progress.

14.13.3 Recording

In many cases it is desirable to obtain and record additional information about the cargo container and its contents. As mentioned above, the weight of the container with its contents and the distribution and changes in this weight distribution could be valuable for a safety authority investigating an accident, for highway authorities monitoring gross vehicle weight, for container owners who charge by the used capacity, and others. The environment that the container and its contents have been subjected to could also be significant information. Such things as whether the container was flooded, exposed to a spill or leakage of a hazardous material, exposed to excessive heat or cold, shocks, vibration etc. can be important historical factors for the container affecting its useful life, establishing liability for damages etc. For example, a continuous monitoring of container interior temperature could be significant for perishable cargo and for establishing liability.

Figure 59A:
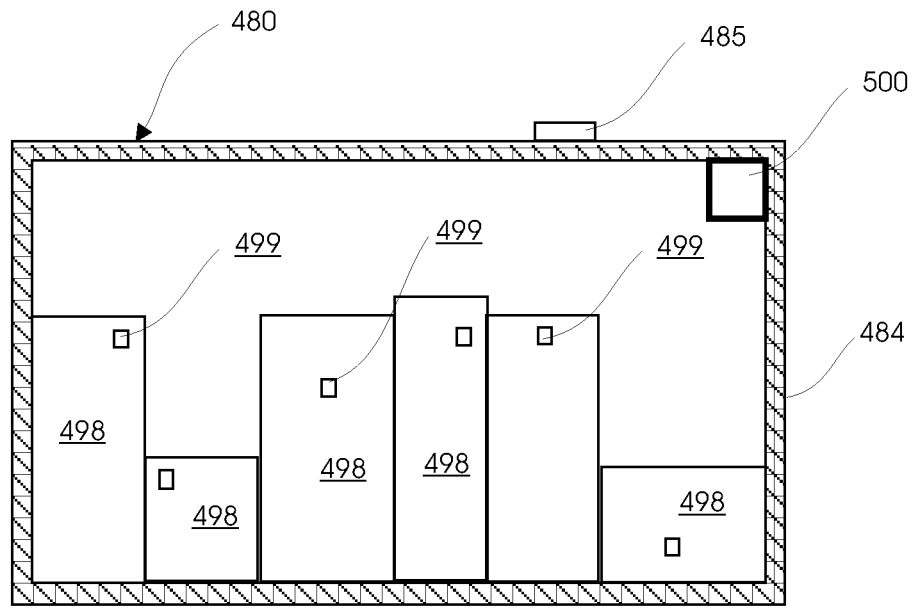
FIG. 59A is a cross-sectional view of a container showing the use of RFID technology in a monitoring system and method in accordance with the invention.

With reference to FIG. 59A, in some cases, the individual cargo items 498 can be tagged with RFID or SAW tags 499 and the presence of this cargo in the container 480 could be valuable information to the owner of the cargo. One or more sensors on the container that periodically read RFID tags could be required, such as one or more RFID interrogators 500 which periodically sends a signal which will causes the RFID tags 499 to generate a responsive signal. The responsive signal generated by the RFID tags 499 will contain information about the cargo item on which the RFID tag 499 is placed. Multiple interrogators or at least multiple antennas may be required depending on the size of the container. The RFID can be based on a SAW thus providing greater range for a passive system or it can also be provided with an internal battery or ultracapacitor for even greater range. Energy harvesting can also be used if appropriate.

Figure 59B:
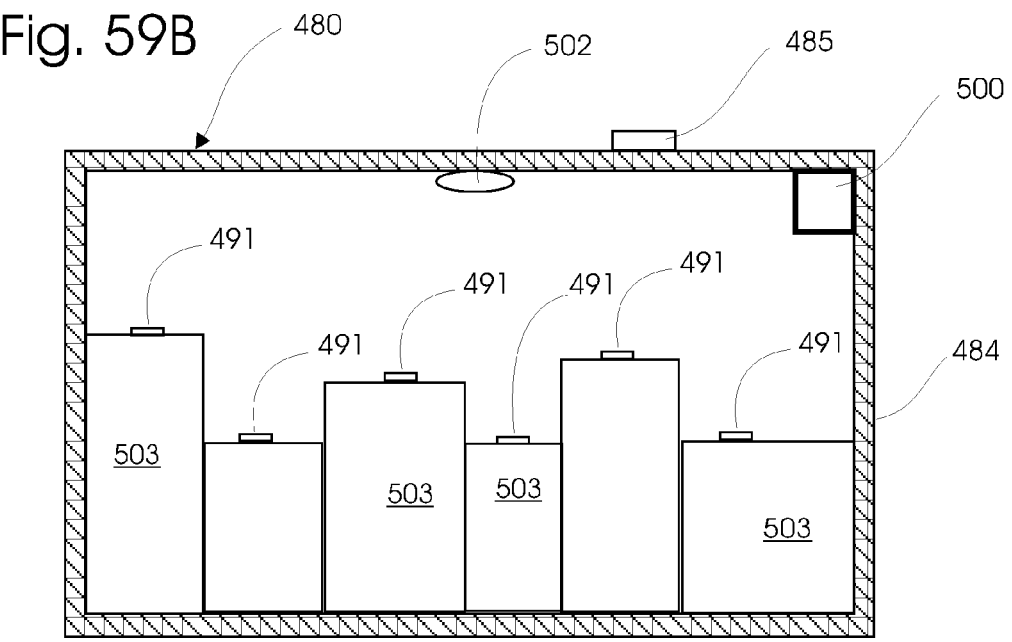
FIG. 59B is a cross-sectional view of a container showing the use of barcode technology in a monitoring system and method in accordance with the invention.

Similarly, for certain types of cargo, a barcode system might acceptable, or another optically readable identification code. The cargo items would have to be placed so that the identification codes are readable, i.e., when a beam of light is directed over the identification codes, a pattern of light is generated which contains information about the cargo item. As shown in FIG. 59B, the cargo items in this case are boxes having an equal height so that a space remains between the top of the boxes 501 and the ceiling of the container 480. One or more optical scanners 502, including a light transmitter and receiver, are arranged on the ceiling of the container and can be arranged to scan the upper surfaces of the boxes 503, possibly by moving the length of the container 480, or through a plurality of such sensors. During such a scan, patterns of light are reflected from the barcodes 501 on the upper surfaces of the boxes 503 and received by the optical scanner 502. The patterns of light contain information about the cargo items in the boxes 503. Receivers can be arranged at multiple locations along the ceiling. Other arrangements to ensure that a light beam traverses a barcode 501 and is received by a receiver can also be applied in accordance with the invention. As discussed above, other tag technologies can be used if appropriate such as those based of magnetic wires.

The ability to read barcodes and RFID tags provides the capability of the more closely tracking of packages for such organizations as UPS, Federal Express, the U.S. Postal Service and their customers. Now, in some cases, the company can ascertain that a given package is in fact on a particular truck or cargo transporter and also know the exact location of the transporter.

Frequently, a trailer or container has certain hardware such as racks for automotive parts, for example, that are required to stay with the container. During unloading of the cargo these racks, or other sub-containers, could be removed from the container and not returned. If the container system knows to check for the existence of these racks, then this error can be eliminated. Frequently, the racks are of greater value then the cargo they transport. Using RFID tags and a simple interrogator mounted on the ceiling of the container perhaps near the entrance, enables monitoring of parts that are taken in or are removed from the container and associated with the location of container. By this method, pilferage of valuable or dangerous cargo can at least be tracked.

Containers constructed in accordance with the invention will frequently have a direct method of transmitting information to a satellite. Typically, the contents of the container are more valuable than the truck or chassis for the case of when the container is not a trailer. If the tractor, train, plane or ship that is transporting the container is experiencing difficulties, then this information can be transmitted to the satellite system and thus to the container, carrier, or cargo owner or agent for attention. Information indicating a problem with carrier (railroad, tractor, plane, boat) may be sensed and reported onto a bus such as CAN bus which can be attached either wirelessly or by wires to the container. Alternately, sensors on the container can determine through vibrations etc. that the carrier may be experiencing problems. The reporting of problems with the vehicle can come from dedicated sensors or from a general diagnostic system such as described in U.S. Pat. No. 5,809,437 and U.S. Pat. No. 6,175,787, and herein. Whatever the source of the diagnostic information, especially when valuable or dangerous cargo is involved, this information in coded form can be transmitted to a ground station, LEO or geostationary satellite as discussed above. Other information that can be recorded by container includes the identification of the boat, railroad car, or tractor and operator or driver.

The experiences of the container can be recorded over time as a container history record to help in life cycle analysis to determine when a container needs refurbishing, for example. This history in coded form could reside on a memory that is resident on the container or preferably the information can be stored on a computer file associated with that container in a database. The mere knowledge of where a container has been, for example, may aid law enforcement authorities to determine which containers are most likely to contain illegal contraband.

The pertinent information relative to a container can be stored on a tag that is associated and physically connected to the container. This tag may be of the type that can be interrogated remotely to retrieve its contents. Such a tag, for example, could contain information as to when and where the container was most recently opened and the contents of the container. Thus, as containers enter a port, their tags can each be interrogated to determine their expected contents and also to give a warning for those containers that should be inspected more thoroughly. In most cases, the tag information will not reside on the container but in fact will be on a computer file accessible by those who have an authorization to interrogate the file. Thus, the container need only have a unique identification number that cannot easily be destroyed, changed or otherwise tampered with. These can be visual and painted on the outside of the container or an RFID, barcode or other object identification system can be used. Again, the tags can be based on passive SAW technology to give greater range or could contain a battery or ultracapacitor for even greater range. The tag can be in a sleep mode until receiving a wakeup call to further conserve battery power.

Figure 60:
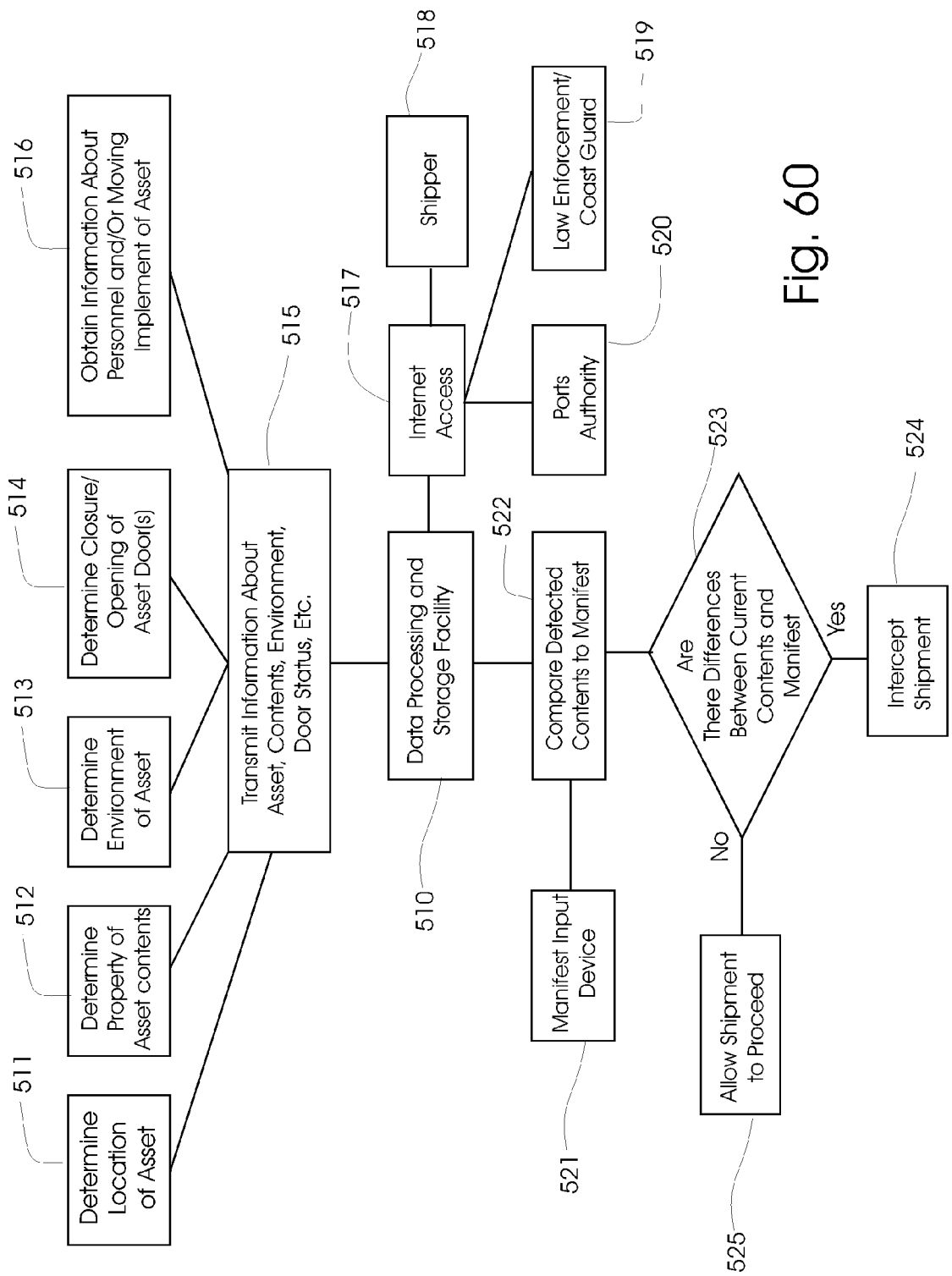
FIG. 60 is a flow chart showing one manner in which multiple assets are monitored in accordance with the invention.

FIG. 60 shows a flow chart of the manner in which multiple assets may be monitored using a data processing and storage facility 510, each asset having a unique identification code. The location of each asset is determined at 511, along with one or more properties or characteristics of the contents of each asset at 512, one or more properties of the environment of each asset at 513, and/or the opening and/or closing of the doors of each asset at 514. This information is transmitted to the data processing and storage facility 510 as represented by 515 with the identification code. Information about the implement being used to transport the asset and the individual(s) or company or companies involved in the transport of the asset can also be transmitted to the facility as represented by 516. This latter information could be entered by an input device attached to the asset.

The data processing and storage facility 510 is connected to the Internet at 517 to enable shippers 518 to check the location and progress of the asset, the contents of the asset, the environment of the asset, whether the doors are being opened and closed impermissibly and the individual and companies handling the asset. The same information, or a subset of this information, can also be accessed by law enforcement personnel at 519 and maritime/port authorities at 520. Different entities can be authorized to access different items of information or subsets of the total information available relating to each asset.

For anti-theft purposes, the shipper enters the manifest of the asset using an input device 521 so that the manifest can be compared to the contents of the asset (at 522). A determination is made at 523 as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 524 to ascertain the whereabouts of the cargo. The history of the travels of the asset would also be present in the data facility 510 so that it can be readily ascertained where the cargo disappeared. If no discrepancy is revealed, the asset is allowed to proceed at 525.

14.13.4 Exterior Monitoring Near a Vehicle

Having the ability to transmit coded information to a satellite, or other telematics system, using a low cost device having a battery that lasts for many years opens up many other, previously impractical opportunities. Many of these opportunities are discussed above and below and all are teachings of at least one of the inventions disclosed herein. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum, capacitive sensors, electric or magnetic field sensors, and chemical sensors among others.

Cameras either with or without a source of illumination can be used to record people approaching the container and perhaps stealing the contents of the container. At the appropriate frequencies, (tetra Hertz, for example) the presence of concealed weapons can be ascertained as described in *Alien Vision: Exploring the Electromagnetic Spectrum With Imaging Technology* (SPIE Monograph Vol. PM104) by Austin Richards. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked as a safe, for example, and only permit an authorized person carrying the proper identification to open the container or other storage facility.

A pattern recognition system can be trained to identify facial or iris patterns, for example, of authorized personnel or ascertain the identity of authorized personnel to prevent theft of the container. Such a pattern recognition system can operate on the images obtained by the cameras. That is, if the pattern recognition system is a neural network, it would be trained to identify or ascertain the identity of authorized personnel based on images of such personnel during a training phase and thus operationally only allow such personnel to open the container, enter the container and/or handle the container.

A wide variety of smart cards, biometric identification systems (such as fingerprints, voice prints and Iris scans) can be used for the same purpose. When an unauthorized person approaches the container, his or her picture can be taken and in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance sensors or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of at least one of the inventions disclosed herein, the output of any of these sensors can now be transmitted to a remote facility using a variety of telematics methods including communication via a low power link to a satellite, such as provided by the Skybitz Corporation as described above and others.

Thus, as mentioned above, many new opportunities now exist for applying a wide variety of sensors to a cargo container or other object as discussed above and below. Through a communication system such as a LEO or geostationary or other satellite system, critical information about the environment of container or changes in that environment can be transmitted to the container owner, law enforcement authorities, container contents owner etc. Furthermore, the system is generally low cost and does not require connection to an external source of power. The system generally uses low power from a battery that can last for years without maintenance, 14.13.5 Analysis Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power satellite monitoring system is that the amount of data routinely sent to the satellite be kept to a minimum. For most transmissions, this information will involve the location of the container, for example, plus a few additional bytes of status information determined by the mission of the particular container and its contents. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the satellite that an exception situation exists and to prepare to receive additional information.

Many of the sensors on the container and inside the container may also require significant energy and thus should be used sparingly. For example, if the container is known to be empty and the doors closed, there is no need to monitor the interior of the container unless the doors have been reopened. Similarly, if the container is stationary and doors are closed, then continuously monitoring the interior of the container to determine the presence of cargo is unnecessary. Thus, each of the sensors can have a program duty cycle that depends on exterior or other events. In some applications either solar power or other source of power may be available either intermittently to charge the battery or continuously.

If the vehicle such as a container is stationary then usually the monitoring can take place infrequently and the battery is conserved. When the vehicle is in motion then energy is frequently available to charge the battery and thus more frequent monitoring can take place as the battery is charged. The technique in known as "energy harvesting" and involves, for example, the use of a piezoelectric material that is compressed, bent or otherwise flexed thereby creating an electric current that can be used to charge the battery. Other methods include the use of a magnet and coil where the magnet moves relative to the coil under forces caused by the motion of the vehicle.

Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

14.13.6 Safety

As mentioned previously, there are times when the value of the contents of a container can exceed the value of the tractor, chassis and container itself. Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement. Note that for some applications in order to minimize the power expended at the sensor installation, the IMU correction calculations based on the GPS can be done at an off sensor location such as the receiving station of the satellite information.

If the vehicle operates on a road that has previously been accurately mapped, to an accuracy of perhaps a few centimeters, then the analysis system can know the input from the road to the vehicle tires and thus to the chassis of the trailer. The IMU can also calculate the velocity of the trailer. By monitoring the motion of the container when subjected to a known stimulus, the road, the inertial properties of the container and chassis system can be estimated. If these inertial properties are known than a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system when the road is covered with ice or when it encounters a pothole.

Thus, there are many safety related aspects to having sensors mounted on a container and where those sensors can communicate periodically with a LEO or other satellite, or other communication system, and thereafter to the Internet or directly to the appropriate facility. Some of these rely on an accurate IMU. Although low cost IMUs are generally not very accurate, when they are combined using a Kalman filter with the GPS system, which is on the container as part of the tracking system, the accuracy of the IMU can be greatly improved, approaching that of military grade systems.

14.13.7 Other Remote Monitoring

The discussion above has concentrated on containers that contain cargo where presumably this cargo is shipped from one company or organization to another. This cargo could be automotive parts, animals, furniture, weapons, bulk commodities, machinery, fruits, vegetables, TV sets, or any other commonly shipped product. What has been described above is a monitoring system for tracking this cargo and making measurements to inform the interested parties (owners, law enforcement personnel etc.) of the status of the container, its contents, and the environment. This becomes practical when a satellite system exists such as the Skybitz, for example, LEO or geostationary satellite system coupled with a low cost low power small GPS receiver and communication device capable of sending information periodically to the satellite. Once the satellite has received the position information from the container, for example, this information can be relayed to a computer system wherein the exact location of the container can be ascertained. Additionally, if the container has an RFID reader, the location of all packages having an RFID tag that are located within the container can also be ascertained.

The accuracy of this determination is currently now approximately 20 meters. However, as now disclosed for the first time, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the container location. It need not be done onboard the container. Using accurate digital maps the location of the container on the earth can be extremely precisely determined. This principle can now be used for other location determining purposes. The data processing facility that receives the information from the asset via satellites can also know the DGPS corrections at the asset location and thus can relay to the vehicle its precise location.

Although the discussion above has centered on cargo transportation as an illustrative example, at least one of the inventions disclosed herein is not limited thereto and in fact can be used with any asset whether movable or fixed where monitoring for any of a variety of reasons is desired. These reasons include environmental monitoring, for example, where asset damage can occur if the temperature, humidity, or other atmospheric phenomena exceeds a certain level. Such a device then could transmit to the telecommunications system when this exception situation occurred. It still could transmit to the system periodically, perhaps once a day, just to indicate that all is OK and that an exceptional situation did not occur.

Another example could be the monitoring of a vacation home during the months when the home is not occupied. Of course, any home could be so monitored even when the occupants leave the home unattended for a party, for example. The monitoring system could determine whether the house is on fire, being burglarized, or whether temperature is dropping to the point that pipes could freeze due to a furnace or power failure. Such a system could be less expensive to install and maintain by a homeowner, for example, than systems supplied by ADT, for example. Monitoring of a real estate location could also be applied to industrial, governmental and any other similar sites. Any of the sensors including electromagnetic, cameras, ultrasound, capacitive, chemical, moisture, radiation, biological, temperature, pressure, radiation, etc. could be attached to such a system which would not require any other electrical connection either to a power source or to a communication source such as a telephone line which is currently require by ADT, for example. In fact, most currently installed security and fire systems require both a phone and a power connection. If a power source is available, it can be used to recharge the batteries or as primary power.

Of particular importance, this system and techniques can be applied to general aviation and the marine community for the monitoring of flight and boat routings. For general aviation, this or a similar system can be used for monitoring the unauthorized approach of planes or boats to public utilities, government buildings, bridges or any other structure and thereby warn of possible terrorist activities.

Portable versions of this system can also be used to monitor living objects such as pets, children, animals, cars, and trucks, or any other asset. What is disclosed herein therefore is a truly general asset monitoring system where the type of monitoring is only limited by requirement that the sensors operate under low power and the device does not require connections to a power source, other than the internal battery, or a wired source of communication. The communication link is generally expected to be via a transmitter and a LEO, geostationary or other satellite, however, it need not be the case and communication can be by cell phone, an ad hoc peer-to-peer network, IEEE 801.11, Bluetooth, or any other wireless system. Thus, using the teachings of at least one of the inventions disclosed herein, any asset can be monitored by any of a large variety of sensors and the information communicated wirelessly to another location which can be a central station, a peer-to-peer network, a link to the owners location, or, preferably, to the Internet.

Additional areas where the principles of the invention can be used for monitoring other objects include the monitoring of electric fields around wires to know when the wires have failed or been cut, the monitoring of vibrations in train rails to know that a train is coming and to enable tracking of the path of trains, the monitoring of vibrations in a road to know that a vehicle is passing, the monitoring of temperature and/or humidity of a road to signal freezing conditions so that a warning could be posted to passing motorists about the conditions of the road, the monitoring of vibrations or flow in an oil pipe to know if the flow of oil has stopped or being diverted so that a determination may be made if the oil is being stolen, the monitoring of infrared or low power (MIR) radar signal monitoring for perimeter security, the monitoring of animals and/or traffic to warn animals that a vehicle is approaching to eliminate car to animal accidents and the monitoring of fluid levels in tanks or reservoirs. It is also possible to monitor grain levels in storage bins, pressure in tanks, chemicals in water or air that could signal a terrorist attack, a pollution spill or the like, carbon monoxide in a garage or tunnel, temperature or vibration of remote equipment as a diagnostic of pending system failure, smoke and fire detectors and radiation. In each case, one or more sensors is provided designed to perform the appropriate, desired sensing, measuring or detecting function and a communications unit is coupled to the sensor(s) to enable transmission of the information obtained by the sensor(s). A processor can be provided to control the sensing function, i.e., to enable only periodic sensing or sensing conditioned on external or internal events. For each of these and many other applications, a signal can be sent to a satellite or other telematics system to send important information to a need-to-know person, monitoring computer program, the Internet etc.

Three other applications of at least one of the inventions disclosed herein need particular mention. Periodically, a boat or barge impacts with the structure of a bridge resulting in the collapse of a road, railroad or highway and usually multiple fatalities. Usually such an event can be sensed prior to the collapse of the structure by monitoring the accelerations, vibrations, displacement, or stresses in the structural members. When such an event is sensed, a message can be sent to a satellite and/or forwarded to the Internet, and thus to the authorities and to a warning sign or signal that has been placed at a location preceding entry onto the bridge. Alternately, the sensing device can send a signal directly to the relevant sign either in addition or instead of to a satellite.

Sometimes the movement of a potentially hazardous cargo in itself is not significantly unless multiple such movements follow a pattern. For example, the shipment of moderate amounts of explosives forwarded to a single location could signify an attack by terrorists. By comparing the motion of containers of hazardous materials and searching for patterns, perhaps using neural networks, fuzzy logic and the like, such concentrations of hazardous material can be forecasted prior to the occurrence of a disastrous event. This information can be gleaned from the total picture of movements of containers throughout a local, state or national area. Similarly, the movement of fuel oil and fertilizer by itself is usually not noteworthy but in combination using different vehicles can signal a potential terrorist attack.

Many automobile owners subscribe to a telematics service such as OnStar®. The majority of these owners when queried say that they subscribe so that if they have an accident and the airbag deploys, the EMS personnel will be promptly alerted.

This is the most commonly desired feature by such owners. A second highly desired feature relates to car theft. If a vehicle is stolen, the telematics services can track that vehicle and inform the authorities as to its whereabouts. A third highly desired feature is a method for calling for assistance in any emergency such as the vehicle becomes stalled, is hijacked, runs off the road into a snow bank or other similar event. The biggest negative feature of the telematics services such as OnStar® is the high monthly cost of the service. See also section 9.2.

The invention described here can provide the three above-mentioned highly desired services without requiring a high monthly fee. A simple device that communicates to a satellite or other telematics system can be provided, as described above, that operates either on its own battery and/or by connecting to the cigarette lighter or similar power source. The device can be provided with a microphone and neural network algorithm that has been trained to recognize the noise signature of an airbag deployment or the information that a crash transpired can be obtained from an accelerometer. Thus, if the vehicle is in an accident, the EMS authorities can be immediately notified of the crash along with the precise location of the vehicle. Similarly, if the vehicle is stolen, its exact whereabouts can be determined through an Internet connection, for example. Finally, a discrete button placed in the vehicle can send a panic signal to the authorities via a telematics system. Thus, instead of a high monthly charge, the vehicle owner would only be charged for each individual transmission, which can be as low as $0.20 or a small surcharge can be added to the price of the device to cover such costs through averaging over many users. Such a system can be readily retrofitted to existing vehicles providing most of advantages of the OnStar® system, for example, at a very small fraction of its cost. The system can reside in a "sleep" mode for many years until some event wakes it up. In the sleep mode, only a few microamperes of current are drawn and the battery can last the life of the vehicle. A wake-up can be achieved when the airbag fires and the microphone emits a current. Similarly, a piezo-generator can be used to wake up the system based on the movement of a mass or diaphragm displacing a piezoelectric device which then outputs some electrical energy that can be sensed by the system electronics. Similarly, the system can be caused to wake up by a clock or the reception of a proper code from an antenna. Such a generator can also be used to charge the system battery extending its useful life. Such an OnStar®-like system can be manufactured for approximately $100, depending on production volume and features.

The invention described above can be used in any of its forms to monitor fluids. For example, sensors can be provided to monitor fuel or oil reservoirs, tanks or pipelines and spills. Sensors can be arranged in, on, within, in connection with or proximate a reservoir, tank or pipeline and powered in the manner discussed above, and coupled to a communication system as discussed above. When a property of characteristic of the environment is detected by the sensor, for example, detection of a fluid where none is supposed to be (which could be indicative of a spill), the sensor can trigger a communication system to transmit information about the detection of the fluid to a remote site which could send response personnel, i.e., clean-up personnel. The sensors can be designed to detect any variables which could provide meaningful information, such as a flow sensor which could detect variations in flow, or a chemical sensor which could detect the presence of a harmful chemical, biological agent or a radiation sensor which could detect the presence of radioactivity. Appropriate action could be taken in response to the detection of chemicals or radioactivity.

Remote water monitoring is also contemplated in the invention since water supplies are potentially subject to sabotage, e.g., by the placement of harmful chemicals or biological agents in the water supply. In this case, sensors would be arranged in, on, within, in connection with or proximate water reservoirs, tanks or pipelines and powered in the manner discussed above, and coupled to a communication system as discussed above. Information provided by the sensors is periodically communicated to a remote site at which it is monitored. If a sensor detects the presence of a harmful chemical or agent, appropriate action can be taken to stop the flow of water from the reservoir to municipal systems.

Even the pollution of the ocean and other large bodies of water especially in the vicinity of a shore can now be monitored for oil spills and other occurrences.

Similarly, remote air monitoring is contemplated within the scope of the invention. Sensors are arranged at sites to monitor the air and detect, for example, the presence of radioactivity and bacteria. The sensors can send the information to a communication system which transmits the information to a remote site for monitoring. Detection of aberrations in the information from the sensors can lead to initiation of an appropriate response, e.g., evacuation in the event of radioactivity detection.

The monitoring of forests for fires is also a possibility with the present invention, although satellite imaging systems are the preferred approach.

An additional application is the monitoring of borders such as the on between the United States and Mexico. Sensors can be placed periodically along such a border at least partially in the ground that are sensitive to vibrations, infrared radiation, sound or other disturbances. Such sensor systems can also contain a pattern recognition system that is trained to recognize characteristic signals indicating the passing of a person or vehicle. When such a disturbance occurs, the system can "wake-up" and receive and analyze the signal and if it is recognized, a transmission to a communication system can occur. Since the transmission would also contain either a location or an identification number of the device, the authorities would know where the border infraction was occurring.

Above, the discussion of the invention has included the use of a location determining signal such as from a GPS or other location determining system such as the use of time of arrival calculations from receptions from a plurality of cell phone antennas. If the device is located in a fixed place where it is unlikely to move, then the location of that place need only be determined once when the sensor system is put in place. The identification number of the device can then be associated with the device location in a database, for example. Thereafter, just the transmission of the device ID can be used to positively identify the device as well as its location. Even for movable cargo containers, for example, if the container has not moved since the last transmission, there is no need to expend energy receiving and processing the GPS or other location determining signals. If the device merely responds with its identification number, the receiving facility knows its location. The GPS processing circuitry can be reactivated if sensors on the asset determine that the asset has moved.

Once the satellite or other communication system has received a message from the sensor system of at least one of the inventions disclosed herein, it can either store the information into a database or, more commonly, it can retransmit or make available the data usually on the Internet where subscribers can retrieve the data and use it for their own purposes. Since such sensor systems are novel to at least one of the inventions disclosed herein, the transmission of the data via the Internet and the business model of providing such data to subscribing customers either on an as-needed bases or on a push basis where the customer receives an alert is also novel. Thus, for example, a customer may receive an urgent automatically-generated e-mail message or even a pop-up message on a particular screen that there is a problem with a particular asset that needs immediate attention. The customer can be a subscriber, a law enforcement facility, or an emergency services facility, among others.

An additional dimension exists with the use of the Skybitz system, for example, where the asset mounted device has further wireless communications with other devices in or on the asset. The fact that certain tagged items within or on the assets can be verified if a local area network exists between the Skybitz device and other objects. Perhaps it is desired to check that a particular piece of test equipment is located within an asset. Further perhaps it is desired to determine that the piece of equipment is operating or operating within certain parameter ranges, or has a particular temperature etc. Perhaps it is desired to determine whether a particular set of keys are in a key box wherein the keys are fitted with an RFID tag and the box with a reader and method of communicating with the Skybitz device. The possibilities are endless for determining the presence or operating parameters of a component of occupying item of a remote asset and to periodically communicate this information to an internet site, for example, using a low power asset monitoring system such as the Skybitz system.

The Skybitz or similar system can be used with cell phones to provide a location determination in satisfaction to US Federal regulations. The advantage of this use of Skybitz is that it is available world wide and does not require special equipment at the cell phone station. This also permits an owner of a cell phone to determine its whereabouts for cases where it was lost or stolen. A similar system can be added to PDAs or other CD players, radios, or any other electronic device that a human may carry. Even non electronic devices such as car keys could be outfitted with a Skybitz type device. It is unlikely that such a device would have a 10 year life but many of them have batteries that are periodically charged and the others could have a very low duty cycle such that they last up to one year without replacement of the battery and then inform the owner that the battery is low. This information process could even involve the sending of an email message to the owner's email stating the location of the device and the fact that the battery needs replacement.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network and modular neural networks have been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations.

Also, any of the apparatus and methods disclosed herein may be used for diagnosing the state of operation or a plurality of discrete components.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A movable vehicle adapted to retain cargo and thereby move the cargo from one place to another, comprising:
   a structure defining an interior space of the movable vehicle for containing one or more inanimate objects constituting the cargo of the movable vehicle, said structure being a cargo container, a railroad car, a truck trailer, a ship having a hold in which the cargo is retained or an airplane having a cargo area in which the cargo is retained;
   an arrangement mounted on said structure and within said structure such that said arrangement moves with said structure, said arrangement monitoring said interior space defined by said structure and determining whether said interior space defined by said structure is empty, whether an inanimate object is present in said interior space defined by said structure and when an inanimate object is determined to be present, whether the inanimate object has changed its position while still being present in said interior space,
   said arrangement comprising:
      at least one optical imaging device that receives images of said interior space defined by said structure; and
      a processor coupled to said at least one optical imaging device and configured to determine whether said interior space defined by said structure is empty by comparing an image of said interior space that is obtained by said at least one optical imaging device to a previously obtained image of said interior space when empty and considering said interior space defined by said structure to be empty when the images are the same; and
   a communications system mounted on said structure and coupled to said arrangement such that said communications system moves with said structure, said communications system wirelessly transmitting from said structure, the determination that said interior space is empty,
      said processor being further configured to determine whether one or more inanimate objects are present in said interior space by comparing an image of said interior space that is obtained by said at least one optical imaging device to the previously obtained image of said interior space when empty,
      said processor being further configured to obtain, when one or more inanimate objects are determined to be present, identification information about the inanimate object or objects, said processor being further configured to analyze images received by said at least one optical imaging device at different times to determine changes in the presence of the inanimate objects indicative of insertion of a new object into said interior space or removal of an object from said interior space, said processor being further configured to analyze images received by said at least one optical imaging device at different times to determine changes in position of the same inanimate object indicative of movement of that object within said interior space, whereby said processor is arranged to distinguish between different inanimate objects or different arrangements of inanimate objects; and said communications system wirelessly transmitting from said structure, the determination of the presence of one or more inanimate object, the information obtained about the inanimate object or objects, the determination of changes in the presence of the inanimate objects and the determination of changes in position of the same inanimate object to a site remote and separate from the vehicle.

2. The vehicle of claim 1, wherein said at least one optical imaging device consists of a single optical imaging device.

3. The vehicle of claim 1, wherein said processor comprises a neural network that determines whether an object is present after being trained in a training stage in which images received by said at least one optical imaging device in the absence of objects in said interior space and images received by said at least one optical imaging device with objects present in said interior space are collected and used to derive the neural network.

4. The vehicle of claim 1, further comprising an illumination device mounted on said structure for illuminating at least a portion of said interior space with electromagnetic radiation.

5. The vehicle of claim 1, further comprising a structured light generator which transmits structured light into said interior space.

6. The vehicle of claim 1, wherein said processor is configured to generate, when one or more inanimate objects are determined to be present in said interior space, a signal characteristic of the inanimate object based on the received images, and categorize the signal to thereby identify the inanimate object and provide the identification information about the inanimate object.

7. The vehicle of claim 6, wherein said processor comprises a pattern recognition technique that recognizes and thus identifies a class of the object by processing the signal into a categorization of the signal based on data relating to images received by said at least one optical imaging device and associated with possible classes of objects.

8. The vehicle of claim 1, wherein said processor is configured to apply a pattern recognition algorithm generated from images of said interior space with different objects therein in order to obtain information about the objects.

9. The vehicle of claim 1, wherein said at least one optical imaging device comprises a plurality of optical imaging devices spaced apart from one another and that obtain images of a common portion of said interior space defined by said structure.

10. The vehicle of claim 1, wherein said structure includes a roof, said at least one optical imaging device being mounted on or proximate to said roof.

11. The vehicle of claim 1, further comprising a reactive system coupled to said processor and being controlled by said processor, when one or more inanimate objects are determined to be present in said interior space, based on the determination by said processor as to whether an inanimate object is present in said interior space and the information about the inanimate object when present in said interior space.

12. The vehicle of claim 1, wherein said processor is further configured to obtain, when one or more inanimate objects are determined to be present, one or more of a position of the inanimate object, a type of the inanimate object and a size of the inanimate object.

13. A method for monitoring an interior space of a movable vehicle adapted to retain cargo and thereby move the cargo from one place to another, comprising:

mounting at least one optical imaging device within a structure defining the interior space of the movable vehicle, the structure being a cargo container, a railroad car, a truck trailer, a ship having a hold in which the cargo is retained or an airplane having a cargo area in which the cargo is retained;

receiving images at the at least one optical imaging device during use of the vehicle; and when images are received, monitoring the interior space defined by the structure, and determining, using a processor mounted on the structure and that moves with the structure, whether the interior space defined by the structure is empty by comparing an image of the interior space to a previously obtained image of the interior space when empty and considering the interior space defined by the structure to be empty when the images are the same, and wirelessly transmitting from the structure, via a communications system mounted on the structure and that moves with the structure, the determination that the interior space is empty to a site remote and separate from the vehicle, and determining whether any inanimate objects constituting the cargo are present in the interior space defined by the structure by comparing an image of the interior space to the previously obtained image of the interior space when empty, and wirelessly transmitting from the structure, via the communications system, the determination of the presence of one or more inanimate objects in the interior space to the site remote and separate from the vehicle, and when one or more inanimate objects are determined to be present, obtaining identification information about the inanimate object or objects based on analysis of the received images, whereby the processor is arranged to distinguish between different inanimate objects or different arrangements of inanimate objects;

analyzing, using the processor, images received at the at least one optical imaging device at different times to determine changes in the presence of the inanimate objects indicative of insertion of a new object into the interior space or removal of an object from the interior space and wirelessly transmitting from the structure, via the communications system, the determination of changes in the presence of the inanimate objects to the site remote and separate from the vehicle;

analyzing, using the processor, images received by the at least one optical imaging device at different times to determine changes in position of the same inanimate object indicative of movement of that object within the interior space and wirelessly transmitting from the structure, via the communications system the determination of changes in position of the same inanimate object to the site remote and separate from the vehicle.

14. The method of claim 13, further comprising distinguishing, using the processor and only when one or more objects are determined to be present in the interior space of the vehicle, between different objects or different arrangements of objects when one or more objects are determined to be present in the interior space of the vehicle.

15. The method of claim 13, wherein the step of determining whether any objects are present and obtaining information about the object or objects when present comprises training a pattern recognition algorithm in a training stage to provide such output, and in the training stage, collecting images received by the at least one optical imaging device in the absence of objects in the interior space and with objects present in the interior space.

16. The method of claim 13, further comprising illuminating at least a portion of the interior space with electromagnetic radiation.

17. The method of claim 13, further comprising controlling, only when one or more objects are determined to be present in the interior space of the vehicle, a reactive system based on the determination as to whether any objects are present in the interior space and the information about the object or objects when present in the interior space.

18. The vehicle of claim 1, wherein said communications system is arranged to transmit the determination of the presence of one or more inanimate objects and the information obtained about the inanimate object or objects to the site remote and separate from the vehicle only when one of the following occurs:
   receipt of a request from the remote site;
   said processor determines, based on analysis of the images received from said at least one optical imaging device, that status of the interior space has changed to a new status requiring notification to the remote site;
   receipt of an indication that security of the interior space has been violated;
   receipt of an indication that an environment within the interior space has changed;
   passage of a predetermined amount of time; and
   receipt of occurrence of an event relating to a change in location of the vehicle.

19. The method of claim 13, wherein the communications system is arranged to transmit the determination of the presence of one or more inanimate objects and the information obtained about the inanimate object or objects to the site remote and separate from the vehicle only when one of the following occurs:
   receipt of a request from the remote site;
   the processor determines, based on analysis of the images received from the at least one optical imaging device, that status of the interior space has changed to a new status requiring notification to the remote site;
   receipt of an indication that security of the interior space has been violated;
   receipt of an indication that an environment within the interior space has changed;
   passage of a predetermined amount of time; and
   receipt of occurrence of an event relating to a change in location of the vehicle.

20. The vehicle of claim 1, wherein when said processor compares an image of said interior space that is obtained by said at least one optical imaging device to the previously obtained image of said interior space when empty, said processor performs image subtraction.

21. The method of claim 13, wherein when the processor compares an image of the interior space that is obtained by the at least one optical imaging device to the previously obtained image of the interior space when empty, the processor performs image subtraction.

22. The vehicle of claim 1, wherein said structure includes a door for accessing said interior space, said at least one imaging device being configured to obtain the image of said interior space when empty based on closure of said door.

23. The method of claim 13, further comprising obtaining the image of the interior space when empty based on closure of a door of the structure that enables access to the interior space.

* * * * *